United States Patent
Wang et al.

(10) Patent No.: US 10,455,024 B2
(45) Date of Patent: Oct. 22, 2019

(54) SYSTEMS, METHODS AND APPARATUS FOR MANAGING MACHINE-TO-MACHINE (M2M) ENTITIES

(71) Applicant: IoT Holdings, Inc., Wilmington, DE (US)

(72) Inventors: Chonggang Wang, Conshohocken, PA (US); Paul L. Russell, Jr., Conshohocken, PA (US); Guang Lu, Thornhill (CA); Dale N. Seed, Conshohocken, PA (US); Lijun Dong, San Diego, CA (US); Michael F. Starsinic, Conshohocken, PA (US)

(73) Assignee: IoT Holdings, Inc., Wilmington, DE (US)

( * ) Notice: Subject to any disclaimer, the term of this patent is extended or adjusted under 35 U.S.C. 154(b) by 0 days.

(21) Appl. No.: 15/965,134

(22) Filed: Apr. 27, 2018

(65) Prior Publication Data

US 2018/0248957 A1    Aug. 30, 2018

Related U.S. Application Data

(63) Continuation of application No. 15/211,017, filed on Jul. 15, 2016, now Pat. No. 9,986,038, which is a
(Continued)

(51) Int. Cl.
*H04W 4/50* (2018.01)
*H04L 29/08* (2006.01)
(Continued)

(52) U.S. Cl.
CPC ........ *H04L 67/125* (2013.01); *H04L 41/0213* (2013.01); *H04L 41/0233* (2013.01);
(Continued)

(58) Field of Classification Search
CPC ...... H04W 4/001; H04W 4/02; H04L 67/125; H04L 41/0233; H04L 41/06; H04L 29/08
See application file for complete search history.

(56) References Cited

U.S. PATENT DOCUMENTS

2009/0089078 A1    4/2009  Bursey
2009/0217348 A1*   8/2009  Salmela ................ H04W 4/70
                                                726/2
(Continued)

FOREIGN PATENT DOCUMENTS

CN       101477535      7/2009
JP       2007-049579    2/2007
(Continued)

OTHER PUBLICATIONS

"3rd Generation Partnership Project; Technical Specification Group Services and System Aspects; Service requirements for Machine-Type Communications (MTC); Stage 1 (Release 10)", 3GPP TS 22.368 V10.3.0, Dec 2010, 18 pages.
(Continued)

*Primary Examiner* — Lakeram Jangbahadur
(74) *Attorney, Agent, or Firm* — Julian F. Santos

(57) ABSTRACT

Systems, methods and apparatus for managing machine-to-machine (M2M) entities are disclosed. Included herein is a method that may include implementing one or more management layers for managing M2M entities in an M2M environment. The method may also include using a plurality of management layers to manage a M2M area network, wherein the M2M area network may include one or more M2M end devices. The M2M end devices may include, for example, an M2M gateway and/or an M2M device. The management layers may include any of an application management layer, service management layer, network management layer and a device management layer. The man-
(Continued)

agement layers may provide any of configuration management, fault management, and performance management of the M2M entities.

18 Claims, 77 Drawing Sheets

Related U.S. Application Data continuation of application No. 13/983,220, filed as application No. PCT/US2012/024634 on Feb. 10, 2012, now Pat. No. 9,426,222.

(60) Provisional application No. 61/441,911, filed on Feb. 11, 2011, provisional application No. 61/444,323, filed on Feb. 18, 2011, provisional application No. 61/452,422, filed on Mar. 14, 2011, provisional application No. 61/485,631, filed on May 13, 2011, provisional application No. 61/496,812, filed on Jun. 14, 2011, provisional application No. 61/500,798, filed on Jun. 24, 2011, provisional application No. 61/501,046, filed on Jun. 24, 2011, provisional application No. 61/508,564, filed on Jul. 15, 2011.

(51) Int. Cl.
　　*H04W 4/70*　　(2018.01)
　　*H04L 12/24*　　(2006.01)
　　*H04W 4/60*　　(2018.01)
　　*H04W 4/02*　　(2018.01)

(52) U.S. Cl.
　　CPC ...... *H04L 41/0273* (2013.01); *H04L 41/0806* (2013.01); *H04W 4/50* (2018.02); *H04W 4/60* (2018.02); *H04W 4/70* (2018.02); *H04L 41/06* (2013.01); *H04W 4/02* (2013.01); *Y04S 40/162* (2013.01); *Y04S 40/166* (2013.01); *Y04S 40/18* (2018.05)

(56) References Cited

U.S. PATENT DOCUMENTS

| | | | | |
|---|---|---|---|---|
| 2010/0057485 | A1* | 3/2010 | Luft | H04W 4/70 455/411 |
| 2011/0016379 | A1 | 1/2011 | McColl et al. | |
| 2011/0268047 | A1* | 11/2011 | Nath | H04W 4/08 370/329 |
| 2012/0047551 | A1 | 2/2012 | Pattar et al. | |

FOREIGN PATENT DOCUMENTS

| | | |
|---|---|---|
| JP | 2010-193264 | 9/2010 |
| WO | WO-2009/092115 | 7/2009 |

OTHER PUBLICATIONS

"Electromagnetic compatibility and Radio spectrum Matters (ERM); Conformance testing for Mode 1 of the digital Private Mobile Radio (dPMR); Part 1: Protocol Implementation Conformance Statement (PICS) proforma", ETSI TS 102 726-1 V1.1.1, Oct 2009, 18 pages.
"English Language Abstract", Japanese Patent Application No. 2007-049579, Feb. 22, 2007, 2 pages.
"English Language Abstract", Japanese Patent Application No. 2010-193264, Sep. 2, 2010, 2 pages.
"Extended European Search Report", EP Application No. 14193582.5-1870, dated Mar. 2, 2015, 6 pages.
"First Notification of Office Action", Chinese Patent Application No. 201280008606.9, dated Aug. 3, 2016, 6 Pages.
"First Notification of Office Action (English Translation)", Chinese Patent Application No. 201280008606.9, dated Aug. 3, 2016, 7 pages.
"International Preliminary Report on Patentability", International Application No. PCT/US2012/02463, Jun. 20, 2013, 13 Pages.
"Machine-to-Machine communications (M2M); Functional architecture", Draft ETSI TS 102 690 V0.11.1, Apr. 2011, 207 pages.
"Machine-to-Machine communications (M2M); Functional architecture", Draft ETSI TS 102 690 V0.12.3, Jun. 2011, 268.
"Machine-to-Machine Communications (M2M); Functional Architecture", Draft ETSI TS 102 690 V0.8.1, Nov. 2010, 158 pages.
"Machine-to-Machine communications (M2M); Functional architecture", Draft ETSI TS 102 690 V0.9.6, Dec. 2010, 191 pages.
"Machine-to-Machine Communications (M2M); Functional Architecture", Draft ETSI TS 102 690 V0.10.1, Jan. 2011, 258 pages.
"Machine-to-Machine Communications (M2M); M2M Service Requirements", TS 102 689 V1.1.1, Aug. 2010, 34 pages.
"Machine-to-Machine Communications (M2M); mla, dla and mld Interfaces", TS 102.921 V0.2.1, Jan. 2011, 32 pages.
"Notification of Transmittal of the International Search Report and the Written Opinion of the International Searching Authority, or the Declaration", International Patent Application No. PCT/US2012/024634, dated Aug. 17, 2012, 12 pages.
"Official Notice of Rejection", Japanese Patent Application No. 2016-034395, dated Nov. 29, 2016, 5 pages.
"Official Notice of Rejection (English Translation)", Japanese Patent Application No. 2016-034395, dated Nov. 29, 2016, 6 pages.
"OMA Device Management Dictionary", Draft Version 1.0—OMA-SUP-DM_Dictionary-V1_0-20110325-D), Mar. 25, 2011, 13 Pages.
"English Language Abstract", Chinese Patent Application No. 101477535, Jul. 8, 2009, 2 pages.
"Smart Energy Profile 2.0 Technical Requirements Document", Draft ZigBee-105553, Apr. 2010, 291 pages.
"Written Opinion of the International Preliminary Examining Authority", International Application No. PCT/US2012/024634, dated Apr. 22, 2013, 5 pages.
Blumenthal, U., et al., "User-based Security Model (USM) for version 3 of the Simple Network Management Protocol (SNMPv3)", The Internet Engineering Task Force (IETF) Request for Comment (RFC) 3414, Dec. 2002, 88 pages.
Broadband Forum, "CPE WAN Management Protocol", Technical Report, TR-069 Amendment 3, Protocol Version 1.2, Nov. 2010, 197 pages.
Case, J., et al., "Message Processing and Dispatching for the Simple Network Management Protocol (SNMP)", The Internet Engineering Task Force (IETF) Request for Comment (RFC) 3412, Dec. 2002, 43 pages.
Dudkowski, Dominique, et al., "M2M(11)0076, Remote Entity Management Principles", ETSI M2M Submission for Huawei Technologies Co., Ltd. & NEC Europe Limited, Dec. 22, 2010, 5 Pages.
Ericsson, "M2M Architecture—3GPP2 Aspects", 3rd Generation Partnership Project 2 (3GPP2) Tdoc X50-20101206-022, 3GPP2 TSGX WG5-PDS Oahu/Waikiki, United States, Dec. 2010, 9 pages.
Harrington, D, et al., "An Architecture for Describing Simple Network Management Protocol (SNMP) Management Frameworks", The Internet Engineering Task Force (IETF) Request for Comment (RFC) 3411, Dec. 2002, 64 pages.
Harrington, D, et al., "Transport Subsystem for the Simple Network Management Protocol (SNMP)", The Internet Engineering Task Force (IETF) Request for Comment (RFC) 5590, Jun. 2009, 34 pages.
Leuca, Ileana, "OMA M2M Activities", ETSI M2M Workshop, Oct. 2010, 10 Pages.
Levi, D., et al., "Simple Network Management Protocol (SNMP) Applications", The Internet Engineering Task Force (IETF) Request for Comment (RFC) 3413, Dec. 2002, 74 pages.
Open Mobile Alliance, "Gateway Management Object Architecture, Candidate Version 1.0", OMA-AD-GwMO-V1_0-20101102-C, Nov. 2, 2010, 12 pages.
Open Mobile Alliance, "Gateway Management Object Technical Specification, Draft Version 1.0", OMA-TS-GwMO-V1_0-20101022-D, Oct. 22, 2010, 22 pages.

(56) References Cited

OTHER PUBLICATIONS

Open Mobile Alliance, "OMA Device Management Protocol, Draft Version 2.0", OMA-TS-DM_Protocol-V2_0-20101028-D, Oct. 28, 2010, 58 pages.
Presuhn, R., et al., "Management Information Base (MIB) for the Simple Network Management Protocol (SNMP)", The Internet Engineering Task Force (IETF) Request for Comment (RFC) 3418, Dec. 2002, 26 pages.
Presuhn, R., et al., "Transport Mappings for the Simple Network Management Protocol (SNMP)", The Internet Engineering Task Force (IETF) Request for Comment (RFC) 3417, Dec. 2002, 19 pages.
Presuhn, R., et al., "Version 2 of the Protocol Operations for the Simple Network Management Protocol (SNMP)", The Internet Engineering Task Force (IETF) Request for Comment (RFC) 3416, Dec. 2002, 31 pages.
Schoenwaelder, "Simple Network Management Protocol (SNMP) Context EngineID Discovery", Simple Network Management Protocol (SNMP) Context EngineID Discovery, Sep. 2008, 9 pages.
Schoenwaelder, Juergen, et al., "Simple Network Management Protocol (SNMP) over IEEE 802 Networks", The Internet Engineering Task Force (IETF) Request for Comment (RFC) 4789, Nov. 2006, 9 pages.
Tseng, Mitch, et al., "Proposed TIA TR-50 Structure", TR-40/30-10-05, Mar. 10, 2010, 10 Pages.
Wijnen, B., et al., "View-based Access Control Model (VACM) for the Simple Network Management Protocol (SNMP)", The Internet Engineering Task Force (IETF) Request for Comment (RFC) 3415, Dec. 2002, 39 pages.
Zhang, Yongjing, "M2M(10)0394, Procedures for Management Object Resource", ETSI M2M Submission for Huawei Technologies Co., Ltd., Nov. 22, 2010, 4 Pages.
Zhang, Yongjing, "M2M(10)0394r1, Procedures for Management Object Resource", ETSI M2M Submission for Huawei Technologies Co., Ltd., Nov. 22, 2010, 6 Pages.
Zhang, Yongjing, "M2M(11)0040, Procedures for Management Object Resource", ETSI M2M Submission for Huawei Technologies Co., Ltd. & NEC Europe Limited, Nov. 22, 2010, 6 Pages.
Lee, Chang Yeol, "A Study of M2M Platform Technologies based on Rest", Journal of the Korea Academia-Industrial Cooperation Society, vol. 12, No. 9, 2011, 7 pages.

\* cited by examiner

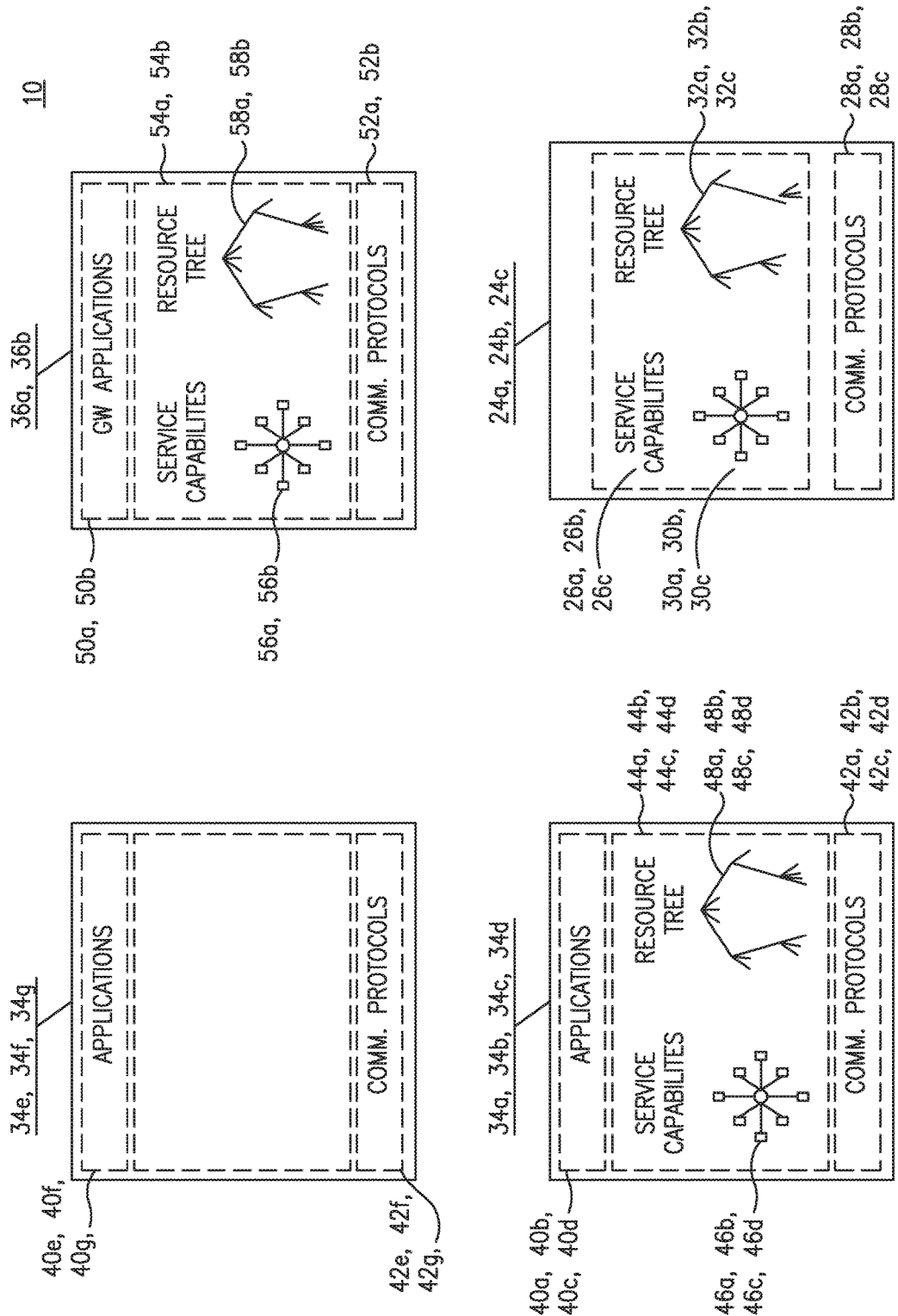

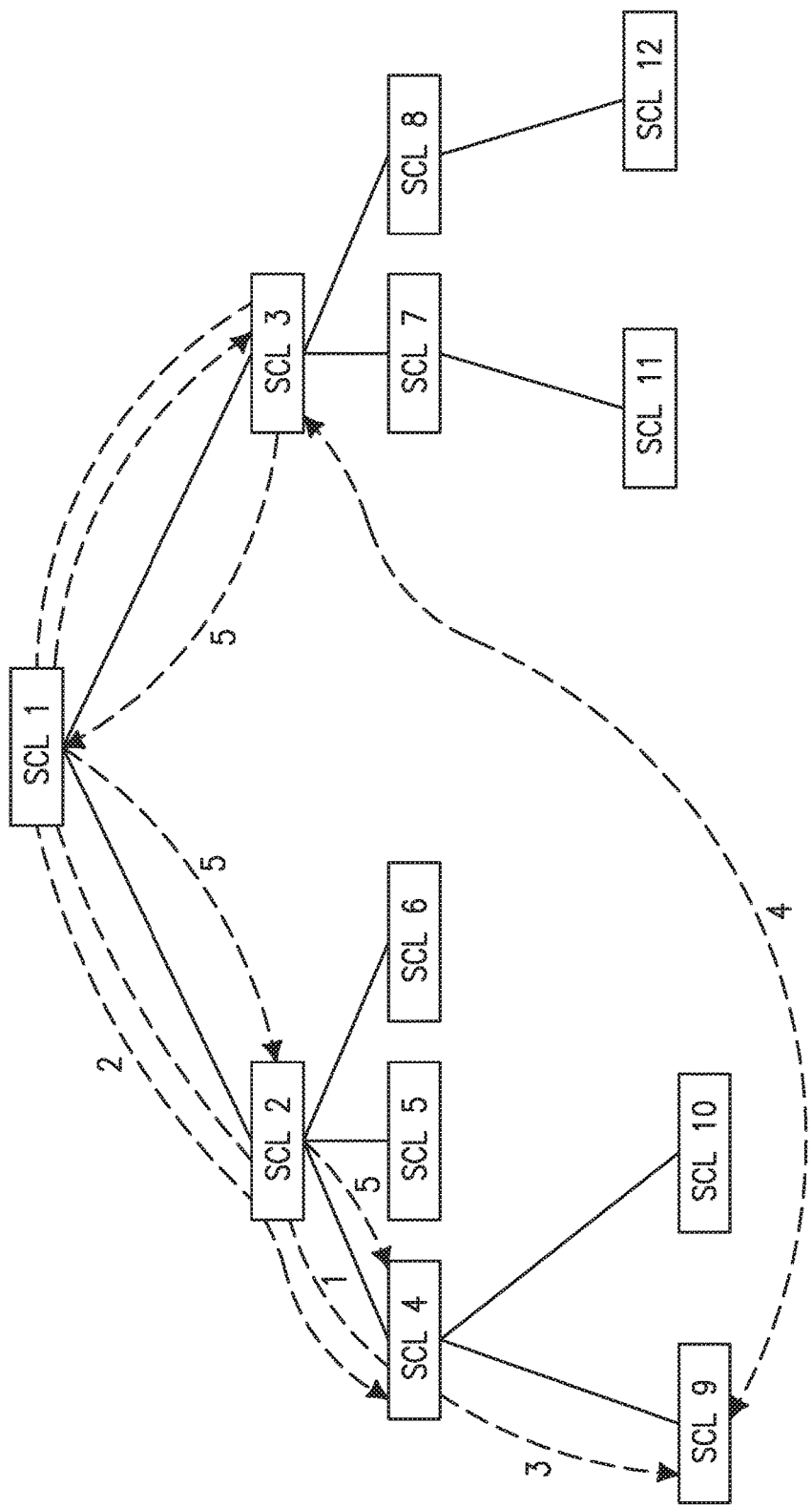

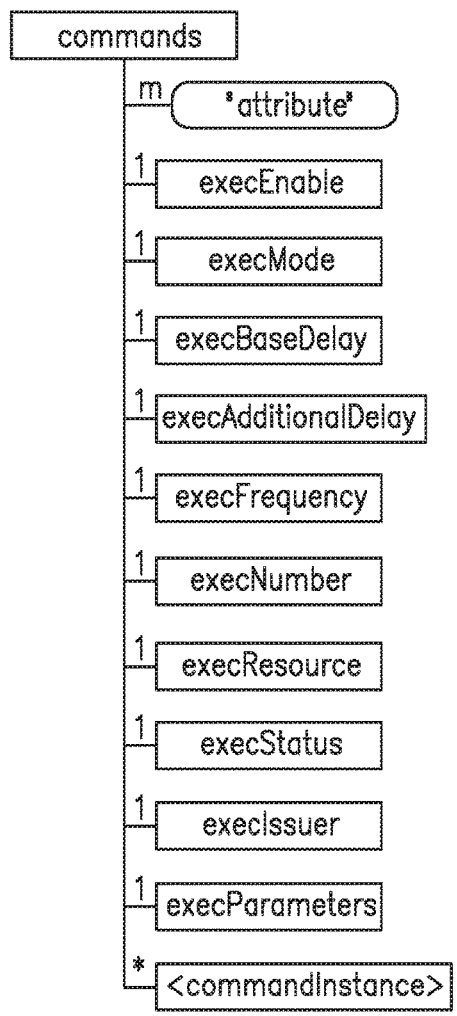
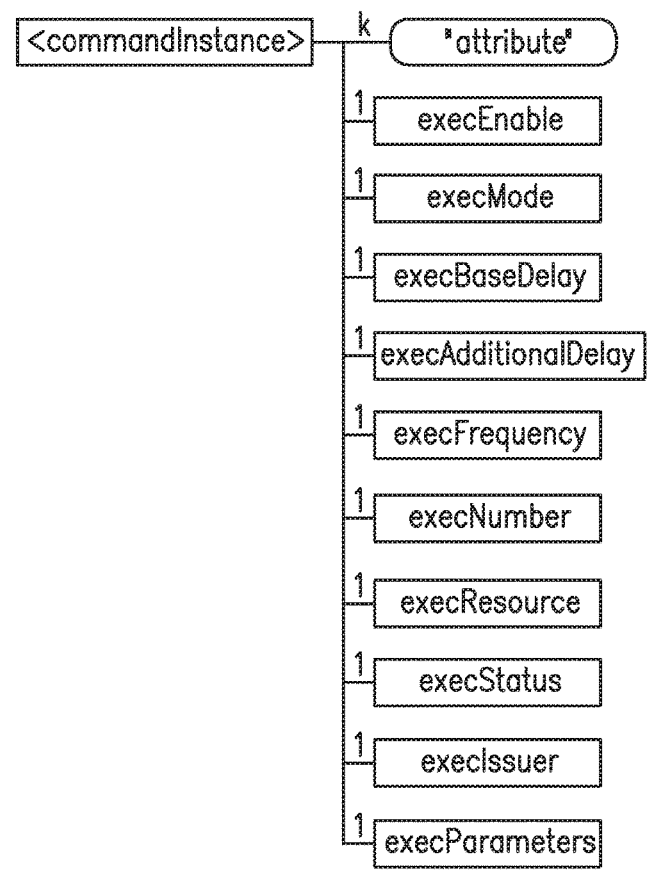
FIG. 27A
FIG. 27B

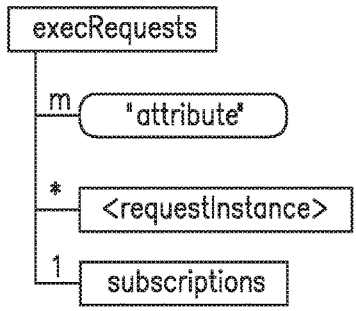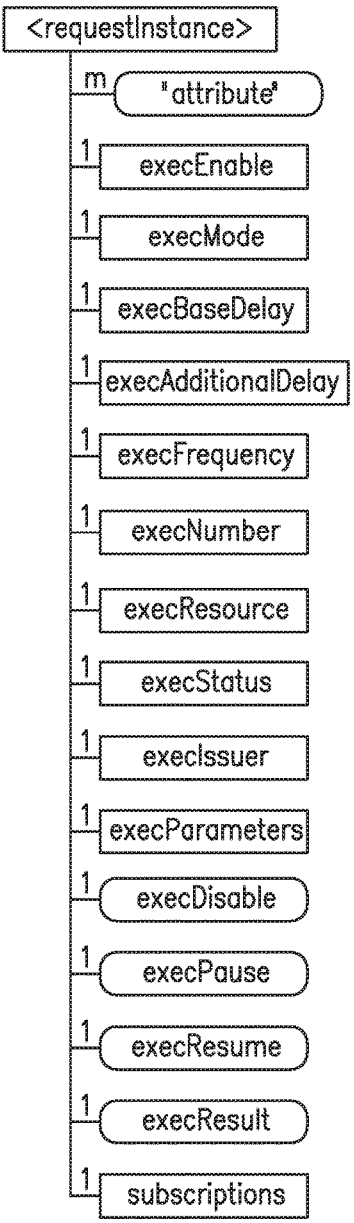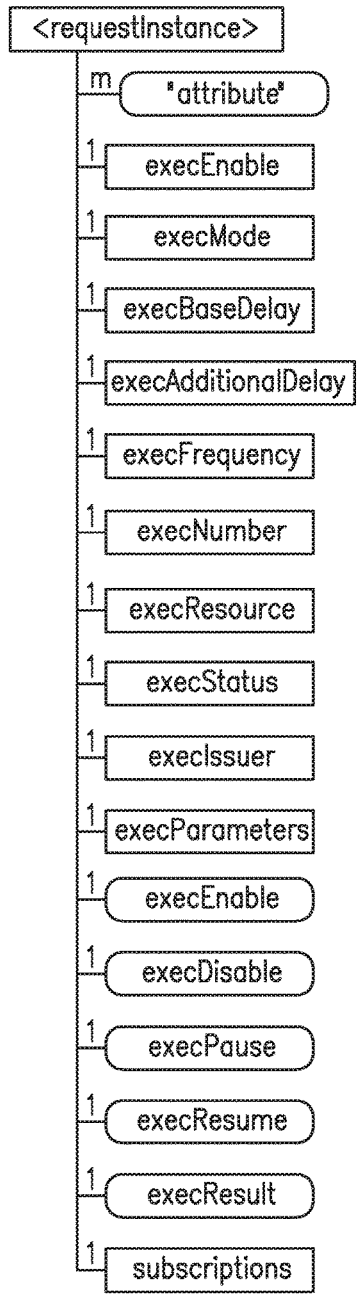
FIG. 28B
FIG. 28C
FIG. 28D

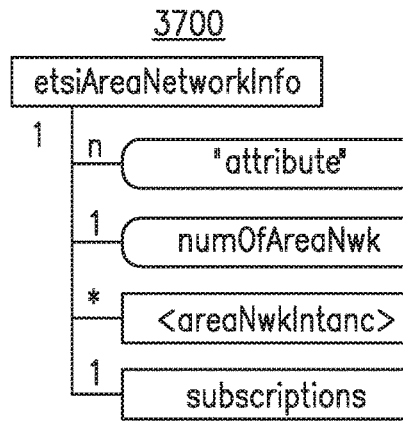
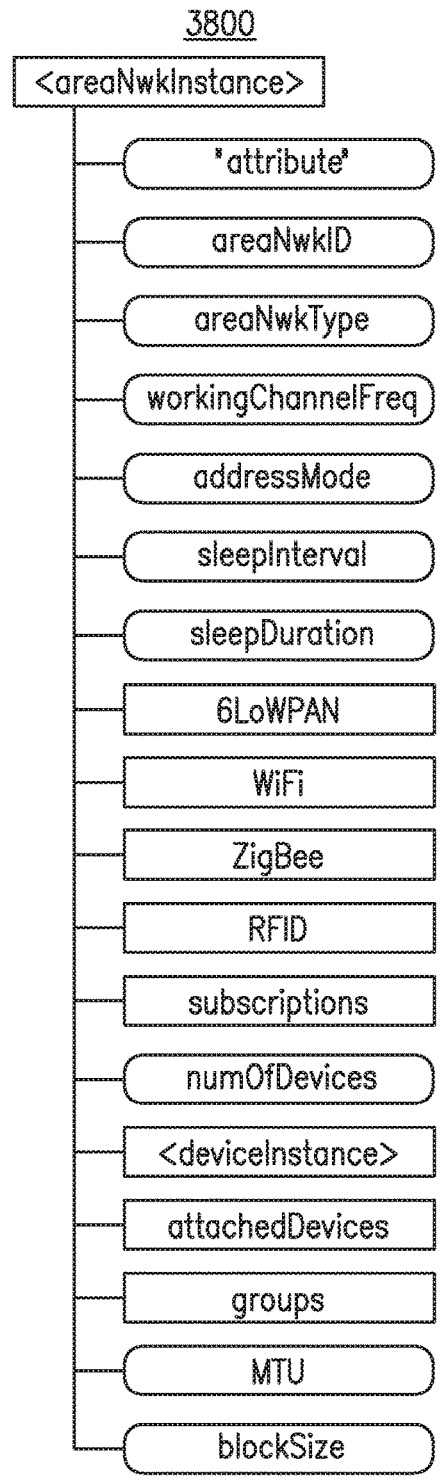
FIG. 37
FIG. 38A

SYSTEMS, METHODS AND APPARATUS FOR MANAGING MACHINE-TO-MACHINE (M2M) ENTITIES

CROSS-REFERENCE TO RELATED APPLICATIONS

This application is a continuation of U.S. ("US") patent application Ser. No. ("Pat. Appln. No.") 15/211,017 filed 15 Jul. 2016; which is a continuaton of U.S. patent application Ser. No. 13/983,220, having a § 371 filing date of 10 Jan. 2014, now U.S. Pat. No. 9,426,222; which is § 371 of International Appln. No. PCT/US2012/024634, filed 10 Feb. 2012; which claims the benefit of and/or priority to U.S. Provisional Pat. Appln. Nos. 61/441,911, filed on 11 Feb. 2011; 61/444,323, filed on 18 Feb. 2011; 61/452,422, filed on 14 Mar. 2011; 61/485,631, filed on 13 May 2011; 61/496,812, filed on 14 Jun. 2011; 61/500,798, filed on 24 Jun. 2011; 61/501,046, filed on 24 Jun. 2011; and 61/508,564, filed on 15 Jul. 2011. Each of the above-mentioned applications is incorporated herein by reference.

BACKGROUND

Field

This application is related to communications, and in particular, to machine-to-machine ("M2M") communications.

Related Art

Machine-to-machine ("M2M") communication refer to a category of communications carried out by, between and/or among devices, referred to as machines, adapted to send, receive or exchange, via such M2M communications, information for performing various applications ("M2M applications"), such as smart metering, home automation, eHealth and fleet management. In general, execution of the various applications, and in turn, the M2M communications attendant to such execution are carried out by the machines without necessitating human intervention for triggering, initiating and/or causing origination of the M2M communications. Understandably, successful implementation and proliferation of the M2M applications is likely dependent upon industry-wide acceptance of standards that ensure (e.g., define requirements for ensuring) interoperability among the various machines, which may be manufactured and operated by various entities.

BRIEF DESCRIPTION OF THE DRAWINGS

A more detailed understanding may be had from the Detailed Description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals in the Figures indicate like elements, and wherein:

FIG. 1A-1C are block diagrams illustrating an example of a system in which one or more embodiments, including those directed to Machine-to-Machine ("M2M") communications and/or operations, may be implemented or otherwise carried out;

FIG. 21 illustrates a diagram of an example procedure for management authority delegation;

FIGS. 27A-27B are block diagrams illustrating an example structure of resource commands;

FIGS. 28A-28B are block diagrams illustrating an example structure of a resource command;

FIG. 28C-28D are block diagrams illustrating an example structure of a resource command instance;

FIG. 37 is a block diagram illustrating an example resource structure for an etsiAreaNwkInfo;

FIG. 38A is a block diagram illustrating an example resource structure for an areaNwkInstance;

DETAILED DESCRIPTION

Example System Architecture

Figure 1A:
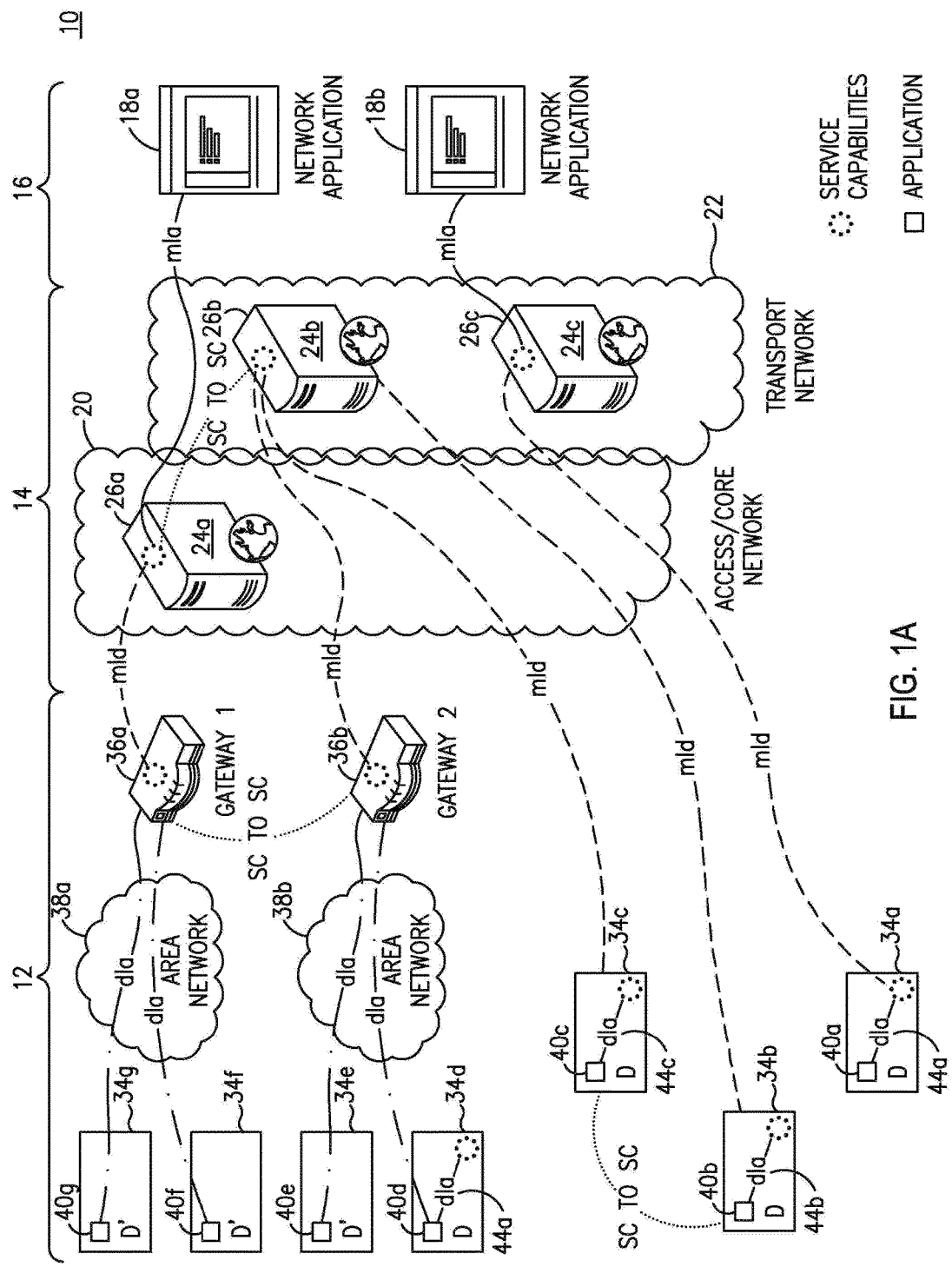
Figure 1C:
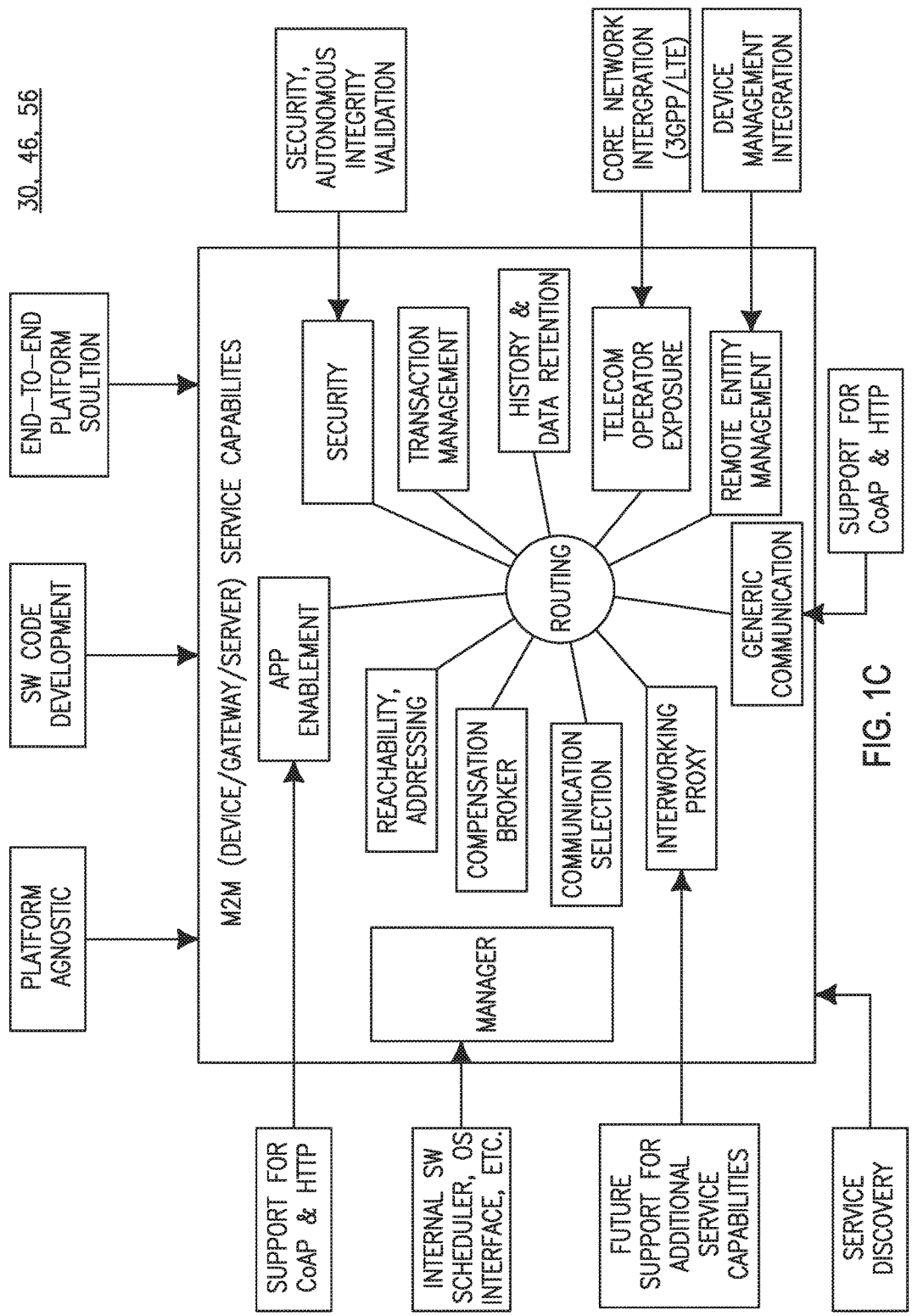

FIGS. 1A-1C are block diagrams illustrating an example of a system 10 in which one or more embodiments may be implemented or otherwise carried out. Such embodiments may include, for instance, embodiments directed to Machine-to-Machine ("M2M") communications and/or operations, including managing M2M remote entities, such as M2M applications, M2M service capabilities ("SCs"), M2M area networks, M2M gateways and M2M devices.

The system 10 may be configured in accordance with and/or implemented using one or more architectures; any of which may be based on and/or configured in accordance with various standards. These standards may include those directed to M2M communications and/or operations, such as, for example, draft technical specification ("TS") promulgated by the European Telecommunications Standards Institute ("ETSI") entitled "Machine-to-Machine (M2M) Communications; Functional Architecture" and referred to as "ETSI TS 102 690." Other examples may include standards those promulgated by the 3rd Generation Partnership Project ("3GPP") and/or 3rd Generation Partnership Project 2 ("3GPP2"), including those relating to Machine-Type Communications ("MTC"), such as, for example, 3GPP TS 22.368, entitled "Technical Specification Group Services and System Aspects; Service requirements for Machine-Type Communications (MTC)." Both of the ETSI TS 102 690 and the 3GPP TS 22.368 are incorporated herein by reference. The architecture(s) of the system 10 may be in accordance with other standards, as well.

The system 10 may include a devices domain 12, a networks domain 14 and a network applications domain 16. The network applications domain 16 may include M2M network applications 18a, 18b. These M2M network applications 18a, 18b may be stored, executed and/or hosted on respective host devices (not shown). Alternatively, the M2M network applications 18a, 18b may be stored, executed and/or hosted on the same host device (also not shown). The host device(s) may include one or more servers; including, for example, a host-application server, and may be deployed in one or more general or specialty purpose computers, personal computers, mainframes, minicomputers, server-type computers and/or any a processor-based platform that operates on any suitable operating system and that is capable of executing software. The host device(s) may include a number of elements, which may be formed in a single unitary device and concentrated on a single node; serving, client, peer or otherwise. Alternatively, the elements of the host device(s) may be formed from two or more separate devices, and as such, may be distributed among a plurality of nodes; serving, client, peer or otherwise.

The networks domain 14 may include access and/or core ("access/core") networks 20 and a transport network 22. The access/core networks 22 may be, for example, a network configured for communication in accordance with one or more protocols for (i) digital subscriber line technologies (collectively "xDSL"), (ii) hybrid-fiber-coax ("HFC") networks, (iii) programmable logic controllers ("PLC"), (iv) satellite communications and networks, (v) Global System for Mobile telecommunication ("GSM")/Enhanced Data GSM Environment ("EDGE") radio access networks ("GERANs"), (vi)_ Universal Mobile Telecommunication System ("UMTS") Terrestrial Radio Access Networks ("UTRANs"), (vii) evolved UTRANs ("eUTRANs"), (viii) wireless local area networks ("WLAN"), Worldwide Interoperability for Microwave Access ("WiMAX"), and the like. Details of example access and/or core networks, which may be representative of the access and/or the core networks 20, are described below with respect to FIGS. 48A-48E. Details of example transport networks, which may be representative of the transport network 22, are also described below with respect to FIGS. 48A-48E.

The access/core networks 20 may also provide connectivity in accordance with the Internet Protocol ("IP") suite. The access/core networks 20 may provide connectivity in accordance with other communication protocols, as well. In addition, the access/core networks 20 may provide service and network control functions, interconnection with other networks, and roaming services. By way of example, the access/core networks 20 may be networks configured for communication in accordance with protocols promulgated by the 3GPP, ETSI Telecommunications and Internet converged Services and Protocols for Advanced Networking ("TISPAN") and protocols promulgated by 3GPP2.

The access/core network 20 may include an M2M server 24a, and the transport network 22 may include M2M servers 24b, 24c. Each of the M2M servers 24a-24c may be owned, maintained and/or operated by respective service providers. For example, the M2M server 24a may be owned, maintained and/or operated by a wireless (e.g., cellular) telecommunications service provider, whereas the M2M servers 24b, 24c may be owned, maintained and/or operated by other service providers. In some instances, ownership, maintenance and/or operation of each of first, second and third M2M servers 24a-24c may be split among two or more providers.

The M2M servers 24a-24c may include or be configured to include respective network service capability layers ("N-SCLs") 26a-26c and respective network communication protocol stacks 28a-28c (FIG. 1B). The N-SCLs 26a-26c may include respective M2M SCs ("N-SCs") 30a-30c and accompanying resource structures 32a-32c (FIG. 1B).

The device domain 12 may include M2M devices 34a-34g, M2M gateways 36a, 36b, and M2M area networks 38a, 38b. The M2M devices 34a-34g may include respective M2M applications ("DAs") 40a-40h and respective network communication protocol stacks 42a-42g. Some of the M2M devices 34a-34g, namely, the M2M devices 34a-34d (hereinafter "Ds 34a-34d" or "D-type devices 34a-34d") may include or be configured to include respective SCLs ("D-SCLs") 44a-44d. The D-SCLs 44a-44d may include or be configured to include respective SCs ("D-SCs") 46a-46d and accompanying resource structures 48a-48d (FIG. 1B).

The M2M devices 34e-34g (hereinafter "D's 34e-34g" or "D'-type devices 34e-34g") lack D-SCLs. The Ds 34a-34d may differ from the D' 34e-34g in other ways, as well. For example, the D's 34e-34f may be subject to resource constraints, such as processing power and memory limitations, whereas the Ds 34a-34d might not be subject to such resource constraints. Alternatively and/or additionally, the D's 34e-34g may include or be configured to include functionality different from the D-SCLs 44a-44d.

The M2M gateways 36a, 36b may include or be configured to include respective M2M applications ("GAs") 50a, 50b, respective network communication protocol stacks 52a, 52b and respective SCLs ("G-SCLs") 54a, 54b (FIG. 1). The G-SCLs 54a, 54b may include or be configured to include respective SCs ("G-SCs") 56a, 56b and accompanying resource structures 58a, 58b (FIG. 1B).

The M2M area networks 38a, 38b may communicatively couple to the M2M gateways 36a, 36b and other M2M gateways (not shown), if any. The M2M area networks 38a, 38b may include M2M devices (not shown) in addition to the D 34d and the D's 34e-34g. These additional M2M devices may be D-type or D'-type devices. Each of the M2M area networks 38a, 38b may be configured using a mesh and/or peer-to-peer architecture, for example.

Communication links communicatively coupling the D 34d and D' 34e together and/or among D 34d, D' 34e and/or neighboring M2M devices of the M2M area network 38a may be wired and/or wireless. Communication links communicatively coupling the D's 34f, 34g together and/or among D's 34f, 34g and/or neighboring M2M devices of the M2M area network 38b may be wired and/or wireless, as well.

Communication links communicatively coupling the D 34d, D' 34e and other M2M devices of the M2M area network 38a to the M2M gateway 36a along with the communication links communicatively coupling the D's 34f, 34g and other M2M devices of the M2M area network 38b to the M2M gateway 36b may be wired and/or wireless. Each of these communications links may be defined in accordance with a proprietary interface, a standard interface and/or an open interface. Alternatively, the communications links may be defined as a reference point, such as, for example, a dIa reference point. Details of an example dIa reference point, which may be representative of such dIa reference point, may be found in the ETSI TS 102 690.

The M2M gateway 36a, M2M gateway 36b and Ds 34b-34c and D 34a may communicatively couple with the M2M servers 24a, 24b and 24c, respectively, via wired and/or wireless communications links. These communications links may be defined in accordance with a proprietary interface, a standard interface and/or an open interface. Alternatively, the communications links may be defined as a reference point, such as, for example, a mIa reference point. Details of an example mIa reference point, which may be representative of such mIa reference point, may be found in the ETSI TS 102 690.

Communication links communicatively coupling the M2M network application 18a with M2M server 24a and communicatively coupling communicatively coupling the M2M network application 18b with M2M servers 24b, 24c may be wired and/or wireless. Each of these communication links may be defined in accordance with a proprietary interface, a standard interface and/or an open interface. Alternatively, the communications links may be defined as a reference point, such as, for example, a mIa reference point. Details of an example mIa reference point, which may be representative of such mIa reference point, may be found in the ETSI TS 102 690.

Communications between the DAs 40a-40d and D-SCLs 44a-44d, respectively, of the Ds 34a-34d may be carried out using mIa reference point. The dIa and mIa reference points may provide a uniform interface between the M2M network application 18b and DAs 40a-40e, and between the M2M network application 18a and DAs 40f-40g.

Although two M2M gateways and eight M2M devices are shown in FIG. 1, the device domain 12 may include more or fewer M2M gateways and more of fewer M2M devices. In practice, the device domain 12 is likely to have many M2M devices and many M2M gateways. Additionally and/or alternatively, the system 10 may include more or fewer M2M servers, more or fewer M2M network applications and more or fewer M2M area networks.

Each of the M2M area networks 38a, 38b may be, for example, a network configured for communication in accordance with a personal area network protocol, such as Institute of Institute of Electrical and Electronics Engineers ("IEEE") 802.15.x, Zigbee, Bluetooth, Internet Engineering Task Force ("IETF") Routing Over Low power and Lossy networks ("ROLL"), International Society of Automation ("ISA") Wireless Systems for Industrial Automation: Process Control and Related Applications ("ISA100.11a"), and the like. The M2M area networks 38a, 38b may be configured in accordance with other network protocols, such as, for example, described below with respect to FIGS. 48A-48E.

Referring now to FIG. 1C, each of the N-SCs 30a-30c may include or be configured to include an application enablement capability ("AE"); a generic communication capability ("GC"); a reachability, addressing and repository capability ("RAR"); a communication selection capability ("CS"); a remote entity management capability ("REM"); a security capability ("SEC"); a history and data retention capability ("HDR"); a transaction management capability ("TM"); an interworking proxy capability ("IP"), and a telecom operator exposure capability ("TOE"); each of which may be connected to a routing function for passing information (e.g., from processed messages) from one capability to another. Each of the N-SCs 30a-30c may also include a manager for scheduling internal software, for managing an operating system interface, etc.

Each of the G-SCs 56a, 56b and each of the D-SCs 46a-46d may also include an AE, GC, RAR, CS, REM, SEC, HDR, TM and IP connected to the routing function along with the manager. For convenience, hereinafter a prefix of "N", "G" or "D" may be added to the AE, GC, RAR, CS, REM, SEC, HDR, TM, routing function and manager differentiate N-SCs, G-SCs and D-SCs. A prefix of "x" may be added to the AE, GC, RAR, CS, REM, SEC, HDR, TM, routing function and manager to refer to the N-SCs, G-SCs and D-SCs collectively.

Each of the N-SCs 30a-30c, G-SCs 56a, 56b and D-SCs 46a-46d may also include SC-to-SC interaction capabilities so as to enable device-to-device (D2D), gateway-to-gateway (G2G) and service-to-server (S2S) direct communications. Portions of some or all of the N-SCs 30a-30c, G-SCs 56a, 56b and D-SCs 46a-46d (collectively "xSCs") may be defined in accordance with standards directed to M2M communications and/or operations, such as the ETSI TS 102 690, for example.

In general, an SC may define and/or implement a function that may be utilized by various M2M applications. To facilitate this, the SCs 24 may expose such functionality to the various M2M applications through a set of open interfaces. Additionally, the SCs may use functionalities ("networks functionalities") of the access/core and/or transport networks 20, 22. The SCs may, however, hide network specificities from the various M2M applications, and instead, may handle network management for such applications via the SCs. The SCs may be M2M specific. Alternatively, the SCs may be generic, e.g., providing support for M2M applications and for applications other than M2M applications. As described in more detail below, each of the N-SCL resource structures 32a-32c, G-SCL resource structures 58a-58e and/or D-SCLs 44a-44d may include one or more resources and/or attributes that may arranged in a hierarchy based on architectures of one or more of the xSCs.

Example xREM Management Layers and Functions

Figure 2:
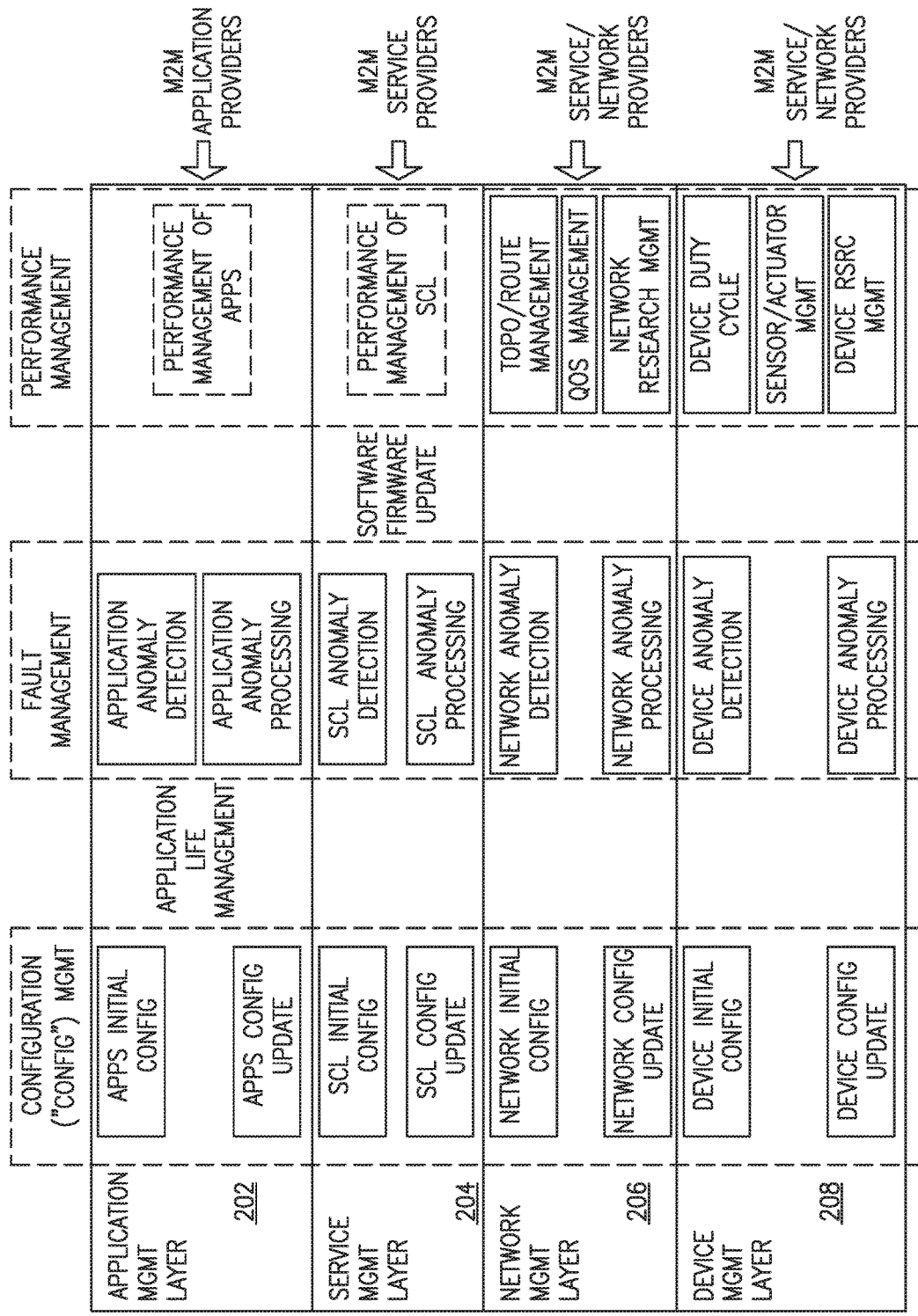
FIG. 2 is a block diagram illustrating an example set of logical management layers defining a functional architecture for performing remote entity management ("REM")

FIG. 2 is a block diagram illustrating an example set of logical management layers 200 defining a functional architecture for performing xREM. In general, the management layers 200 may define functionality for managing communication modules, SCLs, and applications. The management layers 200 may also differentiate management functionalities, define corresponding management objects and resource structures, and identify management functionalities at xREM for an M2M device ("DREM"), an M2M gateway ("GREM"), and a M2M area network ("NREM"), respectively. Differentiation of the management functionalities of the management layers 200 may be based on the type of M2M remote entity. The management layers 200 may include, for example, separate layers that define functionality for managing (i) M2M application(s), (ii) an M2M SC(s); (iii) M2M area network(s) and an M2M gateway(s); and (iv) M2M device(s). Each of the management layers 200 may include functionality for performing configuration management 210, fault management 212, performance management 214, etc. of the M2M remote entity residing at such management layer. In one embodiment, the management layers 200 may include an application-management layer 202, a service management layer 204, a network management layer 206 and a device management layer 208. The management layers 200 may include other layers, as well.

Example M2M Application Management Layer

The M2M application management layer 202 may handle managing M2M applications, including defining management functionalities, defining management objects and resource structures, and identifying management functionalities at xREM associated with managing M2M applications. The M2M application management layer 202 may handle lifecycle management of the M2M device applications in M2M devices and/or M2M gateways (collectively "D/G"), which may include any of installing, updating, deleting, activating, deactivating application software in the D/G. The M2M application management layer 202 may also handle configuration management of the applications in the D/G. This may include configuring and/or provisioning initial settings of and/or updates to such applications, for instance. The M2M application management layer 202 may handle fault management of the applications in the D/G, including, for example, collecting and/or retrieving fault-related information. The M2M application management layer 202 may handle performance management of the applications in the D/G, including, for example, collecting and/or retrieving performance-related information. The owner of the M2M application management layer 202 may be, for example, M2M application providers.

Example M2M Service Management Layer

The M2M service management layer 204 may handle managing M2M SCs, including defining management functionalities, defining management objects and resource structures, and identifying management functionalities at xREM associated with managing M2M SCs. The M2M service management layer 204 may handle software/firmware update of SCLs in the D/G; configuration management of the SCLs in the D/G, including configuring or provisioning initial settings of and/or updates to the SCLs; fault management of the SCLs in the D/G, including, for example, collecting and retrieving fault-related information; and performance management of the SCLs in the D/G, which may include collecting and retrieving performance-related information. The owner of M2M service management layer 204 may be M2M service providers, for example.

Example M2M Network Management Layer

The M2M network management layer 206 may handle managing an M2M area network, including defining management functionalities, defining management objects and resource structures, and identifying management functionalities at xREM associated with managing M2M area networks. For example, this layer may control routing management, topology management, and network lifetime management. Since M2M area networks are connected by a M2M GW in many cases, the M2M GW may play a role in the network management layer 206.

The M2M network management layer 206 may handle configuration management of the M2M area networks, including, for example, configuring and/or provisioning an initial operational configuration of the M2M area networks, which may include configuring IPv6 address prefix, working frequency, WPAN ID, etc. The M2M network management layer 206 may also handle (i) updating the configuration of the D/G, which may include updating of parameters and/or constants in 6LoWPAN/ROLL/CoAP; (i) fault management of the M2M area networks, including anomaly detection (for instance, an outdated or wrong route, a loopback route) and/or alarm generation and/or processing; (iii) performance management of the M2M area networks, which may include any of duty cycle management of the (e.g., whole) M2M area networks, Topology/route management and QoS management. The owner of network management layer 206 may be M2M area network providers, which can be M2M application providers, M2M service providers, or M2M users.

Example M2M Device Management Layer

The device management layer 208 may handle managing M2M end devices, such as D/G, including defining management functionalities, defining management objects and resource structures, and identifying management functionalities at xREM associated with the M2M end devices. The device management layer 208 may handle management functionalities for resource-constrained M2M devices, which may include, for example, duty cycle management and power management. The device management layer 208 may handle (i) configuration management of the D/G, which may include configuring an initial operation of the D/G and/or updating the configuration of the D/G; (ii) fault management of the D/G, which may include any of anomaly detection and alarm generation and processing; (iii) performance management of the D/G, which may include, for example, any of management of constrained resources (sensors, actuators, power/battery, memory, CPU, communication interfaces, etc.), power saving management (e.g., duty cycle of the whole node, duty cycle of transceiver(s), and sensors/actuators management (e.g., sharing among different applications). The owner of the device management layer 208 may be M2M application providers, M2M service providers, M2M area network providers, or M2M users.

Figure 3A:
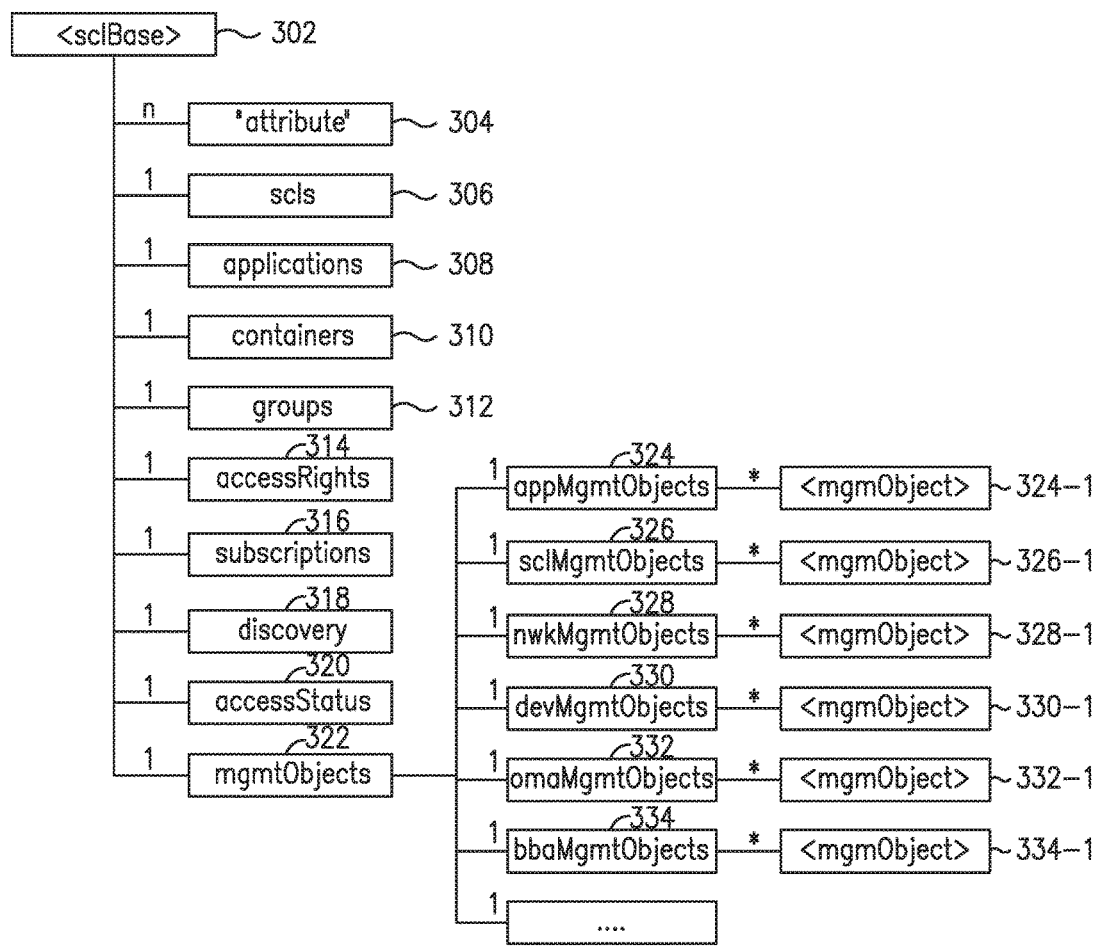
FIG. 3A is a block diagram illustrating an example resource structure framework for provisioning a SCL with a resource structure in accordance with a set of management layers and functions thereof.

Referring to FIG. 3A a block diagram illustrating an example resource structure framework 300 for provisioning a SCL with a resource structure in accordance with a set of management layers and functions thereof is shown. The SCL on which such resource structure may be provisioned may be a hosting SCL, such as any of the N-SCLs 26a-26c, for instance. The resource structure provisioned on the hosting SCL may be subsequently provisioned (e.g., replicated in whole or in part) on one or more other hosting SCLs and/or on one or more remote SCLs, such as the G-SCLs 56a, 56b and/or D-SCLs 44a-44d, by way of synchronization among the hosting SCL, the other hosting SCLs and/or the remote SCLs. Alternatively, the SCL on which such resource structure may be provisioned may be a remote SCL, such as any of the G-SCLs 56a, 56b and/or D-SCLs 44a-44d. The resource structure provisioned on the remote SCL may be subsequently provisioned (e.g., replicated in whole or in part) on one or more other remote SCLs and/or one or more hosting SCLs, such as the N-SCLs 26a-26c, by way of synchronization between the remote SCL, the other remote SCLs and/or the hosting SCLs. Additionally and/or alternatively, the resource structure framework 300 may be used for provisioning the resource structure on multiple hosting SCLs and/or multiple remote SCL, as well.

The resource structure framework 300 may include a root resource of the appropriate SCL ("<sclBase>") 302, a plurality of resources subordinated to the <sclBase> 302 ("sub-resources") and one or more attributes 304. The attributes 304 may be associated with (e.g., are common to) some or all of the sub-resources directly subordinate from the <sclBase> 302. Alternatively, the attributes 304 may be associated with the sub-resources directly and/or indirectly subordinate from the <sclBase> 302. The sub-resources directly subordinate from the <sclBase> 302 may include a SCLs ("scls") sub-resource 306, an applications ("applications") sub-resource 308, a containers ("containers") sub-resource 310, a groups ("groups") sub-resource 312, an access rights ("accessRights") sub-resource 314, a subscriptions ("subscriptions") sub-resource 316, a discovery ("discovery") sub-resource 318, an access status ("accessStatus") sub-resource 320 and a management objects ("mgmtObjs") sub-resource 322.

The scls sub-resource 306 may be a collection of individual SCL resources; each of which may represent an associated (e.g., remote) SCL that is authorized to interact with the hosting SCL, e.g., by way of a M2M service registration procedure. Each SCL resource of the scls sub-resource 306 may be created responsive to successful registration of the associated SCL with its local SCL or vice-versa. The scls sub-resource 306 may include, maintain and/or store context information about the respective registered SCLs. Each of the scls sub-resource 306 may include one or more sub-resources and/or one or more attributes (not shown).

The applications sub-resource 308 may be a collection of individual application resources; each of which may include, maintain and/or store information about an application. Each application resource of the applications sub-resource 308 may be created responsive to successful registration of an associated application with a local SCL.

The containers sub-resource 310 may be a collection of individual container resources; each of which may be generic resource for use with exchanging information between applications and/or SCLs. Each container resource of the containers sub-resource 310 may facilitate the exchange of information between applications and/or SCLs by using the corresponding container as a mediator for buffering the information.

The groups sub-resource 312 may be a collection of individual group resources. Each group resource of the groups sub-resource 312 may be used to define and/or access groups of the other sub-resources, including the sub-resources directly and/or indirectly subordinate from the <sclBase> 302.

The accessRights sub-resource 314 may be a collection of individual access right ("accessRight") resources; each of which may include, maintain and/or store a representation of permissions. Each accessRight resource of the accessRights sub-resource 314 may be associated with one or more of the other sub-resources that may be accessible to entities external to the hosting SCL. The representation of permissions of each of the accessRights 314 may include an identification of a permission holder and an identification of rights granted to the permission holder. The identification of rights granted to the permission holder may be, for example, a permission flag associated with one or more of the rights granted for the corresponding sub-resource.

The subscriptions sub-resource 316 may be a collection of individual subscription resources. Each subscription resource of the subscriptions 316 may include information for tracking a status of a (e.g., active) subscription to its parent resource, namely, the <sclBase> 302. Each of the subscriptions 316 may represent a request, from an issuer, for notification of modifications on the <sclBase> 302.

The discovery sub-resource 318 may be used to allow discovery of the sub-resources. The discovery sub-resource 318 may be used to retrieve a list of uniform resource identifiers ("URIs") of the sub-resource matching a discovery filter criteria. The access Status sub-resource 320 may be a collection of individual access status resources.

The mgmtObjs sub-resource 322 may be a collection of individual management object ("mgmtObj") resources. Each mgmtObj resource of the mgmtObjs 322 may include, maintain and/or store management information and/or parameters for carrying out REM. The mgmtObjs sub-resource 322 may include an application management objects sub-resource ("appMgmtObjects") sub-resource 324, an SCL management objects sub-resource ("sclMgmtObjects") sub-resource 326, a network management objects sub-resource ("nwkMgmtObjects") sub-resource 328, a device management objects sub-resource ("devMgmtObjects") sub-resource 330, an OMA-DM management objects sub-resource ("omaMgmtObjects") sub-resource 332 and a BBF-TR069 management objects sub-resource ("bbfMgmtObjects") sub-resource 334. The mgmtObjs sub-resource 322 may include other and/or different mgmtObj resources, as well.

The appMgmtObjects sub-resource 324 may be a collection of individual application management object ("appMgmtObject") resources. Each appMgmtObject resource may include information and/or parameters for carrying out REM in accordance with an application management layer and functions thereof, such as the application management layer 202 (FIG. 2). Each appMgmtObject resource may be disposed subordinate to the appMgmtObjects sub-resource 324 as a <mgmtObject> instance 324-1.

The sclMgmtObjects sub-resource 326 may be a collection of individual SCL management object ("sclMgmtObject") resources. Each sclMgmtObject resource may include information and/or parameters for carrying out REM in accordance with a service management layer and functions thereof, such as the service management layer 204 (FIG. 2). Each sclMgmtObject resource may be disposed subordinate to the sclMgmtObjects sub-resource 326 as a <mgmtObject> instance 326-1.

The nwkMgmtObjects sub-resource 328 may be a collection of individual network management object ("nwkMgmtObject") resources. Each nwkMgmtObject resource may include information and/or parameters for carrying out REM in accordance with a network management layer and functions thereof, such as the network management layer 206 (FIG. 2). Each nwkMgmtObject resource may be disposed subordinate to the nwkMgmtObjects sub-resource 328 as a <mgmtObject> instance 328-1.

The devMgmtObjects sub-resource 330 may be a collection of individual device management object ("devMgmtObject") resources. Each devMgmtObject resource may include information and/or parameters for carrying out REM in accordance with a device management layer and functions thereof, such as the device management layer 208 (FIG. 2). Each devMgmtObject resource may be disposed subordinate to the devMgmtObjects sub-resource 330 as a <mgmtObject> instance 330-1.

The omaMgmtObjects 332 may be a collection of individual OMA-DM management object ("omaMgmtObject") resources. Each omaMgmtObject resource may include information and/or parameters for carrying out REM in accordance with OMA-DM and/or OMA-DM compatible management functions. Each omaMgmtObject resource may be disposed subordinate to the omaMgmtObjects sub-resource 332 as a <mgmtObject> instance 332-1.

The bbfMgmtObjects sub-resource 334 may be a collection of an individual BBF-TR069 management object ("bbfMgmtObject") resources. Each bbfMgmtObject resource may include information and/or parameters for carrying out REM in accordance with BBF-TR069 and/or BBF-TR069 compatible management functions, such as, for example, BBF-TR069 Remote Procedure Call (RPC) methods. Each bbfMgmtObject resource may be disposed subordinate to the bbfMgmtObjects sub-resource 334 as a <mgmtObject> instance 334-1.

Although, the mgmtObjs sub-resource 322 as shown in FIG. 3A exist only in <sclBase-of-Server>/scls/<scl>/mgmtObjs, other (e.g., multiple) mgmtObjs sub-resources may be placed in various further subordinated branches/locations of the <sclBase> 302. This way, such other mgmtObjs sub-resources may explicitly correspond to specific management functions (such as to applications or SCLs).

Figure 3B:
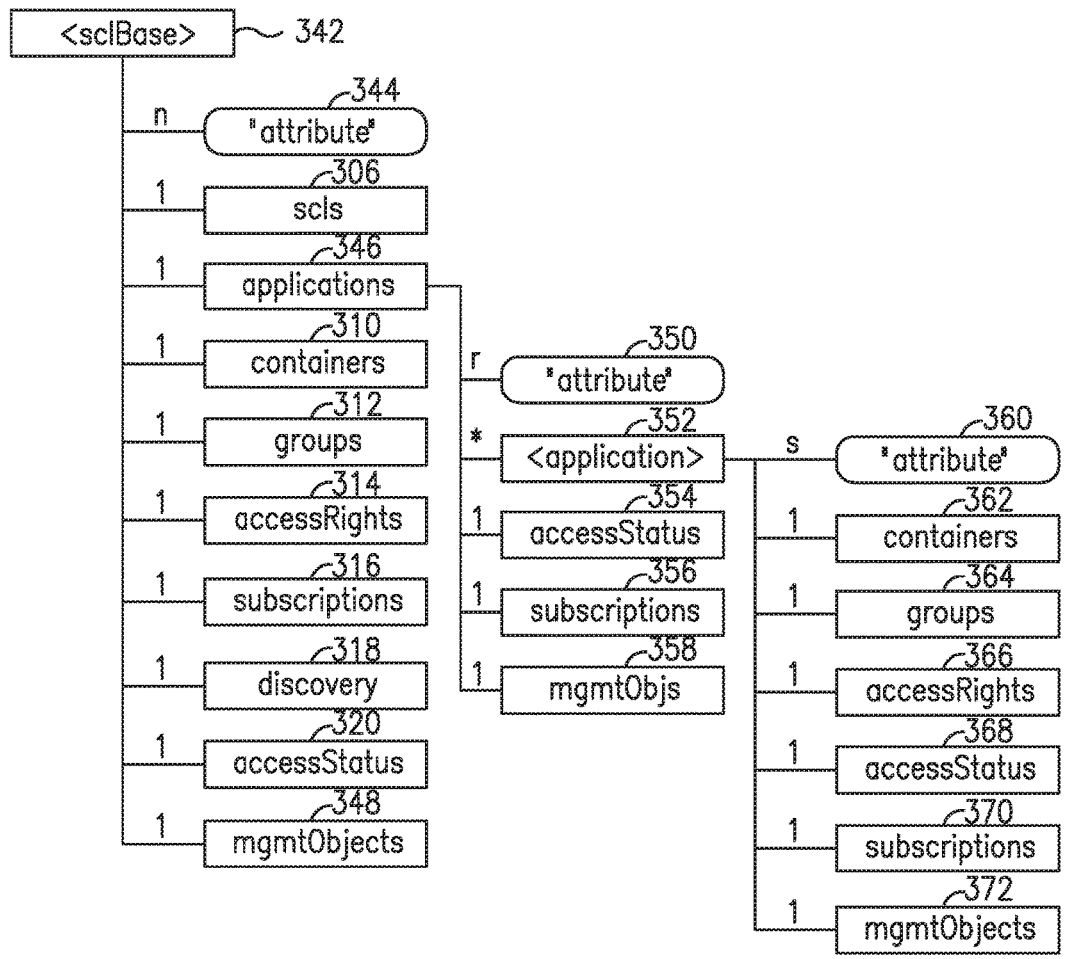
FIG. 3B is a block diagram illustrating an example resource structure framework for provisioning a SCL with a resource structure in accordance with a set of management layers and functions thereof.

FIG. 3B is a block diagram illustrating an example resource structure framework 340 for provisioning a SCL with a resource structure in accordance with a set of management layers and functions thereof. The SCL on which such resource structure may be provisioned may be a local SCL, such as any of the G-SCLs 56a, 56b and/or D-SCLs 44a-44d, for instance. The resource structure provisioned on the local SCL may be subsequently provisioned (e.g., replicated in whole or in part) on one or more other hosting SCLs and/or on one or more remote SCLs, such as the N-SCLs 26a-26c, by way of synchronization among the local SCL and/or the hosting SCLs. Alternatively, the SCL on which such resource structure may be provisioned may be a hosting SCL, such as any of the N-SCLs 26a-26c. The resource structure provisioned on the hosting SCL may be subsequently provisioned (e.g., replicated in whole or in part) on one or more other remote SCLs, such as the G-SCLs 56a, 56b and/or D-SCLs 44a-44d, by way of synchronization between the hosting SCL and the remote SCLs. Additionally and/or alternatively, the resource structure framework 340 may be used for provisioning the resource structure on multiple local SCLs and/or multiple hosting SCLs, as well.

The resource structure framework 340 may include a <sclBase> 342, a plurality of sub-resources to the <sclBase> 342, one or more attributes 344 associated with some or all of the sub-resources directly subordinate from the <sclBase> 342, and attributes 350 and 360 associated with the sub-resources indirectly subordinate from the <sclBase> 342.

The sub-resources directly subordinate from the <sclBase> 342 are similar to sub-resources directly subordinate from the <sclBase> 302 of FIG. 3A, except as follows. The sub-resources directly subordinate from the <sclBase> 342 may include an applications sub-resource 346 and an mgmtObjs sub-resource 348.

The mgmtObjs sub-resource 348 (at <sclBase>/mgmtObjs) may be a collection of individual management object ("mgmtObj") resources. The mgmtObjs sub-resource 348 may include, maintain and/or store management information and/or parameters for carrying out REM in accordance with any of (i) a service management layer and functions thereof; (ii) a network management layer and functions thereof, (ii) a device management layer and functions thereof, (iv) OMA-DM and/or OMA-DM compatible management functions, and (v) BBF-TR069 and/or BBF-TR069 compatible management functions. The mgmtObjs sub-resource 348 may, for example, include the sclMgmtObjects sub-resource 326, the nwkMgmtObjects sub-resource 328, the devMgmtObjects sub-resource 330, the omaMgmtObjects sub-resource 332 and the bbfMgmtObjects sub-resource 334. The mgmtObjs sub-resource 348 may include other and/or different mgmtObj resources, as well.

The applications sub-resource 346 may include a collection of individual application ("<application>") resources 352, an accessStatus sub-resource 354, a subscriptions sub-resource 356, a mgmtObjs sub-resource 358 and the attributes 350 associated with the sub-resources of the applications sub-resource 346. The mgmtObjs sub-resource 358 (at <sclBase>/applications/mgmtObjs) may include a collection of sub-resources for performing REM of all applications registered under the <sclBase> 342 as a whole.

Each of the individual application resources 352 may include a containers sub-resource 362, a groups sub-resource 364, an accessRights sub-resource 366, an accessStatus sub-resource 368, a subscriptions sub-resource 370, a mgmtObjs sub-resource 372 and the attributes 360 associated with the sub-resources of the corresponding individual application resources 352. The mgmtObjs sub-resource 372 (at <sclBase>/applications/<application>/mgmtObjs) may include a collection of sub-resources for performing REM of a specific <application> associated with a corresponding <application> sub-resource 352.

Figure 3C:
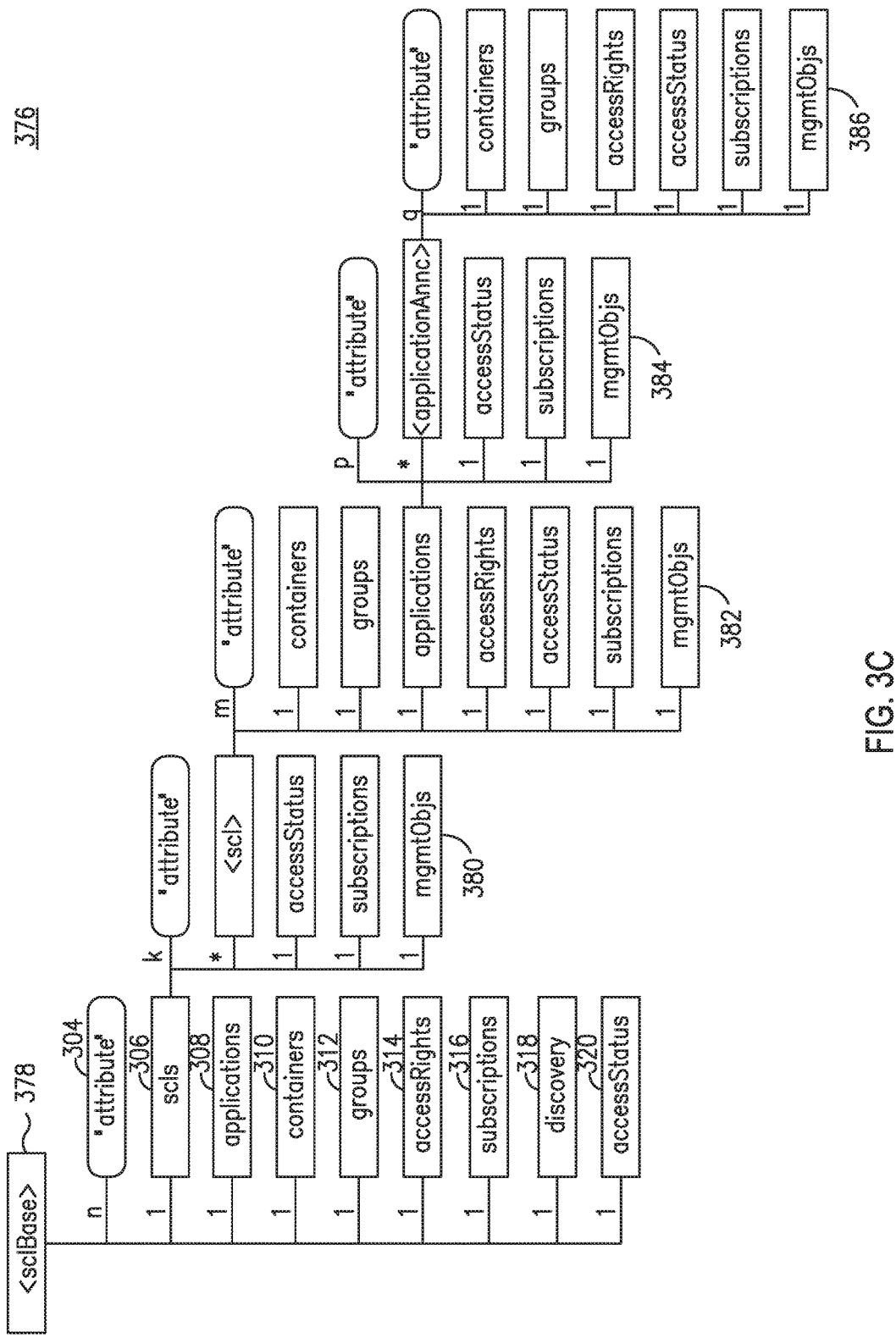
FIG. 3C is a block diagram illustrating an example resource structure framework for provisioning a SCL with a resource structure in accordance with a set of management layers and functions thereof.

FIG. 3C is a block diagram illustrating an example resource structure framework 376 for provisioning a SCL with a resource structure in accordance with a set of management layers and functions thereof. The SCL on which such resource structure may be provisioned may be a hosting SCL, such as any of the N-SCLs 26a-26c, for instance. The resource structure provisioned on the hosting SCL may be subsequently provisioned (e.g., replicated in whole or in part) on one or more other hosting SCLs and/or on one or more remote SCLs, such as the G-SCLs 56a, 56b and/or D-SCLs 44a-44d, by way of synchronization among the hosting SCL, the other hosting SCLs and/or the remote SCLs. Alternatively, the SCL on which such resource structure may be provisioned may be a remote SCL, such as any of the G-SCLs 56a, 56b and/or D-SCLs 44a-44d. The resource structure provisioned on the remote SCL may be subsequently provisioned (e.g., replicated in whole or in part) on one or more other remote SCLs and/or one or more hosting SCLs, such as the N-SCLs 26a-26c, by way of synchronization between the remote SCL, the other remote SCLs and/or the hosting SCLs. Additionally and/or alternatively, the resource structure framework 340 may be used for provisioning the resource structure on multiple hosting SCLs and/or multiple remote SCL, as well.

The resource structure framework 376 may include a <sclBase> 378, a plurality of sub-resources to the <sclBase> 378, one or more attributes associated with some or all of the sub-resources directly and/or indirectly subordinate from the <sclBase> 378. The sub-resources directly subordinate from the <sclBase> 378 are similar to sub-resources directly subordinate from the <sclBase> 302 of FIG. 3A, except that no mgmtObjs sub-resource is directly subordinate from the <sclBase> 378. Instead, the resource structure framework 376 includes multiple mgmtObjs sub-resources at may be placed in various further subordinated branches/locations of the <sclBase> 378. For example, the <sclBase> 378 may include a mgmtObjs sub-resource 380 (at <sclBase>scls/mgmtObjs). The mgmtObjs sub-resource 380 may include a collection of sub-resources for carrying out REM of all SCLs registered to the M2M server as a whole. These sub-resources may include information and/or parameters for carrying out REM of all SCLs registered to the M2M server as a whole in accordance with a service management layer and functions thereof, such as the service management layer 204 (FIG. 2).

The <sclBase> 378 may also include a mgmtObjs sub-resource 382 (at <sclBase>/scls/<scl>/mgmtObjs). This mgmtObjs sub-resource 382 may include a collection of sub-resources for carrying out REM of service capabilities and other management functions (network management layer and device management layer) of <scl> registered to the M2M Server. In one embodiment, the sub-resources may include information and/or parameters for carrying out REM of the service capabilities and other management functions of <scl> registered to the M2M server in accordance with (i) a network management layer and functions thereof, such as, the network management layer 206 (FIG. 2); and (ii) a device management layer, such as the device management layer 208 (FIG. 2).

The <sclBase> 378 may also include a mgmtObjs sub-resource 384 (at <sclBase>/scls/<scl>/applications//mgmtObjs). The mgmtObjs sub-resource 384 may include a collection of sub-resources for performing REM of all applications announced to the Server as a whole. The <sclBase> 378 may further include a mgmtObjs sub-resource 386 (at <sclBase>/scls/<scl>/applications/<applicationAnnc>/mgmtObjs). This mgmtObjs sub-resource 386 may include a collection of sub-resources for performing REM of the specific <applicationAnnc> announced to the M2M server.

In an embodiment, the mgmtObjs sub-resource 382 (at <sclBase>/scls/<scl>/mgmtObjs) may be used by DAs and/or GA to manage another D/G that registers with an M2M server. The M2M Server (i.e., <scl>) may announce its <mgmtObj> to the D/G. Then DA/GA can access such announced <mgmtObj> in the D/G, and in turn, be able to manage the other D/G via messaging relaying at the M2M server.

Figure 4A:
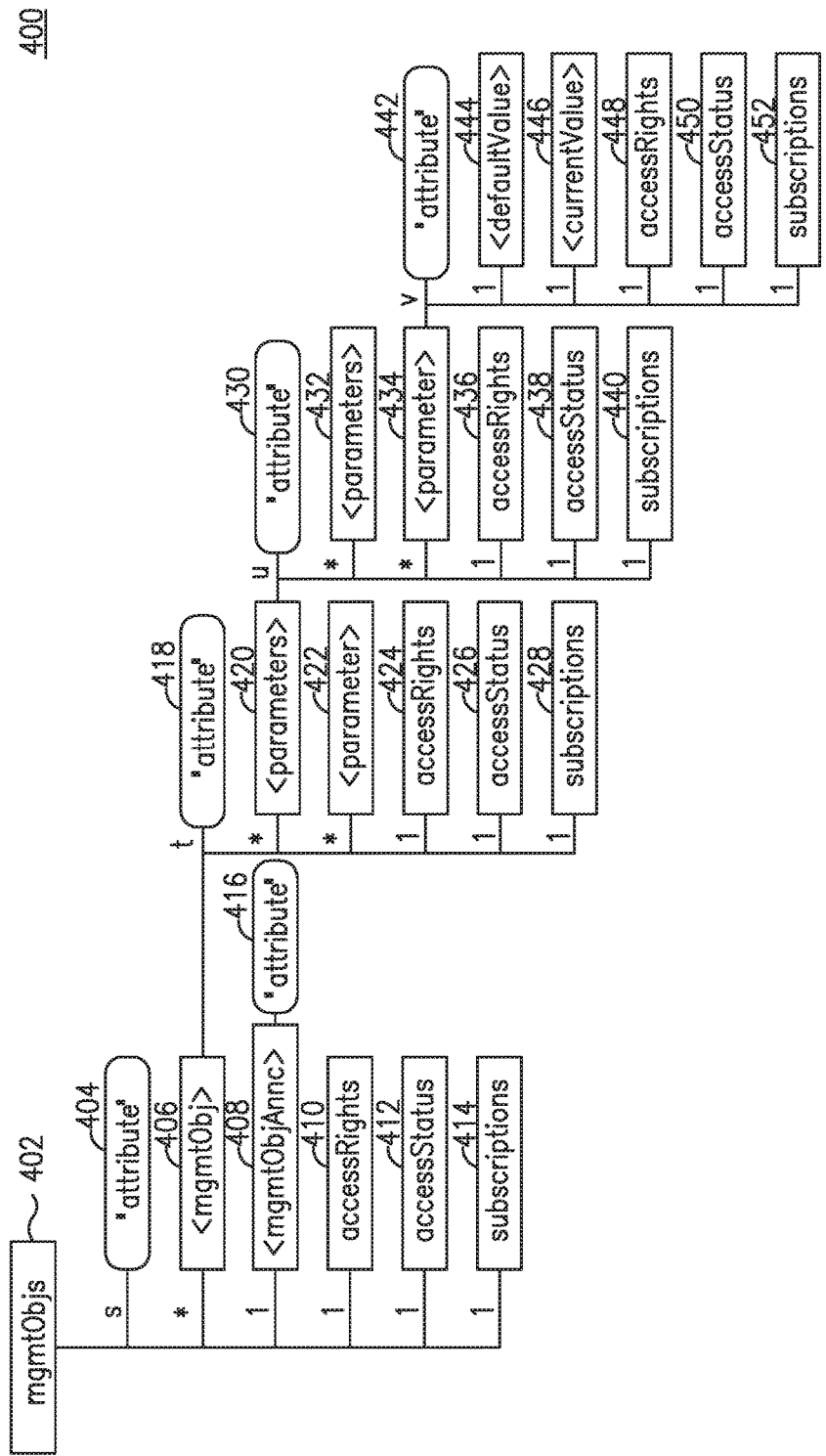
FIG. 4A is a block diagram illustrating an example resource structure framework for provisioning an SCL with a management objects ("mgmtObjs") resource.

FIG. 4A is a block diagram illustrating an example resource structure framework 400 for provisioning an SCL with mgmtObjs. The resource structure framework ("mgmtObjs structure framework") 400 may include, as a root, a mgmtObjs 402, a plurality of sub-resources to the mgmtObjs 402, one or more attributes 404 associated with some or all of the sub-resources directly subordinate from the mgmtObjs 402, and attributes 416, 418, 430, and 442 associated with the sub-resources indirectly subordinate from the mgmtObjs 402. The attributes 404 may include an accessRightID; a creationTime; a lastModifiedTime; a description, such as a text-format description of mgmtObjs 402; and allowedMethod. The allowedMethod may specify allowed RESTful method(s) for processing the mgmtObjs sub-resource 402.

The plurality of sub-resources to the mgmtObjs 402 may include an mgmtObj ("<mgmtObj>") sub-resource 406, a management object announce ("<mgmtObjAnnc>") sub-resource 408, an accessRights sub-resource 410, an accessStatus sub-resource 412 and a subscriptions sub-resource 414.

The <mgmtObj> sub-resource 406 may be a specific management object and a placeholder for storing related management data/parameters for this <mgmtObj> sub-resource 406. The <mgmtObjAnnc> sub-resource 408 may be a placeholder for an announced management object. The <mgmtObjAnnc> sub-resource 408 may include the following attributes (i) link, (ii) accessRightID, and (iii) searchStrings.

The <accessRights> sub-resource 410 may include, maintain and/or store a representation of permissions for the sub-resource used for performing REM. The <accessRights> sub-resource 408 may be inherited from its parent, if any.

The accessStatus sub-resource 414 may be a collection of individual access status resources. The subscriptions sub-resource 414 may be a collection of subscription resources; each of which may include information for tracking a status of a (e.g., active) subscription to its parent resource. Each of the subscriptions 414 may represent a request, from an issuer, for notification of modifications on the parent resource.

The <mgmtObj> sub-resource 406 may include (i) a <parameters> sub-resource 420, which may be a placeholder for a collections of multiple parameters for management purposes; (ii) a <parameter> sub-resource 422, which may be a single management parameter; (iii) an <accessRights> sub-resource 424 for xREM purposes; (iv) an <accessStatus> sub-resource 426; and (v) a <subscriptions> sub-resource 428. The <accessRights> sub-resource 424 may include, maintain and/or store a representation of permissions for the sub-resource used for performing REM. The <accessRights> sub-resource 424 may be inherited from its parent, if any.

The <mgmtObj> sub-resource 406 may include the following attributes (i) an accessRightID, a creationTime, a lastModifiedTime, a description (e.g., a text-format description of the <mgmtObj> sub-resource 406), an allowedMethod, and a contentType. The allowedMethod may specify allowed RESTful method(s) for processing the <mgmtObj> sub-resource 406. The contentType may specify the type of the <mgmtObj> sub-resource 406. The contentType attribute may be referred to as dataType attribute, as well The <parameters> sub-resource 420 may include a <parameters> sub-resource 432. This <parameters> sub-resource 432 may be a placeholder for collections of multiple parameters for management purposes. By making the <parameters> sub-resource 432 subordinate to the <parameters> sub-resource 432, a hierarchical tree structure can be supported, and import of existing management objects may be simpler than a flat structure.

The <parameters> sub-resource 420 may also include (i) a <parameter> sub-resource 434 for maintaining and/or storing a single management parameter; (ii) an <accessRights> sub-resource 436 for xREM purpose; (iii) an <accessStatus> sub-resource 438; and a <subscriptions> sub-resource 440. The <accessRights> sub-resource 436 may include, maintain and/or store a representation of permissions for the sub-resource used for performing REM. The <accessRights> sub-resource 436 may be inherited from its parent, if any.

The <parameters> sub-resource 420 may include the following attributes (i) accessRightID, (ii) creationTime, (iii) lastModifiedTime, (iv) description (e.g., a text-format description of the <parameters> sub-resource 420), (v) an allowedMethod, and (vi) a contentType/dataType. The allowedMethod may specify allowed RESTful method(s) for processing the <mgmtObj> sub-resource 436. The contentType/dataType may specify the type of the <mgmtObj> sub-resource 436.

Further, as shown in the example of FIG. 4A, the mgmtObjs 402 has an additional hierarchical structure by subordinating another <parameters> sub-resource 432 to the <parameters> sub-resource 420. In this substructure, the <parameters> sub-resource 420 may include both a number of the <parameters> sub-resources 432 and an individual <parameter> resource 434. Such hierarchical structure simplify importing other management trees into the mgmtObjs 402 and/or simplify performing tree structure mapping. Note that such hierarchical structure might not be realized without the <mgmtObj> sub-resource 406 and its children (e.g., using existing containers or groups resources) unless one container (or group) resource is adapted to allow creation and use of a contentInstance (or member) with another container (or group) as its sub-resource.

The <parameter> resource 434 may include (i) a <defaultValue> sub-resource 444 that may include, maintain and/or store a default value of the <parameter> sub-resource 434; (ii) a <currentValue> sub-resource 446 that may include, maintain and/or store a current value of the <parameter> sub-resource 434; (iii) an <accessRights> sub-resource 448 for xREM purposes; (iv) an <accessStatus> sub-resource 450; and (v) a <subscriptions> sub-resource 444. The <accessRights> sub-resource 448 may include, maintain and/or store a representation of permissions for the sub-resource used for performing REM. The <accessRights> sub-resource 448 may be inherited from its parent, if any.

The <parameter> resource 434 may include the following attributes (i) accessRightID, (ii) creationTime, (iii) lastModifiedTime (iv) a description (e.g., a text-format description of the <parameter> resource 434), and (v) an allowedMethod. The allowedMethod may specify allowed RESTful method(s) for processing the <parameter> resource 434.

Figure 4B:
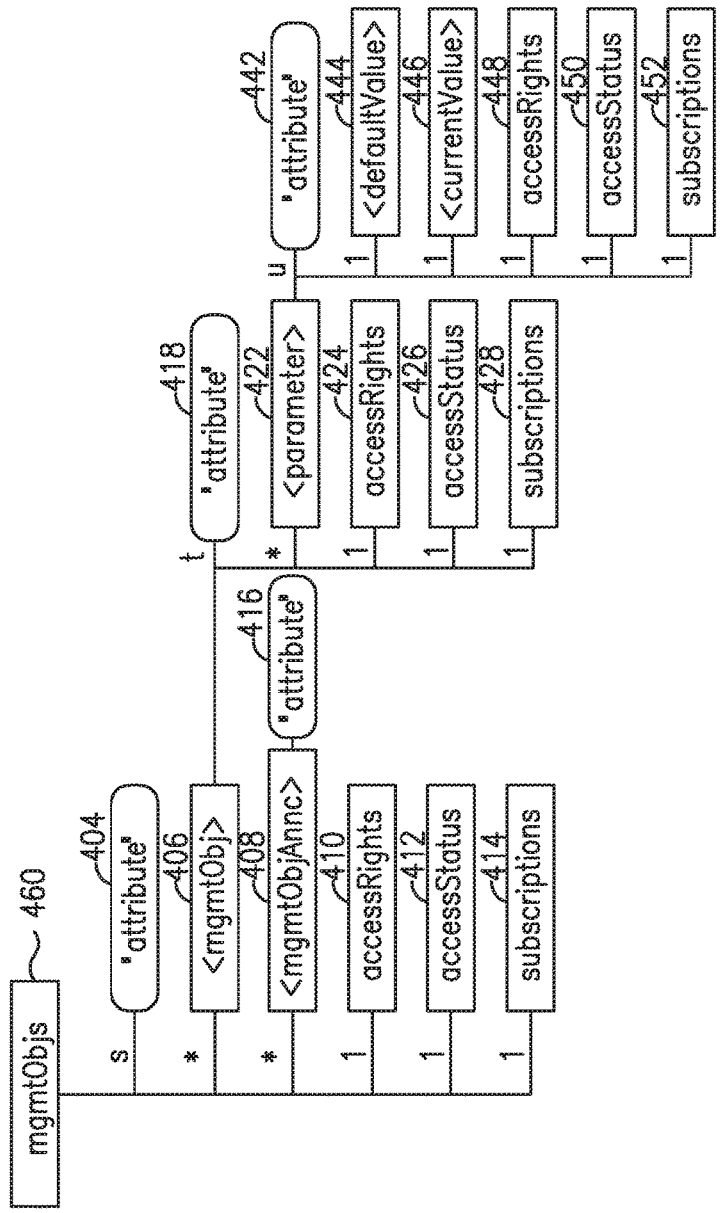
FIG. 4B is a block diagram illustrating an example resource structure framework for provisioning an SCL with a management objects ("mgmtObjs") resource.

In an alternative embodiment, a two-level resource structure framework 458 for provisioning an SCL with mgmtObjs is shown in FIG. 4B. The resource structure framework 458 may include mgmtObjs 460. The mgmtObjs 460 is similar to the mgmtObjs 402 of FIG. 4A, except that mgmtObjs 460 does not include the <parameters> sub-resource 420.

Example M2M xREM Management Model

In an embodiment, xREM may be implemented under a client/server (C/S) model. Additionally and/or alternatively, the xREM may use a proxy function to manage M2M Devices behind a M2M GW, such as the D 34d and D's 34e-34g (FIG. 1).

In an embodiment, an xREM server may be a management controller. The xREM server may operate as, for example, or with functionality similar to any of a SNMP manager, a DM server in accordance with OMA DM, and an ACS in accordance with the BBF-TR069. The xREM Server may control and manage interactions with xREM client and xREM proxy.

In an embodiment, an xREM client may be a software entity controlled by xREM server. The xREM client may as, for example, or with functionality similar to any of a SNMP agent, a DM Client in accordance with OMA DM, and a CPE in accordance with BBF TR-069. xREM Server and xREM Client may work together to establish management session and perform management functionalities.

In an embodiment, an xREM proxy may play roles of both an xREM client and an xREM server. The xREM proxy may have non-xREM management server function for managing D'-type devices, such as M2M Devices operating in accordance with OMA DM, and/or BBF TR-069, and/or M2M Devices without SCLs. The xREM proxy may include translation and/or adaptation functions between the xREM Client and the xREM Server (or non-xREM management server). Example functions may include translation between xREM client and xREM server, and translation between xREM client and non-xREM management server.

In an embodiment, an xREM can be an xREM server (a manager), an xREM client (a managed entity), or an xREM proxy (acting as both a manager and a managed entity) depending on where it locates.

Figure 5:
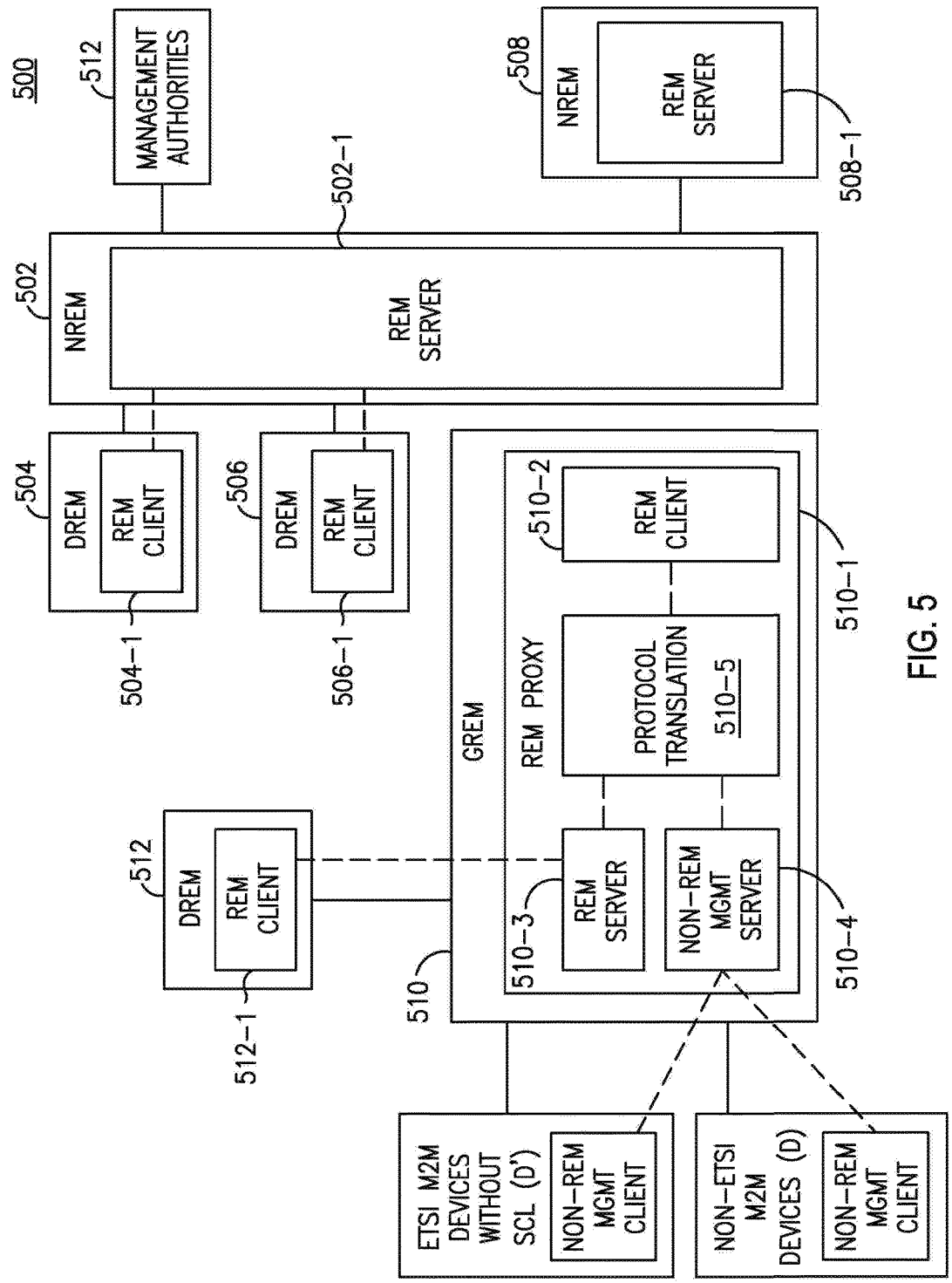
FIG. 5 is a block diagram illustrating a diagram of a client-server model for performing xREM.

FIG. 5 is a block diagram illustrating a diagram of a client-server model 500 for performing xREM. The xREM may be performed in accordance with ETSI TS 102 960. Referring to FIG. 5, a NREM 502 may include an xREM server 502-1, which performs communication interactions with one or more xREM clients, such as any of xREM clients 504-1 and 506-1 of DREM 504 and GREM 506, respectively, or an xREM proxy 510-1 of GREM 510. The NREM 502 may have separate interfaces to third-party management authorities 512 and other NREM, such as NREM 508. The GREM 510 may operate as an xREM Client 510-2 or an xREM Proxy 510-1. When the M2M gateway operates as an end device to be managed by the M2M server, the GREM 510 may operate as an xREM client. When the M2M gateway operates as a proxy for the M2M server to manage M2M devices (either ETSI-compliant or non-ETSI) behind the M2M gateway, the GREM 510 operates as an xREM proxy. As the xREM proxy 510-1, the GREM 510 may include the xREM client 510-2, an xREM server 510-3, a non-xREM management server 510-4, and protocol translation unit 510-5. A DREM 512 may include the xREM client 512-1. The xREM client 512-1 may interact with the xREM server 502-1 in the NREM 502 or, alternatively, to the xREM server 510-3 in the xREM proxy 510-1.

If an OMA DM is used to implement the xREM, the xREM server 502-1 may be a DM server, and the xREM client 512-1 may be a DM client. The xREM proxy 510-1 may be an OMA GwMO. If BBF TR-069 is used to implement the xREM, the xREM server 502-1 may be an ACS, and the xREM client 512-1 may be a CPE. If SNMP is used for implementing the xREM, the xREM Server 502-1 may be a SNMP manager, and the xREM client 512-1 may be an SNMP agent. The xREM proxy 510-1 may be an SNMP proxy.

Support Multiple Management Protocols

In accordance with an embodiment, an integrated M2M system, such as the system 10, may include multiple vertical M2M applications, where different management protocols may be deployed. For example, an M2M device supporting DM client as its xREM client may move and connect to a M2M GW supporting BBFc TR-069 only, or to a M2M server, which has managed only a BBF TR-069 device. In the alternative, other suitable OMA DM devices and BBF TR-069 devices may be managed in an integrated M2M system according to embodiments herein.

Figure 6:
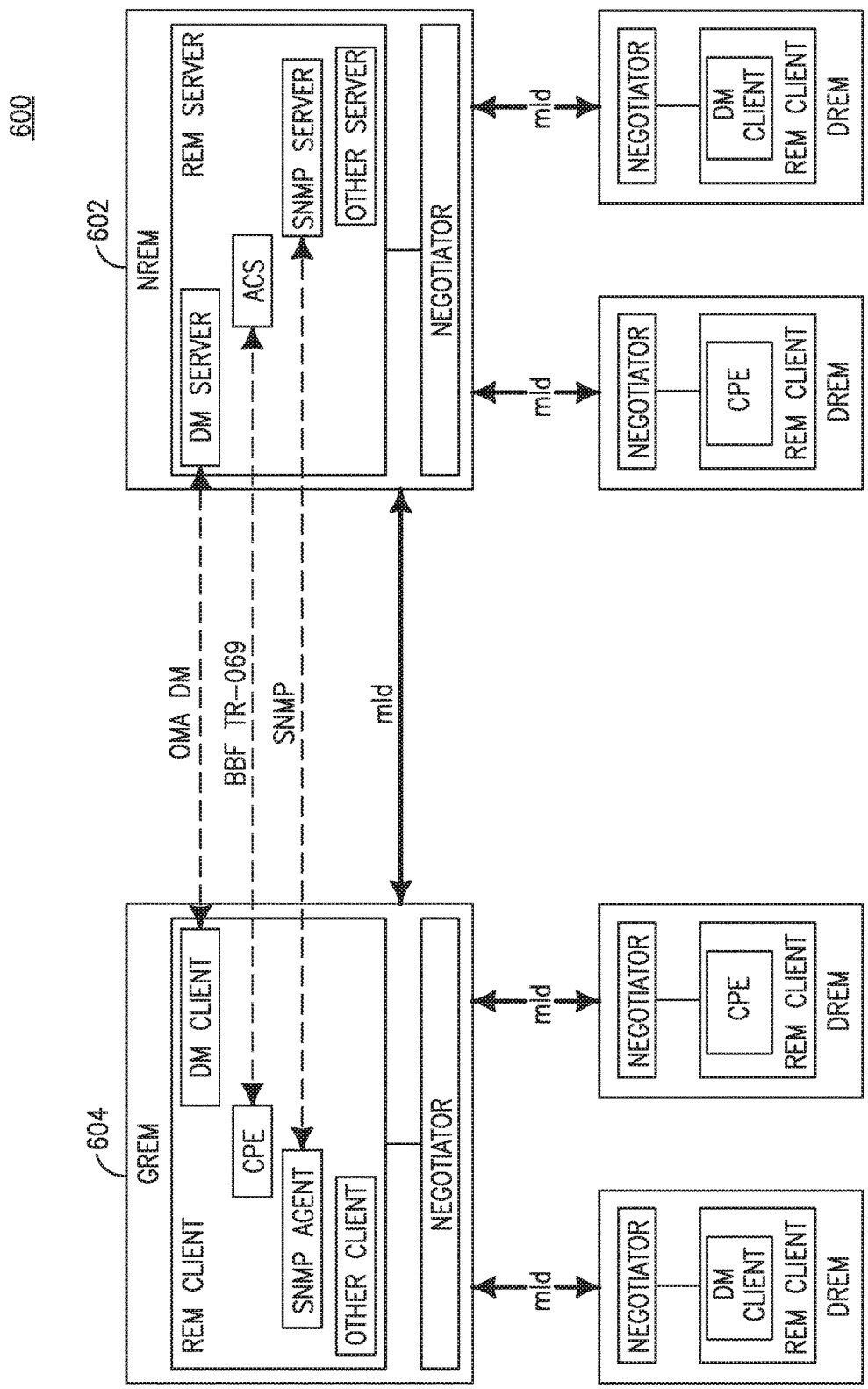
FIG. 6 is a block diagram illustrating a tunnel-based approach to support xREM using multiple different management protocols.

FIG. 6 is a block diagram illustrating a tunnel-based approach to support xREM using multiple different management protocols. The NREM 602 and/or GREM 604 may use different management protocols for management interactions with different M2M GWs and devices. A tunnel module may perform the following. The tunnel module may perform negotiation to negotiate between the D/GREM and NREM and/or between the GREM and DREM to determine which management protocol to use. The tunnel module may also conduct an xREM software update in accordance with the determination.

The tunnel module may perform a data model translation to translate between xREM data model and OMA DM mgmt objects, BBF TR-069 management parameters, and/or SNMP MIB. The tunnel module may also perform management command conversion and/or mapping between the OMA DM commands or BBF TR-069 commands and the xREM RESTful methods. The tunnel module may also perform protocol adaptation to adapt the OMA DM, BBF TR-069 or SNMP protocols to be able to use the RESTful methods over the mid reference points.

Approaches for Negotiating or Indicating Management Protocols

A parameter, referred to as, for example, mgmtProtocolType, may be used to represent the type of management protocol. The mgmtProtocolType may be an attribute (or sub-resource) of the resource <scl>, which may be the SCL of an M2M Device, an M2M Gateway, or an M2M Server. In addition, mgmtProtocolType may be included into M2M SCL management object (referred to as "SCLMO") as a configuration parameter. In one embodiment, the M2M Device may use "mgmtProtocolType" to indicate the management protocol type to use between the M2M Device and the M2M Server, or between the M2M Device and an M2M Gateway. In an embodiment, the M2M Gateway may use "mgmtProtocolType" to represent the management protocol type used between the M2M Gateway and the M2M Server. To facilitate this, the <scl> of the M2M Gateway may include an attribute (or sub-resource) "mgmtProtocolType" and the SCLMO of the M2M Gateway may include a parameter "mgmtProtocolType". If M2M Devices exist behind the M2M Gateway, a second attribute or (sub-resource) "mgmtProtocolTypeExt" may used to represent the management protocol type between the M2M Devices behind the M2M Gateway and the M2M Gateway.

In an embodiment, the M2M Server may use "mgmtProtocolType" to represent the management protocol type it supports for managing M2M Devices and/or M2M Gateways. To facilitate this, the <scl> of the M2M Server may include an attribute (or sub-resource) "mgmtProtocolType".

In an embodiment, the N-SCL (and/or G-SCL) may include a attribute (or sub-resource) mgmtProtocolType that represents a list of multiple management protocols the corresponding NREM and/or GREM) supports As an alternative, mgmtProtocolType can be added to as an attribute of an mgmtObjs resource and/or an attribute of each <mgmtObj> instance. The following approaches may be applied for negotiating or indicating management protocols between DREM and/or GREM ("D/GREM") and NREM and/or between DREM and GREM using mgmtProtocolType as an attribute of <scl>, an attribute of mgmtObjs resource or an attribute of a <mgmtObj>.resource.

Figure 7A:
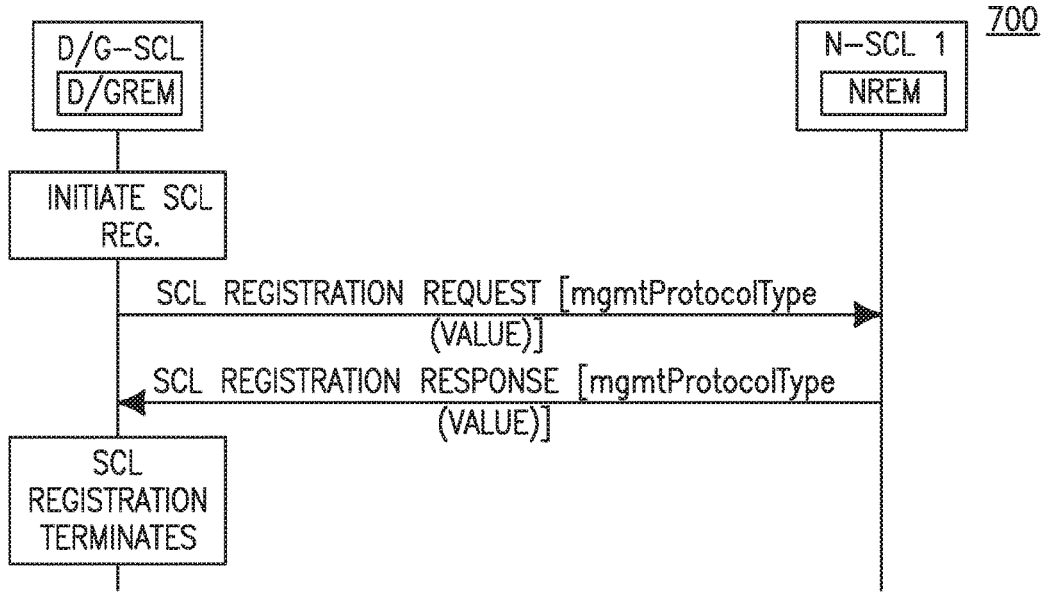
FIGS. 7A-7C are flow diagram illustrating example flows 700, 730 and 760, respectively, for determining a type of management protocol to use for REM.
Figure 7B:
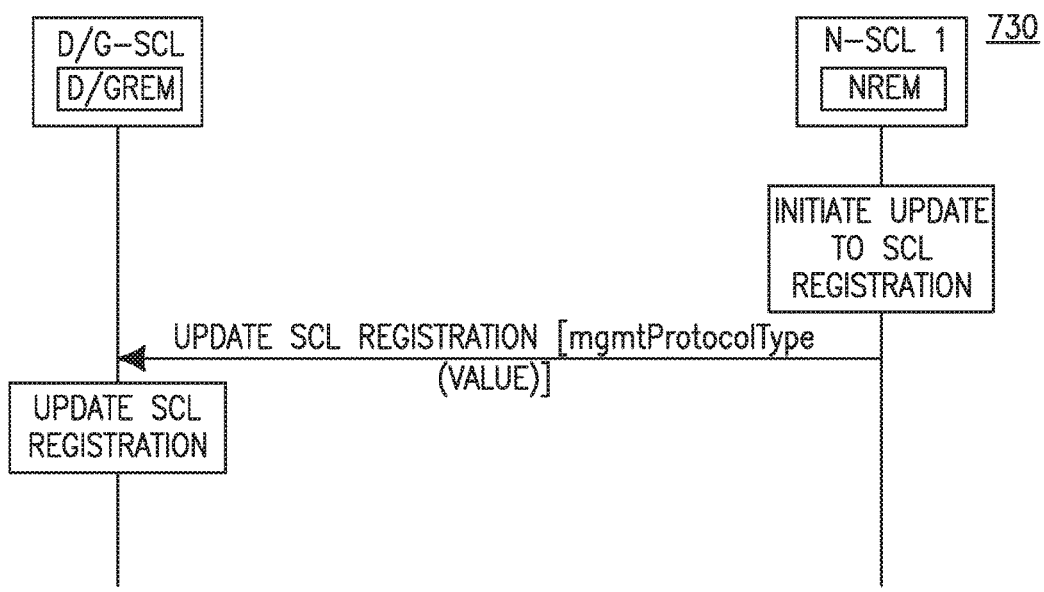
Figure 7C:
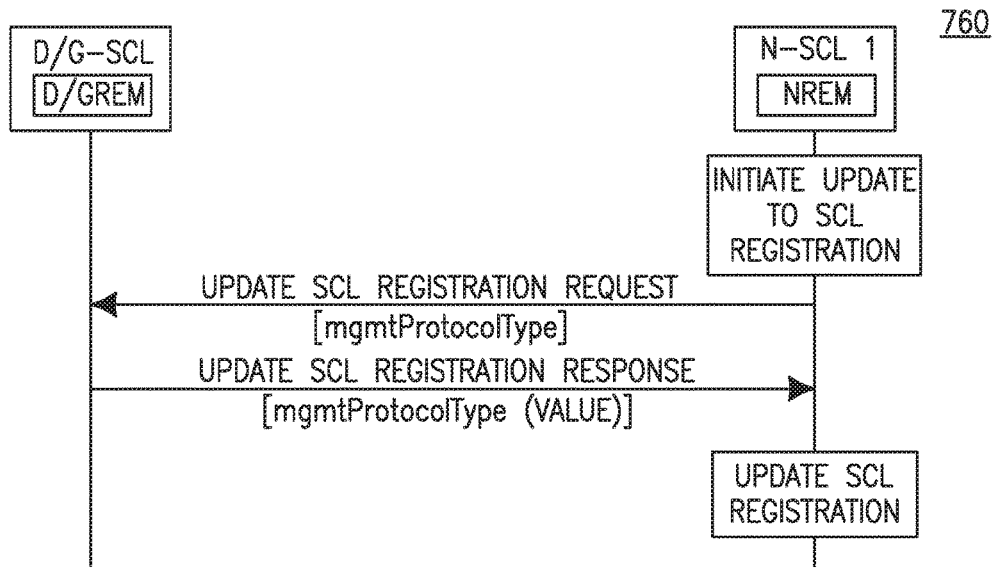

FIGS. 7A-7C are flow diagram illustrating example flows 700, 730 and 760, respectively, for determining a type of management protocol to use for REM. Each of the flows 700, 730 and 760 is described with reference to system 10 of FIGS. 1A-1C for convenience. The flows 700, 730 and 760 may be carried out using other architectures, as well.

Between D/GREM and NREM

Approach 1—Piggyback mgmtProtocolType in "SCL Registration" and/or "Update SCL Registration"

Referring now to the flow 700 of FIG. 7A, the D/GREM may initiate a SCL registration process (702), during which the D/GREM may send one or more request ("SCL REGISTRATION REQUEST") messages to the M2M Server (NREM). As part of, prior to and/or after the initiation of the SCL registration process (702), the D/GREM may obtain from the "mgmtProtocolType" attribute/sub-resource of the D/G-SCL a value ("mgmtProtocolType (value)") indicative of the type of management protocol the D/GREM supports.

The M2M Device/Gateway (D/GREM) may then select and populate one or more of the SCL REGISTRATION REQUEST messages with the mgmtProtocolType (value) as a parameter thereof, and then send such SCL REGISTRATION REQUEST [mgmtProtocolType (value)] messages to the M2M Server (NREM) (704). Responsive to SCL REGISTRATION REQUEST [mgmtProtocolType (value)] message(s), the M2M Server (NREM) may select and populate one or more response ("SCL REGISTRATION RESPONSE") messages with the received mgmtProtocolType (value) as a parameter thereof. Thereafter, the M2M Server (NREM) may send such SCL REGISTRATION RESPONSE [mgmtProtocolType (value)] message(s) to the M2M Device/Gateway (D/GREM) to acknowledge receipt of the mgmtProtocolType (value) and/or acceptance of the type of the management protocol indicated by the received mgmtProtocolType (706). After receipt of the SCL REGISTRATION RESPONSE [mgmtProtocolType (value)] message(s) and other messages for completing the SCL registration process, if any, the D/GREM may terminate the SCL registration process (708). By carrying out the flow 700, the D/GREM may piggyback the mgmtProtocolType attribute/sub-resource on the SCL registration process to facilitate notification and/or acceptance of the type of management protocol the M2M Server (NREM) and the M2M Device/Gateway (D/GREM) may use when performing REM.

Although not shown, the M2M Server (NREM) may, without being requested, piggyback the mgmtProtocolType attribute/sub-resource on the SCL registration process to instruct the M2M Device/Gateway (D/GREM) to use the type of management protocol specified or otherwise indicated by a mgmtProtocolType attribute/sub-resource of the N-SCL. The M2M Server (NREM) may, for example, retrieve the mgmtProtocolType (value) from the mgmtProtocolType attribute/sub-resource of the N-SCL, populate one or more SCL REGISTRATION RESPONSE message(s) with the mgmtProtocolType (value) as a parameter thereof, and send the populated SCL REGISTRATION RESPONSE [mgmtProtocolType (value)] message(s) to the M2M Device/Gateway (D/GREM).

As an alternative, the M2M Server (NREM) and the M2M Device/Gateway (D/GREM) may negotiate the type of management protocol to use by exchanging SCL REGISTRATION REQUEST messages and SCL REGISTRATION RESPONSE messages populated with respective mgmtProtocolType (values) until either the M2M Server (NREM) or the M2M Device/Gateway (D/GREM) sends to the other the mgmtProtocolType (value) it received.

FIGS. 7B-7C, the process for piggybacking mgmtProtocolType in the Update SCL Registration is as follows:

During the Update SCL Registration process, the M2M Server (NREM) can specify "mgmtProtocolType" to be used by the M2M Device/Gateway (D/GREM) by piggybacking it in the message sent to the M2M Device/Gateway (D/GREM).

Alternatively, during the process of "Update SCL Registration", the M2M Device/Gateway (D/GREM) can report their "mgmtProtocolType" to the M2M Server (NREM) by piggybacking "mgmtProtocolType" in the message sent to the M2M Server (NREM).

Approach 2—Piggyback mgmtProtocolType in "Create a mgmtObj Resource"

ETSI M2M Functional Architecture defines the following procedure for creating management object resource. As a result, mgmtProtocolType can be embedded in those procedures so that the M2M Device/Gateway (D/GREM) can inform its mgmtProtocolType to the M2M Server (NREM)

Figure 8:
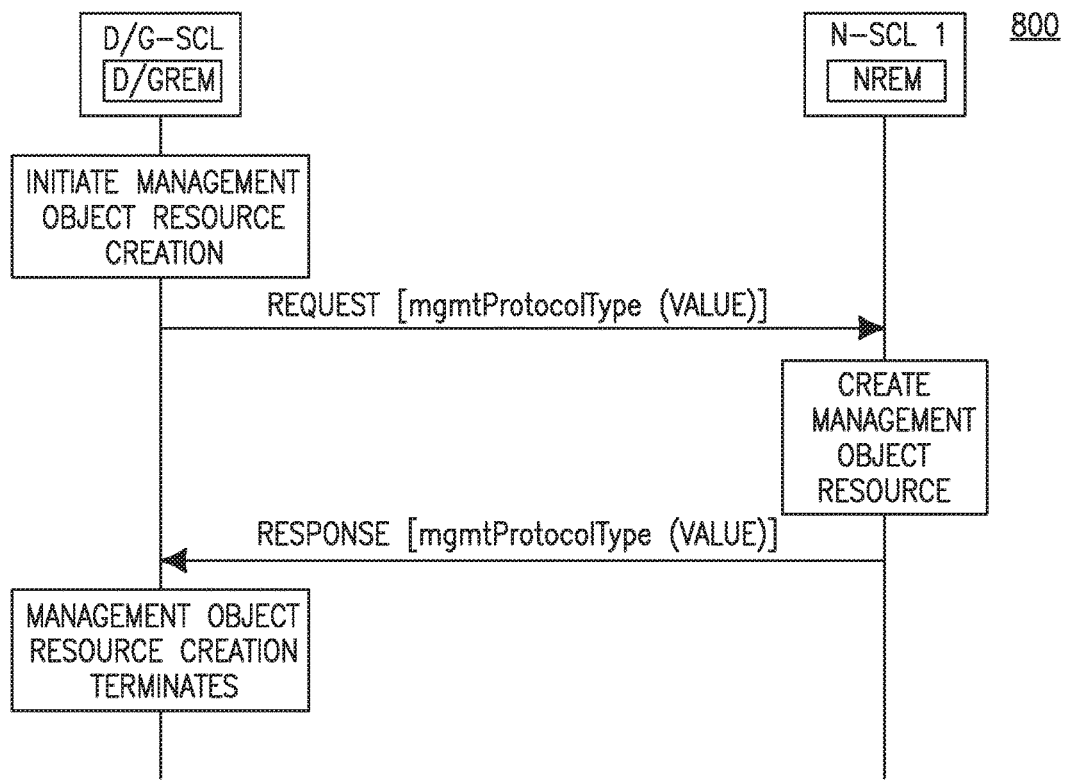
FIG. 8 is a message flow diagram illustrating procedures for negotiating and/or informing devices a type of management protocol for xREM.

As shown in FIG. 8, the process for piggybacking mgmtProtocolType in Create a mgmtObj resource is as follows:

If this process is initiated by the M2M Device/Gateway (D/GREM), the M2M Device/Gateway (D/GREM) will send a request message to the M2M Server (NREM) during this process. The M2M Device/Gateway (D/GREM) can piggyback "mgmtProtocolType" as a parameter in this request message.

Approach 3—Create New Procedure for Sending "mgmtProtocolType"

Figure 9:
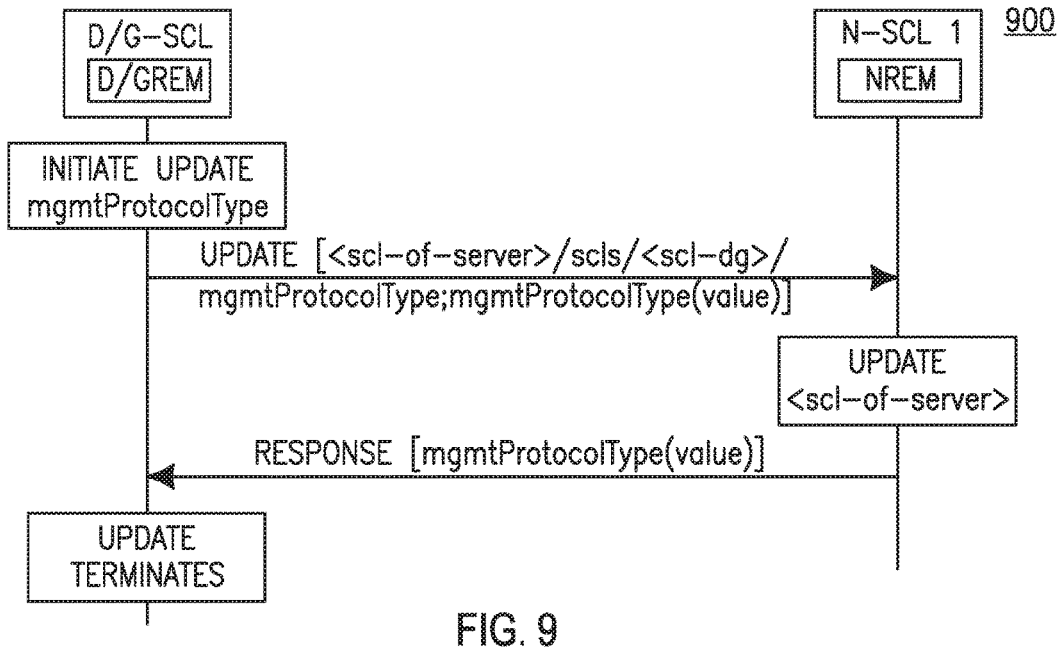
FIG. 9 is a message flow diagram illustrating procedures for negotiating and/or informing devices a type of management protocol for xREM.

Instead of piggybacking "mgmtProtocolType" in existing M2M procedures as described in Approach 2 and Approach 3, the following procedures define a process for sending "mgmtProtocolType" between the M2M Server (NREM) and the M2M Device/Gateway (D/GREM). As shown in FIG. 9, this process is as follows:

Update "mgmtProtocolType"

The M2M Device/Gateway (D/GREM) sends an Update message addressing to <scl-of-server>/scls/<scl-dg>/mgmtProtocolType to update "mgmtProtocolType".

The <scl-of-server> represents the M2M Server. The <scl-dg> represents the M2M Device/Gateway (D/GREM) for updating the M2M Server of its mgmtProtocolType. The "mgmtProtocolType" may be a new attribute of <scl-dg>. As a result, the M2M Server (NREM) knows the "mgmtProtocolType" of the M2M Device/Gateway (D/GREM), which registers with the M2M Server.

Figure 10:
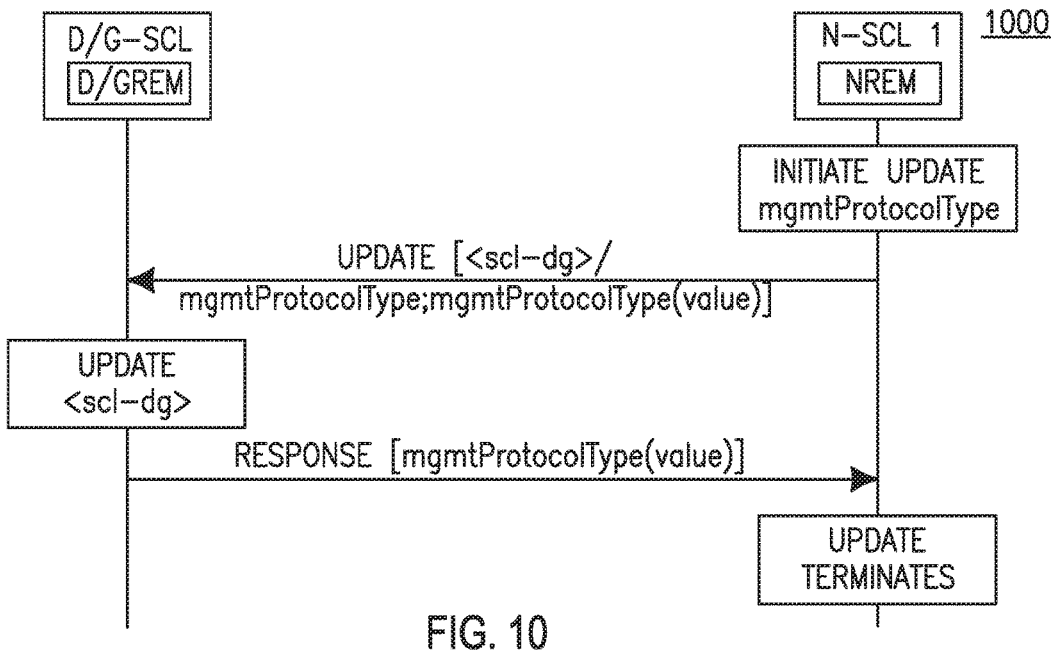
FIG. 10 is a message flow diagram illustrating procedures for negotiating and/or informing devices a type of management protocol for xREM.

The NREM may also actively send an Update message addressing to <scl-dg>/mgmtProtocolType to change the "mgmtProtocolType" of an M2M Device/Gateway, as shown in FIG. 10.

As an alternate, the NREM may send a Retrieve message addressing to <scl-dg>/mgmtProtocolType to retrieve the current management protocol used in the M2M Device/Gateway.

Approach 4—Piggyback mgmtProtocolType in SCL Discovery

Figure 11:
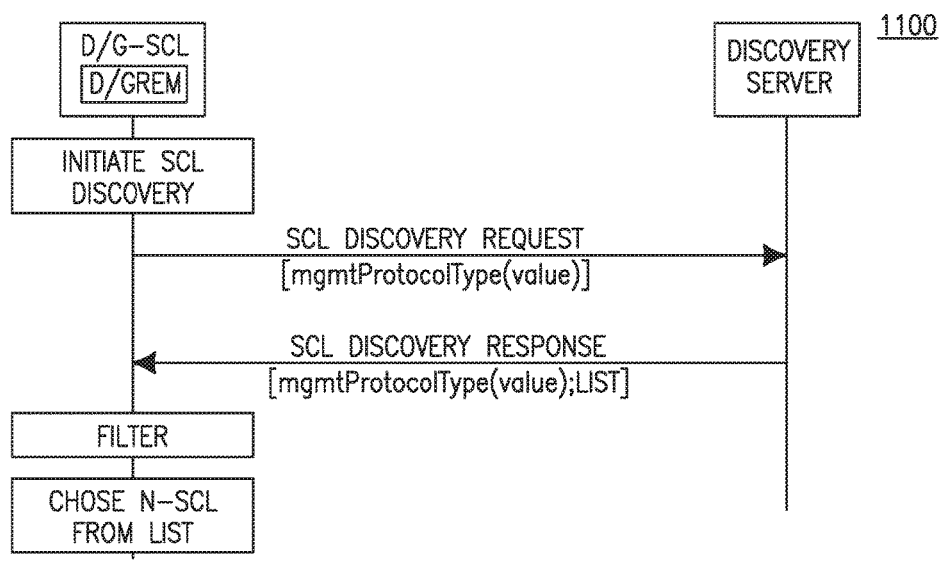
FIG. 11 is a message flow diagram illustrating procedures for negotiating and/or informing devices a type of management protocol for xREM.

The mgmtProtocolType can also be piggybacked in messages for SCL Discovery using the following approaches. As shown in FIG. 11, when the M2M Device/Gateway (D/GREM) issues a request message to discover an M2M Server (N-SCL), the M2M Device/Gateway will include its mgmtProtocolType in the request message. The piggybacked mgmtProtocolType information can help to filter out the M2M Server that does not support the management protocol as denoted by the mgmtProtocolType.

The mgmtProtocolType of the M2M Server may be piggybacked in the SCL Discovery response message to the M2M Device/Gateway. The piggybacked mgmtProtocolType can help the M2M Device/Gateway to choose an appropriate M2M Server. The M2M Device/Gateway can also change to use the management protocol as denoted by the piggybacked mgmtProtocolType.

Between DREM and GREM

In this case, the M2M Devices are behind an M2M Gateway as a proxy. As a result, the M2M Devices need to indicate their mgmtProtocolType to the M2M Gateway or the M2M Gateway can actively retrieve mgmtProtocolType of the M2M Devices. The similar approaches for the Case 1 above can be utilized.

Approach 1—Piggyback mgmtProtocolType in "SCL Registration" and "Update SCL Registration"

ETSI M2M Functional Architecture defines the following procedures for SCL management and as a result, mgmtProtocolType can be embedded in those procedures so that DREM can inform its mgmtProtocolType to GREM SCL Registration:

During this process, D-SCL will send multiple request messages to N-SCL. DREM can piggyback "mgmtProtocolType" as a parameter in anyone of those request messages. In addition, GREM can piggyback "mgmtProtocolType" in the response message to DREM to instruct DREM to use the management protocol as specified by "mgmtProtocolType".

Update SCL Registration

During the process of "Update SCL Registration", GREM can specify "mgmtProtocolType" to be used by DREM by piggybacking it in the message sent to DREM. During the process of "Update SCL Registration", DREM can report their "mgmtProtocolType" to GREM by piggybacking "mgmtProtocolType" in the message sent to GREM.

Approach 2—Piggyback mgmtProtocolType in "Create a mgmtObj Resource"

ETSI M2M Functional Architecture defines the following procedure for creating management object resource. As a result, mgmtProtocolType can be embedded in those procedures so that DREM can inform its mgmtProtocolType to GREM.

Create a mgmtObj Resource:

If this process is initiated by D-SCL (DREM), D-SCL will send a request message to N/G-SCL. During this process, the DREM can piggyback "mgmtProtocolType" as a parameter in this request message.

Approach 3—Create New Procedure for Sending "mgmtProtocolType"

Instead of piggybacking "mgmtProtocolType" in existing M2M procedures as described in Approach 2 and Approach 3, the following procedures can also be utilized for sending "mgmtProtocolType" between GREM and DREM.

Update "mgmtProtocolType"

The M2M Device (DREM) sends an Update message addressing to <scl-of-gw>/scls/<scl-d>/mgmtProtocolType to update "mgmtProtocolType". The <scl-of-gw> represents the M2M Gateway. The <scl-d> represents the M2M Device which registers with the M2M Gateway and is updating the M2M Gateway of its mgmtProtocolType. The "mgmtProtocolType" is the attribute of <scl-d>. As a result, the M2M Gateway (GREM) knows the "mgmtProtocolType" of the M2M Device (DREM) which registers with the M2M Gateway The M2M Gateway (GREM) can also actively send an Update message addressing to <scl-d>/mgmtProtocolType to change the "mgmtProtocolType" of the M2M Device.

Retrieve "mgmtProtocolType"

The M2M Gateway (GREM) sends a Retrieve message addressing to <scl-d>/mgmtProtocolType to retrieve the current management protocol used in the M2M Device.

Approach 4—Piggyback mgmtProtocolType in SCL Discovery

The mgmtProtocolType may also be piggybacked in messages for SCL Discovery using the following approaches.

When the M2M Device (DREM) issues a request message to discover an M2M Gateway (G-SCL), the M2M Device will include its mgmtProtocolType in the request message. The piggybacked mgmtProtocolType information can help to filter out the M2M Gateway(s) that do (does) not support the management protocol as denoted by the mgmtProtocolType.

The mgmtProtocolType of the M2M Gateway can be piggybacked in the SCL Discovery response message to the M2M Device. The piggybacked mgmtProtocolType can help the M2M Device to choose an appropriate M2M Gateway. The M2M Device can also change to use the management protocol as denoted by the piggybacked mgmtProtocolType.

Example Resource Definition for All Access Histories

For the purpose of remote entity management, it may be important for a receiver-SCL to log all access history which a requester/issuer-SCL has had on every local resource of the receiver-SCL. Although the current ETSI M2M functional architecture defines resource accessStatus, it only records the last access (retrieve/update/subscribe)—not all operations on a resource in the past. To facilitate storing all access history, a new resource, referred to as accessHistories, is defined in this disclosure. Related operations on accessHistories are also defined.

Resource accessHistories

Figure 12:
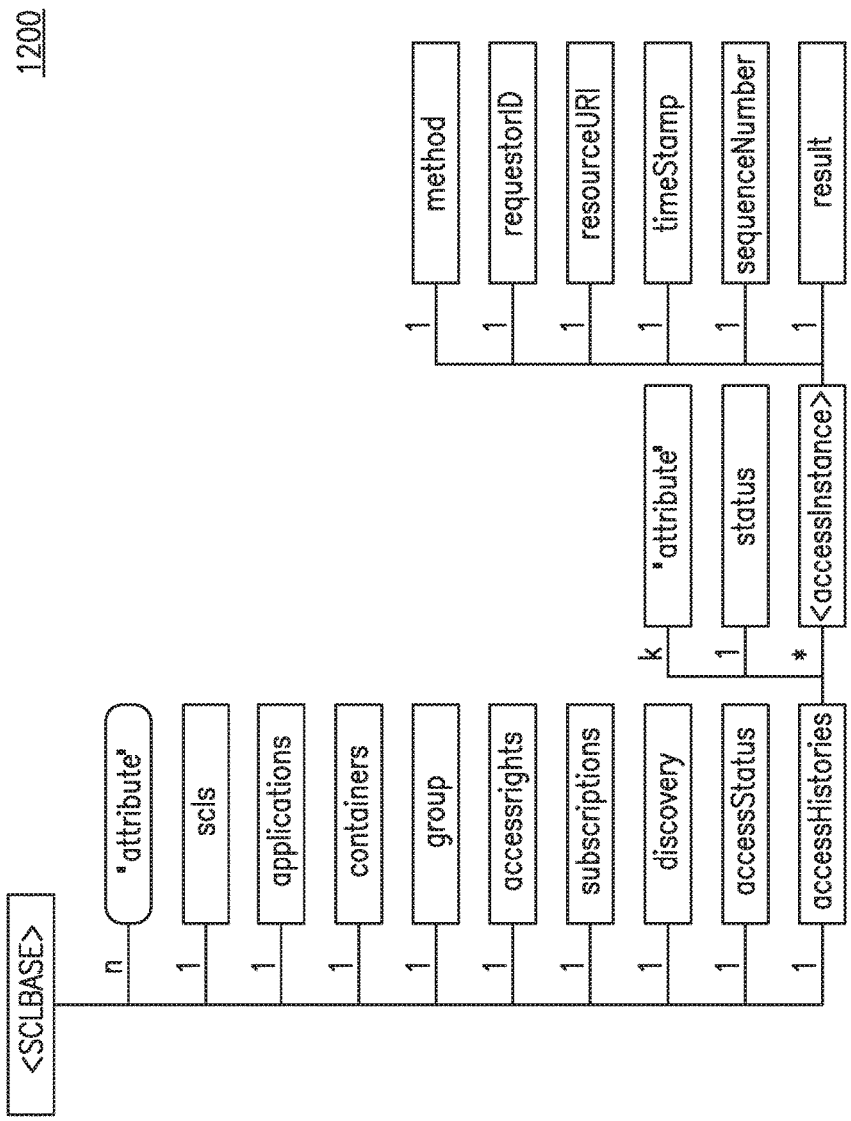
FIG. 12 is an example structure of the resource accessHistories.

Based on accessStatus, accessHistory may be defined and illustrated as in the example of FIG. 12, which illustrates an example structure of the resource accessHistories. Referring to FIG. 12, the accessHistories may contain the following components:

"attribute" may have accessRightID status: used to represent if it starts to or stop logging access histories <accessInstance>: a number of access instances Each <accessInstance> may have the following sub-resources to record access details about it:

method: the method involved in this access. It may be Create, Retrieve, Update, Delete, Subscription, or Announce.

requestorID: the ID of the entity who requests this access resourceURI: the URI of the resource where this access should operate timeStamp: the time when this access takes place sequenceNumber: an automatically incremental integer to stand for access sequence result: the result of this operation
If the method is Update, it stands for the new value of the resourceURI
It could be Success or Failure for other methods. It is possible to define different types of Failures here for fault management.

Resource accessHistories may be stored at M2M Devices and GWs. Whenever there is an operation onto a local resource at a device/GW, an accessInstance may be automatically created and added into accessHistories. As a resource, accessHistories can be accessed in many cases by NREM for management purpose. In other words, NREM can create/retrieve/update/delete accessHistories on D/GREM. The following functions may be implemented:

Create: NREM requests D/GREM to create accessHistories on a particular "method" and/or "resourceURI" for a certain time interval or forever;

Retrieve: NREM retrieves all or some <accessInstance> from D/GREM;

Update: NREM requests D/GREM to disable or resume access history function by changing the value of "status"; and Delete: NREM requests D/GREM to delete all or some <accessInstance>.

Figure 13:
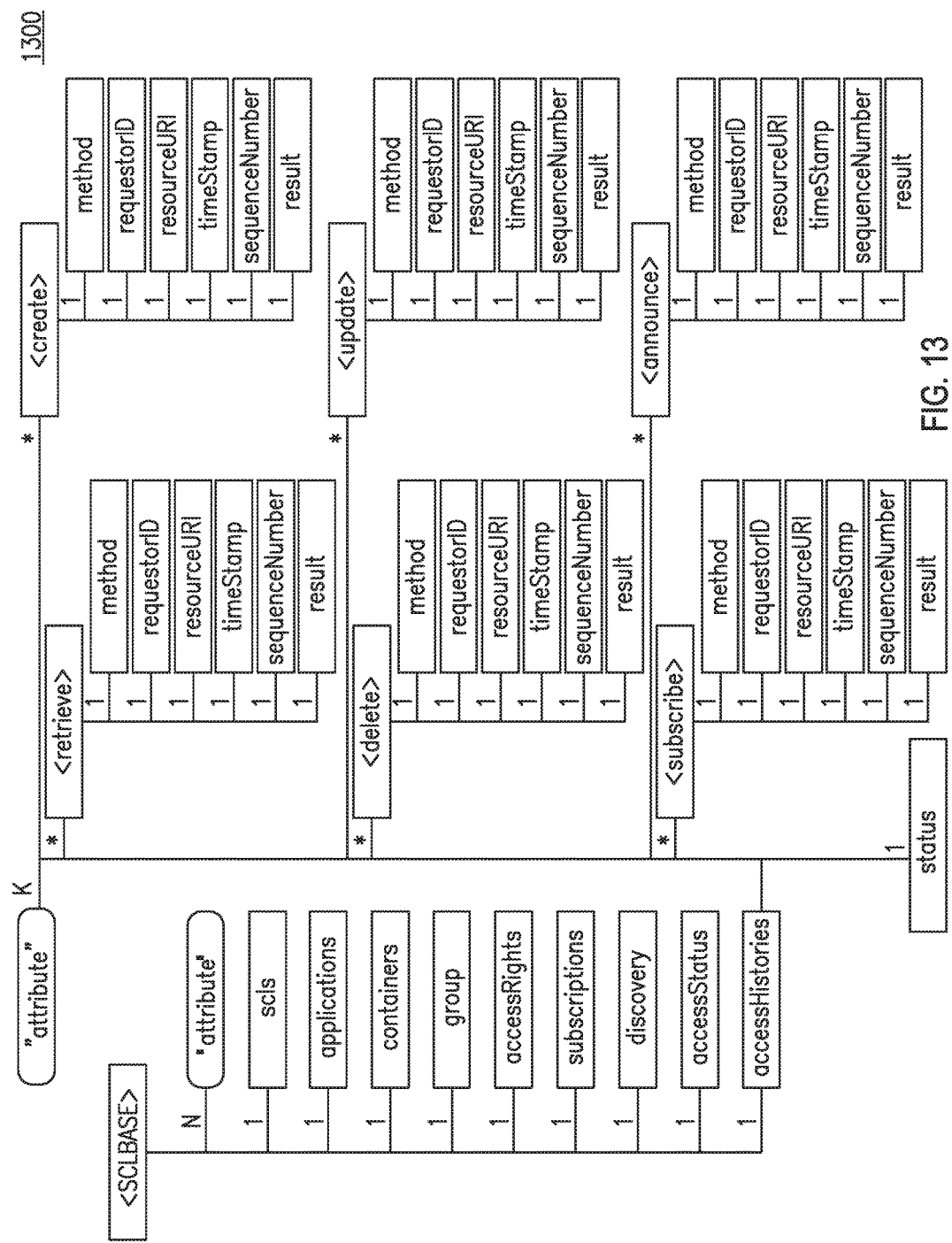
FIG. 13 is an example structure for resource accessHistories structured based on "method"
Figure 14:
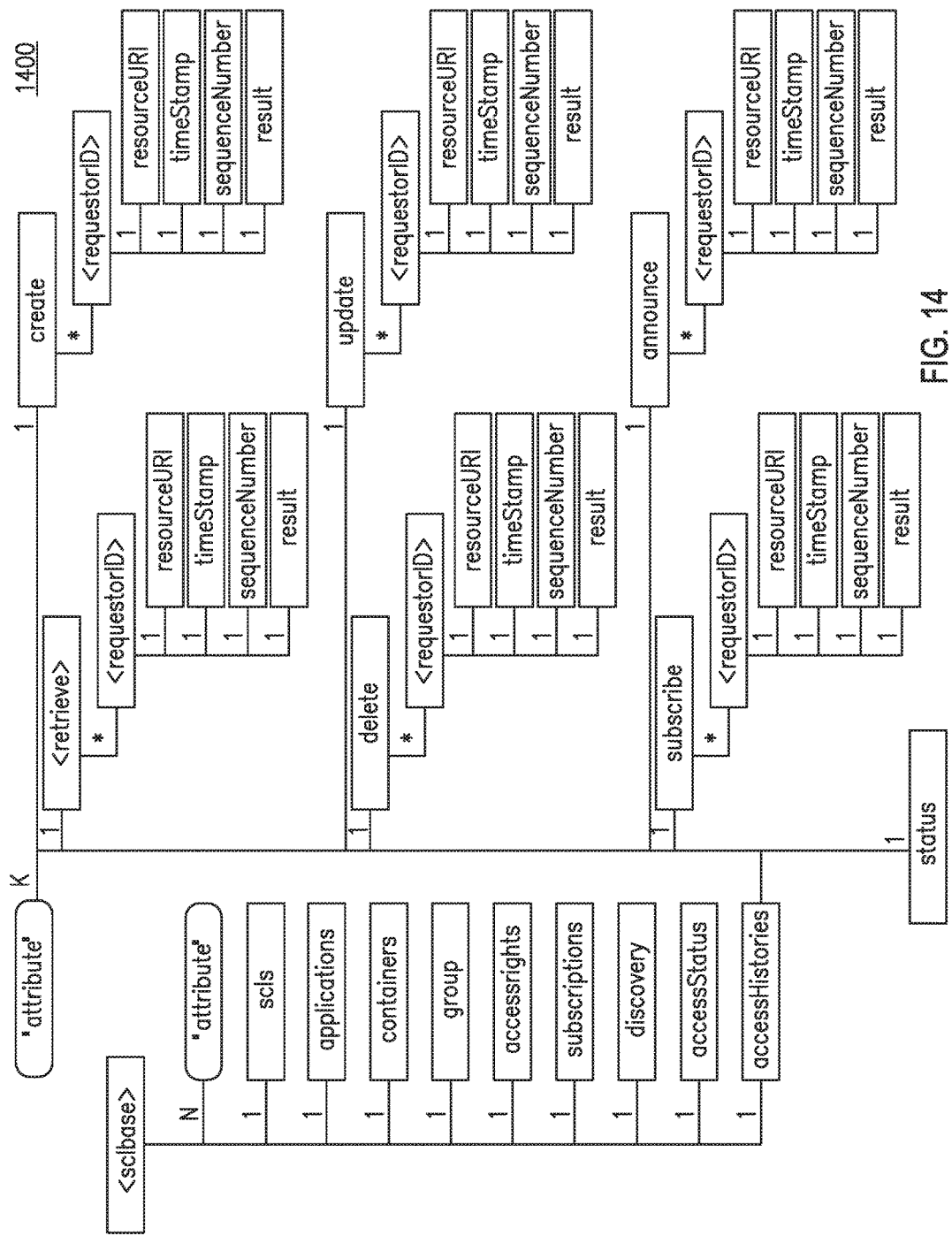
FIG. 14 is an example structure for resource accessHistories—structured based on "method" and requestorID"

<accessInstance> shown in FIG. 12 is a flat structure, which can be re-structured based on "method" as shown in FIG. 13 and/or on "requestorID" as shown in FIG. 14, forming 2-level and 3-level hierarchical structures, respectively. FIG. 13 illustrates an example structure for resource accessHistories—structured based on "method". FIG. 14 illustrates an example structure for resource accessHistories—structured based on "method" and "requestorID". Such hierarchical structures may be useful to expedite query/retrieve operations on resource accessHistories, especially at resource-constrained M2M Devices.

Example Call Flows for Management Authority Delegation for xREM

Management authority of the M2M devices and/or GWs may be delegated to another M2M server. The management authority of M2M Devices can be delegated to another M2M GW, as well. In accordance with embodiments of the present disclosure, management authority delegation procedures for M2M Devices and GWs are described herein.

Management Authority Delegation

Delegator-Initiated Delegation

Figure 15:
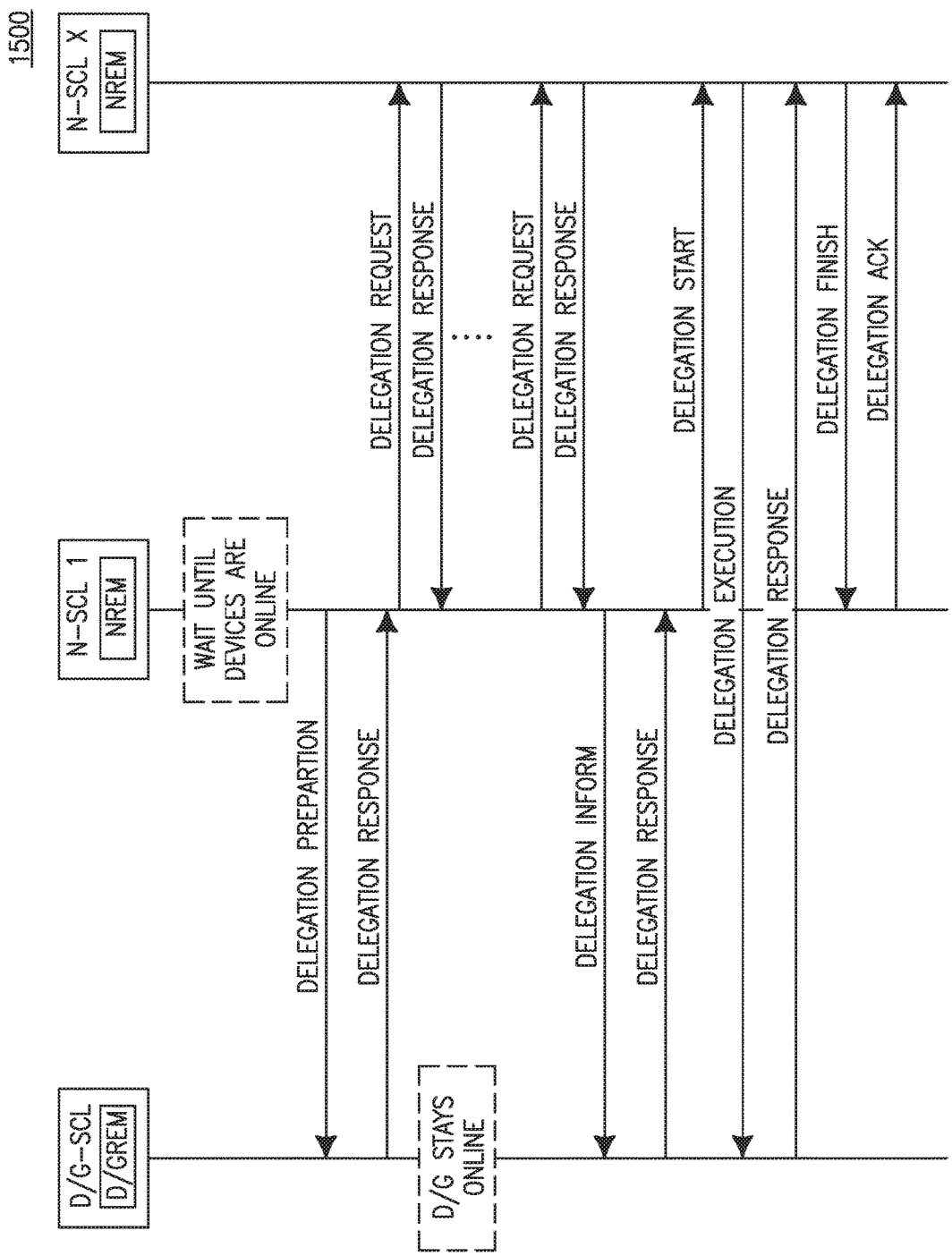
FIG. 15 is a message flow diagram of procedures for management authority delegation (delegator-initiated)

FIG. 15 illustrates a message flow diagram of procedures for management authority delegation (delegator-initiated). Referring to FIG. 15, N-SCL-1 delegates D/G-SCL to another N-SCL, N-SCL X. N-SCL 1 issues "Delegation Preparation" to D/G-SCL after the D/G-SCL becomes online. The "Delegation Preparation" may be used to instruct D/G-SCL to be ready for ongoing delegation operations. The D/G-SCL may send back "Delegation Response" to N-SCL 1. D/G may stay online afterwards. N-SCL 1 may issue "Delegation Request" to the N-SCL X chosen as the new management authority for D/G SCL. The "Delegation Request" may contain the following information:

the URI and/or authentication-related information of D/G-SCL to be delegated; and the reason for requesting management delegation.

N-SCL X may send back "Delegation Response" to N-SCL 1 by answering YES or NO to "Delegation Request". N-SCL 1 may repeat to send "Delegation Request" to other N-SCL Xs until finding an N-SCL X which agrees to accept delegation or after trying the maximum times.

N-SCL 1 may issue "Delegation Inform" to D/G-SCL. If none of the N-SCL Xs agrees, N-SCL 1 may use this message to inform D/G-SCL of cancelling the ongoing delegation. Then D/G can operate as it usually does. It can go to sleep onwards. The whole delegation process may then stop. Otherwise, "Delegation Inform" will contain the information about the N-SCL X, which agrees to accept delegation. D/G-SCL may send back "Delegation Response."

N-SCL 1 issues "Delegation Start" to N-SCL X to trigger it to perform delegation operations.

N-SCL X may issue "Delegation Execution" to D/G-SCL. D/G-SCL may perform authentication on N-SCL X.

D/G-SCL may send back "Delegation Response" to N-SCL X. D/G-SCL may update its management objects by setting N-SCL X as its new management authority. N-SCL X may update its management objects by including D/G-SCL as the managed entity under its authority.

N-SCL X may issue "Delegation Finish" to N-SCL 1.

N-SCL 1 may send back "Delegation ACK" to N-SCL X.

N-SCL 1 may update its management objects by removing D/G-SCL from its management authority.

N-SCL 1 may update its management objects by adding N-SCL X as the entity it delegates the management authority to.

N-SCL X may update its management objects by adding N-SCL 1 as the entity it is delegated the management authority from.

Device-Initiated Delegation

Figure 16:
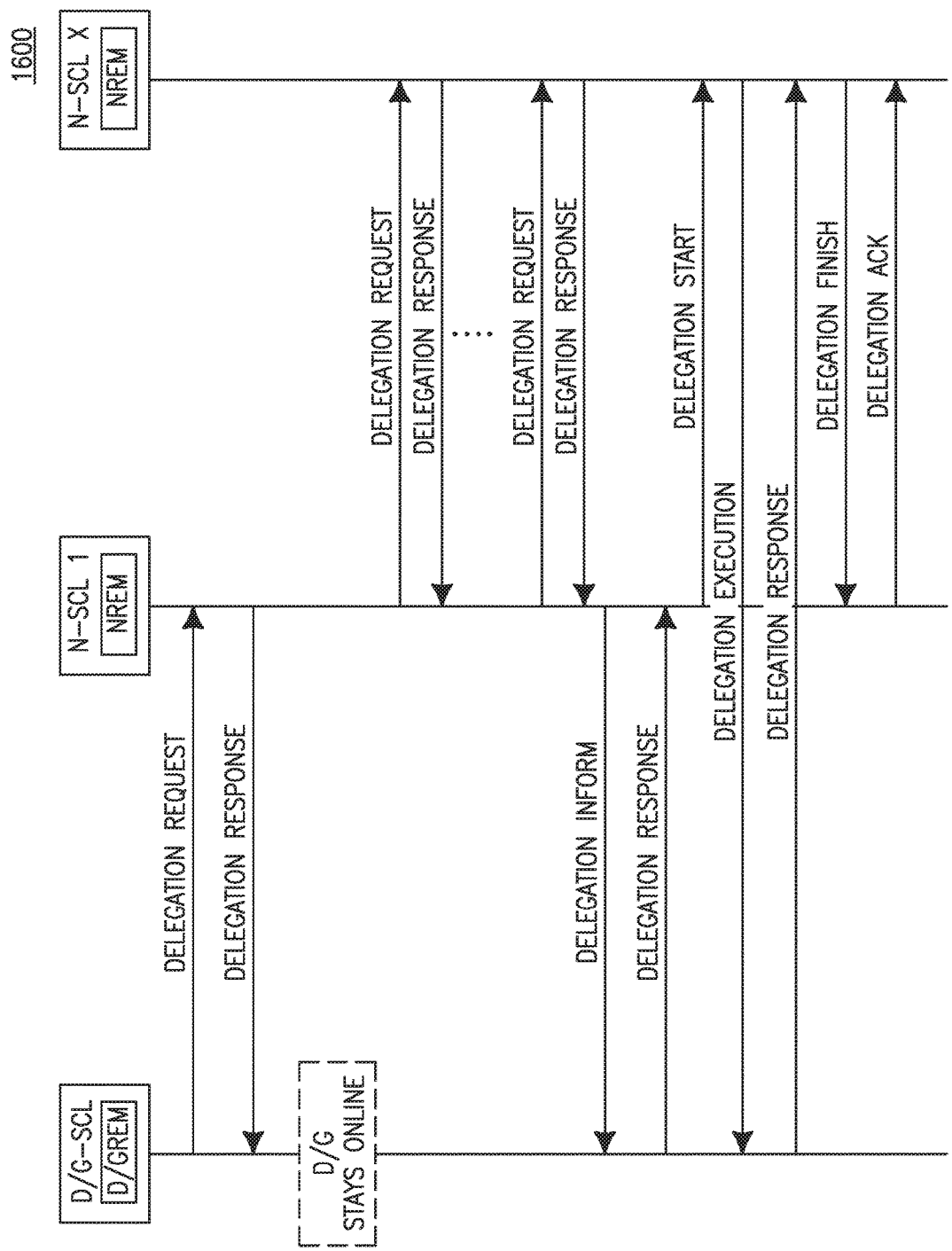
FIG. 16 is an example message flow diagram for management authority delegation (device-initiated)

FIG. 16 illustrates an example message flow diagram for management authority delegation (device-initiated). This may be applied in scenarios where D/G actively requests management authority delegation. The only difference from delegator-initiated delegation is the first two steps. Referring to FIG. 16, D/G-SCL issues "Delegation Request" to N-SCL 1. D/G-SCL can indicate the reason for requesting delegation in this message. N-SCL 1 may send back "Delegation Response" to D/G-SCL by informing D/G-SCL of its willingness to perform delegation. N-SCL 1 may refuse to perform delegation. Then the whole delegation process may stop.

Figure 17:
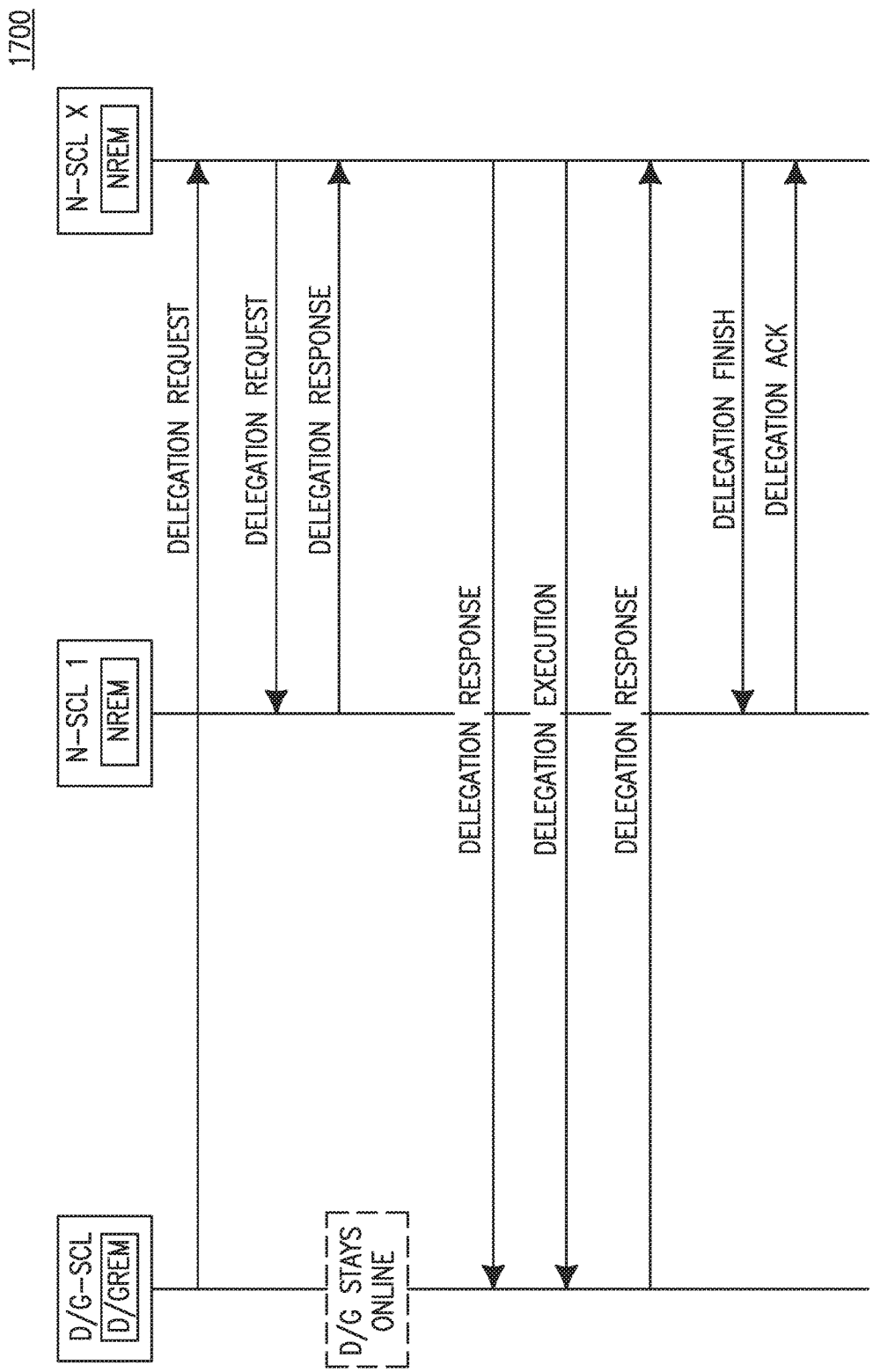
FIG. 17 is an example message flow diagram of management authority delegation (device-initiated to grantee directly)

Different from FIG. 16 and alternatively, D/G can directly send "Delegation Request" to the grantee (new management authority). Then the grantee can make request to the delegator for approval. Example detailed procedures are shown in FIG. 17, which illustrates an example message flow diagram of management authority delegation (device-initiated to grantee directly). The scenario may need the delegator configure some potential grantees to the device beforehand and may happen when the communications between device and the delegator meet problem.

Grantee-Initiated Delegation

Figure 18:
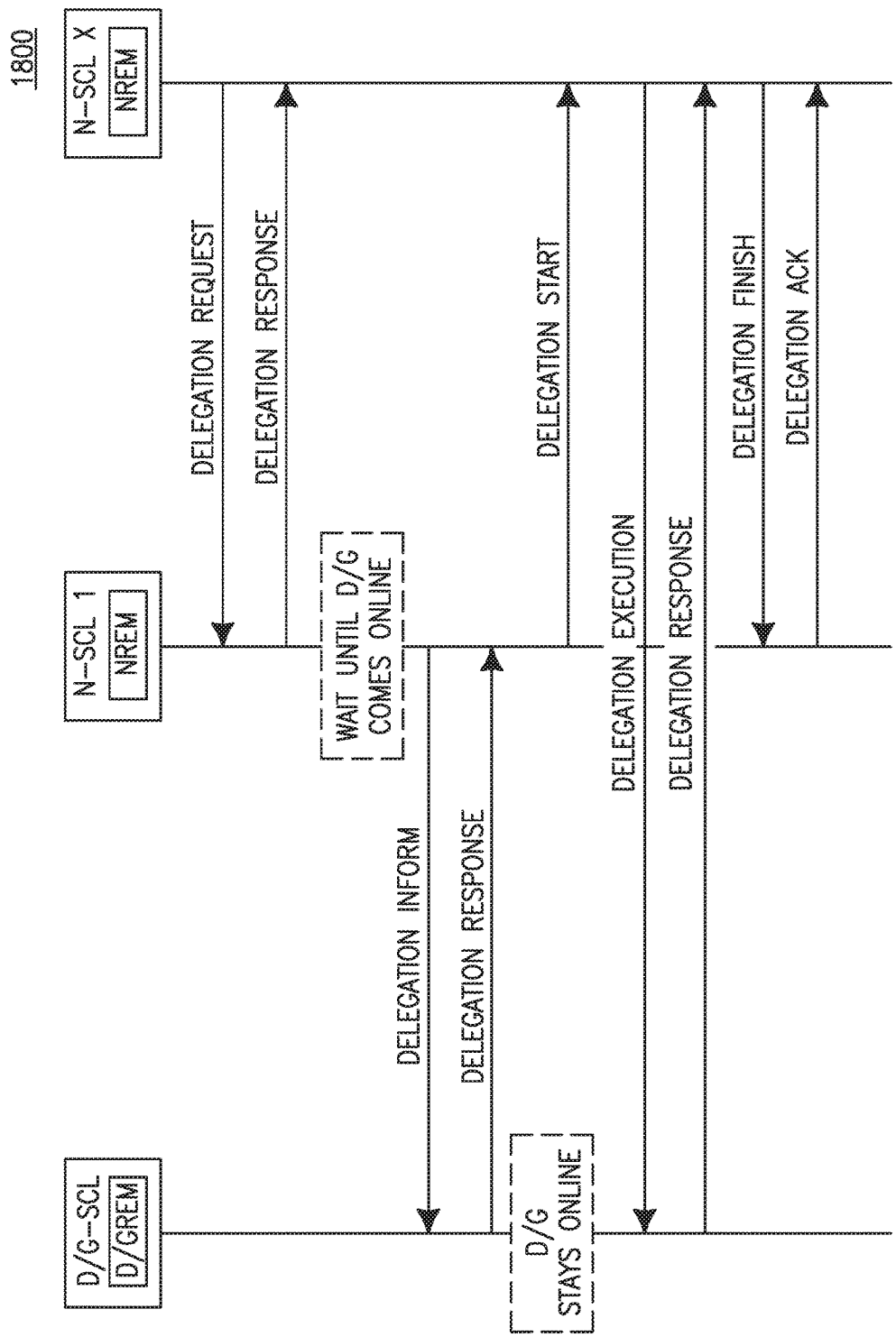
FIG. 18 is an example message flow diagram for management authority delegation (grantee-initiated)

In addition to delegator-initiated and device-initiated delegation, management authority delegation can also optionally be initiated by the grantee. For example, FIG. 18 illustrates an example message flow diagram for management authority delegation (grantee-initiated). Referring to FIG. 18, N-SCL X may request delegation from N-SCL 1. N-SCL 1 may approve to delegate the management authority of D/G-SCL to N-SCL X. The meaning of each step is similar to those described with respect to FIG. 16.

Delegation Under Gateway as a Proxy

Figure 19:
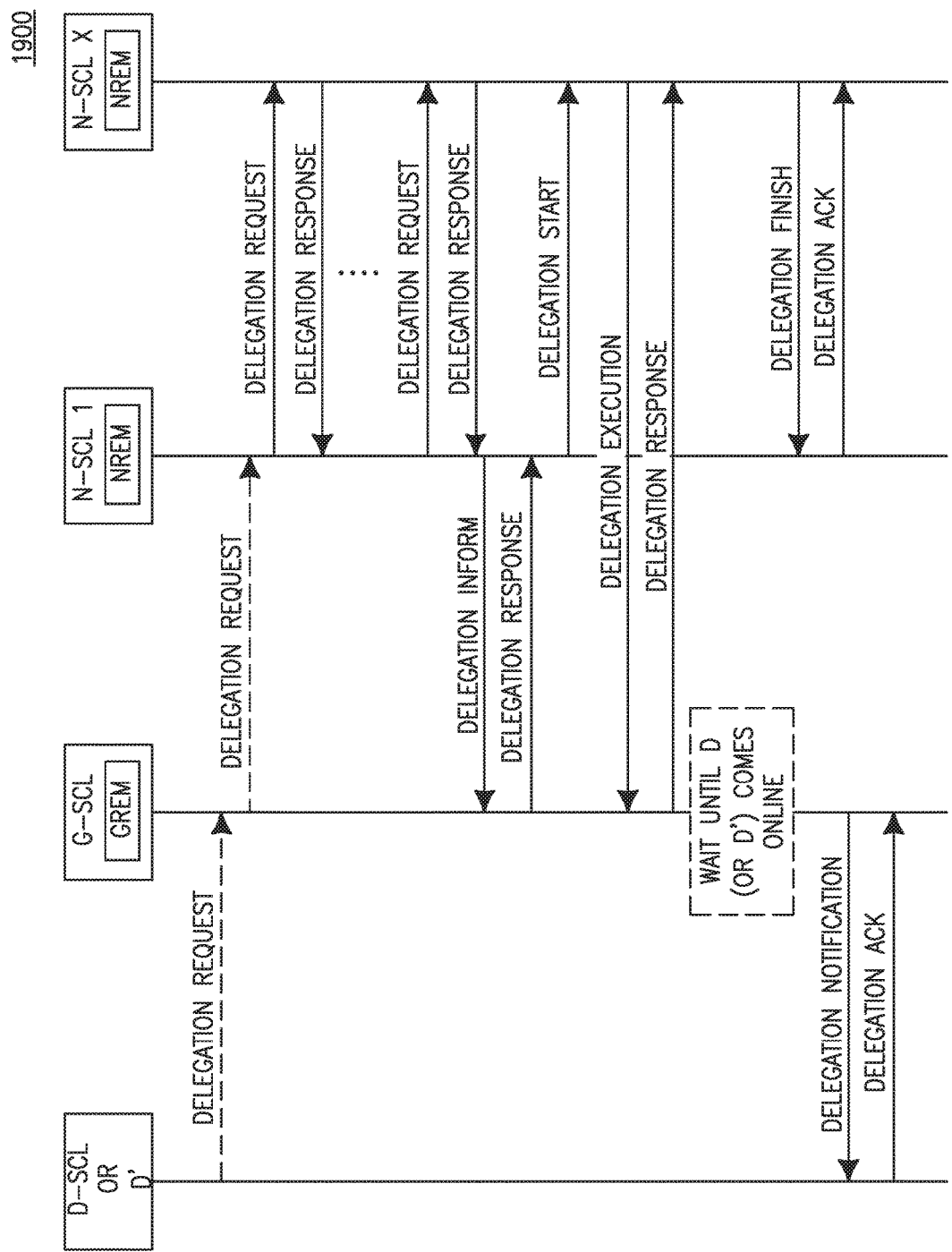
FIG. 19 is an example message flow diagram for management authority delegation (gateway as a proxy)

For scenarios where some devices are behind a gateway, the management authority delegation may be conducted via the gateway as a proxy. For example, FIG. 19 illustrates an example message flow diagram for management authority delegation (gateway as a proxy). Referring to FIG. 19, N-SCL-1 may delegate D-SCL to N-SCL X via G-SCL as a proxy. G-SCL actually performs delegation aggregation. Basically, G-SCL on behalf D or D' behind it, may conduct management authority delegation with N-SCL 1 and N-SCL X using the similar procedures in FIG. 16. When D or D' becomes online, G-SCL will notify them of the delegation results, i.e. the new management authority N-SCL X.

Device-to-Gateway Delegation

Figure 20:
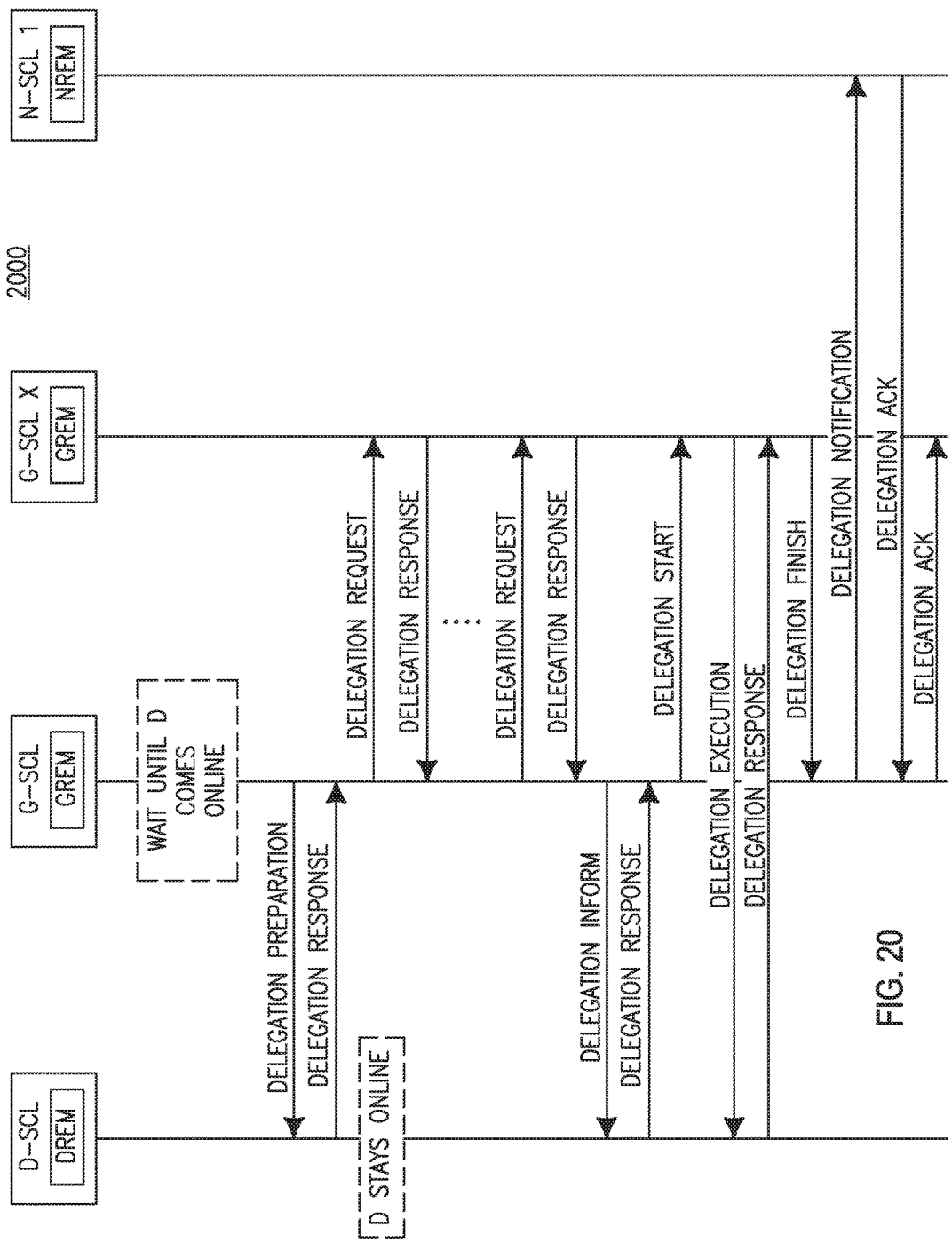
FIG. 20 is an example message flow diagram for management authority delegation (device-to-gateway delegation)

In an embodiment, the management authority of D-SCL is delegated from a G-SCL to another G-SCL X. For example, FIG. 20 illustrates an example message flow diagram for management authority delegation (device-to-gateway delegation). Referring to FIG. 20, after the delegation process among D-SCL, G-SCL and G-SCL X, G-SCL may notify N-SCL 1 of the notification results.

Hierarchical SCL Structure

FIG. 21 illustrates a diagram of a general scenario where: 1) The management authority relationship of all SCLs forms a hierarchical structure; 2) SCL 4 wants to delegate its management authority on SCL 9 to SCL 3. It basically follows three steps:

Step 1: SCL 4 issues "Delegation Request" hop-by-hop via SCL 2 and SCL 1, eventually to SCL 3.
Step 2: SCL 3 sends "Delegation Response" back to SCL 4
Step 3: SCL 4 issues "Delegation Inform" to SCL 9
Step 4: SCL 3 and SCL 9 conduct "Delegation Execution"-related interactions.
Step 5: SCL 3 sends "Delegation Notification" hop-by-hop via SCL 1 and SCL 2, eventually to SCL 4.
SCL 1, SCL 2 and SCL 4 may update their management objects accordingly to reflect this management authority change.

Example xREM Authority Delegation

The NREM is responsible for managing DREM and GREM. But ETSI xREM does not describe the concept of remote entity management (xREM) authority nor xREM authority delegation. xREM authority of M2M Devices or GWs needs to be delegated from an M2M Server to another M2M Server for reasons such as M2M Server replacement, load balancing and mobility. Even the xREM authority of M2M Devices can be delegated from an M2M Server to an M2M GW if the M2M Devices become behind the M2M GW, and vice versa.

Although OMA-DM defines high-level procedures for client authority delegation, it does not consider sleeping devices or the M2M GW in the middle. As a result, it cannot be applied directly for ETSI M2M xREM. ETSI M2M xREM needs to have its own xREM authority delegation.

When an M2M Device or GW successfully registers with an M2M Server, the M2M Server basically possesses the xREM authority over the M2M Device/GW. When M2M Devices are behind an M2M GW, the GW has xREM authority over those M2M Devices. Therefore, xREM authority delegation could mean different scenarios:

Case 1: an M2M Server delegates its xREM authority to another M2M Server
Case 2: an M2M Server delegates its xREM authority to an M2M GW
Case 3: an M2M GW delegates its xREM authority to an M2M Server
Case 4: an M2M GW delegates its xREM authority to another M2M GW Example Functionalities for xREM As a result, ETSI M2M xREM needs to have new functionalities to support xREM authority delegation. The Network Remote Entity Management (NREM) needs to have the following functionalities: Supports xREM authority delegation. NREM has xREM authority over M2M Devices and M2M Gateways. NREM needs to have the following functionalities to support xREM authority delegation. Delegates its xREM authority over M2M Devices and M2M Gateways to another M2M Server or delegates its xREM authority over M2M Devices to an M2M Gateway. Processes xREM authority delegation requested from another M2M Server or an M2M Gateway.

The Gateway Remote Entity Management (GREM) needs to have the following functionalities: when acting as a remote management proxy for M2M Devices of the managed M2M area network. Supports xREM authority delegation. When M2M Devices are behind the M2M Gateway, the M2M Gateway has xREM authority over those M2M Devices. To support xREM authority delegation, the M2M Gateway needs to have the following functionalities: Delegates its xREM authority over M2M Devices to an M2M Server or to another M2M Gateway; processes xREM authority delegation messages from another M2M Server or an M2M Gateway; supports xREM authority delegation. The M2M Server has the xREM authority over the M2M Gateway.

The M2M Gateway needs to have the following functionalities: actively requests the M2M Server to delegate its xREM authority over the M2M Gateway to another M2M Server; and passively processes xREM authority delegation messages from M2M Servers.

The Device Remote Entity Management (DREM) needs to have the following functionalities: supports xREM authority delegation. The M2M Server has the xREM authority over the M2M Device.

The M2M Device needs to have the following functionalities: actively requests the M2M Server to delegate its xREM authority over the M2M Device to another M2M Server; and passively processes xREM authority delegation messages from M2M Servers.

Example Non-RESTful Management Commands Support

Provided herein are embodiments of the systems, apparatuses and methods for M2M xREM in which the non-RESTful management commands may be represented and realized in a RESTful manner. Examples of such non-RESTful management commands may include any of a reboot command for rebooting a device; a download command for instructing a recipient of download command to download a file; an execute command for executing a specific process; a copy command for duplicating and/or moving a resource from one location to another location. The reboot and download commands may be, for example, defined in accordance with BBF-TR069. The execute and copy commands may be, for example, the "Exec" command of OMA-DM and the "Copy" command of OMA-DM; respectively. The non-RESTful management commands may also include other commands, such as, for example, one or more commands used to control controllable elements (e.g., actuators) of M2M Devices equipped with such controllable elements.

In one or more embodiments, a resource, referred to as resource commands, may be used to represent the non-RESTful management commands and to support execution of the non-RESTful management commands ("command execution") in different ways as designated by one or more issuers of the commands. The resource commands may be used to facilitate issuance and command execution of the non-RESTful management commands at a device using any of the RESTful methods.

Further, the resource commands may be used to facilitate, for any of the non-RESTful management commands, an immediate command execution, a command execution after a (e.g., random) delay, a single command execution (e.g., a one-time command execution) and/or multiple repeated command execution.

Figure 22A:
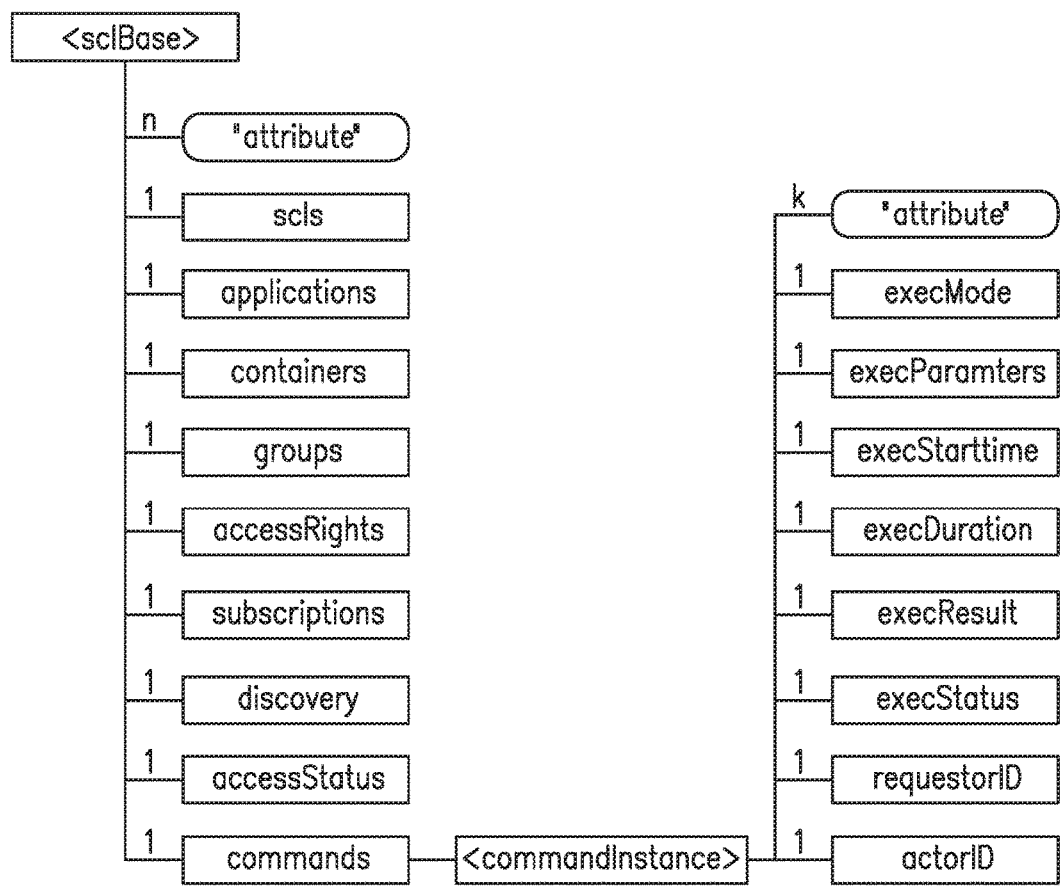
FIGS. 22A-22C are block diagrams illustrating an example structure of a resource command.

Referring to FIG. 22A, a block diagram illustrating an example data structure of an <sclbase> having an instance of a data structure representative of the resource commands ("<commandInstance>"). The <commandInstance> may include a number of data-structure elements, such as those shown in FIG. 22A. Among these data-structure elements shown is a data-structure element representative of an attribute ("attribute"), and data-structure elements representative of a sub-resources execMode, execParameters, execStartTime, execDuration, execResult, execStatus, requestorID and actorID. The "attribute" may include an accessRightID, such as discussed supra.

The execMode may be used to specify certain modes of command execution of the non-RESTful management command of the <commandInstance>. The execMode data-structure element may include one or more entries representative of the modes for command execution ("command-execution modes"). Examples of the command-execution modes may include any of an Immediate Once mode; Immediate and Repeatedly mode, Random Once mode and Random and Repeatedly mode.

The Immediate Once mode specifies that command execution is to occur immediately and only once. The Immediate and Repeatedly mode specifies that command execution is to occur immediately and repeatedly. Any time interval between any two command executions may be specified in the execParameters. The Random Once mode specifies command execution is to occur after a (e.g., random) delay and only once. The delay may be specified in the execParameters. The Random and Repeatedly mode specifies command execution is to occur after a (e.g., random) delay and repeatedly. The delay and any interval between any two command executions may be specified in the execParameters.

The execParameters may be a container, and include information associated with the command-execution modes. In addition to information already noted, the information may include information for (i) specifying how to backoff a certain time before command execution in the Random Once and Random Repeatedly modes, and/or (2) specifying a frequency for repeated command execution in the Immediate and Repeatedly mode and in the Random and Repeatedly mode.

The execStartTime may specify an actual last time of a command execution. The execDuration may specify a required duration for continued command execution. The execResult may specify a returned value for a last command execution. The execStatus may specify a current status of the command execution. This status may be, for example, finished (successful or failure), pending, in-operation, etc. The requestorID may specify an ID (e.g., a URI) of a requestor requesting a command execution be invoked. The actorID may specify an ID (e.g., a URI) of a receiver invoking the command execution.

Figure 22B:
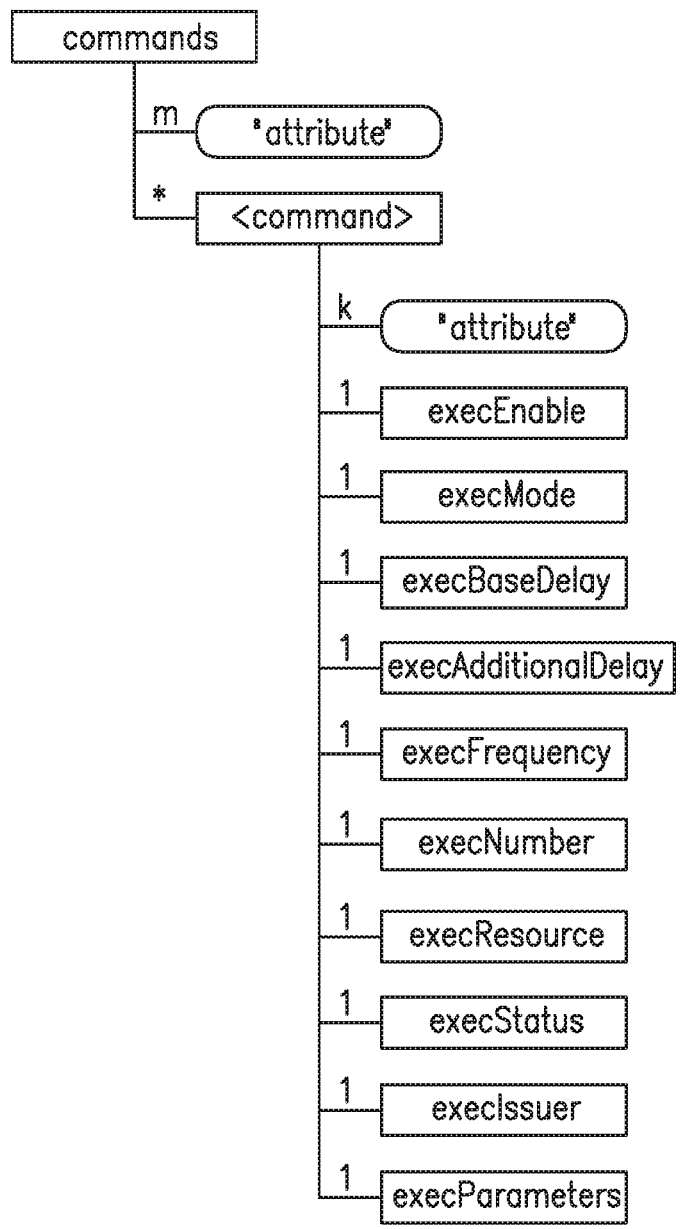

FIG. 22B is a block diagram illustrating an example data structure representative of the commands resource ("commands-resource structure"). The commands-resource structure may include a number of data-structure elements, such as those shown in FIG. 22B. And many of the data-structure elements of this commands-resource structure are similar to the commands-resource structure of FIG. 22A. Among these data-structure elements shown are a data-structure element defining an attribute (commands-resource "attribute"), and sets of data-structure elements representative of a respective collection of commands ("<command>"). Each instance of the <command>, as a resource, represents a single command, and includes data-structure elements representative of attributes and/or sub-resources of the <command> instance. These <command>-instance attributes and/or sub-resources may specify how to trigger and execute the command execution. Among the <command>-instance attributes and/or sub-resources is a data-structure element representative of an execEnable sub-resource ("execEnable"). The execEnable, which may also be referred to as an "execute" attribute, may facilitate invoking a change in a state of a command execution. For example, the execEnable may be a Boolean variable, and certain values of the variable may invoke a command execution, a pause-command execution, a resume-command execution and/or a cancel-command execution. As such, any of the command execution, pause-command execution, resume-command execution and cancel-command execution may be invoked by modifying the value of execEnable. The value of execEnable may be modified using the RESTful methods.

For example, a RESTful method UPDATE may be used to invoke (e.g., trigger) a command execution of the <command> instance. By specifying a first value (e.g., a "1") in the RESTful method UPDATE to . . . /commands/<command>/execEnable, a command execution may be invoked.

The RESTful methods UPDATE and DELETE may be used to cancel (stop) a command execution of the <command> instance. By specifying a second value (e.g., a "0") in the RESTful method UPDATE to . . . /commands/<command>/execEnable, a cancel-command execution may be invoked to stop the <command> instance. Additionally or alternatively, issuing the RESTful method DELETE . . . /commands/<command>/, a cancel-command execution may be invoked to stop the command execution of the <command> instance prior to such the <command> instance being deleted in accordance with the RESTful method DELETE.

In addition to the execEnable, the <command>-instance sub-resources may include data-structure elements representative of sub-resources, such as execBaseDelay, exceAdditionalDelay, execFrequency, execNumber, execResource, execStatus, execResult, execIssuer and execParameters.

The execBaseDelay may specify a minimum delay before a command execution of the <command> instance. The execAdditionalDelay may facilitate generation of a random additional delay. A total delay is a sum of execBaseDelay plus the random additional delay. The execBaseDelay and execAdditionalDelay may include information for (i) specifying how to backoff a certain time before command execution in the Random Once and Random Repeatedly modes, and/or (2) specifying a frequency for repeated command execution in the Immediate and Repeatedly mode and in the Random and Repeatedly mode.

The execFrequency may specify a frequency for repeated command executions of the <command> instance. The execNumber may specify a number of times a command execution of the <command> instance may be repeatedly. The execResource may specify a resource URI for the <command> instance to undergo command execution. The resource URI points to a group resource that includes a group of resources. This way, command execution of multiple <command> instances may be invoked as a function of the resource URI that points to the group resource. The execResource may be optional. If, for example, the <command> instance is subordinated as a sub-resource under the <command> instance, execResource might not be necessary.

The execStatus may specify a current status of a command execution of <command> instance. The status may be, for example, pending, running, paused, stopped, resumed, finished and successful, finished and failure, and the like. The execResult may store an execution result of a command execution of a <command> instance. The execResult can be modeled as a sub-resource of the <command> instance if there are multiple results generated, for example, if execResource points to a group of resources.

The execIssuer may specify an ID of an issuer that issues a request to invoke command execution of the <command> instance. The execParameters may be a container (e.g., a placeholder) for storing parameters specific to the <command> instance.

Figure 22C:
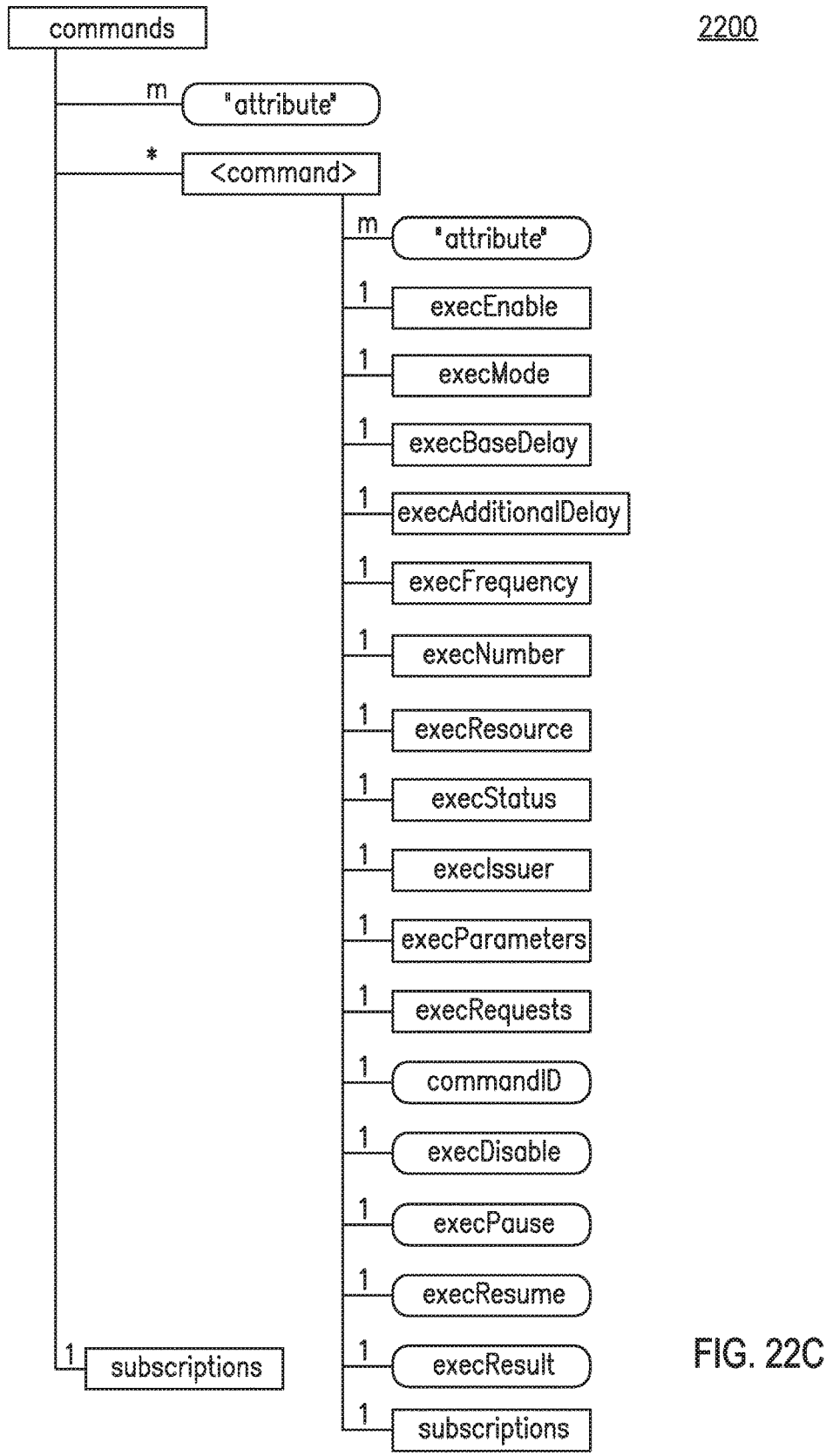

Referring now to FIG. 22C, a block diagram illustrating another example commands-resource structure is shown. This commands-resource structure may include a number of data-structure elements, such as those shown in FIG. 22C. And many of the data-structure elements of this commands-resource structure are similar to the commands-resource structure of FIG. 22B. Among the data-structure elements shown in FIG. 22C are data-structure elements defining a number of attributes, namely, a commandID attribute, a execDisable attribute, a execPause attribute, a execResume attribute and a execResult attribute.

The execEnable attribute, which may also be referred to as an "execute" attribute, may facilitate invocation of a command execution of the <command> instance. A RESTful method UPDATE to the execEnable attribute may invoke a command execution of the <command> instance. A payload of the RESTful method UPDATE may be empty or set to a value (e.g. execEnable=1).

The execDisable attribute, which may also be referred to as "cancel" attribute, may facilitate invocation of cancel-command execution of the <command> instance. A RESTful method UPDATE to the execDisable attribute may invoke a cancel-command execution of the <command> instance. A payload of the RESTful method UPDATE may be empty or set to a value (e.g. execDisable=1).

The execPause attribute may facilitate invocation of a cancel-command execution of the <command> instance. A RESTful method UPDATE to the execPause attribute may invoke a pause-command execution of the <command> instance. A payload of the RESTful method UPDATE may be empty or set to a value (e.g. execPause=1).

The execResume attribute may facilitate invocation of a resume-command execution of the <command> instance. A RESTful method UPDATE to the execResume attribute may invoke such resume-command execution. A payload of the RESTful method UPDATE may be empty or set to a value (e.g. execResume=1).

The foregoing illustrates that the data structures of FIGS. 22A, 22B and 22C facilitate command execution of non-RESTful management commands using the RESTful methods. This includes facilitating command execution of non-RESTful management commands of BBF-TR-069 and OMA-DM. For example, Reboot of BBF-TR-069 may be represented in the data structure as . . . /commands/reboot/. Download of BBF-TR-069 may be represented in the data structure as . . . /commands/download/. Exec of OMA-DM: may be represented in the data structure as . . . /commands/exec/. Copy of OMA-DM may be represented in the data structure as . . . /commands/copy/.

The <command> instances may be used to model and represent other management APIs or Remote Procedure Calls (RPCs), as well. The resource commands may be placed under and as a sub-resource of an existing "resource" so that each commands/<command> may be automatically executed on the "resource" if needed when it is triggered. In addition, "execResource" can be used to designate the resource on which commands/<command> may be executed. In this approach, the resource commands can be placed at a centralized position and not necessary to be immediately under the resource which "execResource" refers to. Taking OMA-DM FUMO as an example, two approaches are illustrated as below.

Approach 1: Use "execResource" to Refer to Operations in FUMO

Figure 23:
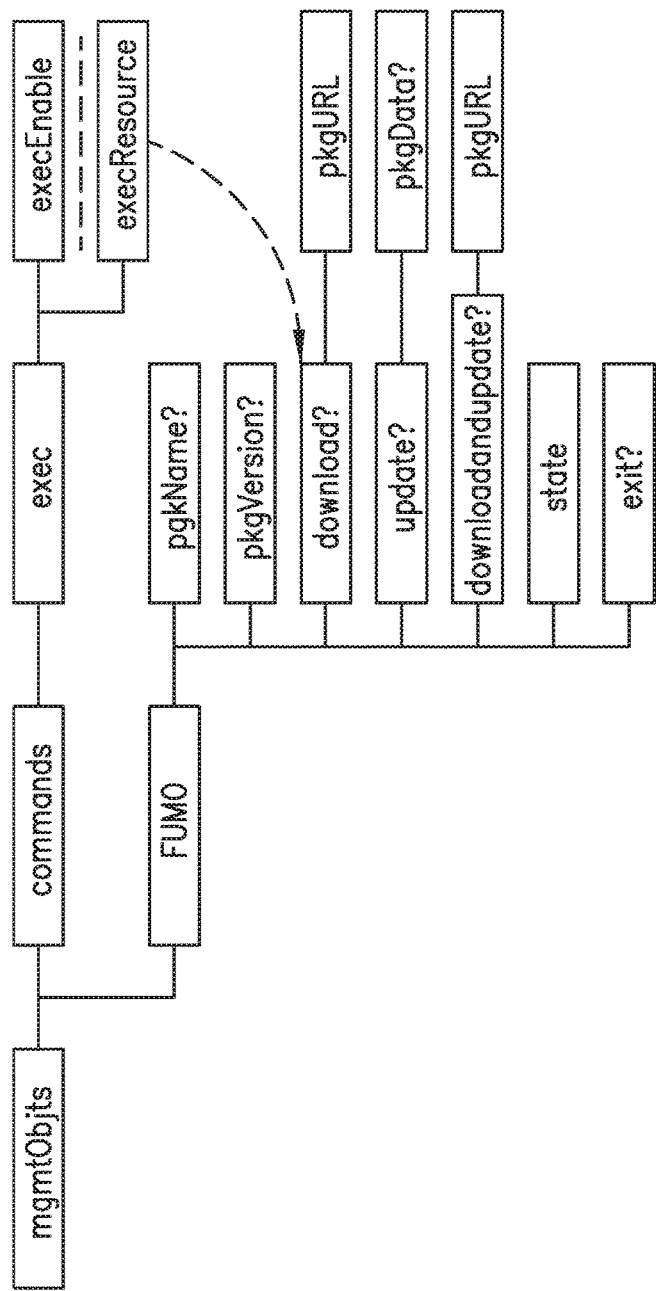
FIG. 23 is a block diagram illustrating an example structure for a resource command.

As shown in FIG. 23, OMA FUMO has three operations: Download, Update, and DownloadAndUpdate. In OMA-DM, those three operations are triggered by a DM Server issuing a non-RESTful Exec command to a DM Client. In order to invoke those three operations in a RESTful manner, Exec is modeled as a <command> exec, which has some attributes as listed in FIG. 23. Two important attributes are execEnable and execResource.

When a M2M application of the network domain ("NA") needs to perform "Download" operation, it simply issues an UPDATE method to . . . /mgmtObjs/commands/exec/ to set:
  execEnable=1 and,
  execResource= . . . /mgmtObjs/FUMO/Download When an NA needs to perform "Update" operation, it simply issues an UPDATE method to . . . /mgmtObjs/commands/exec/ to set:
  execEnable=1 and,
  execResource= . . . /mgmtObjs/FUMO/Update When an NA needs to perform "DownloadAndUpdate" operation, it simply issues an UPDATE method to . . . /mgmtObjs/commands/exec/ to set:
  execEnable=1 and,
  execResource=/mgmtObjs/FUMO/DownloadAndUpdate.

Approach 2: Use Commands to Re-Model Operations in FUMO

Figure 24A:
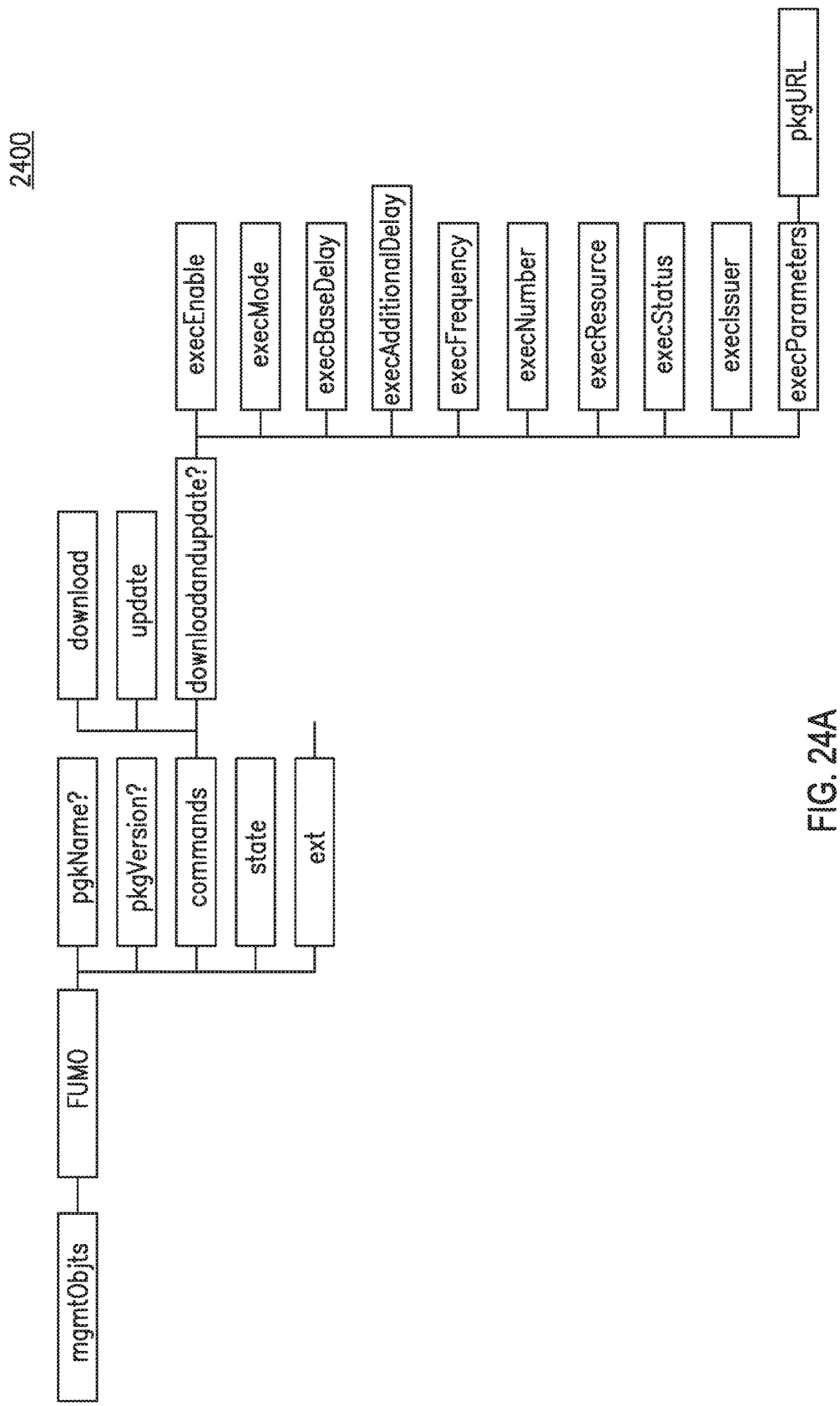
FIGS. 24A-B are block diagrams illustrating an example structure for resource command.
Figure 24B:
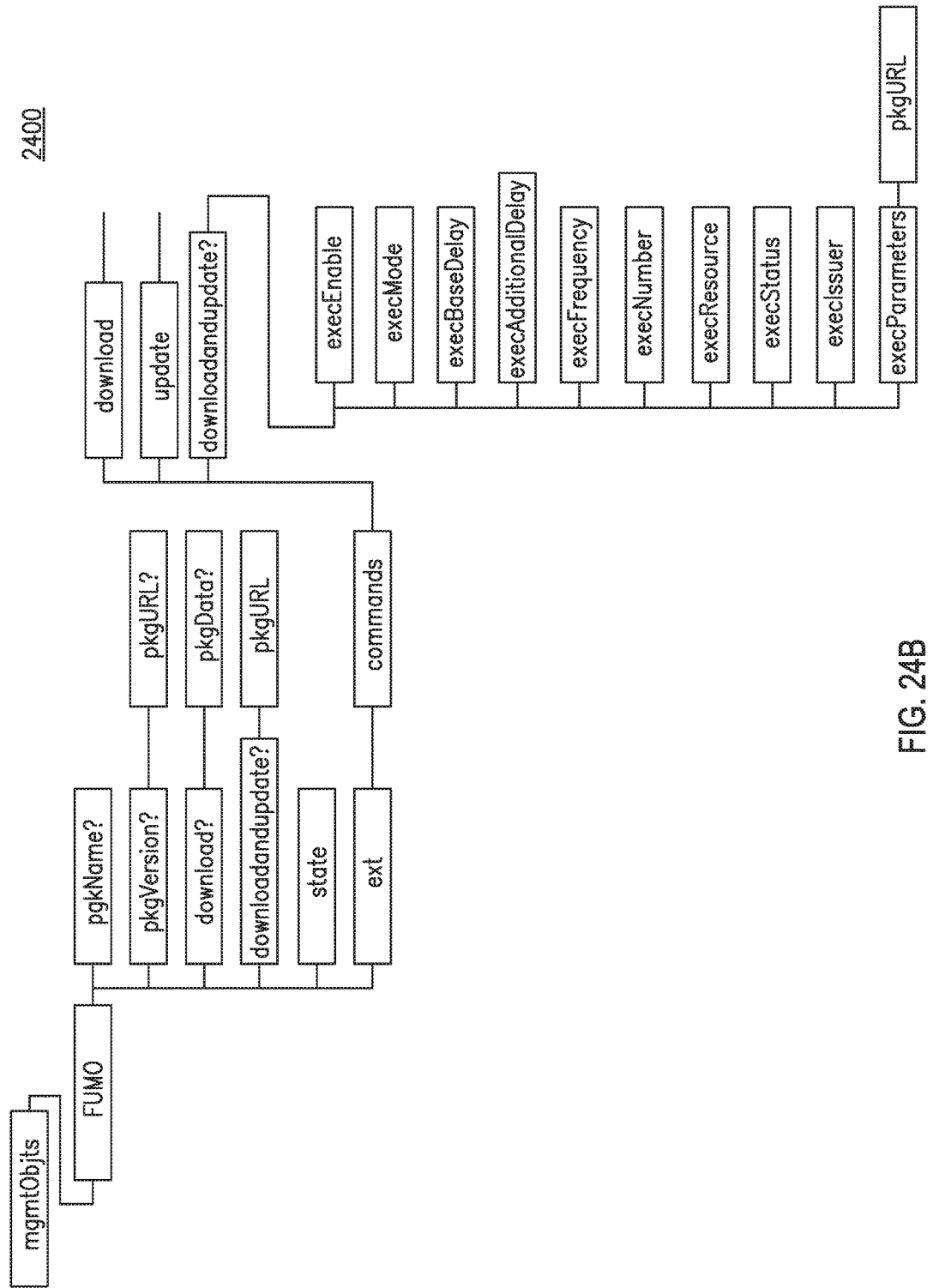

As shown in FIGS. 24A-24B, another approach is to directly remodel all FUMO operations as a <command> resource. To trigger to execute an operation, only an UPDATE to execEnable of a corresponding <command> is needed. As a result, there is no need to define an additional Exec command at all. In this approach, "execResource" is not required.

As illustrated in FIG. 24A, three FUMO operations may be remodeled, respectively, as three <command> resources (i.e., download, update, downloadAndUpdate) under the resource commands. Since each FUMO operation has some child/leaf nodes, they need to be modeled as attributes under "execParameters". Using downloadAndUpdate as an example, "PkgURL" may be added as an attribute of . . . /commands/downloadAndUpdate/execParameters.

When an NA needs to perform "downloadAndUpdate" operation, it simply issues an UPDATE method to . . . /mgmtObjs/FUMO/commands/downloadAndUpdate/ to set:
  execEnable=1 and,
  PkgURL=the URL of the corresponding package.

If the old FUMO operations need to be kept as they are, the re-modeled commands may be placed as sub-tree under the node Ext, as depicted on FIG. 24B.

In one or more embodiments, the commands-resource structure may support multiple issuances of the same non-RESTful management command (e.g., multiple NAs or other issuers may request command execution of the same non-RESTful management command).

Figure 25A:
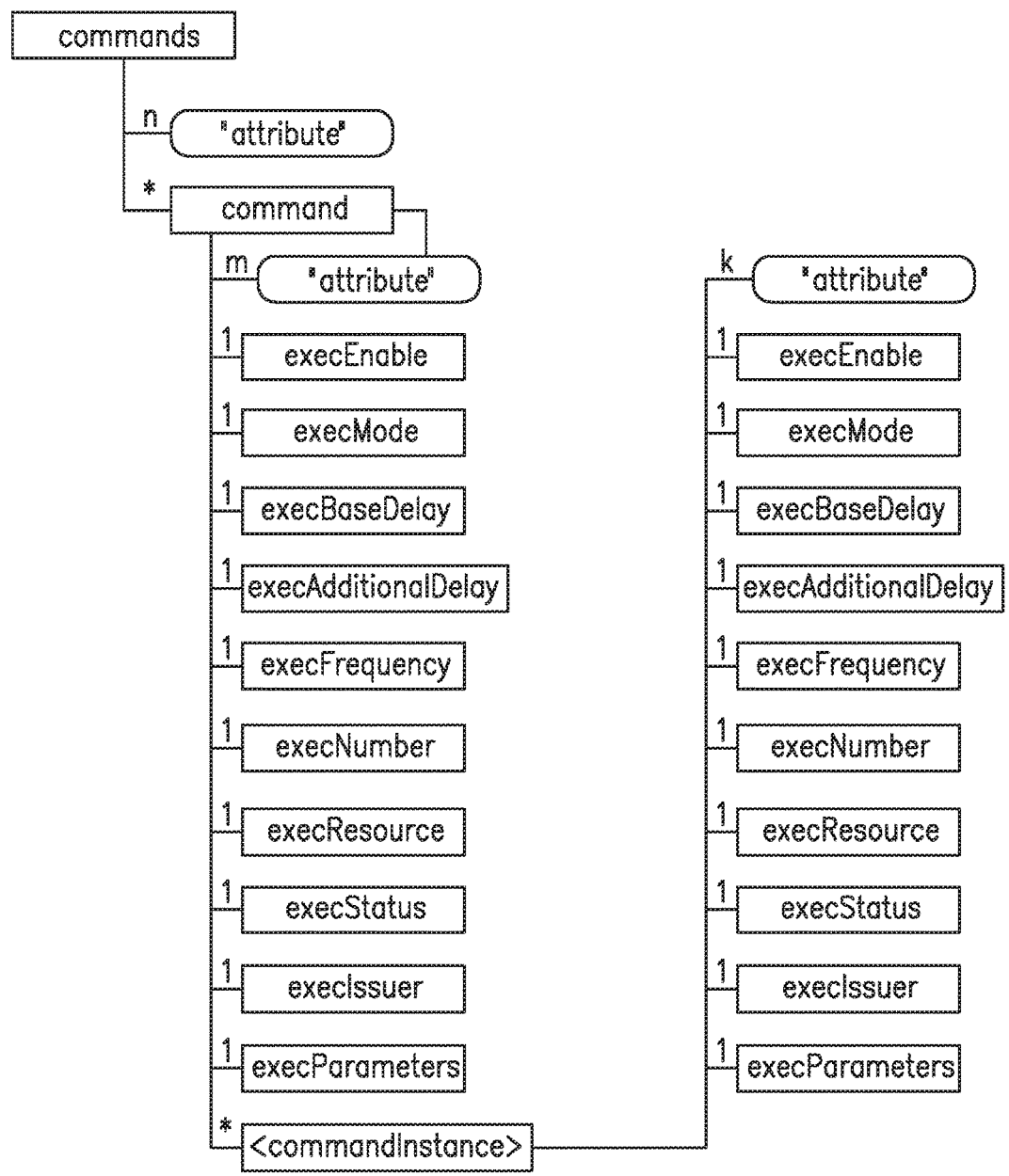
FIGS. 25A-25B are block diagrams illustrating an example structure for resource commands.
Figure 25B:
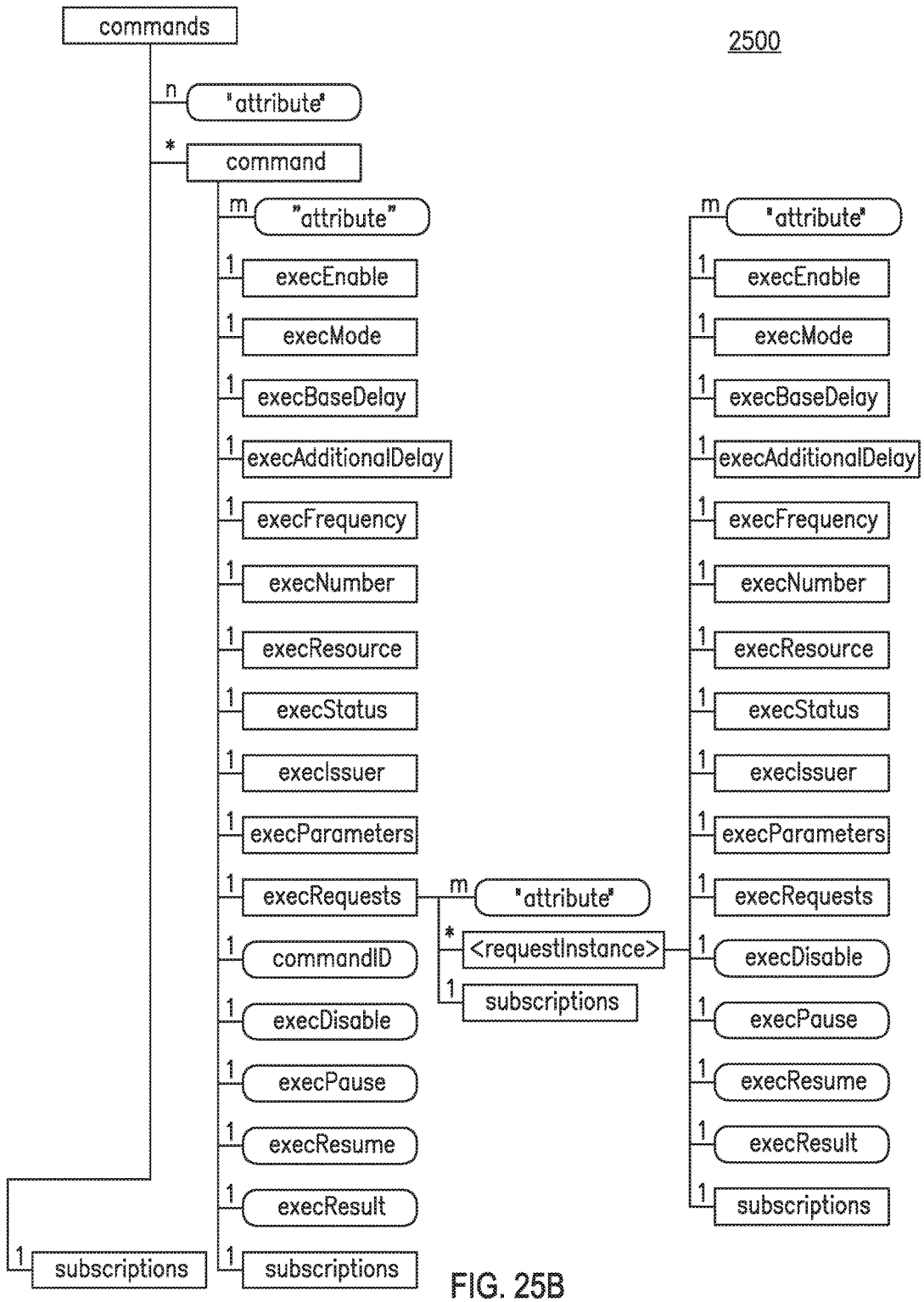

Two examples of commands-resource structures that support multiple issuances of the same non-RESTful management command are shown in FIGS. 25A and 25B. The commands-resource structure shown in FIG. 25A is similar to the commands-resource structure of FIG. 22A, and extends the commands-resource structure of FIG. 22A by defining <command> as a collection of multiple instances, namely, <commandInstances>. The procedures as described previously may be used to invoke a command execution of a <command> and generate a corresponding <commandInstance>. The <commandInstance> may maintain corresponding <command> instances which are issued by multiple NAs. Each command execution of generated <commandInstance> may be stopped or modified by accessing its attributes and/or sub-resources, as described above. For example, a command execution of an existing <commandInstance> may be stopped using the RESTful method UPDATE to modify <commandInstance>/execEnable from 1 to 0. The <commandInstance> and/or a change in a state of the command execution of the <commandInstance> may be accessed and manipulated using other RESTful methods, as well.

The commands-resource structure shown in FIG. 25B is similar to the commands-resource structure of FIG. 22B, and extends the commands-resource structure of FIG. 22B by defining <command>/execRequests (which may also be referred to as <execInstances> as a collection of multiple request instances, namely, <requestInstances>). The procedures described previously will be used to invoke a command execution or change in state of the command execution of a <command> and/or generate a corresponding <requestInstance>. The <requestInstance> may maintain corresponding <command> instances (e.g., those issued by NAs). Each command execution of a generated <requestInstance> may be stopped or modified by accessing its attributes, as described above. For example, a command execution of an existing <requestInstance> may be stopped using the RESTful method UPDATE onto the <requestInstance>/execEnable.

The <requestInstance> and/or a change in a state of the command execution of the <requestInstance> may be accessed and manipulated using other RESTful methods, as well.

Figure 26A:
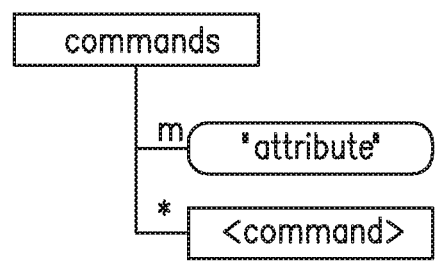
FIGS. 26A-26B are block diagrams illustrating an example structure for resource commands.

FIG. 26A is a block diagram illustrating an example structure of resource commands. The resources commands may have the sub-resources of <command>, and the following attributes:
  accessRightID;
  creationTime;
  lastModifiedTime;
  expirationTime;
  searchStrings;
  contentType, which may be formatted at FFS;
  moID;
  originalMO; and
  description (i.e., a text-format description of commands resource).

The <command> can be modeled as attribute, as well.

Figure 26B:
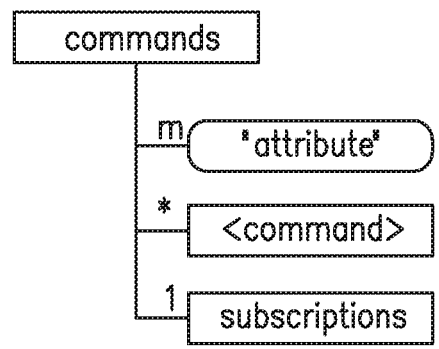

FIG. 26B is a block diagram illustrating an example structure of resource commands. The resources commands may have the sub-resources subscriptions and sub-resources of <command> along with the following attributes:
  accessRightID;
  creationTime;
  lastModifiedTime;
  expirationTime;
  searchStrings;
  contentType, which may be formatted at FFS;
  moID;
  originalMO; and
  description (i.e., a text-format description of commands resource).

The <command> can be modeled as attribute, as well.

Each <command> may include the sub-resources (i) subscriptions, and (ii) execRequests. The execRequests may be a placeholder for storing requests from different issuers for invoking command execution of the same non-RESTful management commands. In one or more embodiments, these requests may have different arguments for the <command> instance.

Each <command> instance may have the following attributes:
  accessRightID;
  creationTime;
  lastModifiedTime;
  expirationTime;
  searchStrings;
  contentType, which may be formatted at FFS;
  moID;
  originalMO; and
  description (i.e., a text-format description of commands resource).

The <command> can be modeled as attribute, as well.

Each <command>, as shown in FIG. 27A, for example, has a number of <commandInstance> as sub-resources. Each <command> has the following attributes:
  accessRightID.
  creationTime.
  lastModifiedTime.
  execEnable: a Boolean variable used to trigger to execute the command.

If execEnable is changed from 1 to 0, then <commandInstance> may be stopped. execEnable can be adjusted to support more options such as pause, etc.

execMode: used to specify how the command may be executed.

Immediate Once: the receiver executes the command immediately and only once.

Immediate and Repeatedly: the receiver executes the command immediately but repeatedly. The interval between two executions is specified by the container execParameters.

Random Once: the receiver executes the command after a random delay and only once. The random delay is specified in execParameters.

Random and Repeatedly: the receiver executes the command after a random delay and repeatedly. The random delay and the interval between two executions are specified by the container execParameters.

execBaseDelay: to specify the minimum delay before <commandInstance> can be executed.

execAdditionalDelay: used to generate a random additional delay. The total delay may be a sum of execBaseDelay plus the random additional delay.

execFrequency: to specify the frequency that <commandInstance> may be repeatedly executed.

execNumber: to specify how many times <commandInstance> may be repeatedly executed.

execResource: may represent a resource URI on which <commandInstance> may be executed. The resource URI can point to a group resource which includes a group of resources; then the command may be executed on each of those resources. execResource is optional. If <commandInstance> is placed as a sub-resource under the resource that <commandInstance> may be executed on, then execResource might not be required.

execStatus: may represent a current status of <commandInstance>. The status may be any of pending, running and finished (successful or failure).

execIssuer: may represent the issuer that issues <command>.

execParameters: is the placeholder for storing parameters specific to each single command.

execBaseDelay and execAdditionalDelay are used to specify how to backoff a certain time before executing <commandInstance> in Random Once and Random Repeatedly modes. execFrequency and execNumber are used to specify the frequency to execute the same <commandInstance> under Immediate and Repeatedly and Random and Repeatedly modes.

The above attributes beginning with "exec" can be modeled as sub-resource too. The above attributes beginning with "exec" can be applied to normal RESTful CRUD operations (i.e., Create, Retrieve, Delete, Update) to add more flexibility to manipulate a resource.

Each <commandInstance>, as shown in FIG. 27B, may have the following attributes:
accessRightID.
creationTime.
lastModifiedTime.

execEnable: a Boolean variable used to trigger to execute the command. If execEnable is changed from 1 to 0, then <commandInstance> may be stopped. execEnable may be adapted to support more options such as pause, etc.

execMode: is used to specify how the command may be executed.

Immediate Once: the receiver may execute the command immediately and only once.

Immediate and Repeatedly: the receiver may execute the command immediately but repeatedly. The interval between two executions is specified by the container execParameters.

Random Once: the receiver may execute the command after a random delay and only once. The random delay may be specified in execParameters.

Random and Repeatedly: the receiver may executes the command after a random delay and repeatedly. The random delay and the interval between two executions may be specified by the container execParameters.

execBaseDelay: used to specify the minimum delay before <commandInstance> can be executed.

execAdditionalDelay: used to generate a random additional delay. The total delay may be the sum of execBaseDelay plus the random additional delay.

execFrequency: used to specify the frequency that <commandInstance> may be repeatedly executed.

execNumber: used to specify how many times <commandInstance> may be repeatedly executed.

execResource: may represent a resource URI on which <commandInstance> may be executed. The resource URI may point to a group resource that includes a group of resources; then the command may be executed on each of those resources. execResource is optional. If <commandInstance> is placed as a sub-resource under the resource which <commandInstance> may be executed on, then execResource might not required.

execStatus: may represent a current status of <commandInstance>. This status may be any of pending, running and finished (successful or failure).

execIssuer: may represent the issuer that issues <command>.

execParameters: is the placeholder for storing parameters specific to each single command.

The above attributes beginning with "exec" can be modeled as sub-resource, as well.

Figure 28A:
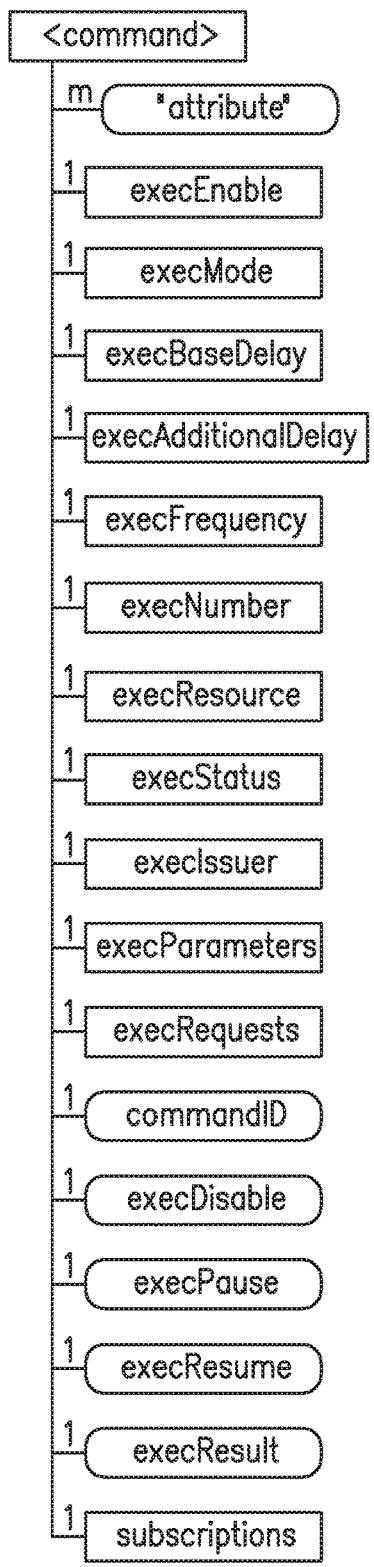

Referring now to FIG. 28A, a block diagram illustrating another example commands-resource structure is shown. This commands-resource structure may include a number of data-structure elements. And many of the data-structure elements of this commands-resource structure are similar to the commands-resource structure of FIG. 22C. As noted above, the commands-resource structure supports multiple issuers' (e.g., multiple NAs') requests for command execution of the same non-RESTful management commands (as identified by, for example, the attribute commandID). To facilitate such support, in one embodiment, a different <command> may be created for each request. Each <command> may have different name, but its attribute commandID may be the same as another. The attribute commandID (which may be categorized by type of command) specifies which command(s) to invoke a change in a state of the command. The sub-resource execRequests of <command> might not be used. Further, each issuer may create a specific <command> under the resource commands. The RESTful method UPDATE may be used to invoke command execution of the created <command> (e.g., use the RESTful method UPDATE onto execEnable attribute of the resource <command>).

Alternatively, the sub-resource execRequests may be used to store the multiple requests for command execution of the same <command>. The issuer may use the RESTful method UPDATE onto execEnable attribute of <command> to invoke a command execution of the <command>. Accordingly, a receiver may create a <requestInstance> under . . . /commands/<command>/execRequests/for this issuer. The issuer may cancel, pause and resume this generated <requestInstance> using the RESTful method UPDATE onto the <requestInstance>'s attributes, execDisable, execPause and execResume, respectively In addition, the issuer can delete this generated <requestInstance> using the RESTful method DELETE operation onto the commands resource . . . /commands/<command>/execRequests/<requestInstance>. The <command>'s attributes execDisable, execPause, execResume might not be used.

As set forth in details above the four attributes (execEnable, execDisable, execPause, execResume) are configured and used to invoke a command execution, a pause-command execution, a resume-command execution and a cancel-command execution, respectively, of a command (<command> or <requestInstance>).

As an alternative, four special <command> resources may be created in the data structure; namely, . . . /commands/enable, . . . /commands/disable, . . . /commands/pause, and . . . /commands/resume. The four special commands may only have respective "execResource" attributes.

The . . . /commands/enable may be used to invoke a general command execution. For example, issuing the RESTful method CREATE or UPDATE operation onto " . . . /commands/enable" resource with its attribute execResource set as execResource=" . . . /commands/<command>" to invoke a command execution of the " . . . /commands/<command>".

The . . . /commands/disable may be used to invoke a may be used to invoke a general cancel-command execution of . . . /commands/<command> (or . . . /commands/<command>/execRequests/<requestInstance>). For example, issuing the RESTful method CREATE or UPDATE onto . . . /commands/disable resource with its attribute execResource set as execResource= . . . /commands/<command> (or . . . /commands/<command>/execRequests/<requestInstance>) to invoke the cancel-command execution of . . . /commands/<command> (or . . . /commands/<command>/execRequests/<requestInstance>).

The . . . /commands/pause may be used to invoke a pause-command execution of an existing . . . /commands/<command> (or . . . /commands/<command>/execRequests/<requestInstance>). For example, issuing the RESTful method CREATE or UPDATE onto./commands/pause resource with its attribute execResource set as execResource= . . . /commands/<command> (or . . . /commands/<command>/execRequests/<request-Instance>) may invoke a pause-command execution of the . . . /commands/<command> (or . . . /commands/<command>/execRequests/<requestInstance>).

The . . . /commands/resume may be used to invoke a resume-command execution of an existing . . . /commands/<command> (or . . . /commands/<command>/execRequests/<requestInstance>). For example, issuing the RESTful method CREATE or UPDATE onto./commands/resume resource with its attribute execResource set as execResource= . . . /commands/<command> (or . . . /commands/<command>/execRequests/<requestInstance>) may invoke the resume-command execution.

Example Message Flow Diagrams for xREM Command Management

Figure 29A:
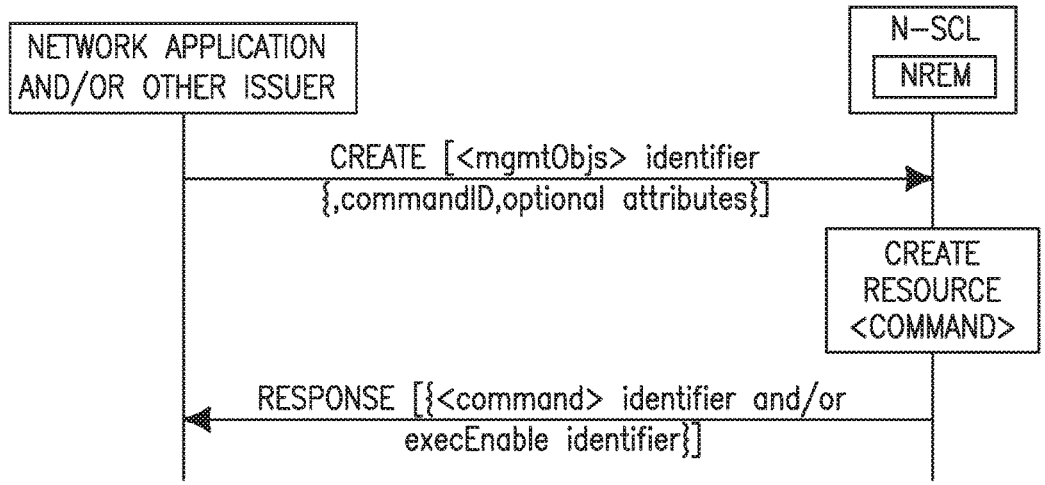
FIG. 29A-29R are message flow diagrams illustrating example message flows for xREM of resource commands.
Figure 29B:
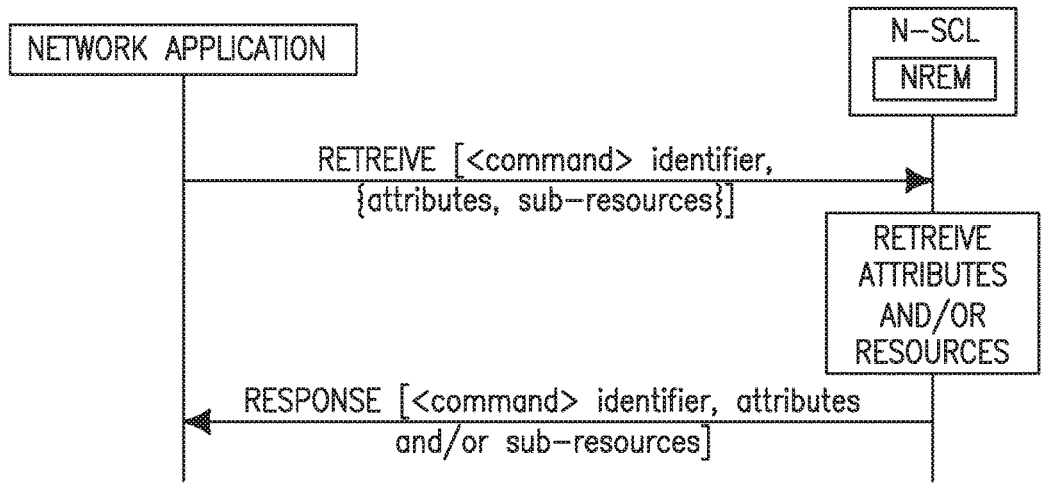
Figure 29C:
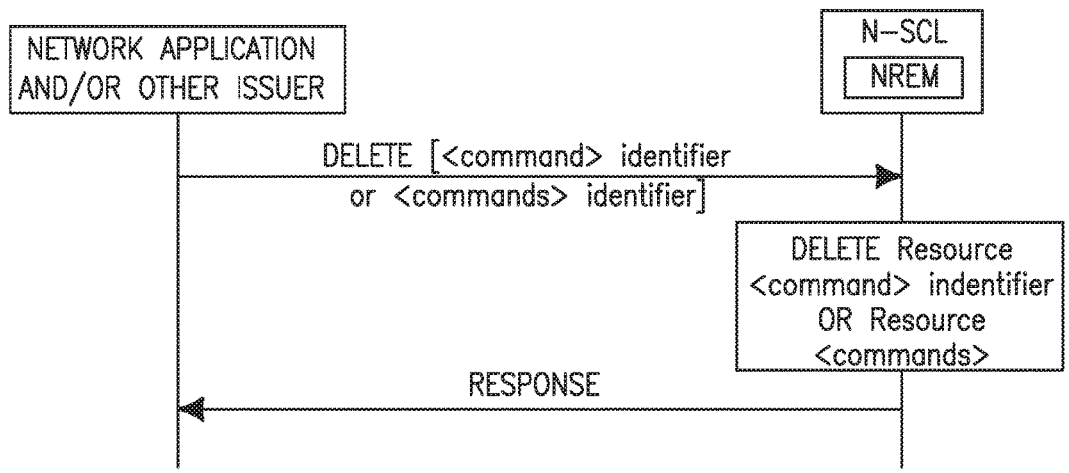
Figure 29D:
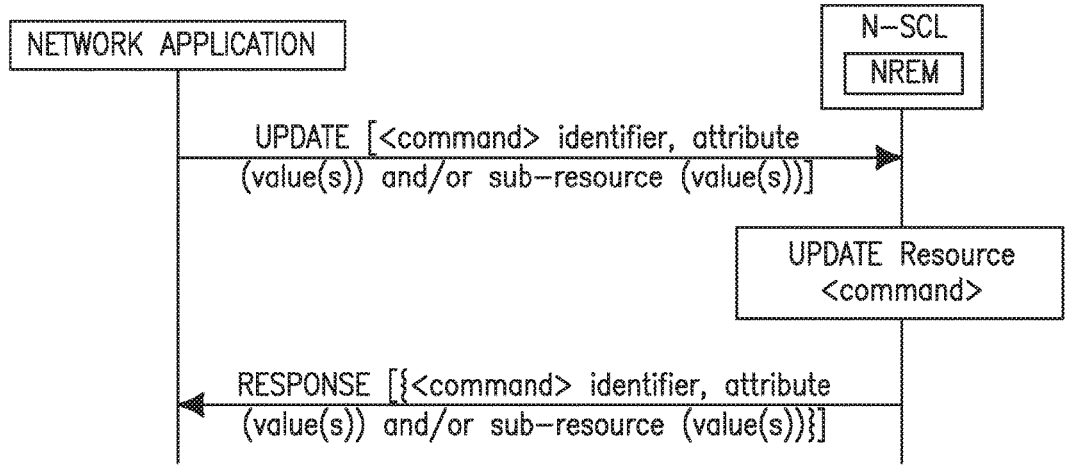
Figure 29E:
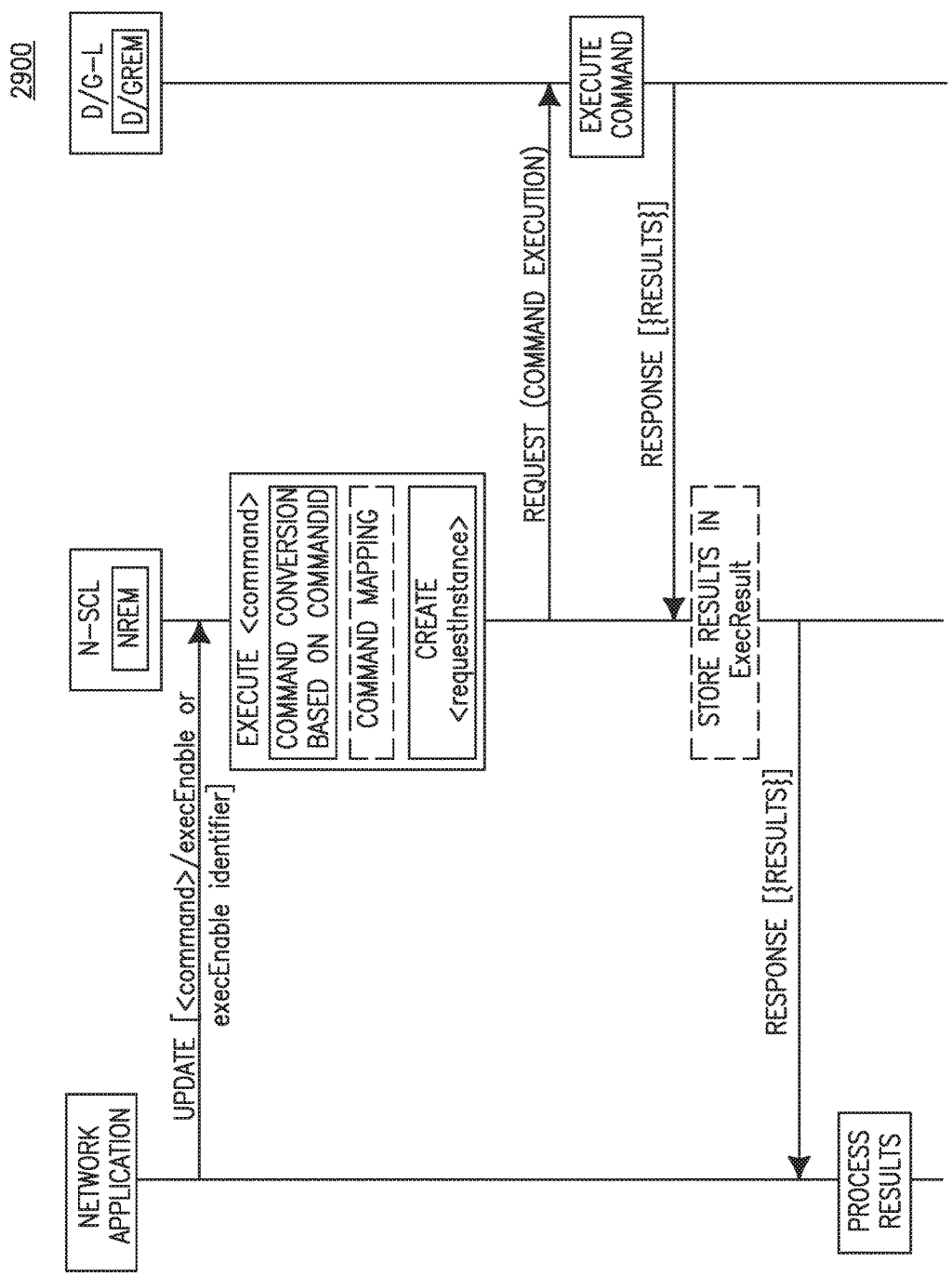
Figure 29F:
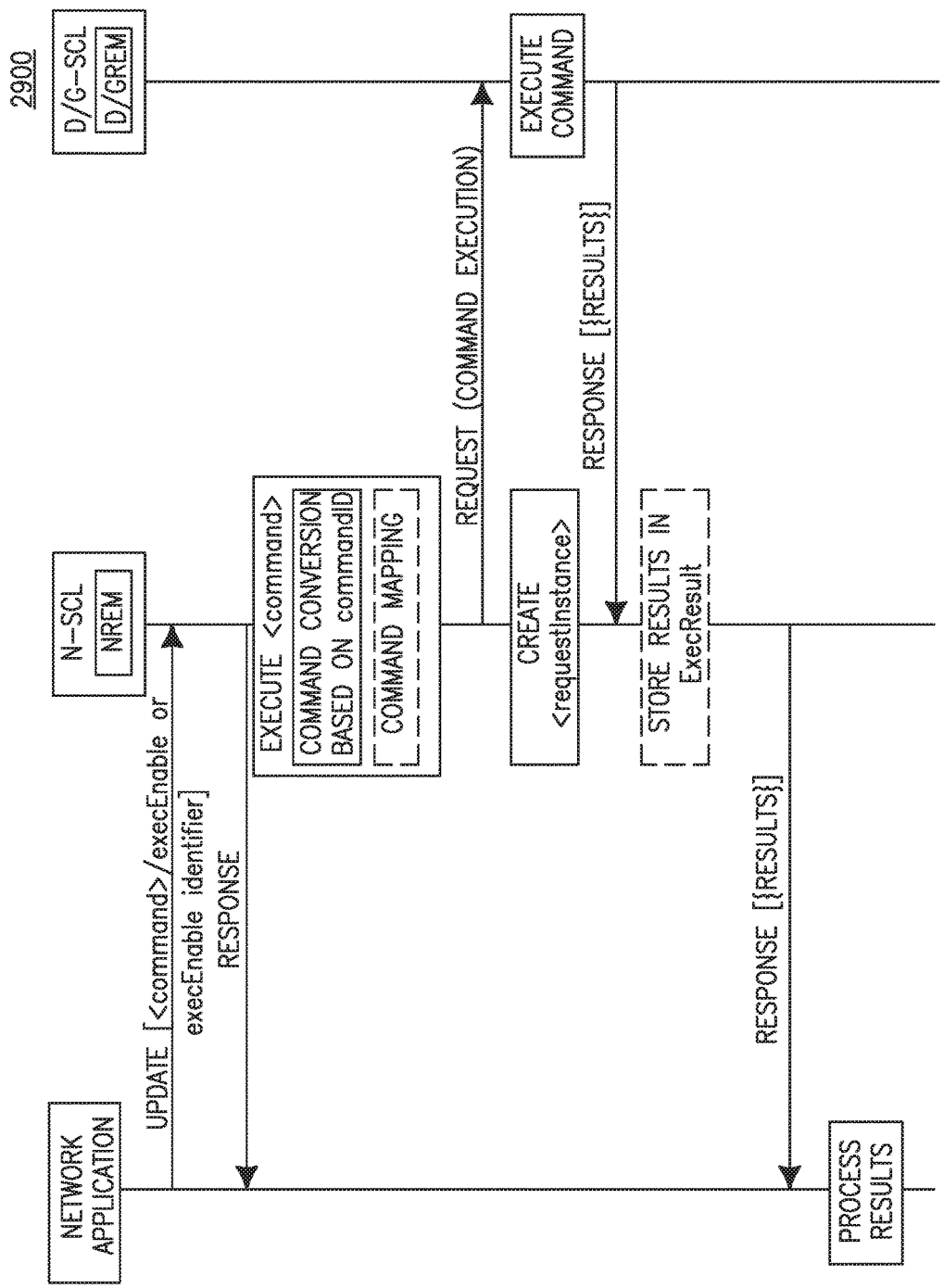
Figure 29G:
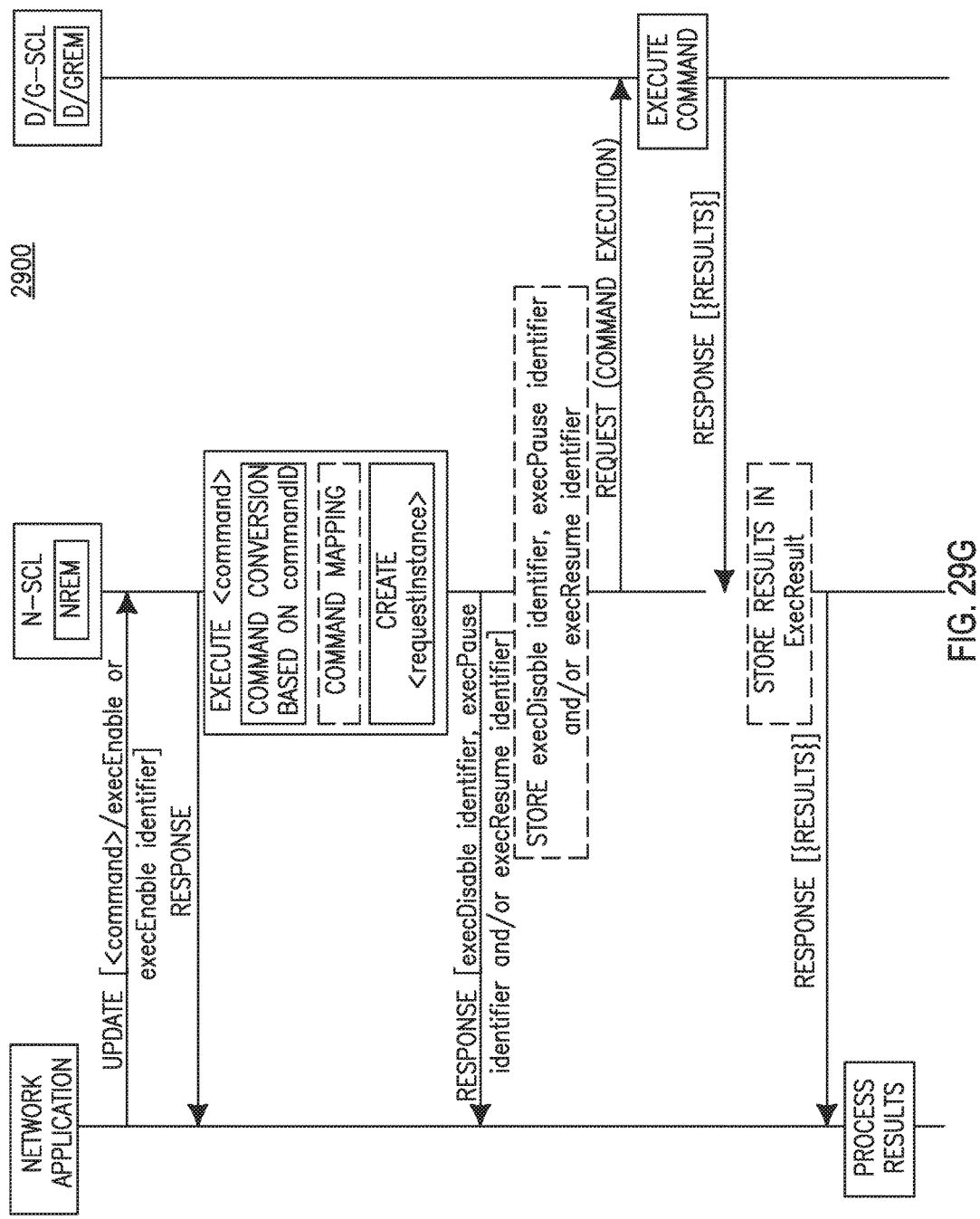
Figure 29H:
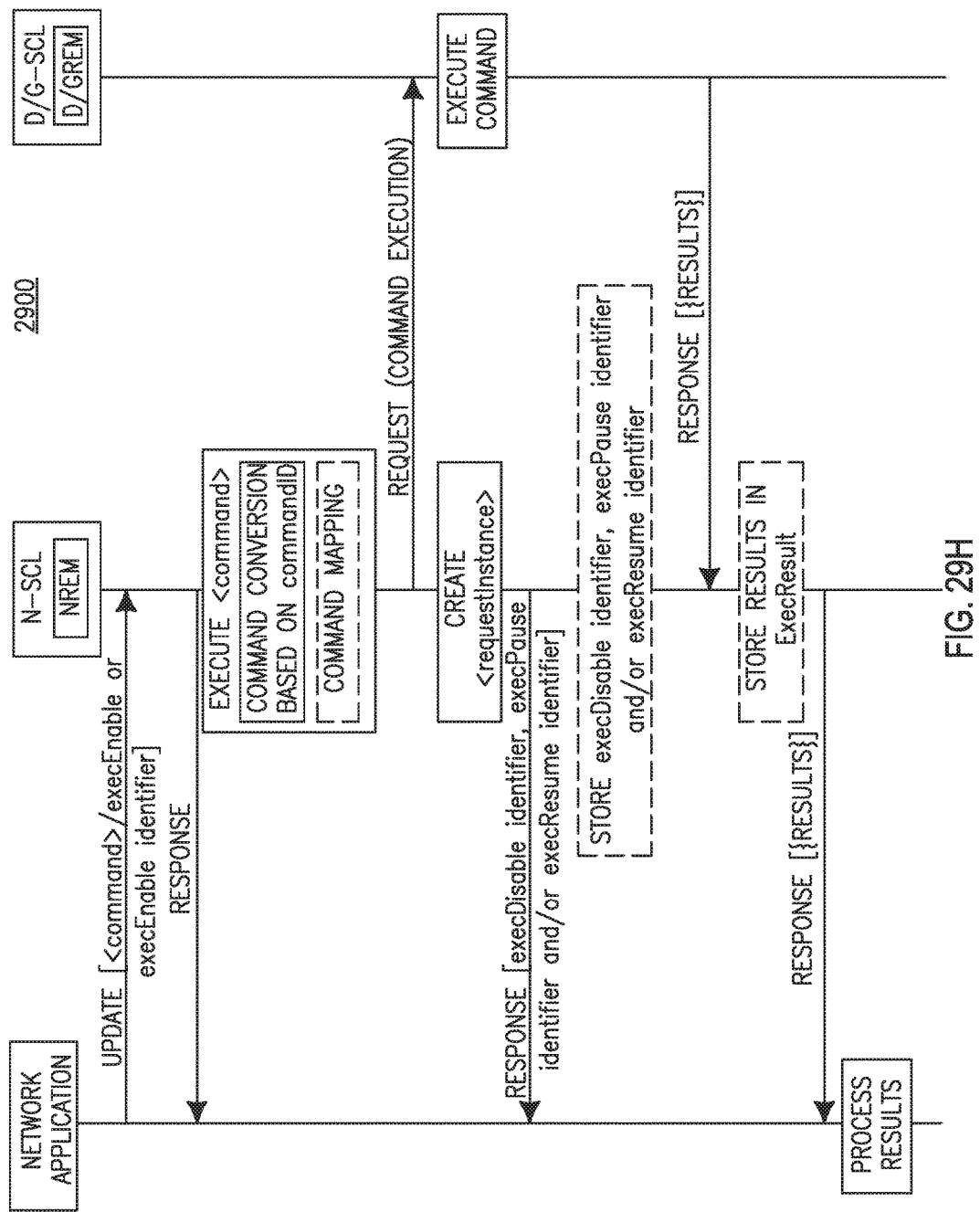
Figure 29I:
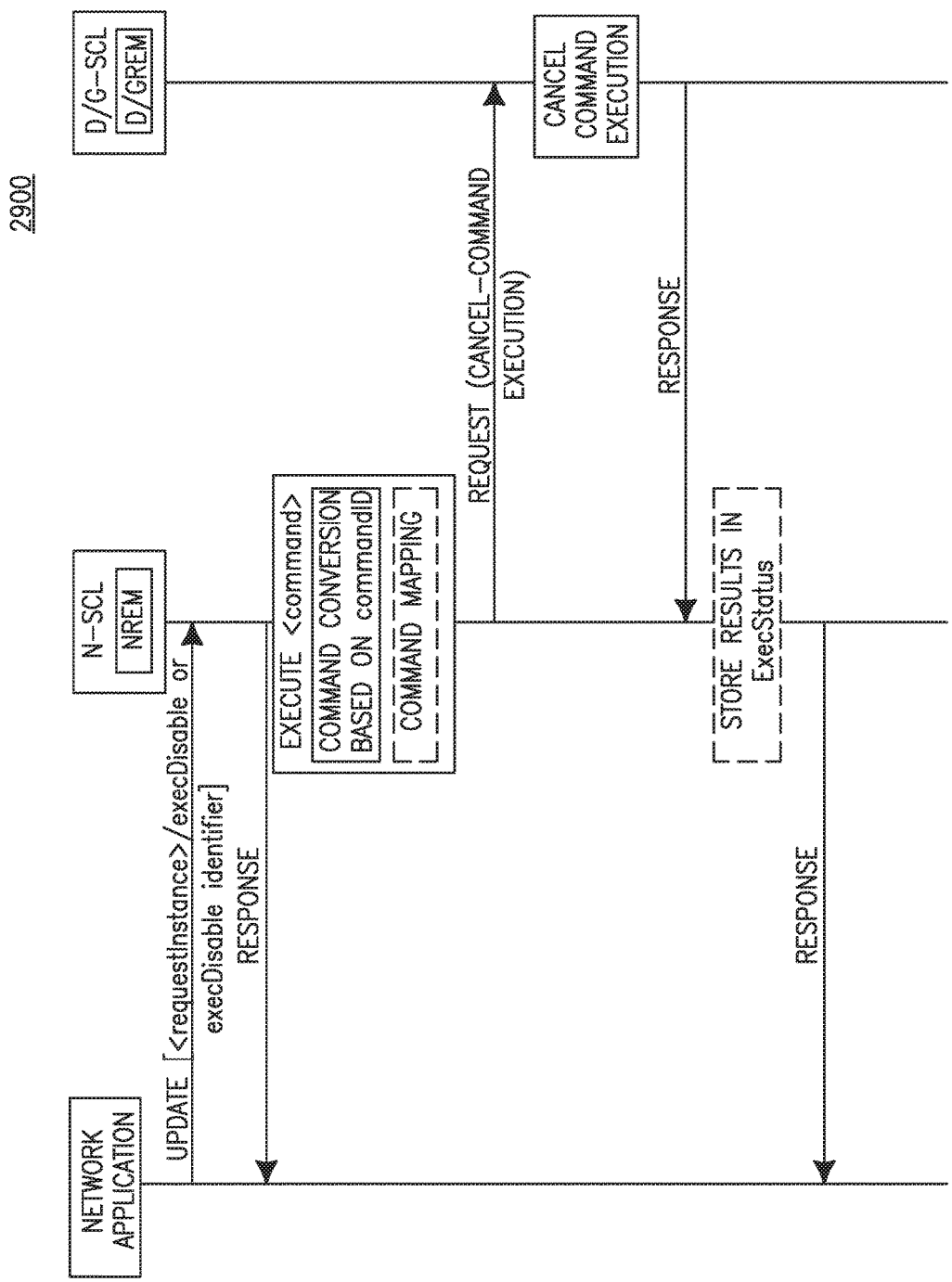
Figure 29J:
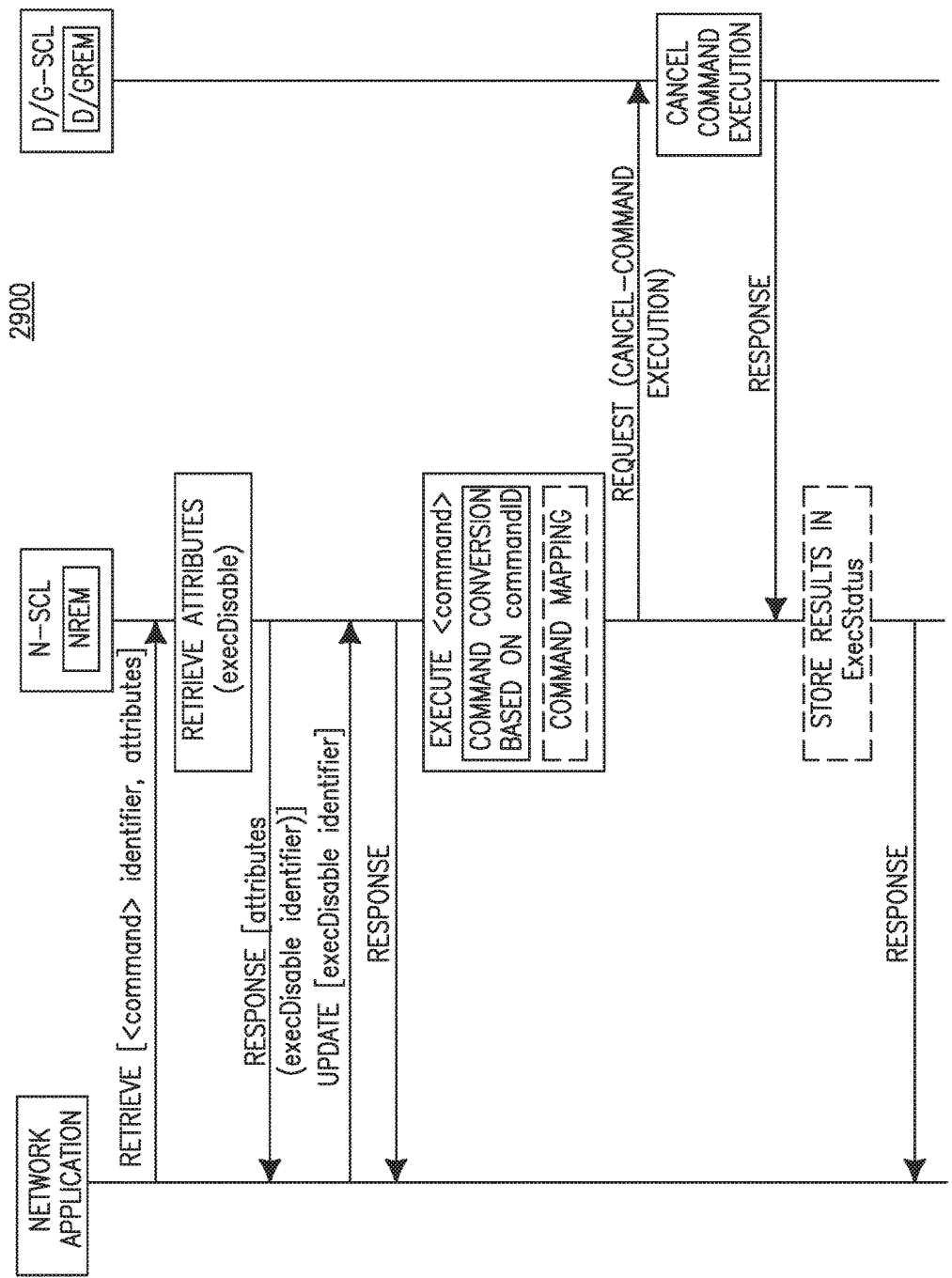
Figure 29K:
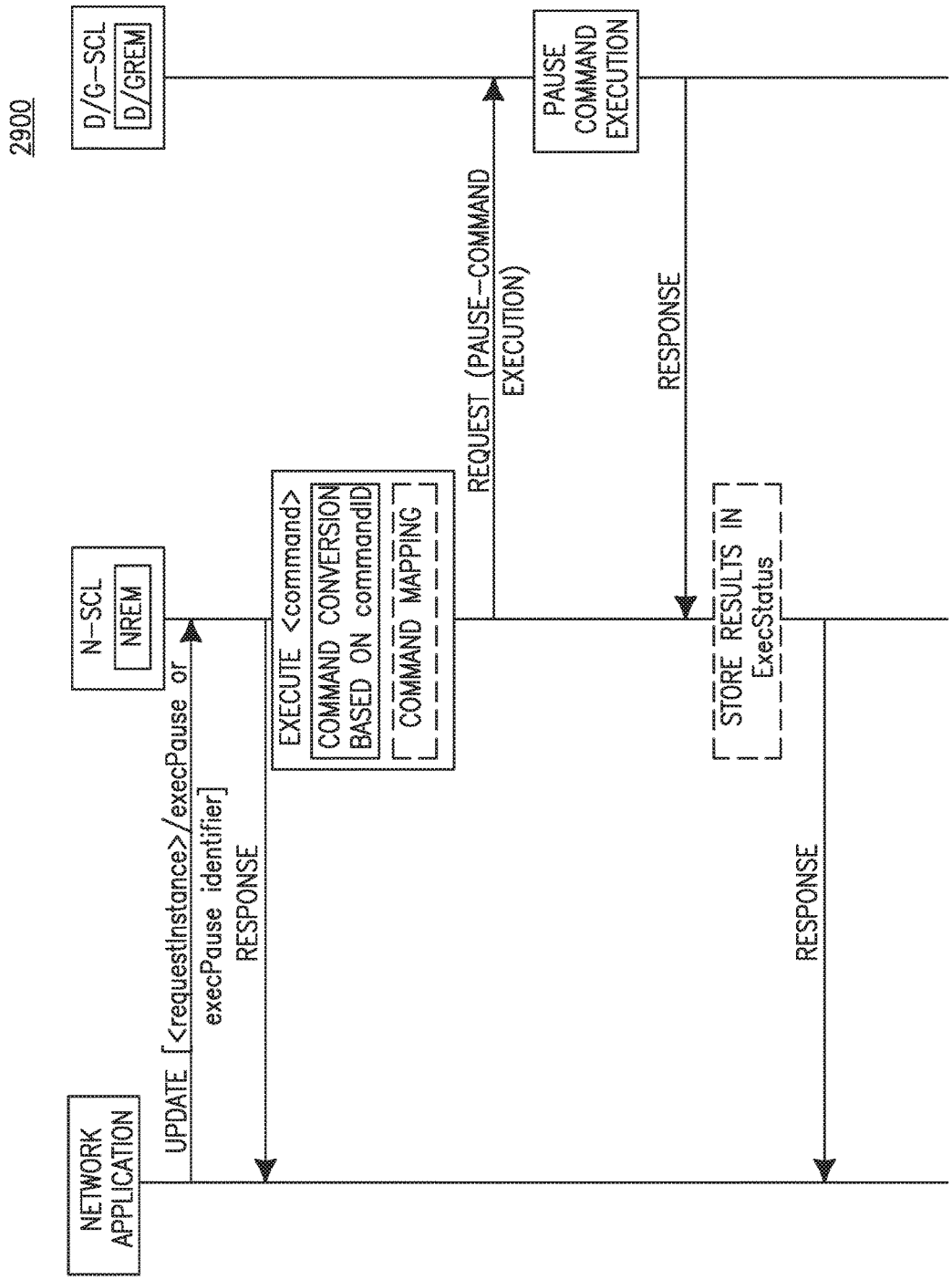
Figure 29L:
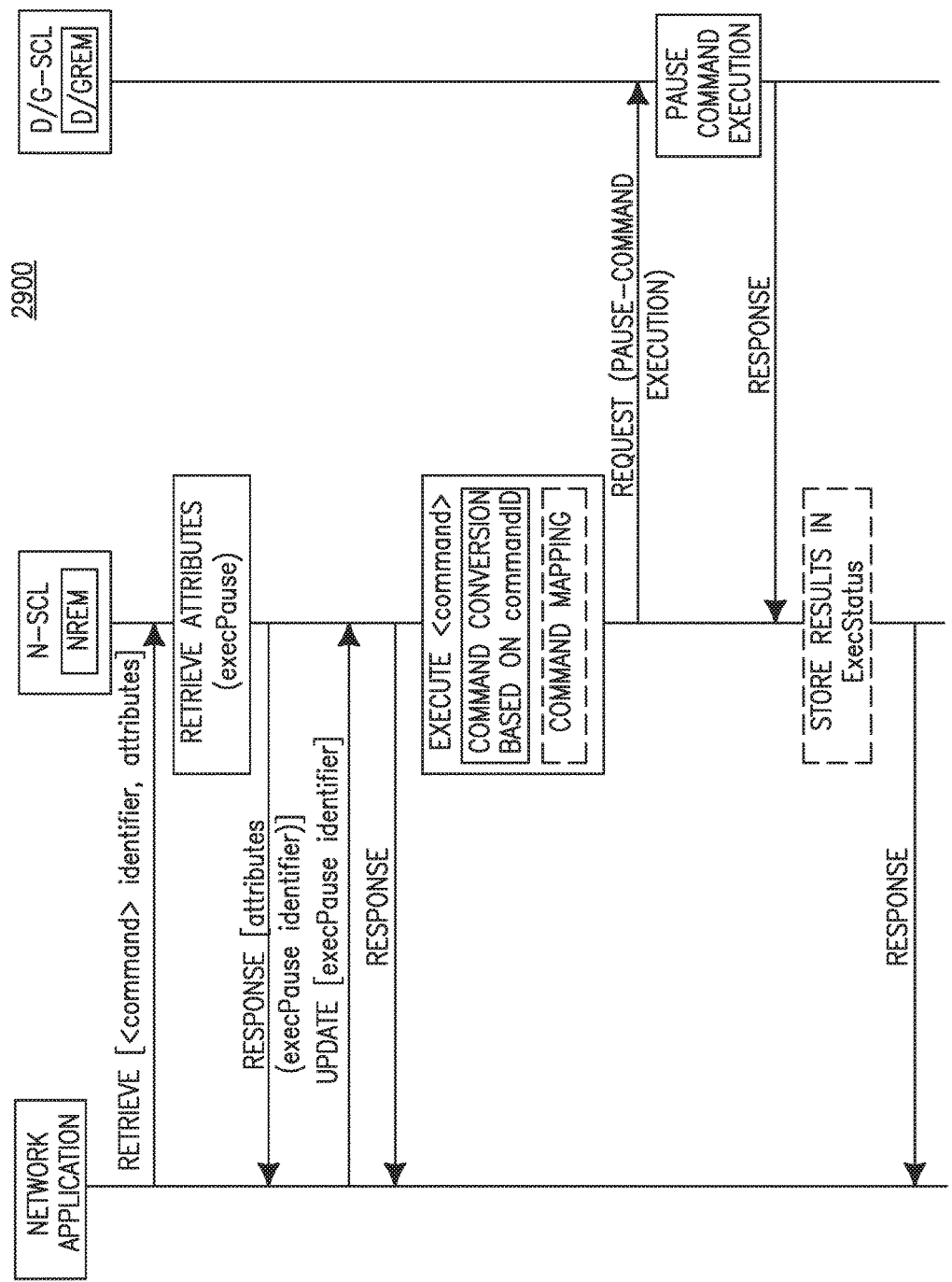
Figure 29M:
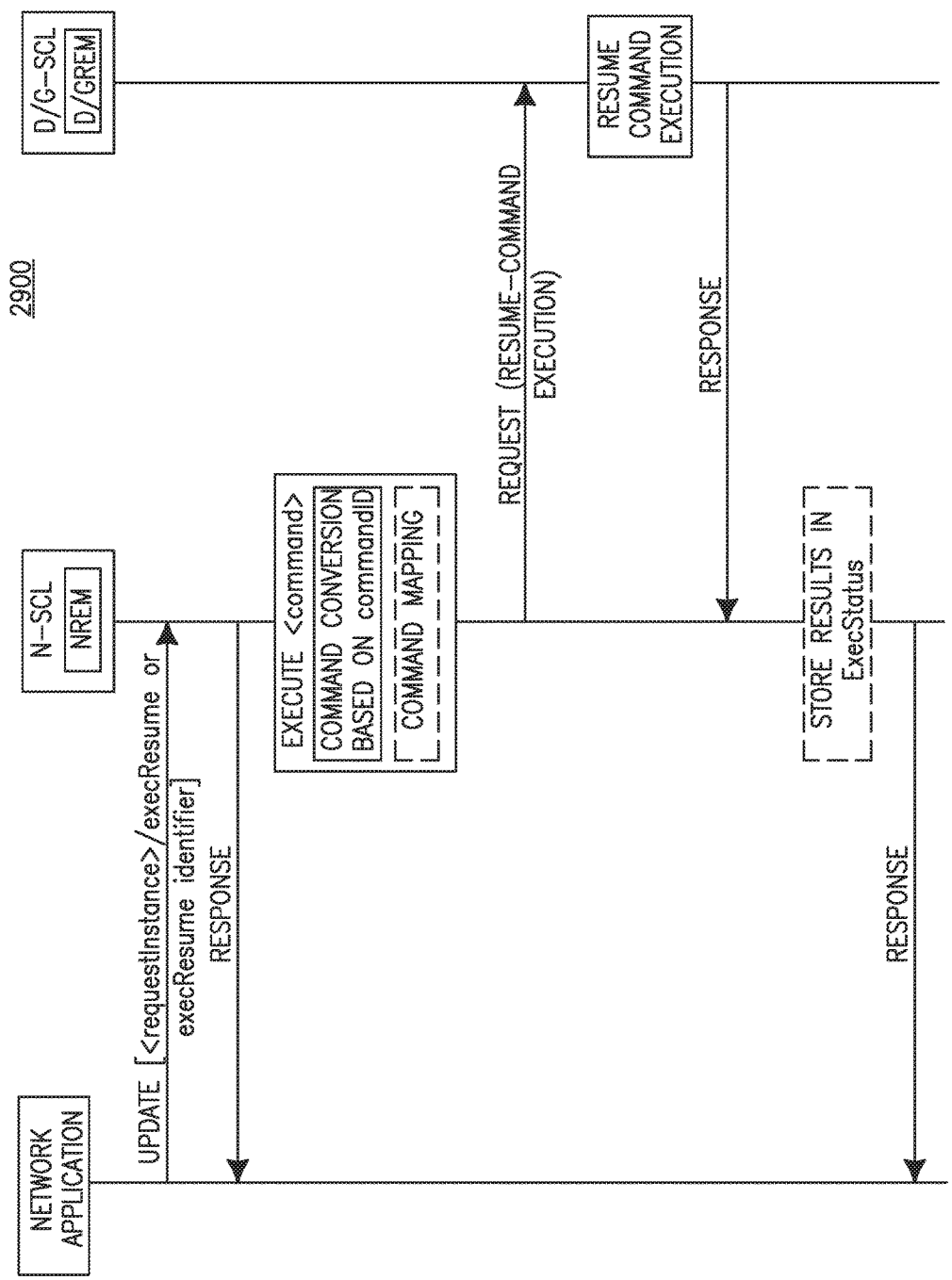
Figure 29N:
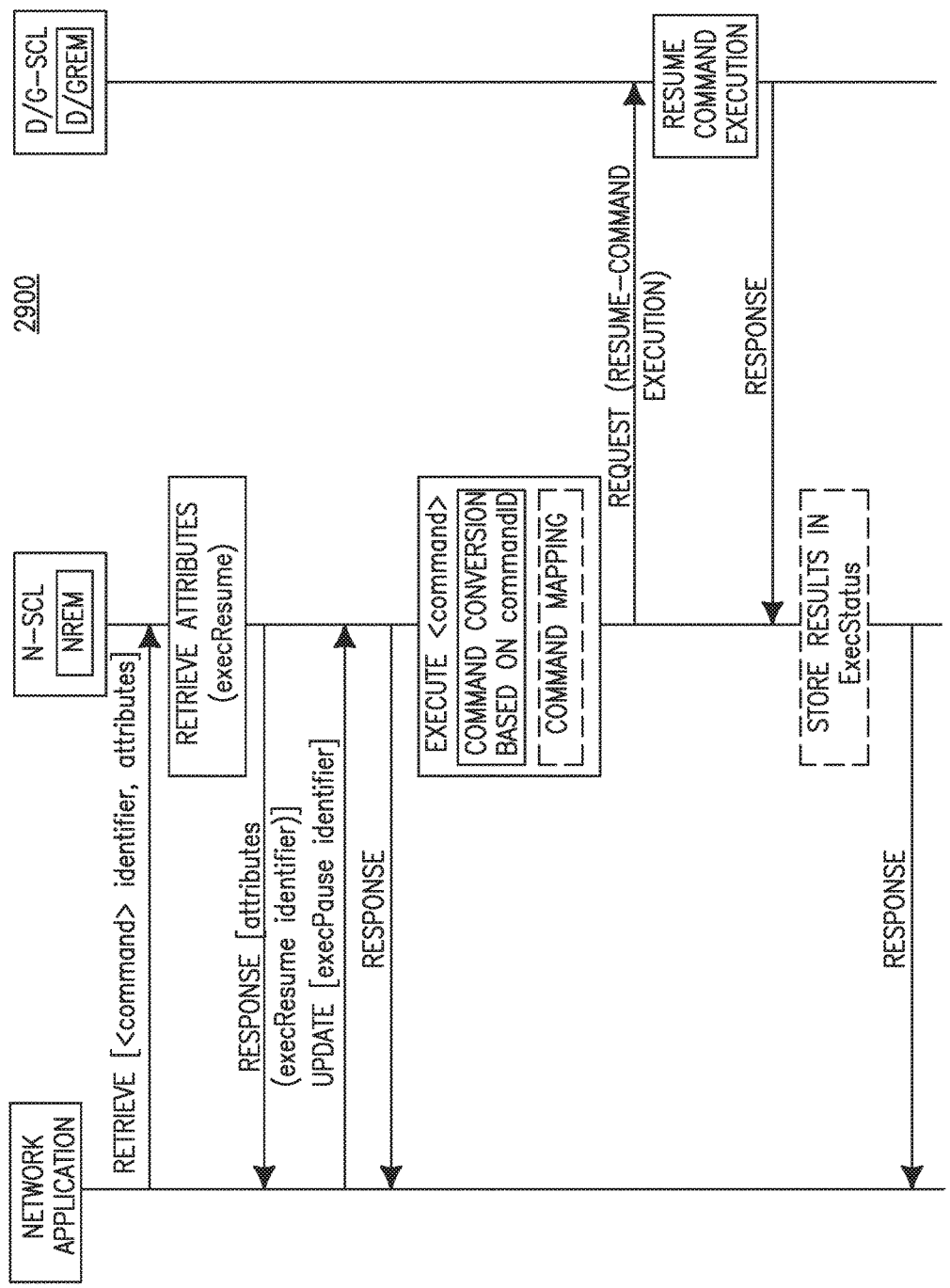
Figure 29O:
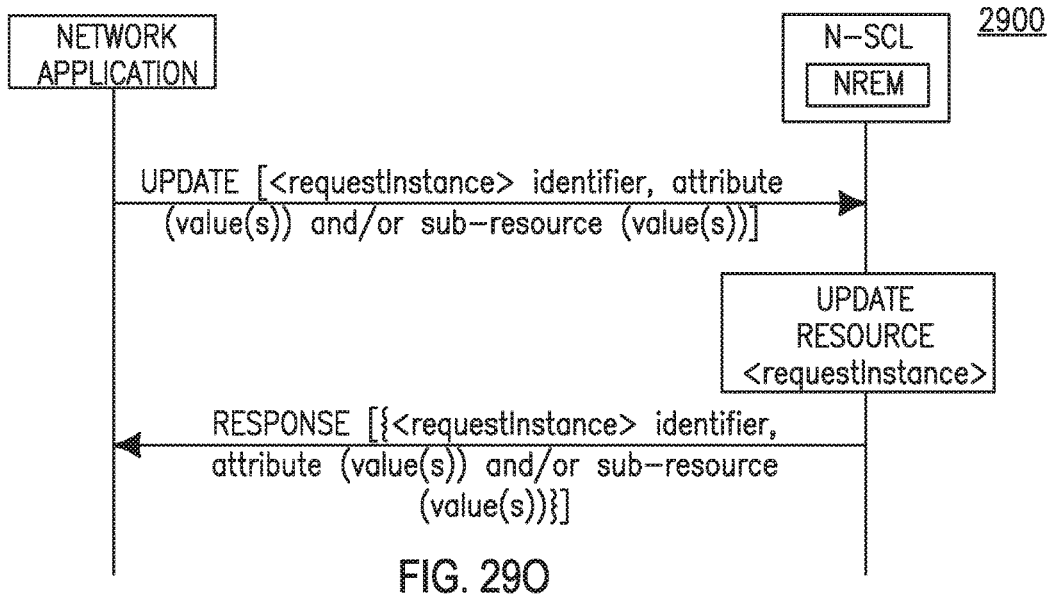
Figure 29P:
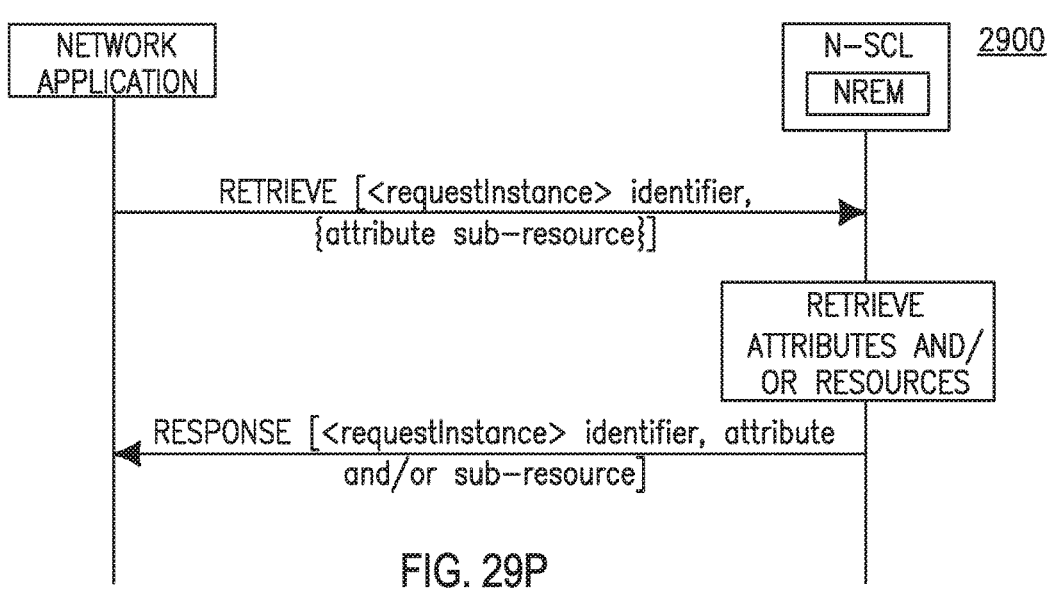
Figure 29Q:
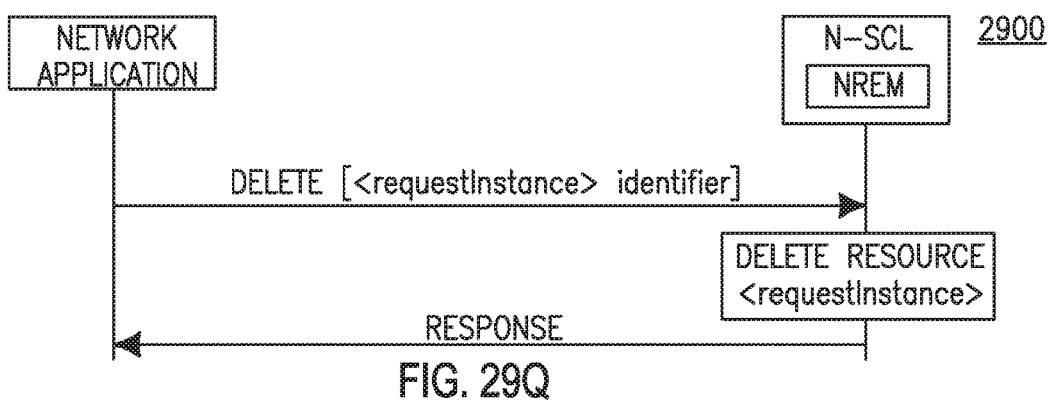
Figure 29R:
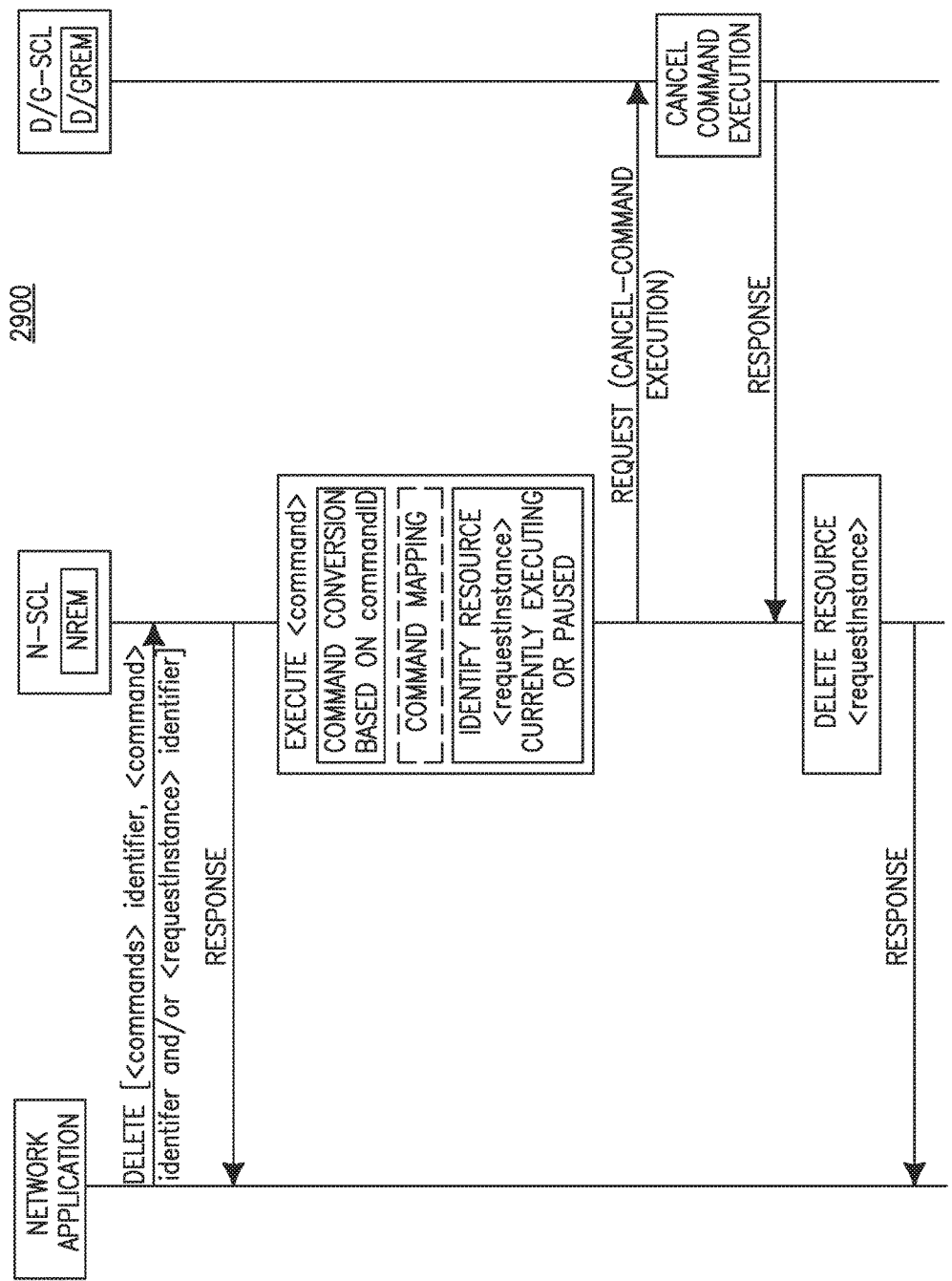

FIGS. 29A-29R are message flow diagrams illustrating example message flows for xREM of the resource commands. The message flows of FIGS. 29A-29R are described with reference to the commands-resource structure of FIGS. 22C, 25B and 28A-28D. The message flows may be carried out using other structures of the resource commands or <commands>, as well.

Referring now to FIG. 29A, a message flow diagram illustrating example message flow for creating a resource-command structure is shown. The resource-command structure created using the messages flow of FIG. 29A may include some or all of the resource-command structure shown in FIGS. 22C, 25B and 28A. For example, the resource-command structure may include all of the elements of the <command> shown in such Figures. Alternatively, the resource-command structure may include a subset of the elements of the <command> shown. Such subset may include a subset of the attributes and/or sub-resources of the <command>. By way of example, the resource-command structure may include (i) attributes, such as, for example, the "attribute", execEnable and commandID; and (ii) sub-resources such as, for example, the execParameters, execRequests and subscriptions. As another example, the resource-command structure may include (i) attributes, such as, for example, the "attribute", execEnable, execDisable, execPause, execResume and commandID; and (ii) sub-resources such as, for example, the execParameters, execRequests and subscriptions. As yet another example, the resource-command structure may include (i) attributes, such as, for example, the "attribute", execEnable, execDisable and commandID; and (ii) sub-resources such as, for example, the execParameters, execRequests and subscriptions. The resource-command structure may include other combinations of the elements (e.g., attributes and sub-resources) of the <command> shown in the FIGS. 22C, 25B and 28A.

The resource-command structure may also include other elements of the <command> not shown in the FIGS. 22C, 25B and 28A, as well. These other elements may be included in the resource-command structure in combination with any of the combinations of the elements of the <command> shown in the FIGS. 22C, 25B and 28A.

To initiate creation of the resource-command structure, an issuer may issue a RESTful method CREATE to the M2M Server. The issuer may be, for example, any of the NA, M2M Device and M2M GW. The M2M Device or M2M GW, as the issuer, may issue the RESTful method UPDATE responsive to registration or as part of registering with the M2M Server. The M2M Device, M2M GW or NA may issue the RESTful method CREATE at other times, as well.

To facilitate creation of the resource-command structure at a given node of the <sclbase>, the RESTful method CREATE may include an identifier of a node (e.g., a resource) under which the resource-command structure may be created. For example, the RESTful method CREATE may include an identifier of the resource <mgmtObjs> (hereinafter "<mgmtObjs> identifier") so as to identify it as the node under which the resource-command structure may be created.

As an alternative, the RESTful method CREATE may include an identifier of the resource <commands> (hereinafter "<commands> identifier") to identify the resource <commands> as the node under which the resource-command structure may be created. Each of the <mgmtObjs> and <commands> identifiers, as noted above, may be any of a URI, link and address, for instance. For simplicity of exposition, the following assumes the resource-command structure may be created under the resource <mgmtObjs>. The resource-command structure, however, may be created under any of the nodes of the <sclbase>.

The RESTful method CREATE may also include information for populating any of the attributes of the resource-command structure. For example, the RESTful method CREATE may include information to populate the commandID attribute so as to indicate the type of non-RESTful command that may be requested for execution and executed using the resource-command structure.

The RESTful method CREATE may further include information for populating one or more of the sub-resources (e.g., the parameter resources) of the resource-command structure. For example, the RESTful method CREATE may include one or more parameters and/or arguments for populating the execParameters sub-resource. These parameters and/or arguments may be specific to the resource <command> and/or the non-RESTful command. The RESTful method CREATE may also include information for populating, in accordance with the non-RESTful command, any of the sub-resources execMode, execBaseDelay, execAdditionDelay, execFrequency, execNumber and execResource.

After receipt of the RESTful method CREATE, the M2M Server may create the resource-command structure under the resource <mgmtObjs> of the M2M Server. The resource-command structure created (hereinafter "server <command>") may include all of the elements of the <command> shown in the FIGS. 22C, 25B and 28A. Alternatively, the server <command> may include a subset of the elements of the <command> shown, such as, for example, a subset of the attributes and/or sub-resources of the <command>. The server <command> may include the "attribute", execEnable and commandID attributes; and the execParameters, execRequests and subscriptions sub-resources, for example.

Alternatively, the server <command> may include the "attribute", execEnable, execDisable, execPause, execResume and commandID attributes; and the execParameters, execRequests and subscriptions sub-resources. As yet another example, the server <command> may include the "attribute", execEnable, execDisable and commandID attributes; and the execParameters, execRequests and subscriptions sub-resources. The server <command> may include other combinations of the elements (e.g., attributes and sub-resources) of the <command> (shown and not shown in the FIGS. 22C, 25B and 28A), as well.

If the information for populating the attributes and/or sub-resources of the server <command> is included in the RESTful method CREATE, the M2M Server may populate such corresponding attributes and/or sub-resources with the information provided. If information for populating any given attribute and/or sub-resource is not provided, the M2M server may leave such attribute and/or sub-resource as initially created (e.g., blank or with default attributes and/or parameters). As described in more detail below, the attributes and sub-resources may be populated after creation of the server <command> by issuing to the M2M Server a RESTful method UPDATE, which includes information for populating the attributes and/or sub-resources.

In response to the RESTful method CREATE, the M2M Server may send a response message ("Response") to the issuer. The M2M Server may send the Response after creating the server <command>, as shown. Alternatively, the M2M Server may send the Response during creation of the server <command>. The M2M Server may also send an acknowledgement ("ACK/NACK") message (not shown) to the issuer for acknowledging receipt of the RESTful method CREATE. No receipt of the ACK/NACK message by the issuer (e.g., within a certain time) may indicate non-acknowledgement of the RESTful method CREATE by the M2M Server.

The Response may include an indication (e.g., a code) to indicate whether the M2M Server successfully created or failed to create the server <command>. The indication may be one value to indicate of successful creation and another value to indicate failure. Alternatively, the Response may include a first indication (e.g., a code) to indicate that the M2M Server successfully created the server <command>, and a second indication (e.g., a code) to indicate failure to create the server <command>. As another alternative, the M2M Server may only issue the Response if the M2M Server successfully created the server <command>.

The Response may include an identifier of the node assigned to the server <command>("server-<command> identifier") during creation. This server-<command> identifier may be used to access the server <command>. The server-<command> command identifier may be, for example, a URI, link or address of the node.

The Response may also include an identifier of the node assigned to the execEnable sub-resource ("execEnable identifier") during creation. As described above and in more detail below, the execEnable identifier may be used to invoke a change in a state of command execution (e.g., invoke any of a command execution, a cancel-command execution, a pause-command execution and a resume-command execution).

Alternatively, the Response may also include the execEnable identifier; an identifier of the node assigned to the execDisable ("execDisable identifier") during creation, if any; an identifier of the node assigned to the execPause ("execPause identifier") during creation, if any; and an identifier of the node assigned to the execResume ("execResume identifier") during creation, if any. As described above and in more detail below, each of the execEnable, execDisable, execPause and execResume identifiers may be used to invoke a change in a state of command execution. The execEnable may be used to invoke a command execution. The execDisable may be used to invoke a cancel-command execution. The execPause may be used to invoke a pause-command execution. The execResume may be used to invoke a resume-command execution.

As an alternative, the M2M Server may store any of the execEnable, execDisable, execPause and execResume identifiers, if any, in an attribute or sub-resource of the server <command>, such as, for example, the "attribute" attribute. This way, any of the execEnable, execDisable, execPause and execResume identifiers so stored may be retrieved at a later time.

Referring now to FIG. 29B, a message flow diagram illustrating example message flow for retrieving information from a resource-command structure, such as the server <command>, is shown. To initiate retrieval, the NA (i.e., the issuer) may issue a RESTful method RETRIEVE to the M2M Server. The RESTful method RETRIEVE may include the server-<command> identifier.

After receipt of the RESTful method RETRIEVE, the M2M Server may use the server-<command> identifier to locate the server <command>. Once located, the M2M Server may query and obtain retrievable information (e.g., attributes, parameters and/or arguments) from the attributes and/or sub-resources of the server <command> having such retrievable information (hereinafter "retrieved-attribute information" and/or "retrieved-sub-resource information"). The retrieved-attribute and/or retrieved-sub-resource information may include any of the stored execEnable, execDisable, execPause and execResume identifiers.

After obtaining the retrieved-attribute and/or retrieved-sub-resource information, the M2M Server may send a Response to the NA. This Response may include the server-<command> identifier and the retrieved-attribute and/or retrieved-sub-resource information.

As an alternative, the RESTful method RETRIEVE may be used to retrieve one or more select portions of the retrievable information from the attributes and/or sub-resources of the server <command> having such retrievable information. To facilitate this, the RESTful method RETRIEVE may include an identifier of each node assigned to the attributes and/or sub-resources of the server <command> having the select portions of the retrievable information. Using the identifier (or identifiers, if more than one), the M2M Server may locate, query and obtain the select portions of the retrievable information (hereinafter "selected retrieved-attribute and/or retrieved-sub-resource information"). The M2M Server may then send to the NA a Response that includes the selected retrieved-attribute and/or retrieved-sub-resource information.

Although not shown, the M2M Server may also send an ACK/NACK message to the issuer for acknowledging receipt of the RESTful method RETRIEVE. No receipt of the ACK/NACK message by the issuer (e.g., within a certain time) may indicate non-acknowledgement of the RESTful method RETRIEVE by the M2M Server.

Referring now to FIG. 29C, a message flow diagram illustrating example message flow for deleting a resource-command structure, such as the server <command> or a collection of server <command> instances ("server-<command> instances"), is shown. To initiate the delete, an issuer may issue a RESTful method DELETE to the M2M Server. The issuer may be the NA, M2M Device or M2M GW. The M2M Device and/or the M2M GW may issue the RESTful method DELETE in response to a reboot, cancellation of the non-RESTful command, de-registration, etc.

The RESTful method DELETE may include the server-<command> identifier. Alternatively, the RESTful method DELETE may include an identifier of a node assigned to a resource (e.g., the server <commands>) under which the collection of server-<command> instances have been created (hereinafter "server-<commands> identifier").

After receipt of the RESTful method DELETE, the M2M Server may use the server-<command> identifier or server-<commands> identifier to locate and delete the server <command> or server <commands>, respectively. This may include deleting all attributes and/or sub-resources of the server <command> or, for the server <commands>, deleting each of the server-<command> instances of such server <commands>.

In response to the RESTful method DELETE, the M2M Server may send a Response to the issuer. The M2M Server may send the Response after deleting the server <command> or the server <commands>, as shown. Alternatively, the M2M Server may send the Response during deletion of the server <command> or the server <commands>. The M2M Server may also send an ACK/NACK message (not shown) to the issuer for acknowledging receipt of the RESTful method DELETE. No receipt of the ACK/NACK message by the issuer (e.g., within a certain time) may indicate non-acknowledgement of the RESTful method DELETE by the M2M Server.

The Response may include an indication (e.g., a code) to indicate whether the M2M Server successfully deleted or failed to delete the server <command> or the server <commands>. The indication may be one value to indicate of successful deletion and another value to indicate failure. Alternatively, the Response may include a first indication (e.g., a code) to indicate that the M2M Server successfully deleted the server <command> or the server <commands>, and a second indication (e.g., a code) to indicate failure to delete the server <command> or the server <commands>. As another alternative, the M2M Server may only issue the Response if the M2M Server successfully deleted the server <command> or the server <commands>.

FIG. 29D is a message flow diagram illustrating example message flow for updating a resource-command structure, such as the server <command>, with information for use in performing the non-RESTful command is shown. FIGS. 29E-29N are flow diagrams illustrating example message flows for updating a resource-command structure, such as the server <command>, to invoke command execution of a non-RESTful command. While the messages flow of FIG. 29D and the message flows of FIGS. 29E-29N may use the RESTful method UPDATE, the message flow of FIG. 29D may use the RESTful method UPDATE to populate elements of a resource-command structure, such as the server <command>, with information (e.g., any of an attribute, parameter and/or argument) that may be used in to perform the non-RESTful command (i.e., after a command execution has been invoked). The message flows of FIGS. 29E-29N, however, may use the RESTful method UPDATE to cause invocation of command execution of the non-RESTful command.

Referring now to FIG. 29D, the NA (i.e., the issuer) may issue a RESTful method UPDATE to the M2M Server to initiate the update. The RESTful method UPDATE may include the server-<command> identifier and the information (e.g., attributes, parameters and/or arguments) for populating the attributes and/or sub-resources of the server <command> with such information. Like the RESTful method CREATE above, the RESTful method UPDATE may include information to populate the commandID attribute so as to indicate the type of non-RESTful command that may be requested for execution and executed using the resource-command structure.

The RESTful method UPDATE may further include information for populating one or more of the sub-resources (e.g., the parameter resources) of the resource-command structure. For example, the RESTful method UPDATE may include one or more parameters and/or arguments for populating the execParameters sub-resource. These parameters and/or arguments may be specific to the resource <command> and/or the non-RESTful command. The RESTful method UPDATE may also include information for populating, in accordance with the non-RESTful command, any of the sub-resources execMode, execBaseDelay, execAdditionDelay, execFrequency, execNumber and execResource.

After receipt of the RESTful method UPDATE, the M2M Server locate the server <command> using the server-command identifier. The M2M Server may thereafter populate the attributes and/or sub-resources of such server <command> with the information provided. If information for populating any given attribute and/or sub-resource is not provided, the M2M server may leave such attribute and/or sub-resource as initially created (e.g., blank or with default attributes and/or parameters) or last modified.

In response to the RESTful method UPDATE, the M2M Server may send a Response to the issuer. The M2M Server may send the Response after updating the server <command>, as shown. Alternatively, the M2M Server may send the Response during the update of the server <command>. The M2M Server may also send an ACK/NACK message (not shown) to the issuer for acknowledging receipt of the RESTful method UPDATE. No receipt of the ACK/NACK message by the issuer (e.g., within a certain time) may indicate non-acknowledgement of the RESTful method UPDATE by the M2M Server.

The Response may include an indication (e.g., a code) to indicate whether the M2M Server successfully updated or failed to update the server <command>. The indication may be one value to indicate of successful update and another value to indicate failure. Alternatively, the Response may include a first indication (e.g., a code) to indicate that the M2M Server successfully updated the server <command>, and a second indication (e.g., a code) to indicate failure to update the server <command>. As another alternative, the M2M Server may only issue the Response if the M2M Server successfully updated the server <command>.

The Response may also include the server-<command> identifier and/or the attributes and/or sub-resources updated. The Response may further include the information that was used to update the attributes and/or sub-resources or confirmation indicative of the same.

Referring now to FIG. 29E, a flow diagram illustrating example message flow for updating a resource-command structure, such as the server <command>, to invoke command execution of a non-RESTful command is shown. To initiate the update, the NA (i.e., the issuer) issues a RESTful method UPDATE to the M2M Server. This RESTful method UPDATE may include the server-<command> identifier along with specifying the sub-resource execEnable (e.g., . . . /<command>/execEnable). Alternatively, the RESTful method UPDATE may include the execEnable identifier.

Responsive to this RESTful method UPDATE, the M2M Server may send an ACK/NACK message (shown as a Response) to the issuer for acknowledging receipt of the RESTful method UPDATE. No receipt of the ACK/NACK message by the issuer (e.g., within a certain time) may indicate non-acknowledgement of the RESTful method UPDATE by the M2M Server.

The M2M Server may invoke a command execution of the non-RESTful command in accordance with the attributes and/or sub-resources of the server <command>. The M2M Server may perform, as part of invoking the command execution, a number of functions. These functions may include, for example, converting or translating the command, as identified by in the server <command> (e.g., by the commandID), into the non-RESTful command that can be interpreted or executed by the M2M Device or M2M GW. The functions may also include functions for mapping attributes, parameters and/or arguments ("mapped attributes, parameters and/or arguments") between the command identified by in the server <command> and the non-RESTful command that can be interpreted or executed by the M2M Device or M2M GW.

The M2M Server may also create a resource <requestInstance> under execRequests sub-resource to maintain and track the invoked server <command>. The resource <requestInstance> may include one or more of the attributes and/or sub-resources of server <command>. The M2M Server may inherit or import such attributes and/or sub-resources from the server <command> when creating the resource <requestInstance>. Given that the server <command> may include various combinations of elements, the resource <requestInstance> may also various combinations of elements. For example, the resource <requestInstance> may include may include all of the elements of the resource <requestInstance> shown in FIGS. 25B, 28C and 28D, which may be corollaries to the server <command> shown in FIGS. 22C, 25B and 28A, for instance.

Alternatively, the resource <requestInstance> may include a subset of the elements of the resource <requestInstance> shown. Such subset may include a subset of the attributes and/or sub-resources of the resource <requestInstance>. By way of example, the resource <requestInstance> may include the "attribute", execEnable, execStatus, execResult and execDisable attributes; and the subscriptions subscription resources. As another example, the resource <requestInstance> may include the "attribute", execEnable, execStatus, execResult and execDisable, execPause, and execResume attributes; and subscriptions sub-resource. As yet another example, the resource <requestInstance> may include the "attribute", execEnable, execStatus and execResult attributes; and subscriptions sub-resource. The sub-resources may include other combinations of the elements (e.g., attributes and sub-resources) of the server <command> and/or the resource <requestInstance> shown in the FIGS. 25B, 28C and 28D.

The resource <requestInstance> may also include other elements of the <command> not shown in the FIGS. 25B, 28C and 28D, as well. These other elements may be included in the resource <requestInstance> in combination with any of the combinations of the elements of the resource <requestInstance> shown in the FIGS. 25B, 28C and 28D.

Upon creation of the resource <requestInstance> under the execRequests sub-resource, the M2M Server may assign to the resource <requestInstance> an identifier of a node at which the resource <requestInstance> is created ("<requestInstance> identifier"). This <requestInstance> identifier may be, as noted above, any of a URI, link and address, for instance.

The M2M server may import into the resource <requestInstance> (or cause the resource <requestInstance> to inherit) some or all of the information populated into the attributes and/or sub-resources of the server <command> that are imported into or inherited by the resource <requestInstance>. Such information may include one or more parameters and/or arguments populated into the execParameters sub-resource of the server <command>. The information may also include some or all of the information populated in, for example, the execMode, execBaseDelay, execAdditionDelay, execFrequency, execNumber and execResource sub-resources.

After creating the resource <requestInstance>, the M2M Server may send a request message ("Request") to the M2M Device and/or M2M GW so as to invoke a command execution at the M2M Device and/or M2M GW. The Request may include the non-RESTful command. The Request may also include any of the mapped attributes, parameters and arguments.

Responsive to the Request, the M2M Device and/or M2M GW may execute the non-RESTful command. The M2M Device and/or M2M GW may send a Response to the Request ("Command-execution Response"). This Command-execution Response may include results, if any (as denoted by the "{ }" symbols). The M2M Server may extract and store the results in the execResult sub-resource of the resource <requestInstance> for later retrieval. Alternatively and/or additionally, the M2M Server may send the results in a Response to the NA ("NA Response"). After obtaining the results, the NA may process them.

The Command-execution Response may also include an indication (e.g., a code) to indicate whether the M2M Device and/or M2M GW successfully performed the command execution of the non-RESTful command or failed to perform the command execution of the non-RESTful command. The indication may be one value to indicate of successful command execution and another value to indicate failure. Alternatively, the Response may include a first indication (e.g., a code) to indicate that the M2M Device and/or M2M GW successfully performed the command execution, and a second indication (e.g., a code) to indicate the M2M Device and/or M2M GW failed to perform the command execution. As another alternative, the M2M Device and/or M2M GW may only issue the Response if the M2M Device and/or M2M GW successfully performed the command execution.

Although not shown, the M2M Server may delete the resource <requestInstance> when the M2M Device and/or M2M GW fail to perform the command execution of the non-RESTful command. The M2M Server may also delete the server <command> and/or one or more of the server <commands> in response to being informed that the M2M Device and/or M2M GW failed to perform the command execution of the non-RESTful command.

Referring now to FIG. 29F, a flow diagram illustrating another example message flow for updating a resource-command structure, such as the server <command>, to invoke command execution of a non-RESTful command is shown. The message flow of FIG. 29F is similar to the message flow of FIG. 29E, except as described herein. In the message flow of FIG. 29F, the M2M Server may issue the Request before creating the resource <requestInstance>. Also, the M2M Server may receive the Command-execution Response after creating resource <requestInstance>.

FIG. 29G is a flow diagram illustrating another example message flow for updating a resource-command structure, such as the server <command>, to invoke command execution of a non-RESTful command. The message flow of FIG. 29G is similar to the message flow of FIG. 29E, except as described herein. In the message flow of FIG. 29G, after creating a resource <requestInstance> that includes the execDisable, execPause and/or execResume attributes (or sub-resources), the M2M Server may send to the issuer corresponding execDisable, execPause and/or execResume identifiers.

Alternatively, the M2M Server may store any of the execEnable, execDisable, execPause and execResume identifiers in an attribute or sub-resource of the resource <requestInstance>, such as, for example, the "attribute" attribute. This way, the execEnable, execDisable, execPause and execResume identifiers so stored may be retrieved at a later time. As described below, an issuer (e.g., the NA) may use the execDisable, execPause and/or execResume identifiers to invoke a cancel-command execution, a pause-command execution and/or resume-command execution, respectively.

Referring now to FIG. 29H, a flow diagram illustrating another example message flow for updating a resource-command structure, such as the server <command>, to invoke command execution of a non-RESTful command is shown. The message flow of FIG. 29H is similar to the message flow of FIG. 29G, except as described herein. In the message flow of FIG. 29G, the M2M Server may issue the Request before creating the resource <requestInstance>. Also, the M2M Server may receive the Command-execution Response after creating resource <requestInstance>.

FIGS. 29I and 29J are flow diagrams illustrating example message flows for updating a resource-command structure, such as the server <command>, to invoke a change in state of a command execution of a non-RESTful command. To initiate the update, the NA (i.e., the issuer) may issue a RESTful method UPDATE to the M2M Server. This RESTful method UPDATE may include the <requestInstance> identifier along with specifying the sub-resource execDisable (e.g., . . . /<command>/execDisable). Alternatively, the RESTful method UPDATE may include the execDisable identifier obtained via a Response sent from the M2M Server (FIG. 29I) or after retrieving it from the attributes of the resource <requestInstance> (FIG. 29J).

Responsive to this RESTful method UPDATE, the M2M Server may send an ACK/NACK message (shown as a Response) to the issuer for acknowledging receipt of the RESTful method UPDATE. No receipt of the ACK/NACK message by the issuer (e.g., within a certain time) may indicate non-acknowledgement of the RESTful method UPDATE by the M2M Server.

The M2M Server may then invoke a cancel-command execution of the non-RESTful command in accordance with the attributes and/or sub-resources of the server <command>. The M2M Server may perform, as part of invoking the cancel-command execution, a number of functions. These functions may include, for example, converting or translating the cancel-command execution, as identified by in the resource <requestInstance>, into a non-RESTful command for invoking a cancel-command execution of an executing non-RESTful command ("non-RESTful-cancellation command"). The functions may also include functions for preparing mapped attributes, parameters and/or arguments between the command identified by in the resource <requestInstance> and the non-RESTful-cancellation command.

After performing the functions for invoking the cancel-command execution, the M2M Server may send a Request to the M2M Device and/or M2M GW so as to invoke the cancel-command execution at such the M2M Device and/or M2M GW. The Request may include the non-RESTful-cancellation command. The Request may also include any of the mapped attributes, parameters and arguments for performing the non-RESTful-cancellation command.

Responsive to the Request, the M2M Device and/or M2M GW may execute the non-RESTful-cancellation command. The M2M Device and/or M2M GW may send a Command-execution Response. This Command-execution Response may include results, if any. The M2M Server may extract and store the results in the execResult sub-resource of the resource <requestInstance> for later retrieval. Alternatively and/or additionally, the M2M Server may send the results in a NA Response. After obtaining the results, if any, the NA may process them.

The Command-execution Response may also include an indication (e.g., a code) to indicate whether the M2M Device and/or M2M GW successfully performed the cancel-command execution of non-RESTful-cancellation command or failed to perform the cancel-command execution of the non-RESTful-cancellation command. The indication may be one value to indicate of successful cancel-command execution and another value to indicate failure. Alternatively, the Response may include a first indication (e.g., a code) to indicate that the M2M Device and/or M2M GW successfully performed the cancel-command execution, and a second indication (e.g., a code) to indicate the M2M Device and/or M2M GW failed to perform the cancel-command execution. As another alternative, the M2M Device and/or M2M GW may only issue the Response if the M2M Device and/or M2M GW successfully performed the cancel-command execution.

Although not shown, the M2M Server may delete the resource <requestInstance> when the M2M Device and/or M2M GW fail to perform the cancel-command execution of the non-RESTful command. The M2M Server may also delete the server <command> and/or one or more of the server <commands> in response to being informed that the M2M Device and/or M2M GW failed to perform the cancel-command execution of the non-RESTful-cancellation command.

FIGS. 29K and 29L are flow diagrams illustrating example message flows for updating a resource-command structure, such as the server <command>, to invoke a change in state of command execution of a non-RESTful command. To initiate the update, the NA (i.e., the issuer) may issue a RESTful method UPDATE to the M2M Server. This RESTful method UPDATE may include the <requestInstance> identifier along with specifying the sub-resource execPause (e.g., . . . /<command>/execPause). Alternatively, the RESTful method UPDATE may include the execPause identifier obtained via a Response sent from the M2M Server (FIG. 29K) or after retrieving it from the attributes of the resource <requestInstance> (FIG. 29L).

Responsive to this RESTful method UPDATE, the M2M Server may send an ACK/NACK message (shown as a Response) to the issuer for acknowledging receipt of the RESTful method UPDATE. No receipt of the ACK/NACK message by the issuer (e.g., within a certain time) may indicate non-acknowledgement of the RESTful method UPDATE by the M2M Server.

The M2M Server may then invoke a pause-command execution of the non-RESTful command in accordance with the attributes and/or sub-resources of the server <command>. The M2M Server may perform, as part of invoking the pause-command execution, a number of functions. These functions may include, for example, converting or translating the pause-command execution, as identified by in the resource <requestInstance>, into a non-RESTful command for invoking a pause-command execution of an executing non-RESTful command ("non-RESTful-pause command"). The functions may also include functions for preparing mapped attributes, parameters and/or arguments between the command identified by in the resource <requestInstance> and the non-RESTful-pause command.

After performing the functions for invoking the pause-command execution, the M2M Server may send a Request to the M2M Device and/or M2M GW so as to invoke the pause-command execution at such the M2M Device and/or M2M GW. The Request may include the non-RESTful-pause command. The Request may also include any of the mapped attributes, parameters and arguments for performing the non-RESTful-pause command.

Responsive to the Request, the M2M Device and/or M2M GW may execute the non-RESTful-pause command. The M2M Device and/or M2M GW may send a Command-execution Response. This Command-execution Response may include results, if any. The M2M Server may extract and store the results in the execResult sub-resource of the resource <requestInstance> for later retrieval. Alternatively and/or additionally, the M2M Server may send the results in a NA Response. After obtaining the results, if any, the NA may process them.

The Command-execution Response may also include an indication (e.g., a code) to indicate whether the M2M Device and/or M2M GW successfully performed the pause-command execution of non-RESTful-pause command or failed to perform the pause-command execution of the non-RESTful-pause command. The indication may be one value to indicate of successful pause-command execution, and another value to indicate failure. Alternatively, the Response may include a first indication (e.g., a code) to indicate that the M2M Device and/or M2M GW successfully performed the pause-command execution, and a second indication (e.g., a code) to indicate the M2M Device and/or M2M GW failed to perform the pause-command execution. As another alternative, the M2M Device and/or M2M GW may only issue the Command-execution Response if the M2M Device and/or M2M GW successfully performed the pause-command execution.

Although not shown, the M2M Server may delete the resource <requestInstance> when the M2M Device and/or M2M GW fail to perform the pause-command execution of the non-RESTful command. The M2M Server may also delete the server <command> and/or one or more of the server <commands> in response to being informed that the M2M Device and/or M2M GW failed to perform the pause-command execution of the non-RESTful-pause command.

FIGS. 29M and 29N are flow diagrams illustrating example message flows for updating a resource-command structure, such as the server <command>, to invoke a change in state of a command execution of a non-RESTful command. To initiate the update, the NA (i.e., the issuer) may issue a RESTful method UPDATE to the M2M Server. This RESTful method UPDATE may include the <requestInstance> identifier along with specifying the sub-resource execResume (e.g., . . . /<command>/exec-Resume). Alternatively, the RESTful method UPDATE may include the execResume identifier obtained via a Response sent from the M2M Server (FIG. 29M) or after retrieving it from the attributes of the resource <requestInstance> (FIG. 29N).

Responsive to this RESTful method UPDATE, the M2M Server may send an ACK/NACK message (shown as a Response) to the issuer for acknowledging receipt of the RESTful method UPDATE. No receipt of the ACK/NACK message by the issuer (e.g., within a certain time) may indicate non-acknowledgement of the RESTful method UPDATE by the M2M Server.

The M2M Server may then invoke a resume-command execution of the non-RESTful command in accordance with the attributes and/or sub-resources of the server <command>. The M2M Server may perform, as part of invoking the resume-command execution, a number of functions. These functions may include, for example, converting or translating the resume-command execution, as identified by in the resource <requestInstance>, into a non-RESTful command for invoking a resume-command execution of a paused non-RESTful command ("non-RESTful-resume command"). The functions may also include functions for preparing mapped attributes, parameters and/or arguments between the command identified by in the resource <requestInstance> and the non-RESTful-resume command.

After performing the functions for invoking the resume-command execution, the M2M Server may send a Request to the M2M Device and/or M2M GW so as to invoke the resume-command execution at such the M2M Device and/or M2M GW. The Request may include the non-RESTful-resume command. The Request may also include any of the mapped attributes, parameters and arguments for performing the non-RESTful-resume command.

Responsive to the Request, the M2M Device and/or M2M GW may execute the non-RESTful-resume command. The M2M Device and/or M2M GW may send a Command-execution Response. This Command-execution Response may include results, if any. The M2M Server may extract and store the results in the execResult sub-resource of the resource <requestInstance> for later retrieval. Alternatively and/or additionally, the M2M Server may send the results in a NA Response. After obtaining the results, if any, the NA may process them.

The Command-execution Response may also include an indication (e.g., a code) to indicate whether the M2M Device and/or M2M GW successfully performed the resume-command execution of non-RESTful-resume command or failed to perform the resume-command execution of the non-RESTful-resume command. The indication may be one value to indicate of successful resume-command execution and another value to indicate failure. Alternatively, the Response may include a first indication (e.g., a code) to indicate that the M2M Device and/or M2M GW successfully performed the resume-command execution, and a second indication (e.g., a code) to indicate the M2M Device and/or M2M GW failed to perform the resume-command execution. As another alternative, the M2M Device and/or M2M GW may only issue the Command-execution Response if the M2M Device and/or M2M GW successfully performed the resume-command execution.

Although not shown, the M2M Server may delete the resource <requestInstance> when the M2M Device and/or M2M GW fail to perform the resume-command execution of the non-RESTful command. The M2M Server may also delete the server <command> and/or one or more of the server <commands> in response to being informed that the M2M Device and/or M2M GW failed to perform the resume-command execution of the non-RESTful-pause command.

Referring now to FIG. 29O, a message flow diagram illustrating example message flow for updating a resource-command structure, such as the <requestInstance>, with information for use in performing the non-RESTful command is shown. Like the messages flow of FIG. 29D, the message flow of FIG. 29O may use the RESTful method UPDATE to populate elements of a resource-command structure, such as the <requestInstance>, with information (e.g., any of an attribute, parameter and/or argument) that may be used in to perform the non-RESTful command.

As shown, the NA (i.e., the issuer) may issue a RESTful method UPDATE to the M2M Server initiate the update. The RESTful method UPDATE may include the <requestInstance> identifier and the information (e.g., attributes, parameters and/or arguments) for populating the attributes and/or sub-resources of the <requestInstance> with such information.

After receipt of the RESTful method UPDATE, the M2M Server locate the <requestInstance> using the <requestInstance> identifier. The M2M Server may thereafter populate the attributes and/or sub-resources of such <requestInstance> with the information provided. If information for populating any given attribute and/or sub-resource is not provided, then the M2M server may leave such attribute and/or sub-resource as initially created (e.g., blank or with default attributes and/or parameters) or last modified.

In response to the RESTful method UPDATE, the M2M Server may send a Response to the issuer. The M2M Server may send the Response after updating the <requestInstance>, as shown. Alternatively, the M2M Server may send the Response during the update of the <requestInstance>. The M2M Server may also send an ACK/NACK message (not shown) to the issuer for acknowledging receipt of the RESTful method UPDATE. No receipt of the ACK/NACK message by the issuer (e.g., within a certain time) may indicate non-acknowledgement of the RESTful method UPDATE by the M2M Server.

The Response may include an indication (e.g., a code) to indicate whether the M2M Server successfully updated or failed to update the <requestInstance>. The indication may be one value to indicate of successful update and another value to indicate failure. Alternatively, the Response may include a first indication (e.g., a code) to indicate that the M2M Server successfully updated the <requestInstance>, and a second indication (e.g., a code) to indicate failure to update the <requestInstance>. As another alternative, the M2M Server may only issue the Response if the M2M Server successfully updated the <requestInstance>.

The Response may also include the <requestInstance> identifier and/or the attributes and/or sub-resources updated. The Response may further include the information that was used to update the attributes and/or sub-resources or confirmation indicative of the same.

FIG. 29P is a message flow diagram illustrating example message flow for retrieving information from a resource-command structure, such as the <requestInstance>. To initiate retrieval, the NA (i.e., the issuer) issues a RESTful method RETRIEVE to the M2M Server. The RESTful method RETRIEVE may include the <requestInstance> identifier.

After receipt of the RESTful method RETRIEVE, the M2M Server may use the <requestInstance> identifier to locate the <requestInstance>. Once located, the M2M Server may query and obtain retrievable information (e.g., attributes, parameters and/or arguments) from the attributes and/or sub-resources of the <requestInstance> having such retrievable information (hereinafter "retrieved-attribute information" and/or "retrieved-sub-resource information"). The retrieved-attribute and/or retrieved-sub-resource information may include, for example, any of the stored exec-Disable, execPause and execResume identifiers and/or any of the information from other attributes and/or sub-resources, such as execStatus and execResults.

After obtaining the retrieved-attribute and/or retrieved-sub-resource information, the M2M Server may send a Response to the NA. This Response may include the <requestInstance> identifier and the retrieved-attribute and/or retrieved-sub-resource information.

As an alternative, the RESTful method RETRIEVE may be used to retrieve one or more select portions of the retrievable information from the attributes and/or sub-resources of the <requestInstance> having such retrievable information. To facilitate this, the RESTful method RETRIEVE may include an identifier of each node assigned to the attributes and/or sub-resources of the server <command> having the select portions of the retrievable information. Using the identifier (or identifiers, if more than one), the M2M Server may locate, query and obtain the selected retrieved-attribute and/or retrieved-sub-resource information. The M2M Server may then send to the NA a Response that includes the selected retrieved-attribute and/or retrieved-sub-resource information.

Although not shown, the M2M Server may also send an ACK/NACK message to the issuer for acknowledging receipt of the RESTful method RETRIEVE. No receipt of the ACK/NACK message by the issuer (e.g., within a certain time) may indicate non-acknowledgement of the RESTful method RETRIEVE by the M2M Server.

FIG. 29Q is a message flow diagram illustrating example message flow for deleting a resource-command structure, such as the <requestInstance>. To initiate the delete, an issuer may issue a RESTful method DELETE to the M2M Server. The issuer may be the NA, M2M Device or M2M GW. The M2M Device and/or the M2M GW may issue the RESTful method DELETE in response to a reboot, cancellation of the non-RESTful command, de-registration, etc.

The RESTful method DELETE may include the <requestInstance> identifier. Alternatively, the RESTful method DELETE may include an identifier of a node assigned to a resource (e.g., the <requestInstances>) under which the collection of <requestInstance> instances have been created (hereinafter "<requestInstances> identifier").

After receipt of the RESTful method DELETE, the M2M Server may use the <requestInstance> identifier or <requestInstances> identifier to locate and delete the <requestInstance> or <requestInstances>, respectively. This may include deleting all attributes and/or sub-resources of the <requestInstance> or, for the <requestInstances>, each <requestInstance> of such <requestInstances>.

In response to the RESTful method DELETE, the M2M Server may send a Response to the issuer. The M2M Server may send the Response after deleting the <requestInstance> or the <requestInstances>, as shown. Alternatively, the M2M Server may send the Response during deletion of the <requestInstance> or the <requestInstances>. The M2M Server may also send an ACK/NACK message (not shown) to the issuer for acknowledging receipt of the RESTful method DELETE. No receipt of the ACK/NACK message by the issuer (e.g., within a certain time) may indicate non-acknowledgement of the RESTful method DELETE by the M2M Server.

The Response may include an indication (e.g., a code) to indicate whether the M2M Server successfully deleted or failed to delete the <requestInstance> or the <requestInstances>. The indication may be one value to indicate of successful deletion and another value to indicate failure. Alternatively, the Response may include a first indication (e.g., a code) to indicate that the M2M Server successfully deleted the <requestInstance> or the <requestInstances>, and a second indication (e.g., a code) to indicate failure to delete the <requestInstance> or the <requestInstances>. As another alternative, the M2M Server may only issue the Response if the M2M Server successfully deleted the <requestInstance> or the <requestInstances>.

Referring now to FIG. 29R a message flow diagram illustrating example message flow for deleting a resource-command structure, such as the server <command>, server <commands> and/or <requestInstance>, is shown. The message flow of FIG. 29R is similar to a combination of the message flow of FIG. 29C and the message flow of FIG. 29I (or FIG. 29J) or a combination of the message flow of FIG. 29Q and the message flow of FIG. 29I (or FIG. 29J). As shown, when an issuer issues a RESTful method DELETE to the M2M server, the M2M Server determines if any <requestInstance> is being used for a command execution or a pause-command execution, then the M2M Server may carry out a cancel-command execution of such <requestInstance> prior to deleting it. The M2M Server may carry out the cancel-command execution in accordance with the message flow of FIG. 29I or FIG. 29J.

In addition to the foregoing, the M2M Server) may create and/or delete a server <command> or another resource-commands structure without being issued RESTful method CREATE or a RESTful method DELETE.

Example Gateway-Based Machine-to-Machine ("M2M") Device Management

Figure 30A:
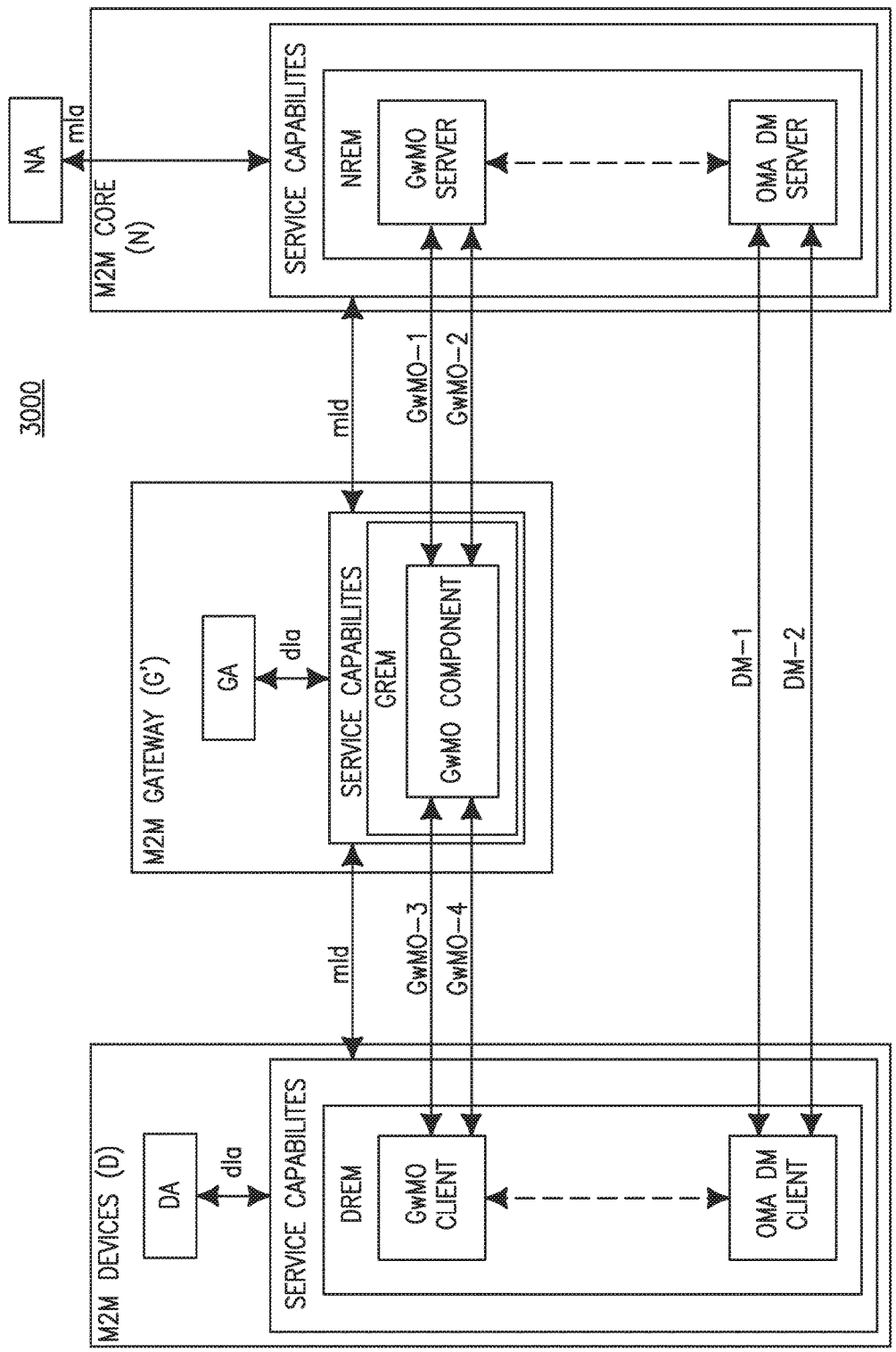
FIG. 30A is a block diagram illustrating an example architecture for managing D-type ETSI M2M Devices via an M2M GW (G') by leveraging OMA GwMO "transparent" mode.

In accordance an embodiment, FIG. 30A illustrates an example architecture for managing D-type ETSI M2M Devices via an M2M GW (G') by leveraging OMA GwMO "transparent" mode. Referring to FIG. 30A, NREM uses GwMO-specific interfaces and components to get device information from GREM, which in turn talks to DREM via GwMO interfaces in order to perform this task. Then, NREM may talk to DREM directly using OMA DM protocol—a client-server interaction model for message exchanging. It is noted that in "transparent" mode, GREM does not need to support OMA DM protocol order to manage devices.

Figure 30B:
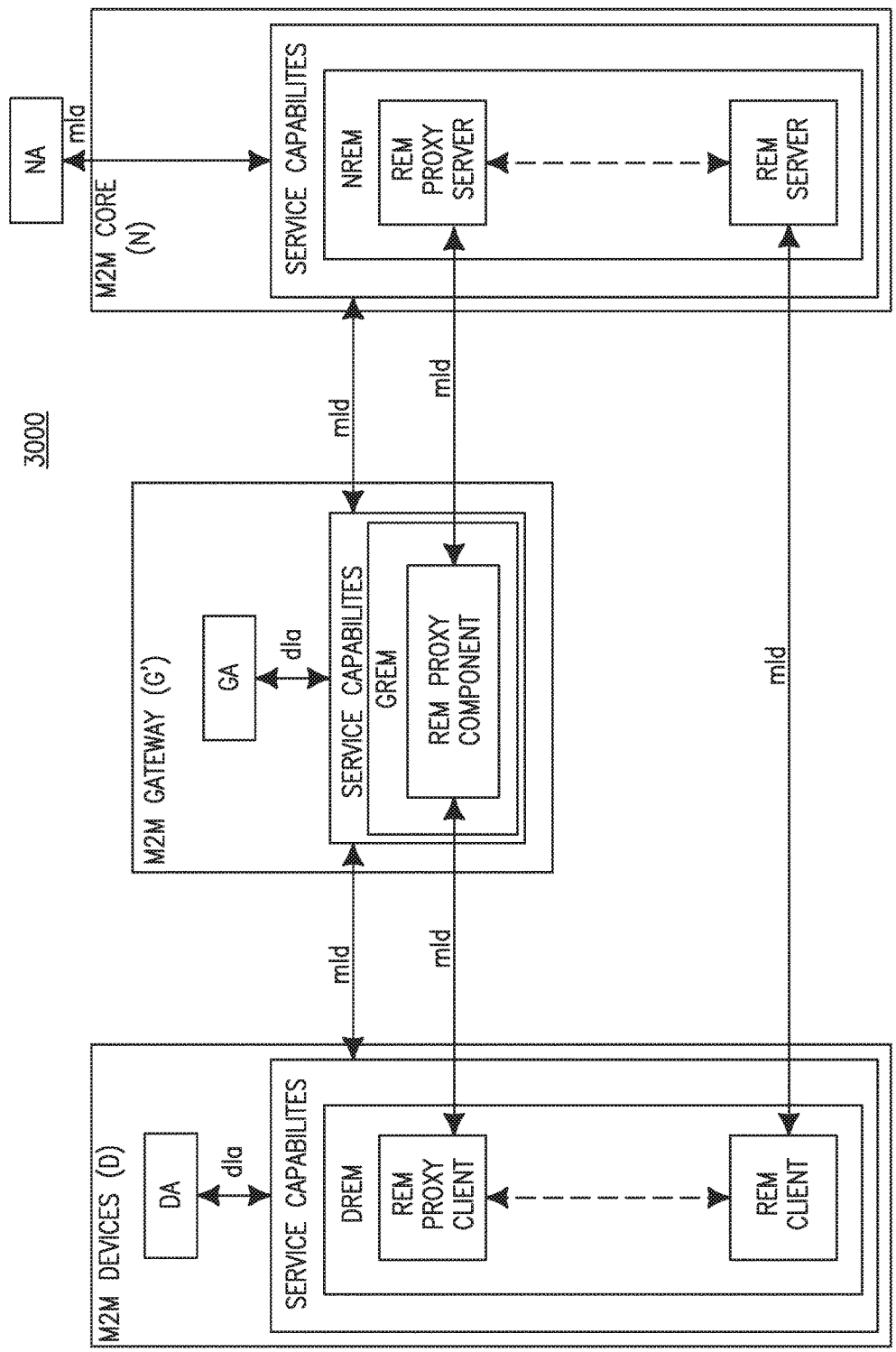
FIG. 30B is a block diagram illustrating an example architecture of ETSI M2M xREM.

In accordance with an embodiment, FIG. 30B illustrates an example architecture of ETSI M2M xREM. Referring to FIG. 30B, xREM is split into functional sub-modules. For example, an REM server plays server role in device management (like a DM Server in OMA DM or ACS). An REM client plays a client role in device management (like a DM client in OMA DM or CPE). An REM proxy component sits only in GREM talking to a REM proxy server (in a NREM) and a REM proxy client (in a DREM), respectively. An REM proxy server sits in a NREM used to talk to a REM proxy component to get the information of devices behind a GW. An REM proxy client sits in a DREM used to make responses to a REM proxy component to report device information to the GW, which eventually is forwarded to a NREM.

Figure 31A:
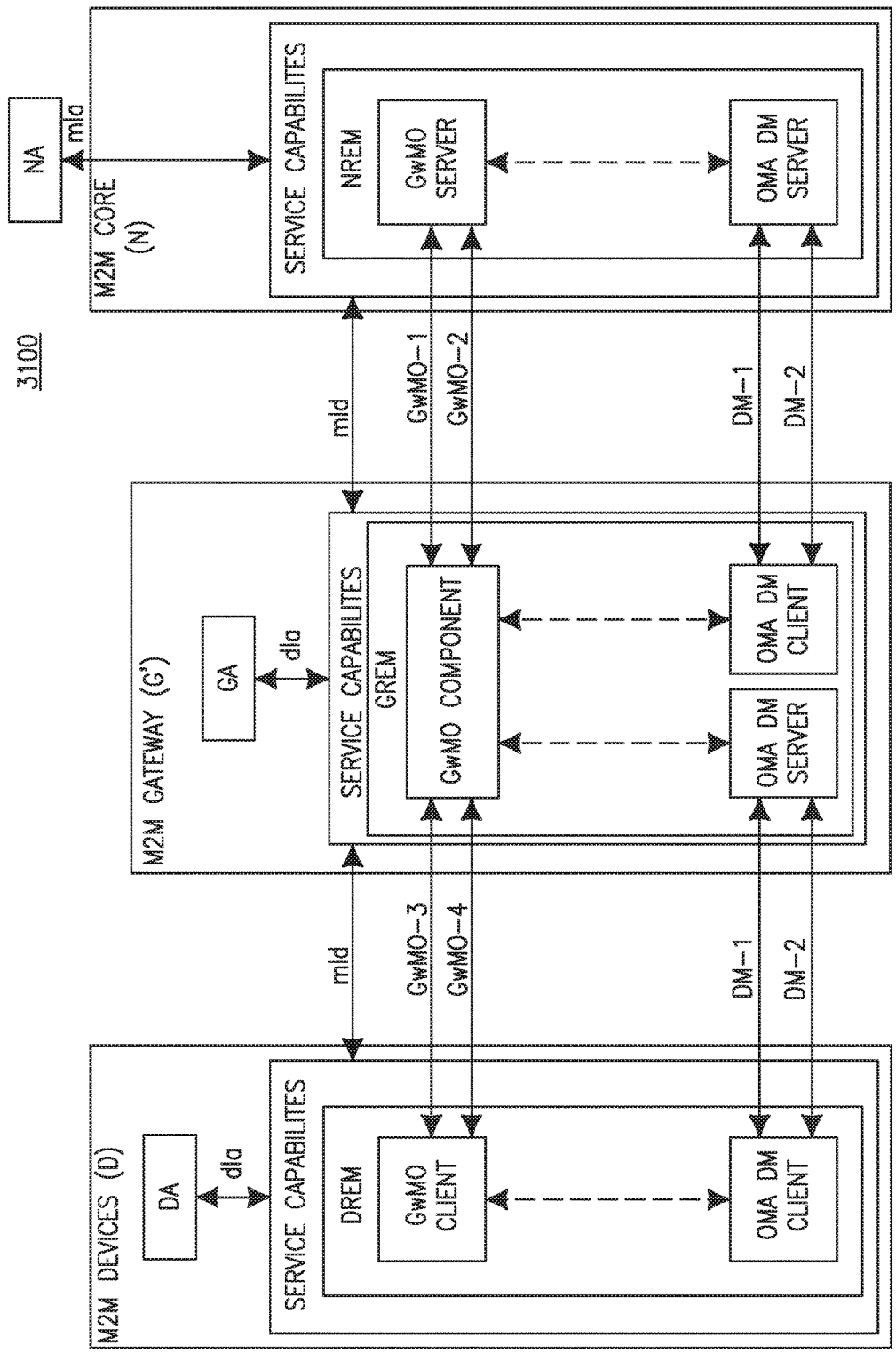
FIG. 31A is a block diagram illustrating an example architecture for leveraging OMA GwMO1.0.
Figure 31B:
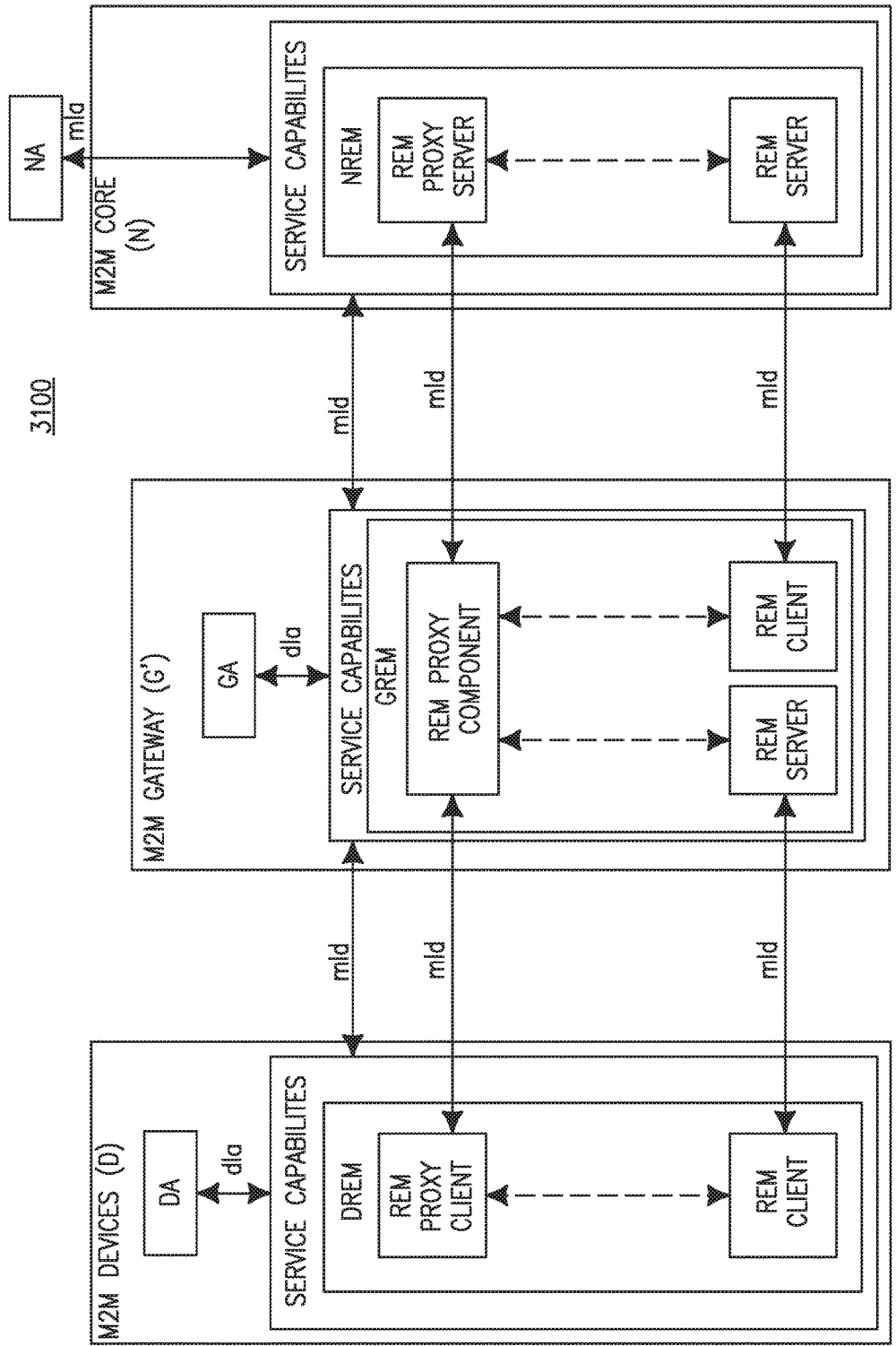
FIG. 31B is a block diagram illustrating an example architecture of xREM.

In a proxy mode, the M2M GW may act like a "man-in-the-middle". It can support both GwMO and DM client and DM server as shown in FIG. 31A, which illustrates an example architecture for leveraging OMA GwMO1.0. In this mode, NREM does not communicate with DREM directly, and instead communications are translated and relayed by GREM. To DREM, GREM looks like a server; to NREM, GREM behaves like a client. This mode adds more features and functionalities to the M2M GW. Exemplary benefits include more value-added services such as command fan-out and response aggregation, and in turn lower traffic load in the M2M core and more efficient for managing constrained M2M devices especially sleeping nodes. FIG. 31B depicts an example architecture of xREM for this mode.

Figure 32A:
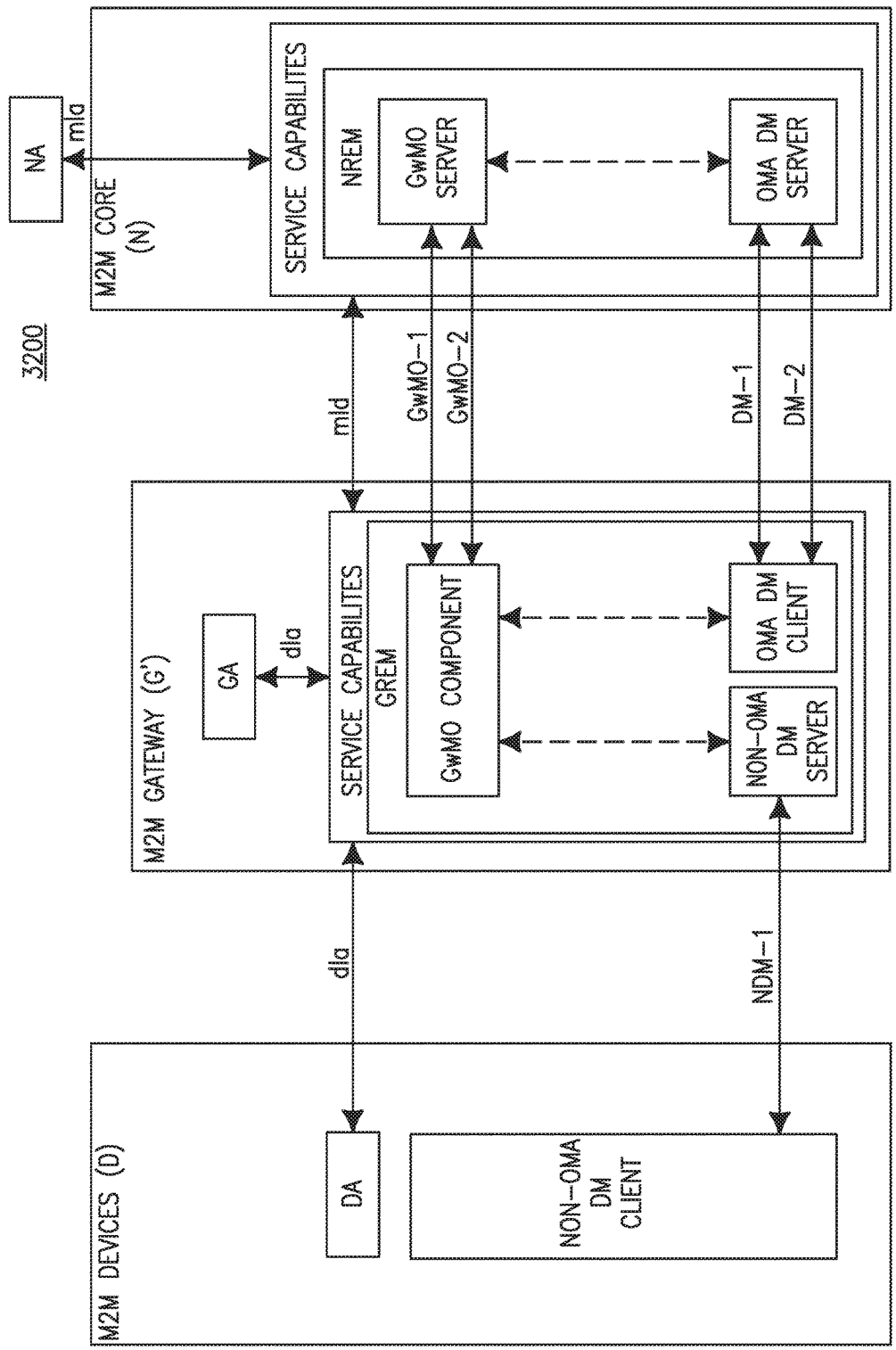
FIG. 32A is a block diagram illustrating an example architecture for leveraging OMA GwMO1.0.
Figure 32B:
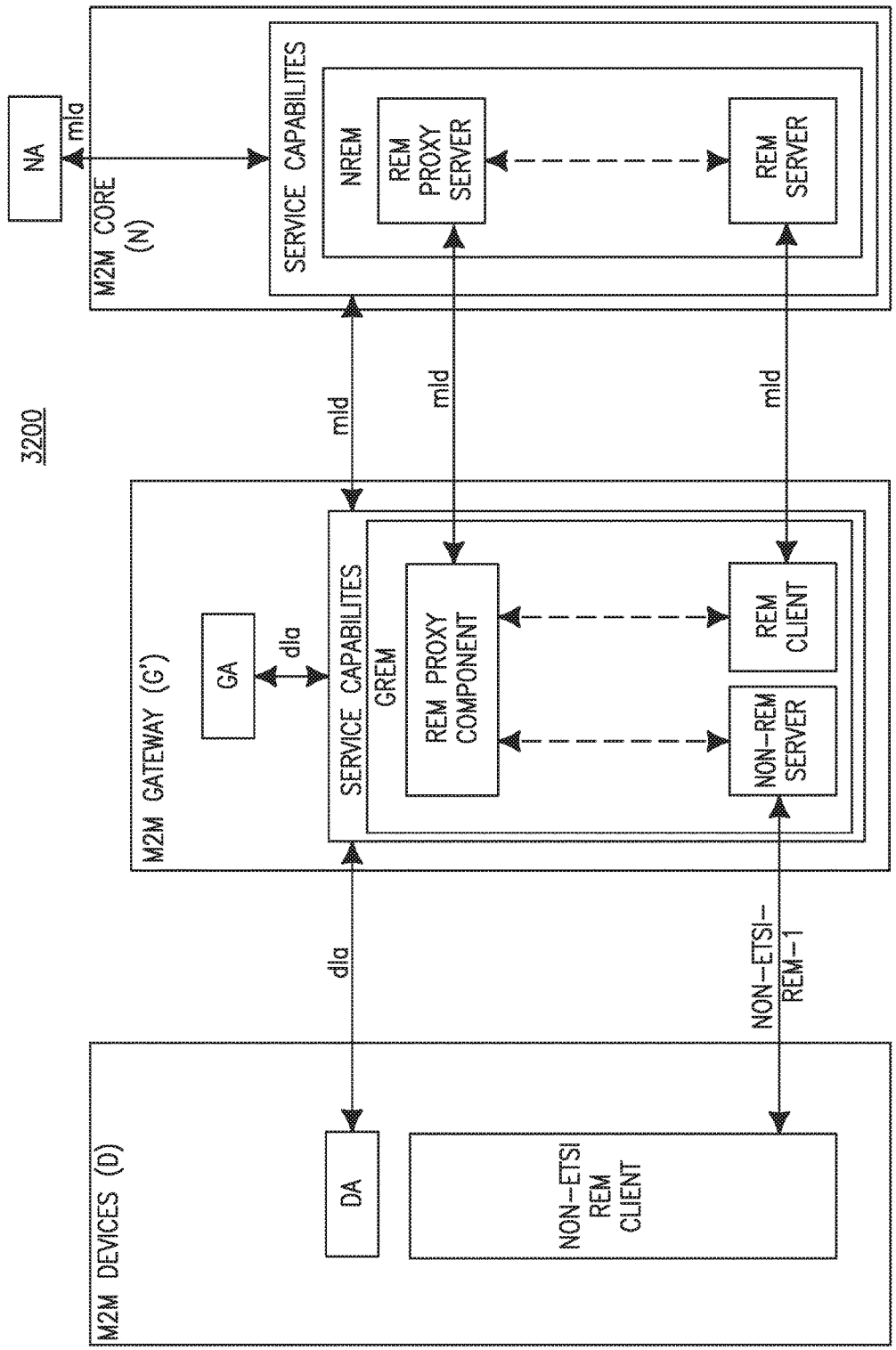
FIG. 32B is a block diagram illustrating an example an architecture of ETSI M2M xREM.

In accordance an embodiment, the M2M devices (D') may not have ETSI M2M service capabilities. It may be assumed that they do not have OMA DM client functionalities, but other non-OMA device management protocols. As a result, the M2M GW may adopt an "adaptation" mode to translate between OMA protocol and other management protocols. FIG. 32A illustrates an example architecture for leveraging OMA GwMO1.0. FIG. 32B illustrates an example architecture of ETSI M2M xREM. Compared to "proxy" mode, some non-OMA management protocols, such as SNMP, be utilized for interactions between the M2M GW and M2M devices over either dIa interface or another NDM-1 interface. It is noted that the protocol translation refers to not only management commands mapping/translating, but also management tree structure (or resource) mapping/translating, and the like. If D'-type devices indeed have OMA DM Client functionalities, "transparent" and "proxy" mode can be applied as well.

Figure 33A:
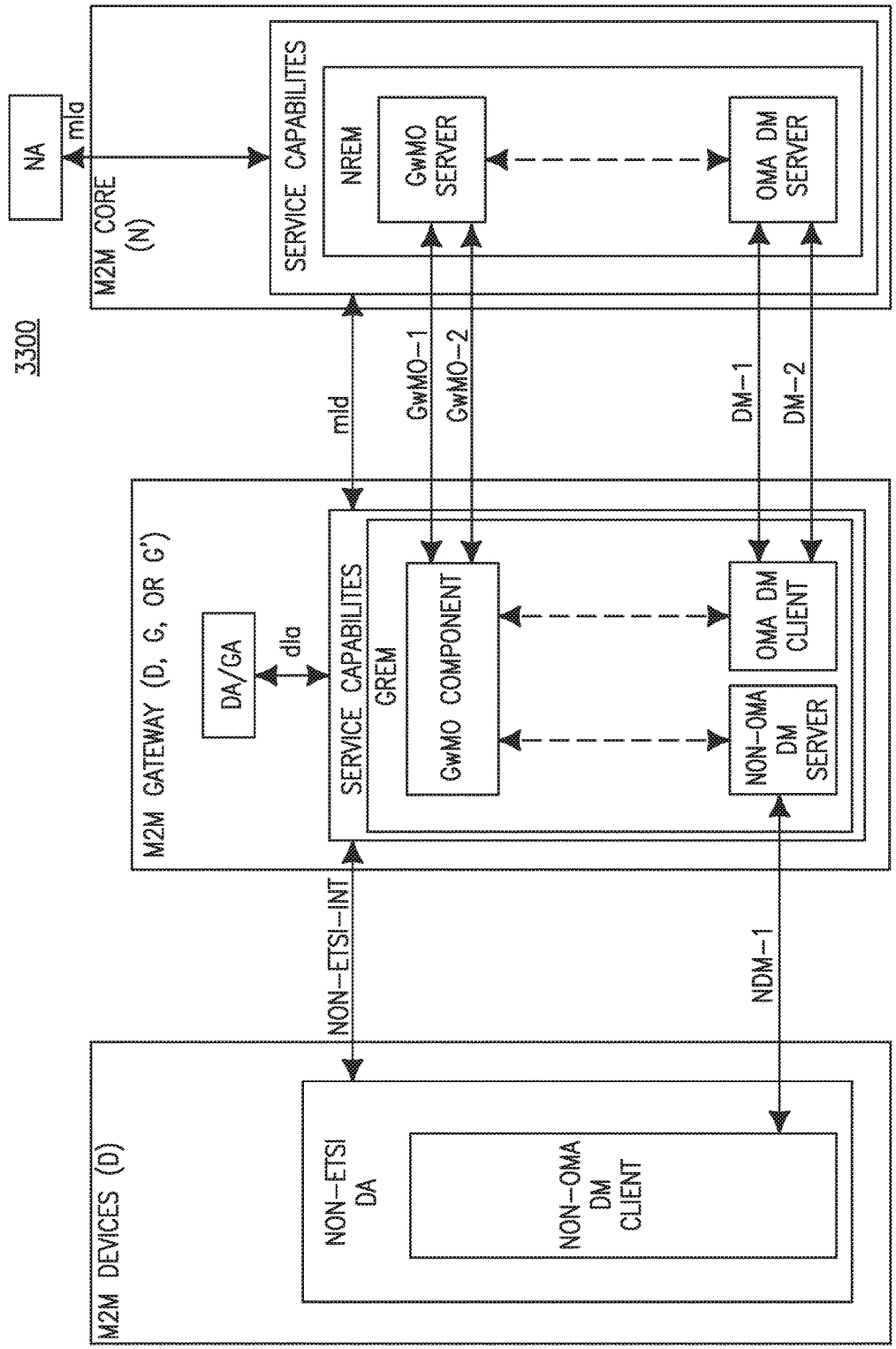
FIG. 33A is a block diagram illustrating an example architecture for leveraging OMA GwMO1.0.
Figure 33B:
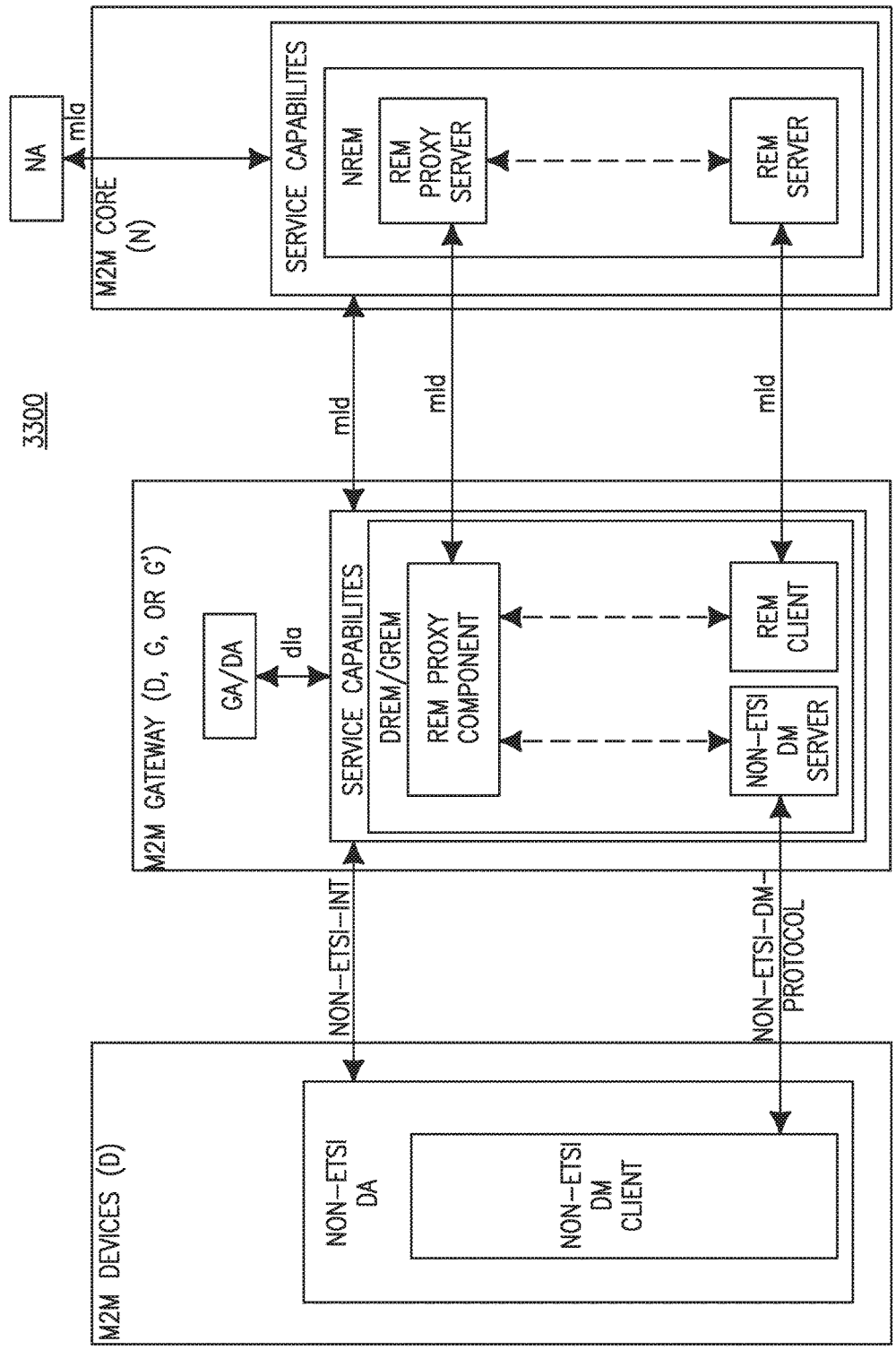
FIG. 33B is a block diagram illustrating an example architecture of ETSI M2M xREM according to embodiments of the present disclosure.

In accordance with an embodiment, it may be assumed that the d-type non-ETSI M2M devices may use different management protocols. As a result, the M2M GW may use an "adaptation" mode to manage them. The architecture shown in FIGS. 33A and 33B is similar to that in FIGS. 32A and 32B. It is noted that d-type device may be non-ETSI M2M GW such as ZigBee coordinators, through which non-ETSI M2M area networks can be connected together using and accessing ETSI M2M service capabilities.

Figure 34:
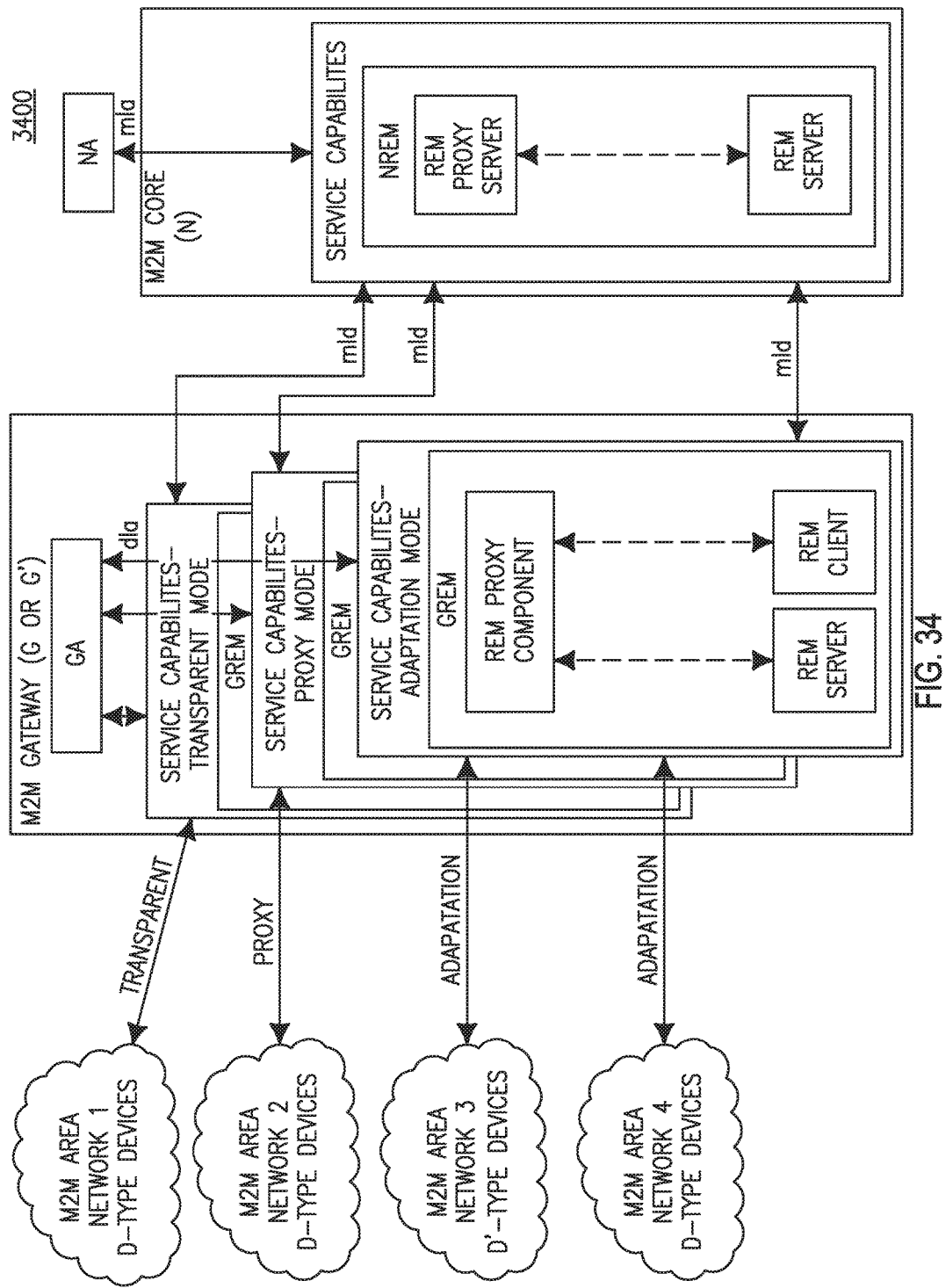
FIG. 34 is a block diagram illustrating an example of a GW-based device management leveraging OMA GwMO.

In an embodiment, FIG. 34 illustrates a diagram of GW-based device management leveraging OMA GwMO. As shown in FIG. 34, a single M2M GW can connect multiple M2M area networks with different types of M2M devices. The M2M GW can impose transparent, proxy, or adaptation management mode for different area networks.

Figure 35:
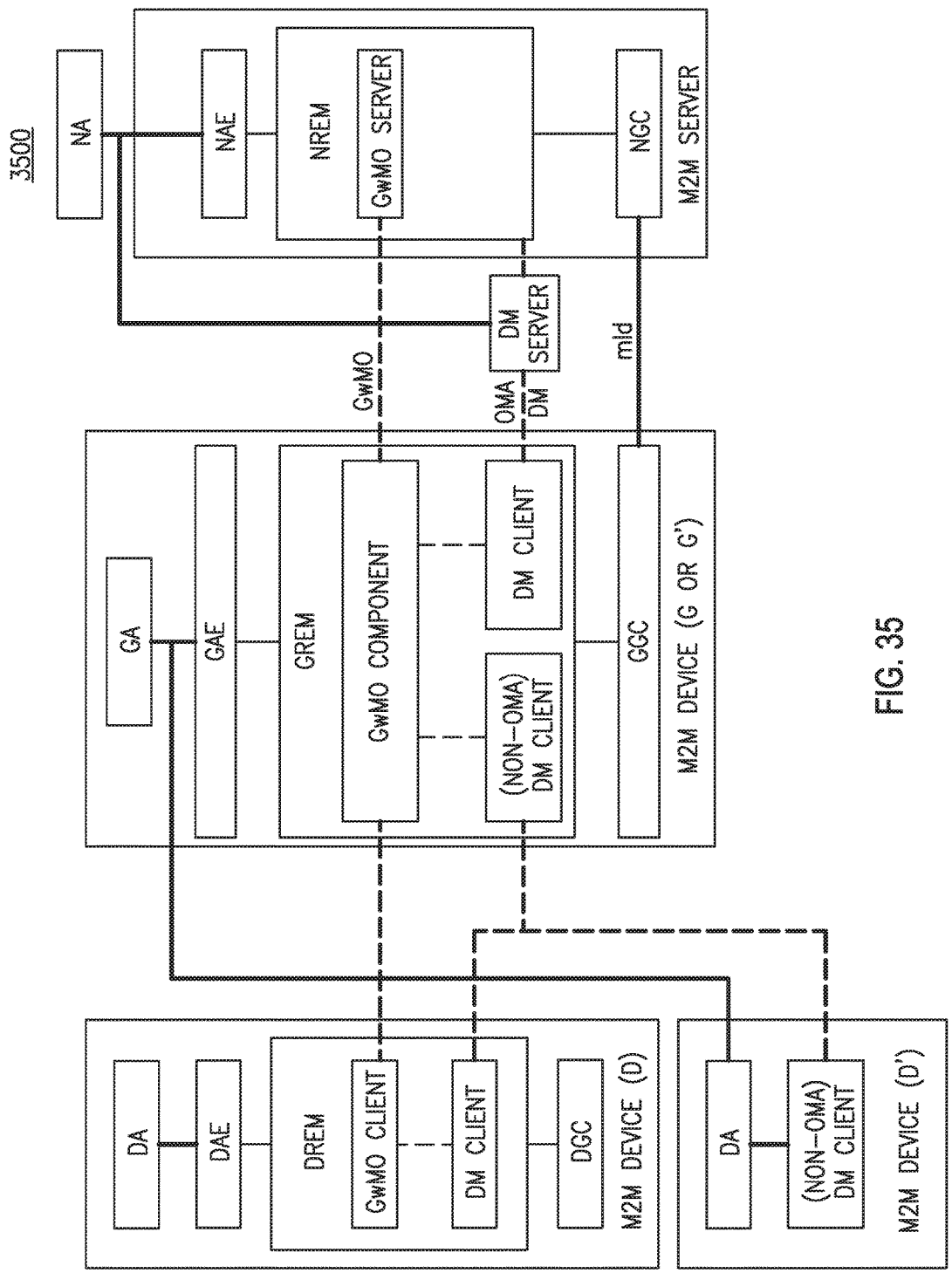
FIG. 35 is a block diagram illustrating an example architecture for partially tight integration of OMA DM and M2M GW.
Figure 36:
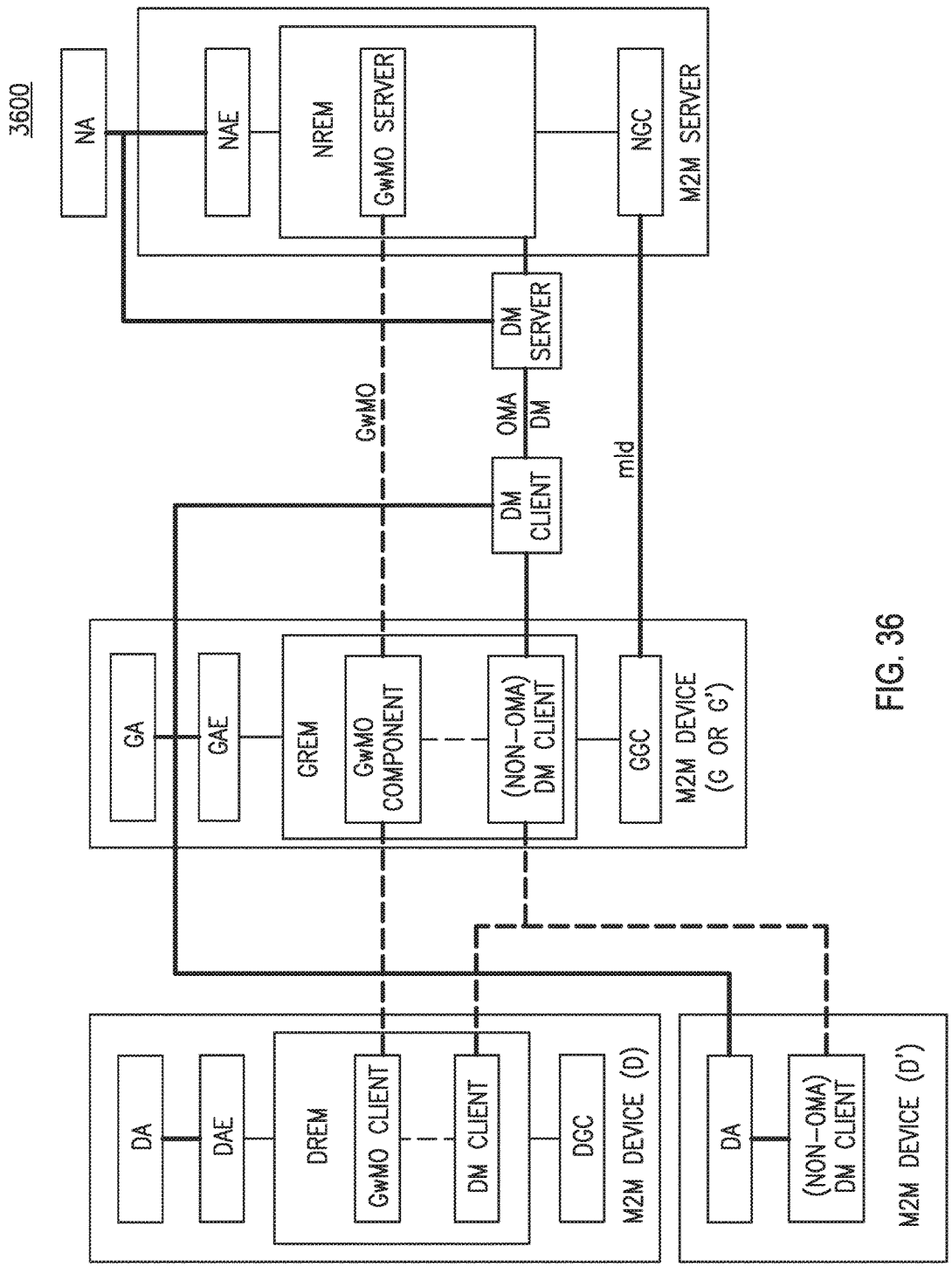
FIG. 36 is a block diagram illustrating an example architecture for loose integration of OMA DM and M2M GW.

In all of the FIGS. 30-34, extra OMA GwMO and DM logical entities (such as OMA DM Server) are not necessarily a part of xREM; but instead, could be separate entities outside of xREM. The architecture disclosed herein, however, may be applied as well. For example, FIG. 35 illustrates an example architecture for partially tight integration of OMA DM and M2M GW. FIG. 36 illustrates an example architecture for loose integration of OMA DM and M2M GW.

Example Data Model for Managing M2M Area Networks And M2M Devices Behind The M2m Gateway As described in more detail below, management objects (MO) for managing machine-to-machine communications (M2M) area networks and M2M devices behind the M2M Gateway. M2M area network management may provide the functionalities, such as device inventory and configuration management, area network configuration management, area network performance management, and group management of devices. This may include applications (A), M2M direct devices (D), M2M local devices (d-type, D'-type, or D-type devices), and M2M Gateway (G).

Management objects (MOs) may be defined to manage M2M area networks by an M2M gateway. One such MO may be an etsiAreaNwkInfo resource, which may be a management object for area network information and configuration. Another MO may be etsiAreaNwkDeviceInventory resource, which may be a MO for M2M local device inventory. A management object for M2M local device groups may be etsiAreaNwkDeviceGroups resource, for example. A management object for operating a group of M2M local devices may be any of an etsiGroupMgmtOperations and an etsiAreaNwkGroupOperations, and a management objects resource for sensors integrated into a M2M device may be an etsiSensors resource.

The MOs may be organized and/or placed at different subordination levels. For example, the MOs may be a sub-resource of the same placeholder somewhere under a <sclBase-of-Server>/scls/<GSCL> at the M2M server. By way of example, an mgmtObjs sub-resource under a <sclBase-of-Server>/scls/<GSCL>/attachedDevices may be created for managing attached devices behind a M2M gateway as a whole. The MOs may be placed under a <sclBase-of- Server>/scls/<GSCL>/attachedDevices/mgmtObjs, for example. An MO may be a sub-resource of another MO. For example, etsiSensors may be a sub-source of a <deviceInventory>, which may be a sub-resource of etsiAreaNwkDeviceInventory.

As shown in FIG. 37, the MO for area network information and configuration, etsiAreaNwkInfo, may include one or more attributes and a plurality of sub-resources, such as a subscriptions collection and a <areaNwkInstance>. The <areaNwkInstance> may be an instance of M2M area network. The attributes of the etsiAreaNwkInfo may include, for example, an expirationTime, an accessRightID, a searchStrings, a creationTime, a lastModifiedTime, a contentType, a moID, an originalMO, a numOfAreaNwks, and a description. The numOfAreaNwks attribute may be representative of a number of M2M area networks. The description attribute may be a text-format description of mgmtObj. The attributes (and/or variables) may conform to ETSI M2M TS 102 690. As an alternative, the attributes and/or the subscriptions collection may include, maintain and/or store the expirationTime, accessRightID, searchStrings, creationTime, lastModifiedTime, contentType, moID, originalMO, numOfAreaNwks, and the description.

As shown in FIG. 38A, the <areaNwkInstance> sub-resource of an etsiAreaNwkInfo resource may include one or more attributes and a plurality of sub-resources. The <areaNwkInstance> sub-resource may include (i) an areaNwkID attribute to house an identity of the M2M area networks, (ii) an areaNwkType attribute to specify a type of the M2M area networks, e.g., a Bluetooth/6LoWPAN, 802.15.4/6LoWPAN, Wi-Fi network, (iii) a workingChannelFrequency attribute to specify a working channel frequency of the M2M area network, and (iv) a addressMode attribute to specify a address mode of the M2M area network (e.g., IPv4, IPv6, Short MAC (medium access control), or Long MAC).

The plurality of sub-resources of the <areaNwkInstance> sub-resource may include a subscription collection, a <deviceInstance> sub-resource, an attachedDevices sub-resource, a groups sub-resource, a 6LoWPAN sub-resource, a Wi-Fi sub-resource, a RFID sub-resource, and a ZigBee sub-resource.

The <deviceInstance> sub-resource may include information for a single device in the area network instance. The attachedDevices sub-resource may be a placeholder for all attached devices to the area network, and the groups sub-resource may be a placeholder for defined device groups for group operations or operation fan-out. The 6LoWPAN sub-resource may be placeholder for containing parameters related to 6LoWPAN networks; as such information may be used when the area network is a 6LoWPAN network. The Wi-Fi sub-resource may be a placeholder for containing parameters related to Wi-Fi networks; as such information may be used when the area network is a Wi-Fi network. The RFID sub-resource may be placeholder for containing parameters related to RFID networks, as this information may be needed when the area network is a RFID network, and the ZigBee sub-resource may be a placeholder for containing parameters related to ZigBee networks, as such information may be needed when the area network is a ZigBee network. Extensions may also be included as a sub-resource and may provide the placeholder for extensions.

The attributes associated with <areaNwkInstance> sub-resource may include (i) a numOfDevices, which may represent the number of devices in the area network instance; (ii) a sleepinterval, which may represent the interval between two sleeps, (iii) a sleepDuration, which may represent a time duration of each sleep; (iv) a MTU, which may represent the maximum transmission unit in this area network <areaNwkInstance> sub-resource; and (v) a blockSize, which may represent a block size used in a IETF CoAP blockwise transmission. The blockSize may be helpful when the area network <areaNwkInstance> sub-resource supports constrained application protocols (CoAP protocol). The sleepinterval attribute may be used as a general time interval, through which, the M2M server can instruct M2M devices and/or M2M gateway to send back certain reports or responses periodically, such as every sleepinterval time unit, for example.

Figure 38B:
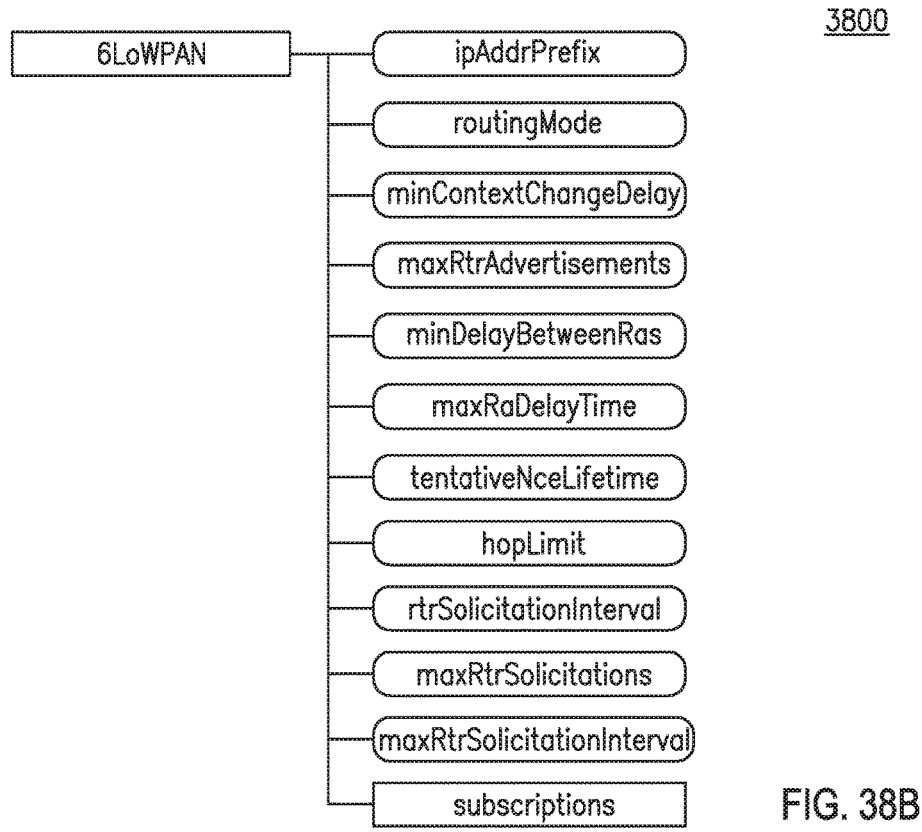
FIG. 38B is a block diagram illustrating an example resource structure for a sub-resource descriptions for 6LoW-PAN for the areaNwkInstance of FIG. 38A.

As shown in FIG. 38B, the 6LoWPAN sub-resource may have a subscriptions sub-resource, subscription and a plurality of attributes related to any of addressing, routing, and neighbor discovery in 6LoWPAN. The plurality of attributes may include (i) an ipAddrPrefix attribute for specifying an IP address prefix of the area network, and (ii) a routingMode attribute for specifying a routing mode of the M2M area network. For 6LoWPAN networks, the routingMode attribute may specify the routing mode to be mesh-under or route-over.

The plurality of attributes may also include (i) minContextChangeDelay attribute for specifying a minimum time for continuing to disseminate header compression context information in preparation for a change; (ii) a maxRtrAdvertisements attribute for storing and/or specifying a maximum number of unsolicited Router Advertisements to be sent, (iii) a minDelayBetweenRas attribute for specifying a minimum interval between two consecutive Router Advertisements sent to all-nodes multicast address, (iv) a maxRaDelayTime attribute for specifying a maximum delay for sending a Router Advertisement message as the responses to a received Router Solicitation message, (v) an entativeNceLifetime attribute for storing and providing a timer for tentative neighbor cache, (vii) a hopLimit attribute for storing and/or specifying a hop limit value for Duplicate Address Detection message, (viii) a rtrSolicitationInterval attribute for storing and/or specifying an interval for initial retransmission of the first maxRtrSolications Router Solicitations, (ix) a maxRtrSolicitations attribute for storing and/or specifying a number of initial retransmissions as defined by rtrSolicitationInterval, and (x) a maxRtrSolicitationInterval attribute for storing and/or specifying a maximum retransmission internal for Router Solicitations since the device may use binary exponential backoff after the initial retransmission. The hopLimit, rtrSolicitationInterval, maxRtrSolicitations and maxRtrSolicitationInterval attributes may be applicable to devices. Other parameters may be applicable to both devices and M2M gateway.

Figure 38C:
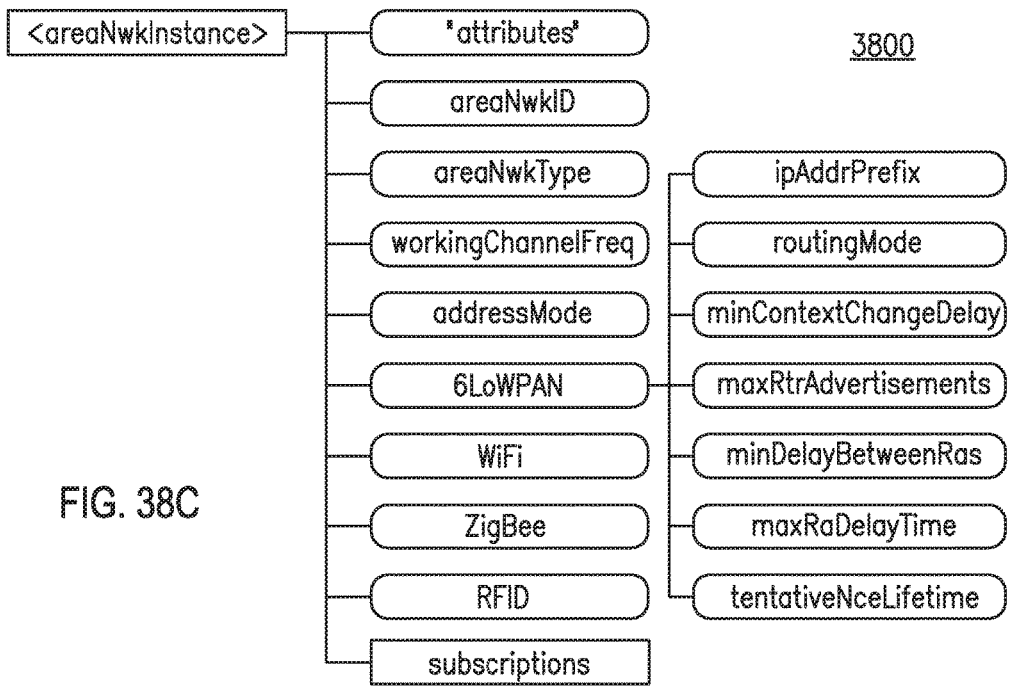
FIG. 38C is a block diagram illustrating an example resource structure for an areaNwkInstance.

As shown in FIG. 38C, a <areaNwkInstance> sub-resource of an etsiAreaNwkInfo resource may include one or more attributes and a subscriptions sub-resource. The <areaNwkInstance> sub-resource may include (i) an areaNwkID attribute to house an identity of the M2M area networks, (ii) an areaNwkType attribute to specify a type of the M2M area networks, e.g., a Bluetooth/6LoWPAN, 802.15.4/6LoWPAN, Wi-Fi network, (iii) a workingChannelFrequency attribute to specify a working channel frequency of the M2M area network, and (iv) a addressMode attribute to specify a address mode of the M2M area network (e.g., IPv4, IPv6, Short MAC (medium access control), or Long MAC), (v) a 6LoWPAN attribute, a Wi-Fi attribute, a RFID attribute, a ZigBee attribute.

The 6LoWPAN attribute may be placeholder for containing parameters related to 6LoWPAN networks, e.g., information that may be used when the area network is a 6LoWPAN network. The Wi-Fi attribute may be a placeholder for containing parameters related to Wi-Fi networks, e.g., information that may be used when the area network is a Wi-Fi network. The RFID attribute may be placeholder for containing parameters related to RFID networks, and the ZigBee attribute may be a placeholder for containing parameters related to ZigBee networks.

In addition the <areaNwkInstance> sub-resource may have more attributes related to a specific type of area network. For example, if M2M area network is a 6LoWPAN network, the <areaNwkInstance> sub-resource may include a number of attributes related to addressing, routing, and/or neighbor discovery in 6LoWPAN. The plurality of attributes may include (i) an ipAddrPrefix attribute, and (ii) a routingMode attribute; (iii) a minContextChangeDelay attribute; (iv) a maxRtrAdvertisements attribute; (vi) a minDelayBetweenRas attribute, (vii) a maxRaDelayTime attribute, (viii) an tentativeNceLifetime attribute, (ix) a hopLimit attribute, (x) a rtrSolicitationInterval attribute, (xi) a maxRtrSolicitations attribute for storing and/or specifying a number of initial retransmissions as defined by rtrSolicitationInterval, and (xii) a maxRtrSolicitationInterval attribute. The hopLimit, rtrSolicitationInterval, maxRtrSolicitations and maxRtrSolicitationInterval attributes may be applicable to devices. Other parameters may be applicable to both devices and M2M gateway.

Figure 39:
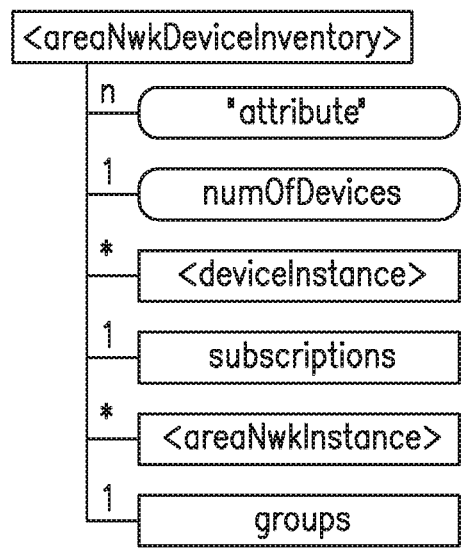
FIG. 39 is a block diagram illustrating an example resource structure for a etsiAreaNwkDeviceInventory.

As shown in FIG. 39, an etsiAreaNwkDeviceInventory MO may have sub-resources, including (i) a <deviceInstance> sub-resource, which may include a collection of individual <deviceInstance> information for each active device attached with a M2M gateway; (ii) a <areaNwkInstance> sub-resource, which may identify each area network; (iii) a groups sub-resource, which may provide a placeholder for defined device groups, and (iv) a subscriptions collection sub-resource. The subscriptions collection sub-resource may include attributes, such as expirationTime, accessRightID, searchStrings, creationTime, lastModifiedTime, contentType, which may be included in FSS format, moID, originalMO, a description (e.g., a text-format description of mgmtObj), and the number of devices attached with the M2M gateway numOfDevices.

The M2M area network under the same M2M gateway may correspond to a single etsiAreaNwkDeviceInventory sub-resource, or each area network may have its own etsiAreaNwkDeviceInventory sub-resource. The etsiAreaNwkDeviceInventory sub-resource may be subordinate to the etsiAreaNwkInfo sub-resource. As an alternative, the etsiAreaNwkDeviceInventory MO might not include the <areaNwkInstance> sub-resource and/or the groups sub-resource.

Figure 40A:
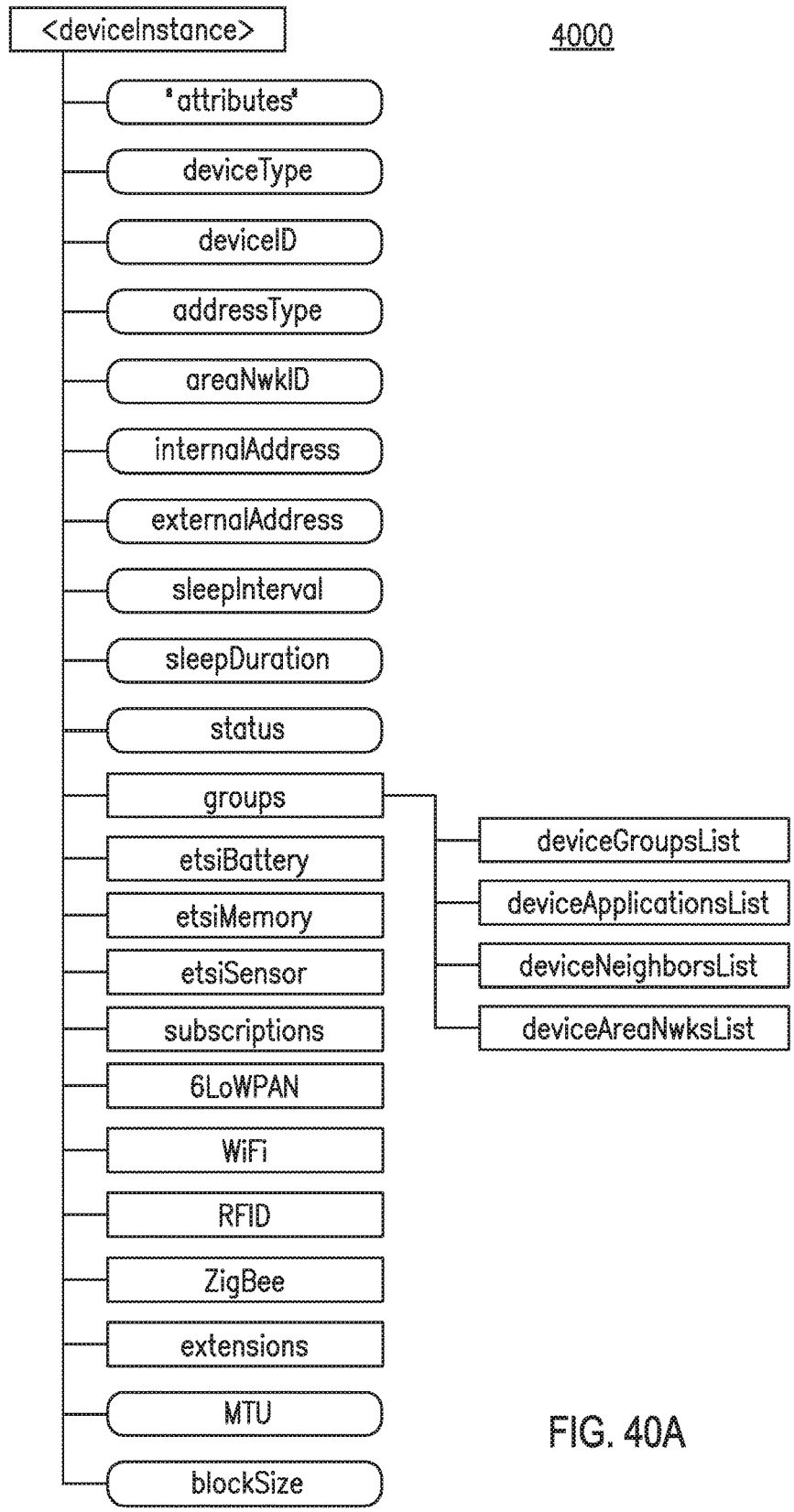
FIG. 40A is a block diagram illustrating an example resource structure for a deviceInstance.

As shown in FIG. 40A, each <deviceInstance> may include a list of identities of groups that the device belongs to, such as a deviceGroupsList, the group of application identities of all applications, such as D'A or DA, for example, on this device deviceApplicationsList, the list of identities of neighbor nodes deviceNeighborsList, battery info etsiBattery, memory information etsiMemory, and sensor/actuator information etsiSensor, 6LoWPAN, which may provide the placeholder for containing parameters related to 6LoWPAN networks, Wi-Fi, which may provide the placeholder for containing parameters related to Wi-Fi networks, RFID, which may provide the placeholder for containing parameters related to RFID networks, ZigBee, which may provide the placeholder for containing parameters related to ZigBee networks, and extensions, which may be the placeholder for extensions.

This group may provide the standard group resource, such as, for example, set forth in the ETSI TS 102 609. The <deviceInstance> may include attributes, such as deviceType, which may be the type of device; deviceID, which may be the device identifier; addressType, which may be the address type of the device; areaNwkID, which may include the identity of the M2M area network which the device belongs to; internal address, which may be the internal IP address of the device used insider the M2M area network; and external address, which may be the external IP address of the device used outside of the M2M area network. This address may contain port information if port number is used in address translation at M2M gateway. Further, the interval between two sleeps sleepinterval, the time duration of each sleep sleepDuration, the status of the device status, such as sleeping or awake, MTU, which may include the maximum transmission unit in the area network, and blockSize, which may include the block size used in the IETF CoAP blockwise transmission.

Figure 40B:
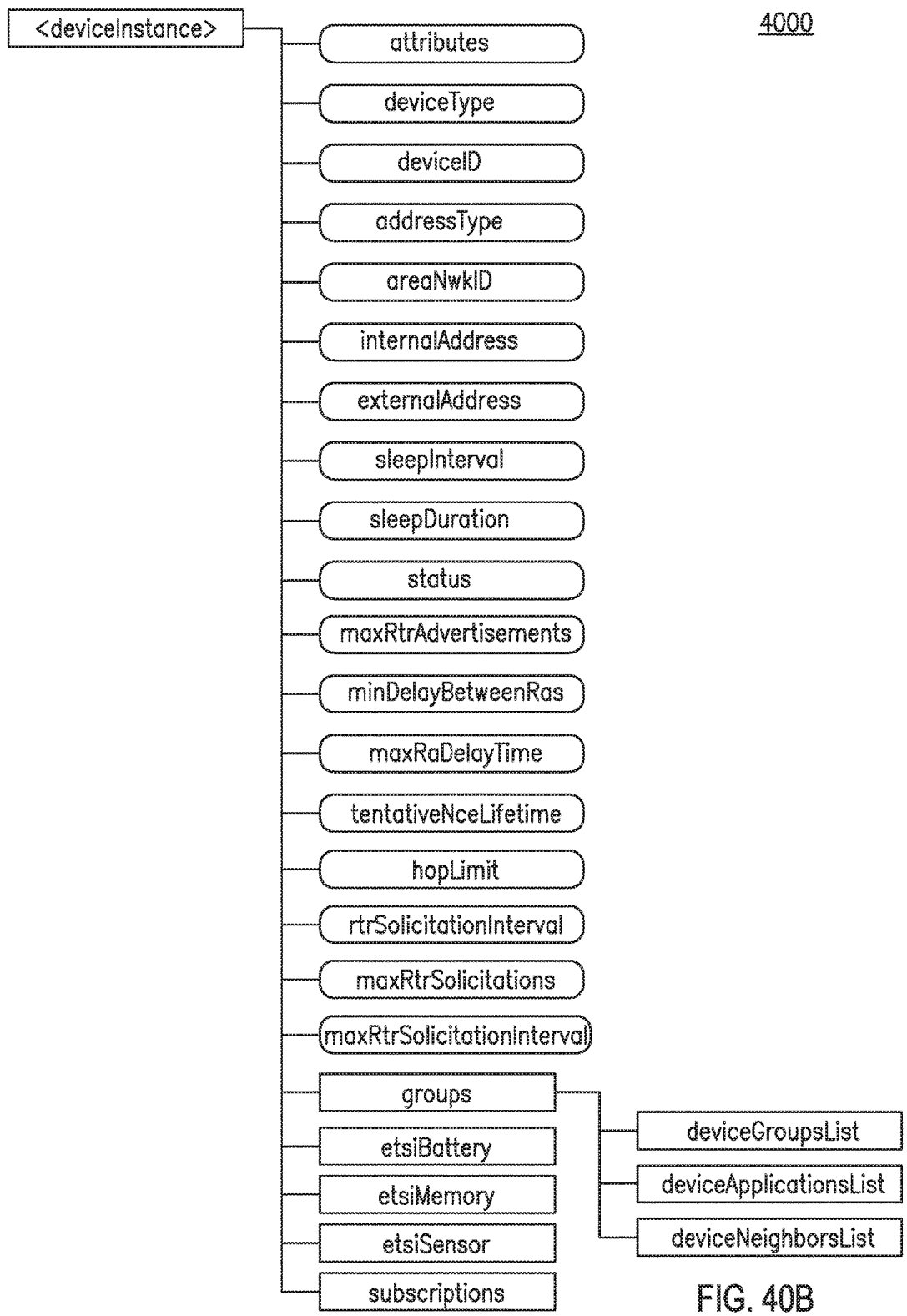
FIG. 40B is a block diagram illustrating an example resource structure for a deviceInstance.

As shown in FIG. 40B, each <deviceInstance> may include a list of identities of groups that the device belongs to such as deviceGroupList, the group of application identities of all applications, such as D'A or DA, for example, on this device deviceApplicationList, the list of identities of neighbor nodes deviceNeighborList, battery info etsiBattery, memory information etsiMemory, and sensor/actuator information etsiSensor. The subscription collection may include attributes such as deviceType, which may be the type of device; deviceID, which may be the device identifier; addressType, which may be the address type of the device; areaNwkID, which may include the identity of the M2M area network which the device belongs to; internal address, which may be the internal IP address of the device used insider the M2M area network; and external address, which may be the external IP address of the device used outside of the M2M area network. This address may contain port information if port number is used in address translation at M2M gateway. Further, the interval between two sleeps sleepinterval, the time duration of each sleep sleepDuration, the status of the device status, such as sleeping or awake, the maximum number of unsolicited Router Advertisements to be sent maxRtrAdvertisements, the minimum interval between two consecutive Router Advertisements sent to all-nodes multicast address minDelayBetweenRas, the maximum delay for sending a Router Advertisement message as the responses to a received Router Solicitation message maxRaDelayTime, the timer for tentative neighbor cache tentativeNceLifetime, the hop limit value for Duplicate Address Detection message hopLimit, the interval for initial retransmission of the first maxRtrSolications Router Solicitations rtrSolicitationInterval, the number of initial retransmissions maxRtrSolicitations, and the maximum retransmission internal for Router Solicitations since the device may use binary exponential backoff after the initial retransmission maxRtrSolicitationInterval.

Figure 41A:
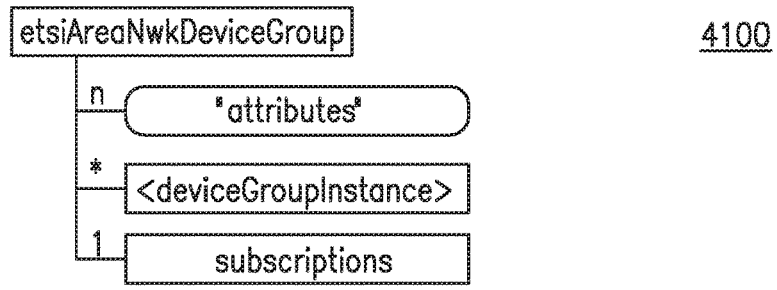
FIG. 41A is a block diagram illustrating an example resource structure for etsiAreaNwkDeviceGroup.

As shown in FIG. 41A, an etsiAreaNwkDeviceGroups MO may include sub-resources such as <deviceGroupinstance> defining a group of devices and subscriptions. The subscription collection and attributes may include expirationTime, accessRightID, searchStrings, creationTime, lastModifiedTime, contentType, which may be formatted as FFS, moID, originalMO, and a description including the text-format description of mgmtObj.

Figure 41B:
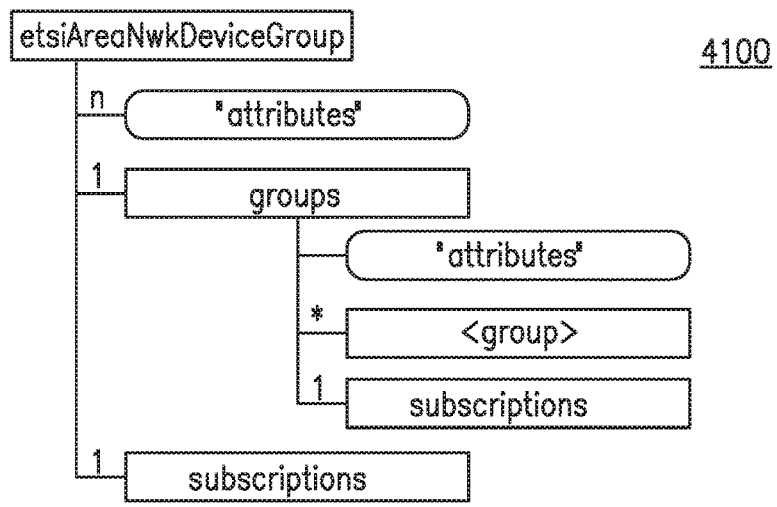
FIG. 41B is a block diagram illustrating an example resource structure for a etsiAreaNwkDeviceGroup.

As shown in FIG. 41B, an etsiAreaNwkDeviceGroups MO may include sub-resources subscriptions and groups defining as a collection of multiple groups of devices. An etsiAreaNwkDeviceGroups may include attributes such as expirationTime, accessRightID, searchStrings, creationTime, lastModifiedTime, contentType, which may be formatted as FFS, moID, originalMO, and a description including the text-format description of mgmtObj.

Each sub-resource <group> may contain a list of identities of devices, which belong to the same group. In addition, a device may belong to and exist in multiple <group> instances.

Figure 42:
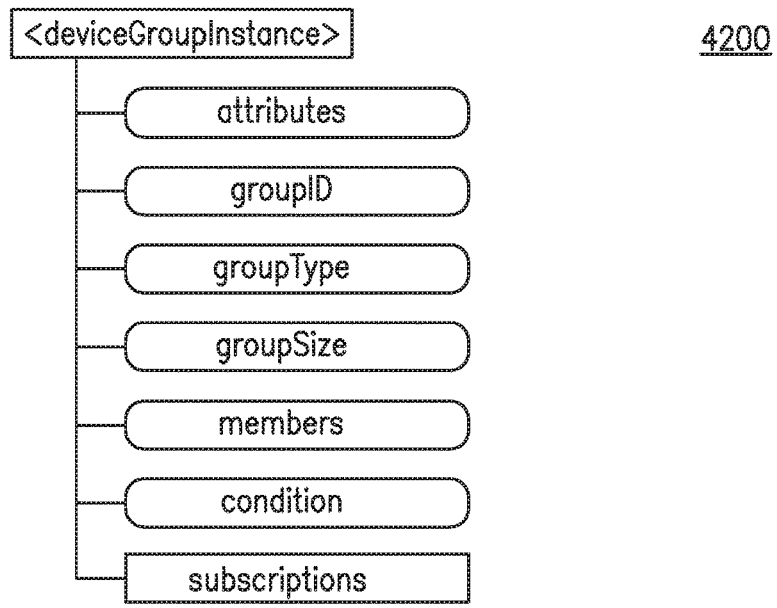
FIG. 42 is a block diagram illustrating an example resource structure for deviceGroupinstance.

As shown in FIG. 42, each <deviceGroupinstance> may include sub-resources such as subscriptions, with subscription collection and attributes including expirationTime, accessRightID, searchStrings, creationTime, lastModifiedTime, contentType, which may be in FFS format, moID, originalMO, and a description including the text-format description of mgmtObj. Further, groupID may include the group identity, groupType, which may include the group type, groupSize such as the number of devices in the group, members defined as the collection of devices in the group, and the condition, which specifies the condition for devices to be a member of this group.

Figure 43A:
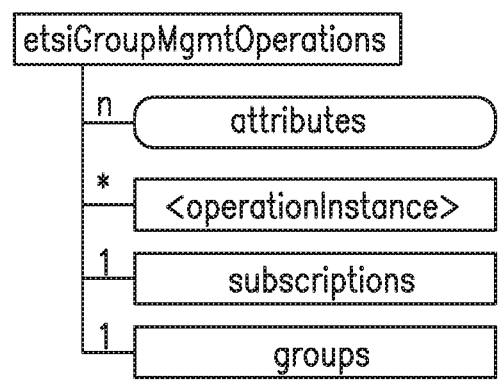
FIG. 43A is a block diagram illustrating an example resource structure for a etsiGroupMgmtOperations.

As shown in FIG. 43A, etsiGroupMgmtOperations MO may include sub-resources such as <operationInstance>, which may stand for an operation or action to be executed on a group, and groups, which may include the placeholder for defined device groups with each device group including a list of devices and may be operated by one or multiple <operationInstance>. The subscription collection and attributes may include expirationTime, accessRightID, searchStrings, creationTime, lastModifiedTime, contentType, moID, originalMO, and description including the text-format description of mgmtObj.

In addition to being used to manage/operate a group of M2M devices behind a M2M gateway, etsiGroupMgmtOperations may be used to manage the operation of a group of M2M devices directly connecting to a M2M server. In this case, etsiGroupMgmtOperations may be placed under <sclBase-of-Server>/scls/mgmtObjs/etsiGroupMgmtOperations. The corresponding <operationInstance> may include de-registering a group of M2M devices or gateways, sending a group of M2M devices or gateways to sleep mode, rebooting a group of M2M devices or gateways, and performing the same software/firmware update on a group of M2M devices or gateways.

Also, etsiGroupMgmtOperations may be used to manage a group of applications on a M2M Device or a M2M Gateway. In this case, etsiGroupMgmtOperations may be placed under <sclBase-of-Server>/scls/<scl>/applications/mgmtObjs/etsiGroupMgmtOperations. The corresponding <operationInstance> may include de-registering a group of M2M applications, and performing the same software/firmware update on a group of M2M applications.

Figure 43B:
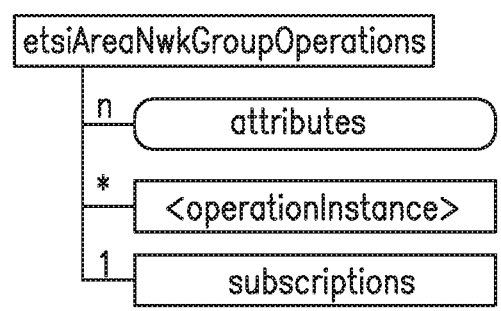
FIG. 43B is a block diagram illustrating an example resource structure for a etsiareaNwkGroupOperations.

As shown in FIG. 43B, an etsiAreaNwkDeviceGroupOperations MO may include sub-resources, such as <operationInstance>, which may stand for an operation or action to be executed on a group. The subscription collection and attributes may include expirationTime, accessRightID, searchStrings, creationTime, lastModifiedTime, contentType, moID, originalMO, and description including the text-format description of mgmtObj.

Figure 44A:
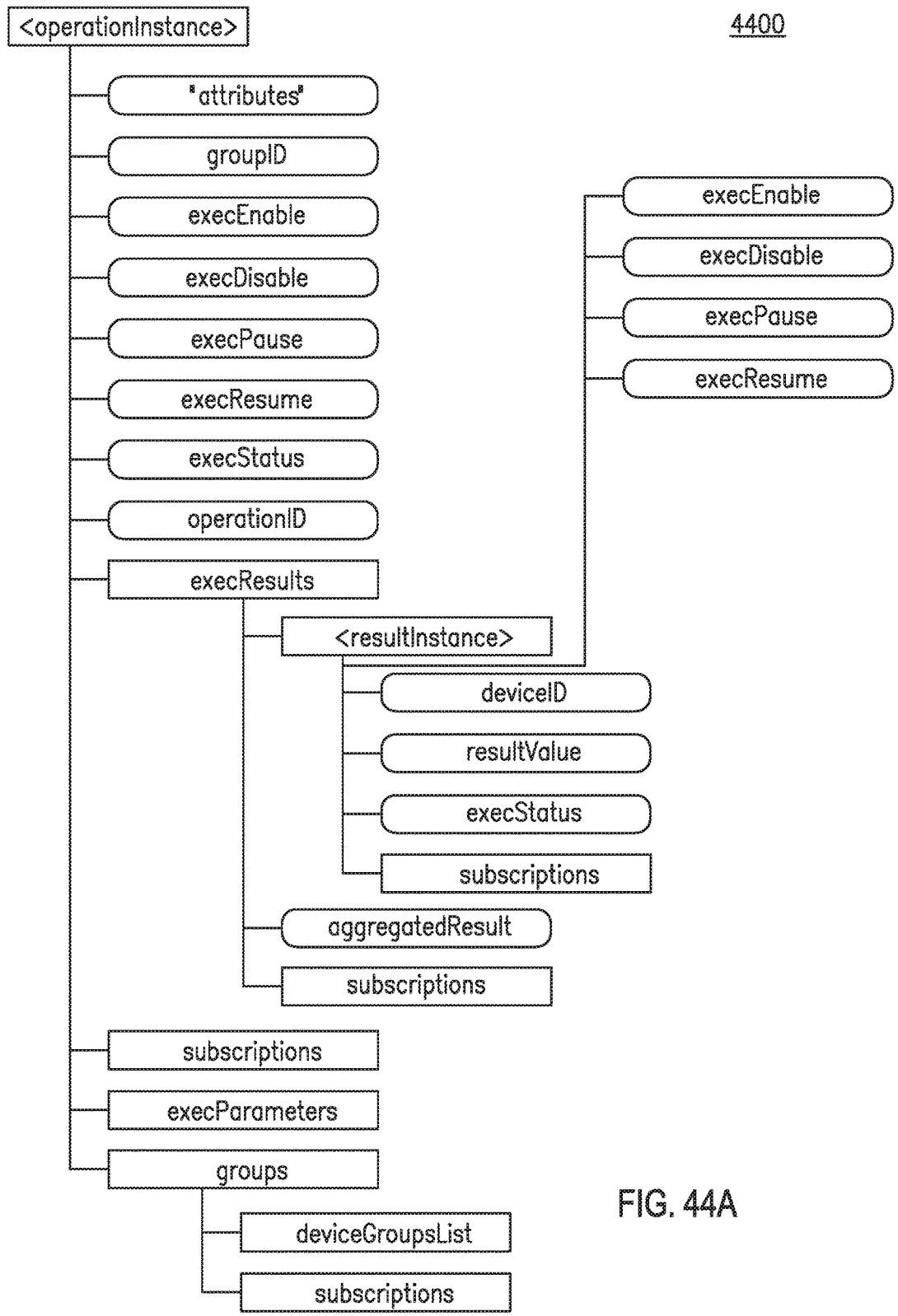
FIG. 44A is a block diagram illustrating an example resource structure for a operationInstance.

As shown in FIG. 44A, each <operationInstance> may include a sub-resource such as subscriptions with subscription collection and attributes including expirationTime, accessRightID, searchStrings, creationTime, lastModifiedTime, contentType, which may be in FSS format, moID, originalMO, and description including the text-format description of mgmtObj. <operationInstance> may include as a sub-resource groups, which may include deviceGroupsList, which may be a list of identities of groups that <operationInstance> may be executed on, execResults, which may be the collection of results of <operationInstance>, and may have further sub-resources including <resultInstance> and subscription and an attribute aggregatedResult.

<resultInstance> may represent the result from a single device and may have sub-resource subscriptions and attributes including deviceID, which may be the device identity, resultValue, which may be the result from the device deviceID, execStatus, which may be the status of <operationInstance> on the device deviceID, execEnable, which may be to start the <operationInstance> on deviceID, execPause, which may be to pause the <operationInstance> on deviceID, execResume, which may be to resume the <operationInstance> on deviceID, execDisable, which may be to stop the <operationInstance> on deviceID, aggregatedResult, which may be the aggregated result, execParameters, which may contain the arguments required by <operationInstance> and may be operation-specific.

Further, operationID, which may be the identification of <operationInstance> and may specify what <operationInstance> stands for. groupID may provide the identity of the group which the <operationInstance> may be executed on, and groupID may contain multiple identifications if <operationInstance> can be executed on multiple defined device groups. Alternatively, those multiple group identifications may be contained in deviceGroupsList resource. execEnable may start the <operationInstance> on devices in the groupID. execPause may pause the <operationInstance> on devices in the groupID, execResume may resume the <operationInstance> on devices in the groupID, execDisable may stop the <operationInstance> on devices in the groupID, execStatus may provide the status of the <operationInstance>. The status may include pending, running, stopped, paused, resumed, the number of devices successfully executed, finished & successfully on devices, and/or the number of devices that fail to be executed on.

Figure 44B:
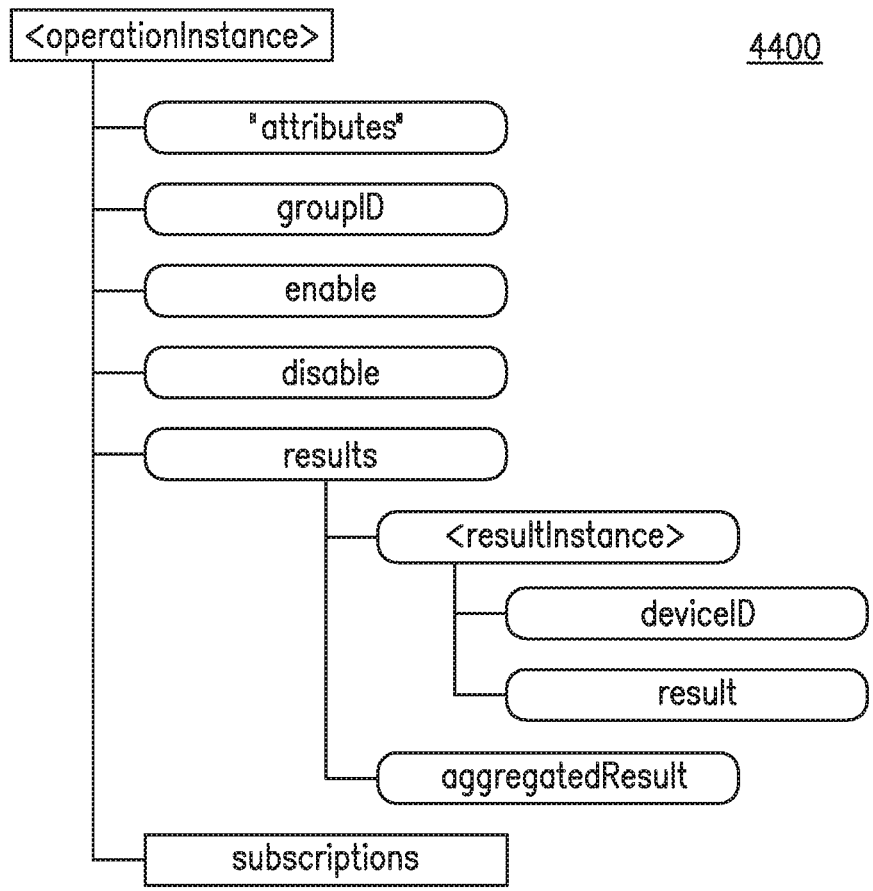
FIG. 44B is a block diagram illustrating an example resource structure for a operationInstance.

As shown in FIG. 44, each <operationInstance> may include a sub-resource such as subscriptions with subscription collection and attributes including expirationTime, accessRightID, searchStrings, creationTime, lastModifiedTime, contentType, which may be in FSS format, moID, originalMO, and description including the text-format description of mgmtObj. Further, groupID may provide the identity of the group which the <operation> may be executed on, enable may be provided to start the <operation>, disable to stop the <operation>, results may include the collection of results of <operation>, and aggregatedResult may include the aggregated result. Each <resultInstance> may have two attributes such as deviceID and resultValue, which may indicate the device identity and result, and which may be the result from the device, deviceID.

Figure 45:
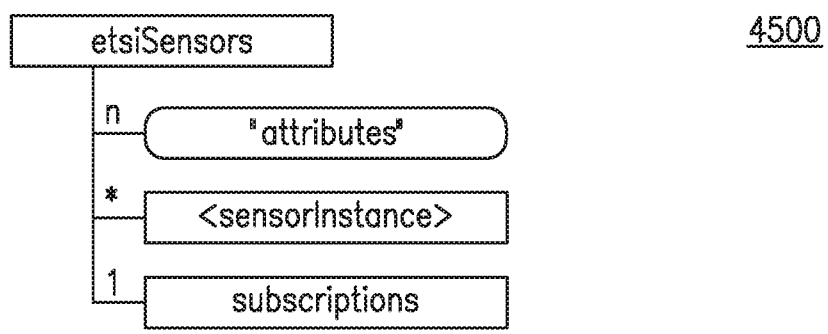
FIG. 45 is a block diagram illustrating an example resource structure for an etsiSensor.

As shown in FIG. 45, an etsiSensors MO may include sub-resource such as <sensorInstance> for a sensor instance and subscriptions including subscription collection and attributes, such as expirationTime, accessRightID, searchStrings, creationTime, lastModifiedTime, contentType, which may be in FFS format, moID, originalMO, and description, which may include the text-format description of mgmtObj. etsiSensors may be applicable to a D-type M2M device which has M2M service capabilities.

Figure 46:
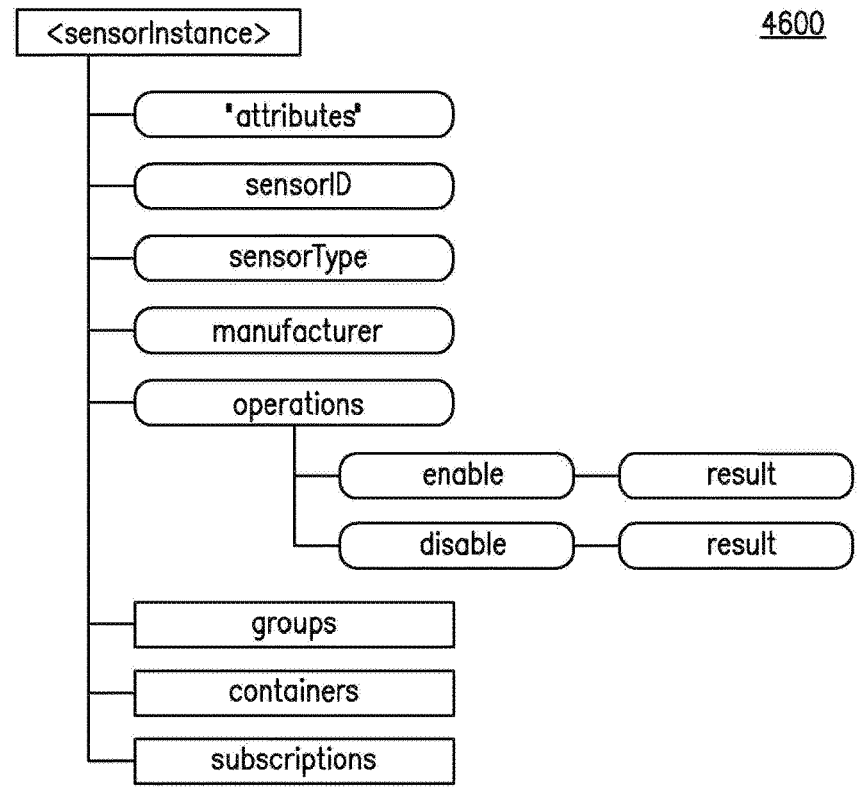
FIG. 46 is a block diagram illustrating an example resource structure for a sensorInstance.

As shown in FIG. 46, <sensorInstance> may include sub-resources such as groups with related groups. For example, one group may be applicationList to stand for D'A or DA applications on this device, which uses the <sensorInstance>. Containers may store sensor readings. Subscription collection and attributes may include expirationTime, accessRightID, searchStrings, creationTime, lastModifiedTime, contentType, which may be in FFS format, moID, originalMO, and description that may include the text-format description of mgmtObj. sensorID may describe the identity of <sensorInstance>. sensorType may describe the type of <sensorInstance> such as temperature, pressure, manufacturer defining the manufacturer of <sensorInstance>, and operations, which may include the operations which are operable on <sensorInstance>. Enable may include enabling the sensor reading. If it is a switch sensor, enable may mean switch-on. Enable may have a result as its attribute to store the operation result. Disable may include disabling the sensor reading. If it is a switch sensor, disable may mean switch-off. Disable may have a result as its attribute to store the operation result. Other operations may be possible for a particular sensor.

Example Operating Environments

Figure 47:
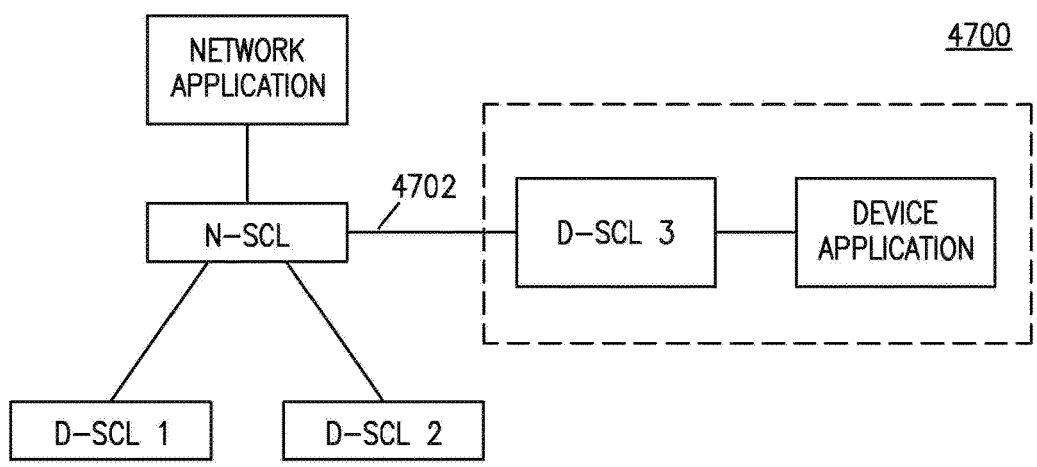
FIG. 47 is a block diagram of example architecture of a system for performing xREM.

FIG. 47 is a block diagram of example architecture of a system 4700 for performing REM in accordance with a management object used by DA and/or GA to manage another D/G that registers with an M2M Server (it is <scl> here).

The M2M Server (i.e., <scl>) may announce its management object to the D/G, as shown at 4702. Then DA/GA can access such announced management object in D/G, and in turn, be able to manage the other D/G via messaging relaying at the M2M Server.

FIG. 38A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

Figure 48A:
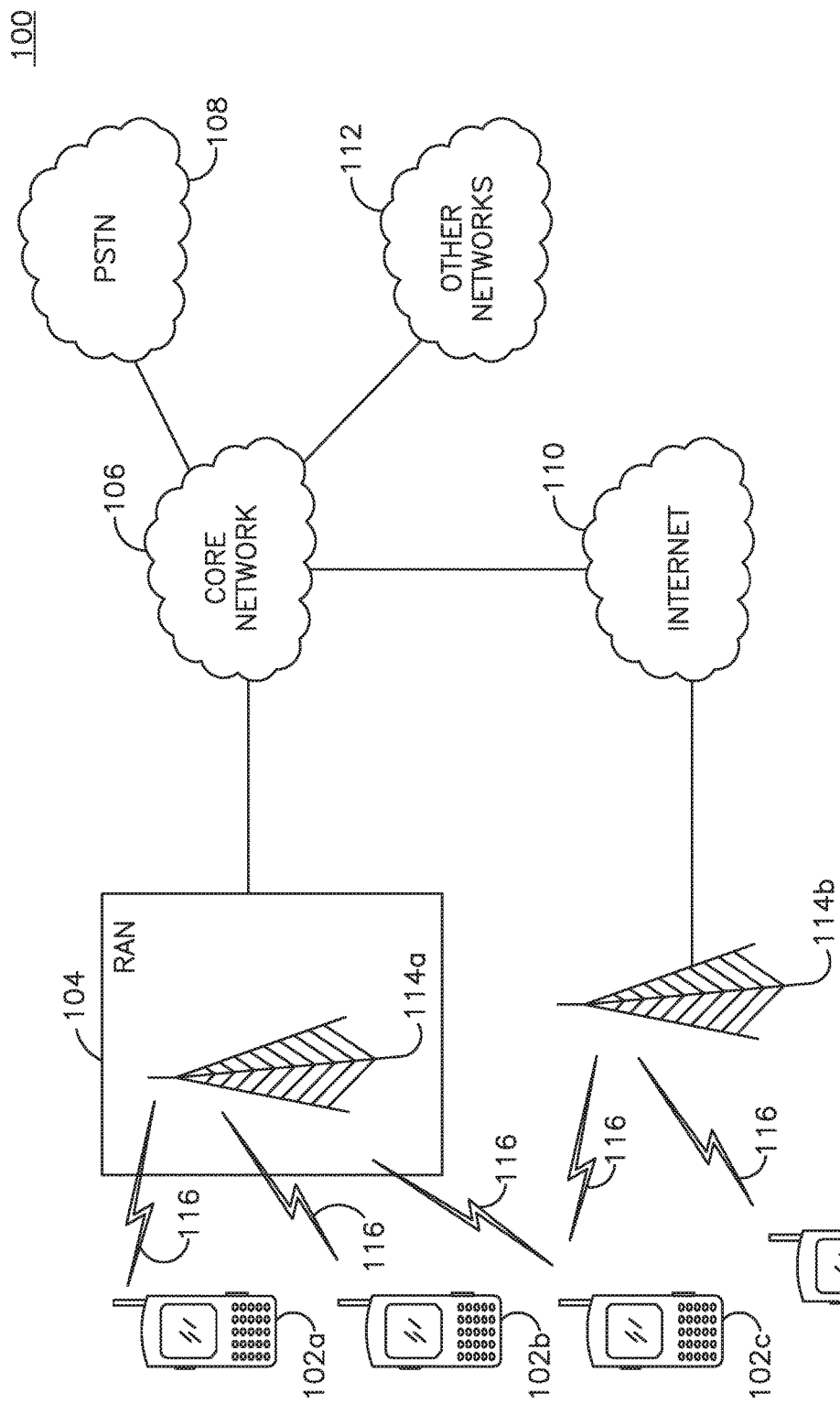
FIG. 48A is a diagram of an example communications system in which one or more disclosed embodiments may be implemented.

As shown in FIG. 48A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 48A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN).

In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 48A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 48A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 48A may be configured to communicate with the base station 114a, which may employ a cellular-based radio technology, and with the base station 114b, which may employ an IEEE 802 radio technology.

Figure 48B:
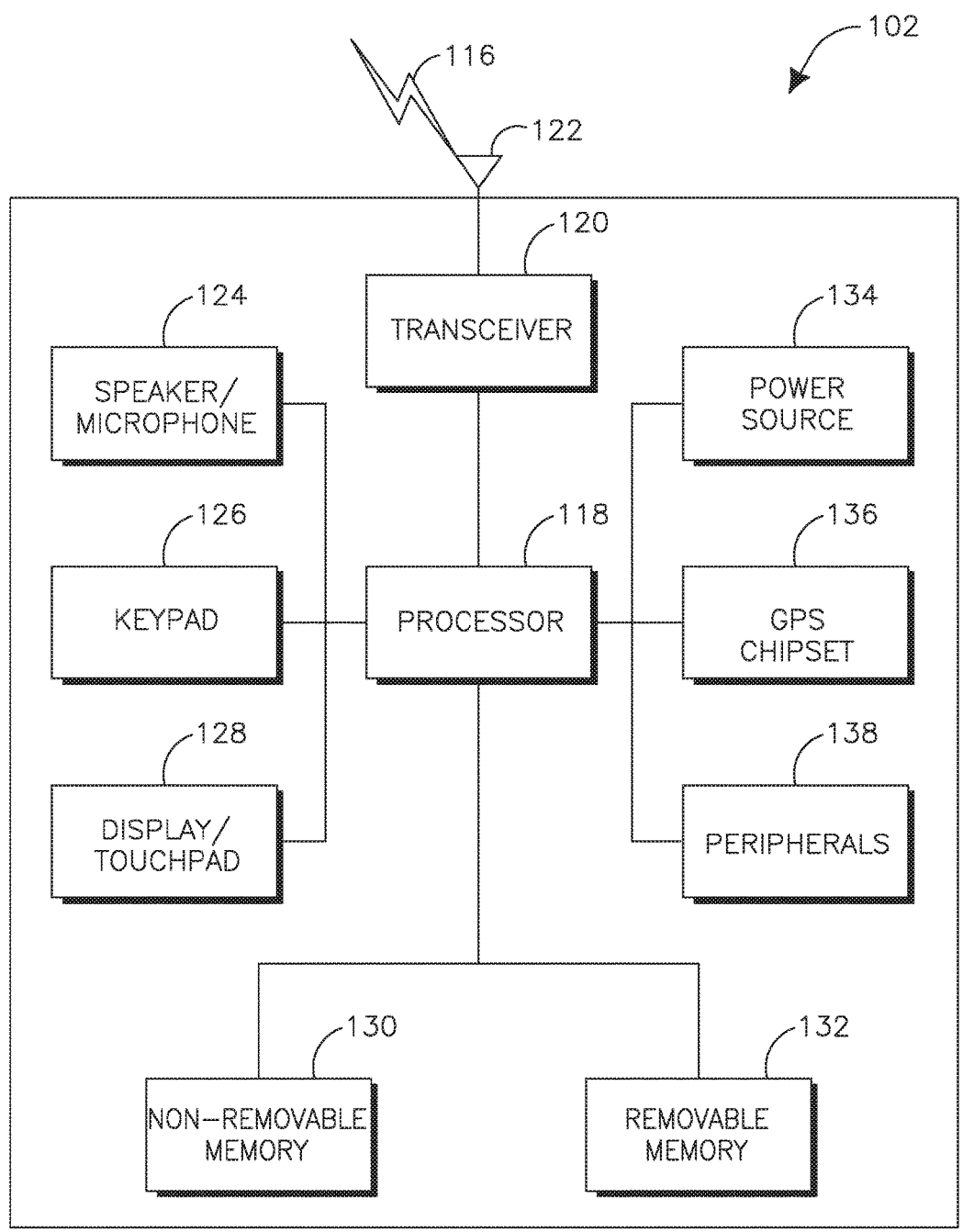
FIG. 48B is a system diagram of an example wireless transmit/receive unit (WTRU) that may be used within the communications system illustrated in FIG. 48A.

FIG. 48B is a system diagram of an example WTRU 102. As shown in FIG. 48B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 48B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 48B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 48C:
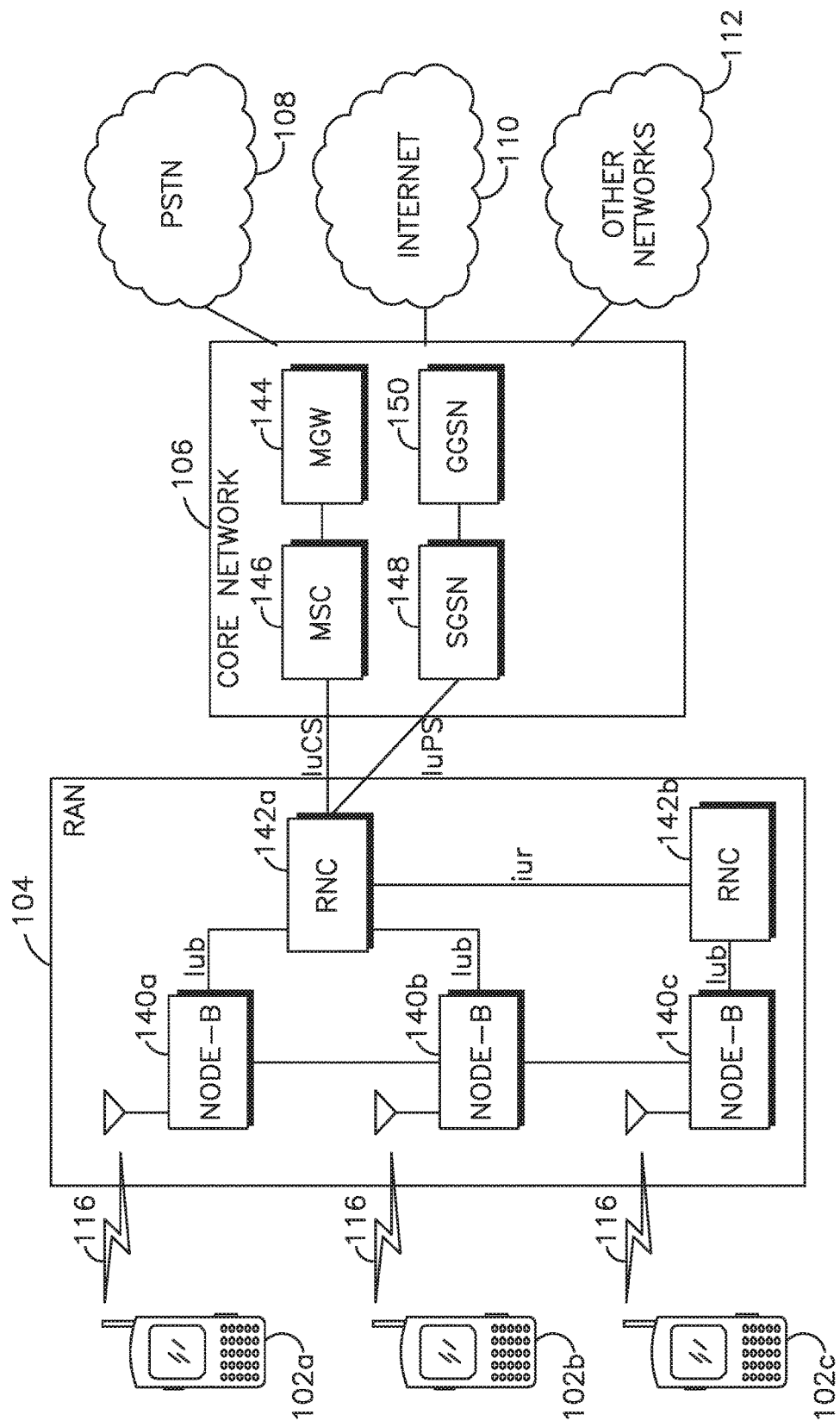
FIG. 48C is a system diagram of an example radio access network and an example core network that may be used within the communications system illustrated in FIG. 48A.

FIG. 48C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 48C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 48C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 48C may include a media gateway (MGW) 144, a mobile switching center (MSC) 146, a serving GPRS support node (SGSN) 148, and/or a gateway GPRS support node (GGSN) 150. While each of the foregoing elements are depicted as part of core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 48D:
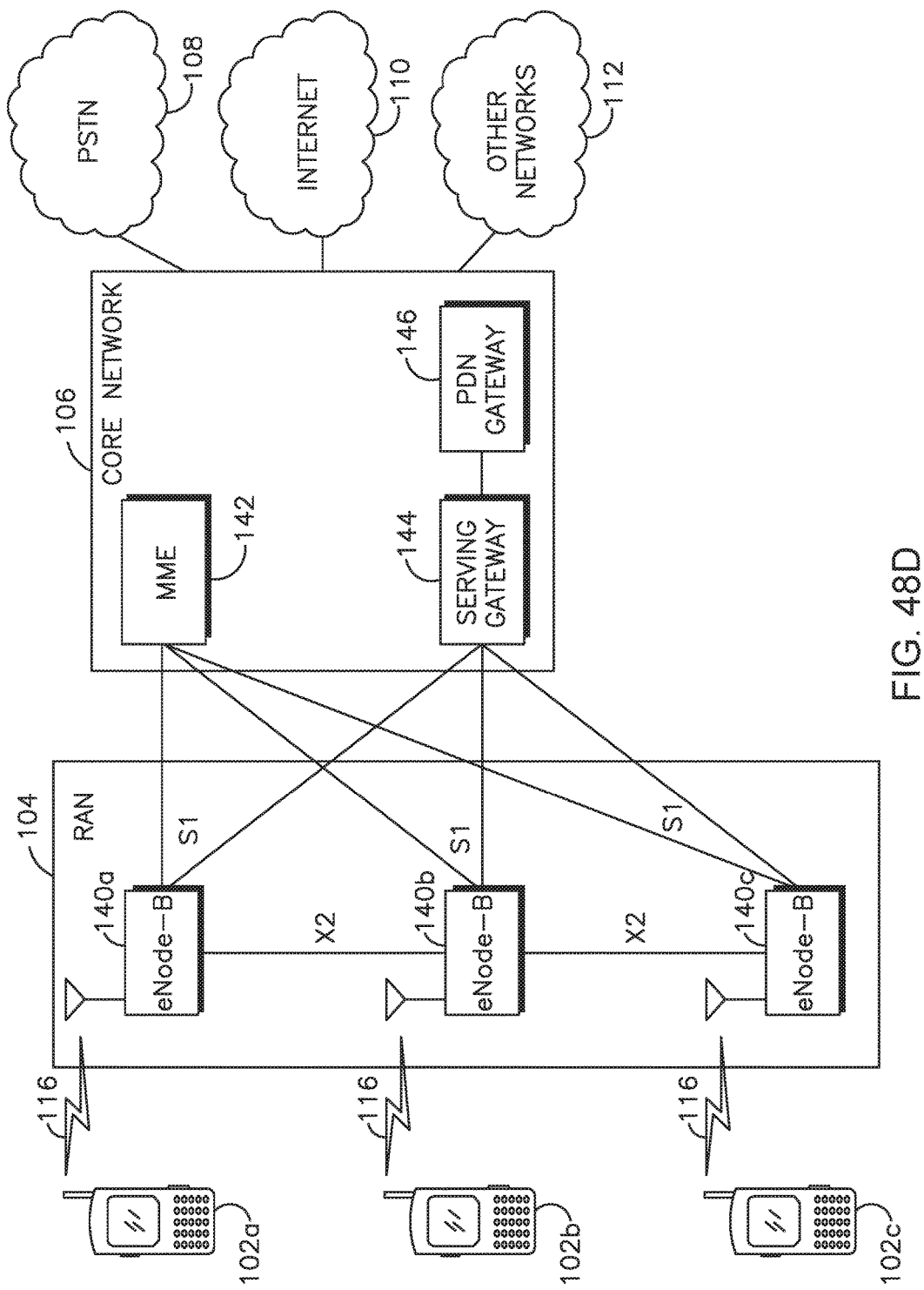
FIG. 48D is a system diagram of another example radio access network and an example core network that may be used within the communications system illustrated in FIG. 48A.

FIG. 48D is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 48D, the eNode-Bs 140a, 140b, 140c may communicate with one another over an X2 interface.

The core network 106 shown in FIG. 48D may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 48E:
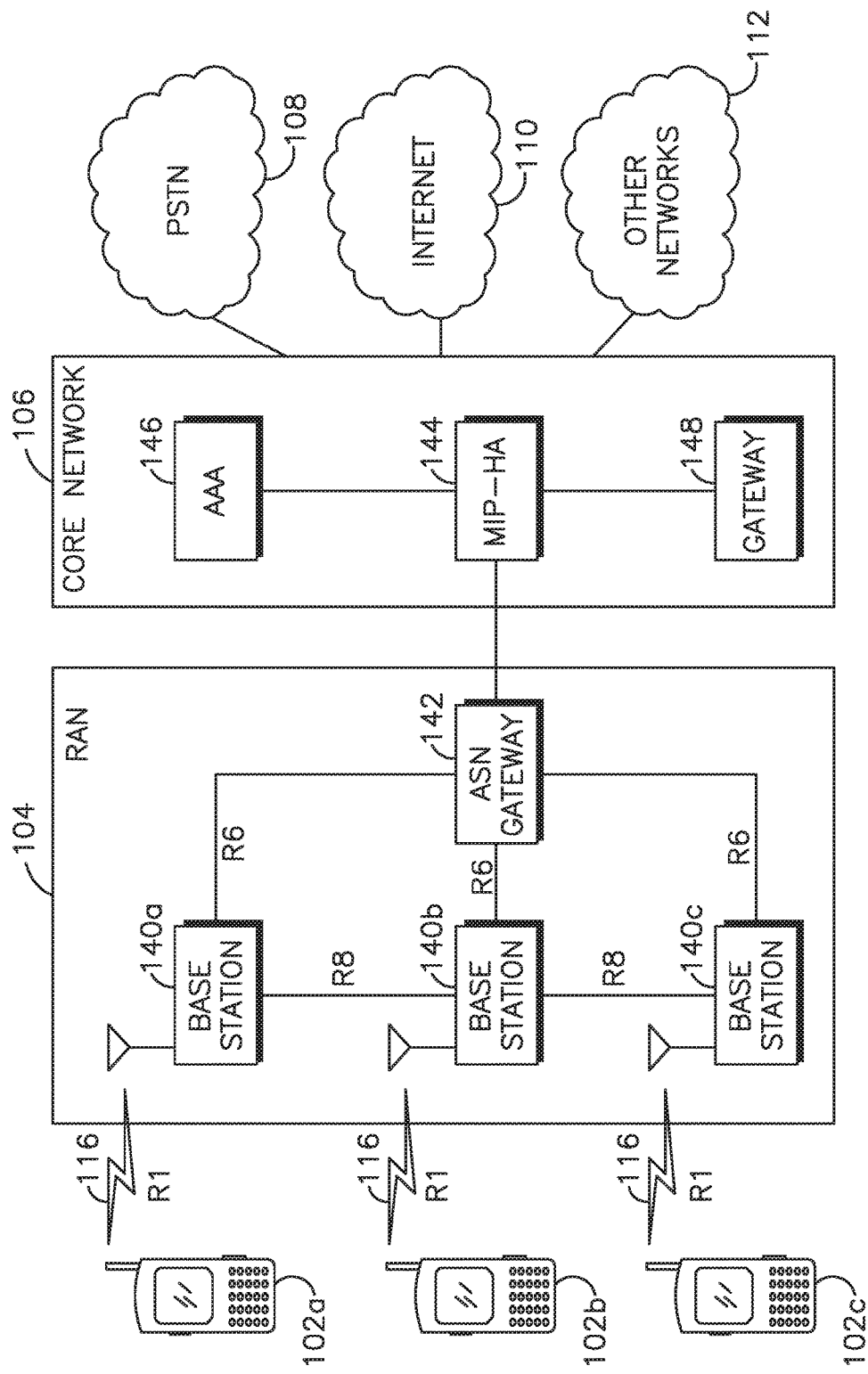
FIG. 48E is a system diagram of another example radio access network and an example core network that may be used within the communications system illustrated in FIG. 48A.

FIG. 48E is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 48E, the RAN 104 may include base stations 140a, 140b, 140c, and an ASN gateway 142, though it will be appreciated that the RAN 104 may include any number of base stations and ASN gateways while remaining consistent with an embodiment. The base stations 140a, 140b, 140c may each be associated with a particular cell (not shown) in the RAN 104 and may each include one or more transceivers for communicating with the WTRUs 102a, 102b, 102c over the air interface 116. In one embodiment, the base stations 140a, 140b, 140c may implement MIMO technology. Thus, the base station 140a, for example, may use multiple antennas to transmit wireless signals to, and receive wireless signals from, the WTRU 102a. The base stations 140a, 140b, 140c may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 140a, 140b, 140c may be defined as an R8 reference point that includes protocols for facilitating WTRU handovers and the transfer of data between base stations. The communication link between the base stations 140a, 140b, 140c and the ASN gateway 142 may be defined as an R6 reference point. The R6 reference point may include protocols for facilitating mobility management based on mobility events associated with each of the WTRUs 102a, 102b, 102c.

As shown in FIG. 48E, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 112, which may include other wired or wireless networks that are owned and/or operated by other service providers.

Although not shown in FIG. 48E, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Conclusion

The Draft ETSI TS 102 690 V0.12.3 (2011-06) and earlier versions of the same (collectively "Draft ETSI Standards for M2M Communications") include a number of terms having given definitions that define meanings of such terms within context of the Draft ETSI Standards for M2M Communications. Incorporated herein by reference are the terms and associated definitions specified, disclosed and/or referred to by the Draft ETSI TS 102 690 V0.12.3 (2011-06) and earlier versions of the same.

Embodiments

In an embodiment, a method may include implementing one or more management layers for managing M2M entities in an M2M environment. The method may also include using a plurality of management layers to manage a M2M area network, wherein the M2M area network may include one or more M2M end devices. The M2M end devices may include, for example, an M2M gateway and/or an M2M device. The management layers may include any of an application management layer, service management layer, network management layer and a device management layer. The management layers may provide any of configuration management, fault management, and performance management of the M2M entities.

In an embodiment, a method may include configuring a first M2M entity with a service capability ("SC") for remote entity management ("REM") and with a resource structure having a subordinate resource structure for performing REM of a second M2M entity in accordance with one of a plurality of management layers. The method may further include performing REM of the second M2M entity by manipulating any of a resource and attribute of the subordinate resource structure.

A method as in the preceding embodiment, wherein the first M2M entity may be an M2M server, and wherein the second M2M entity may be an M2M application, an M2M service capability, an M2M area network, an M2M gateway or an M2M device.

A method as in at least one of the preceding embodiments, wherein the plurality of management layers may include at least two of a device management layer, a network management layer, a service management layer and an application management layer.

A method as in at least one of the preceding embodiments, wherein the subordinate resource structure for remote entity management of a second M2M entity may include a resource structure for remote entity management of a M2M application in accordance with an application management layer.

A method as in the preceding embodiment, wherein the application management layer may include one or more functions for performing application lifecycle management.

A method as in at least one of the preceding embodiments, wherein the subordinate resource structure for remote entity management of a second M2M entity may include a resource structure for remote entity management of a M2M service capability in accordance with a service management layer.

A method as in the preceding embodiment, wherein the service management comprises functions for performing software management and/or firmware management.

A method as in at least one of the preceding embodiments, wherein the subordinate resource structure for remote entity management of a second M2M entity may include a resource structure for remote entity management of a M2M area network in accordance with a network management layer.

A method as in at least one of the preceding embodiments, wherein the subordinate resource structure for remote entity management of a second M2M entity may include a resource structure for remote entity management of a M2M device in accordance with a device management layer.

A method as in at least one of the preceding embodiments, wherein each the plurality of management layers may define one or more functions for performing any of configuration management, fault management, and performance management of the second M2M entity.

A method as in at least one of the preceding embodiments may further include receiving, at the first M2M entity, a command to manipulate any of the resource and attribute of the subordinate resource structure, wherein REM of the second M2M entity may be performed responsive to the command.

A method as in the preceding embodiment, wherein the command comprises a RESTful method.

A method as in at least one of the preceding embodiments may further include receiving, at the first M2M entity, a first command to manipulate any of the resource and attribute of the subordinate resource structure.

A method as in the preceding embodiment, wherein performing REM of the second M2M entity may include sending, to the second M2M entity, a second command to manipulate any of the resource and attribute of the subordinate resource structure, and performing REM of the second M2M entity responsive to the received second command.

A method as in the preceding embodiment, wherein both of the first and second commands may include a RESTful method.

A method as in at least one of the preceding embodiments, wherein the first command may include a RESTful method, and wherein the second command comprise a non-RESTful method.

A method as in at least one of the preceding embodiments, wherein performing REM of the second M2M entity may include sending, to the second M2M entity, a command to manipulate any of the resource and attribute of the subordinate resource structure, and performing REM of the second M2M entity responsive to the received command.

A method as in the preceding embodiment, wherein the command may be either a non-RESTful method or a RESTful method.

A method as in at least one of the preceding embodiments, wherein the second M2M entity may include a copy of the subordinate resource structure, and wherein performing REM of the second M2M entity comprises manipulating the copy of the subordinate resource structure to replicate the subordinate resource structure after manipulating any of a resource and attribute of the subordinate resource structure.

In an embodiment, an apparatus may include a first M2M entity configured with a SC for REM and with a resource structure having a subordinate resource structure for performing REM of a second M2M entity in accordance with one of a plurality of management layers. The apparatus may further include a processor adapted to perform REM of the second M2M entity by manipulating any of a resource and attribute of the subordinate resource structure.

An apparatus as in the preceding embodiment, wherein the first M2M entity may include an M2M server, and wherein the second M2M entity may include an M2M application, an M2M service capability, an M2M area network, an M2M gateway or an M2M device.

An apparatus as in at least one of the preceding embodiments, wherein the plurality of management layers may include two or more of a device management layer, a network management layer, a service management layer, and an application management layer.

An apparatus as in at least one of the preceding embodiments, wherein the subordinate resource structure for REM of a second M2M entity may include a resource structure for REM of a M2M application in accordance with an application management layer.

An apparatus as in at least one of the preceding embodiments, wherein the application management layer may include functions for performing application lifecycle management.

An apparatus as in at least one of the preceding embodiments, wherein the subordinate resource structure for remote entity management of a second M2M entity may include a resource structure for remote entity management of a M2M service capability in accordance with a service management layer.

An apparatus as in the preceding embodiment, wherein the service management may include functions for performing software management and/or firmware management.

An apparatus as in at least one of the preceding embodiments, wherein the subordinate resource structure for remote entity management of a second M2M entity may include a resource structure for remote entity management of a M2M area network in accordance with a network management layer.

An apparatus as in at least one of the preceding embodiments, wherein subordinate resource structure for remote entity management of a second M2M entity may include a resource structure for remote entity management of a M2M device in accordance with a device management layer.

An apparatus as in at least one of the preceding embodiments, wherein each the plurality of management layers may define functions for performing any of configuration management, fault management, and performance management of the second M2M entity.

An apparatus as in at least one of the preceding embodiments, wherein the first M2M entity may include: a SC for receiving a command to manipulate any of the resource and attribute of the subordinate resource structure, wherein REM of the second M2M entity may be performed responsive to the command.

An apparatus as in at least one of the preceding embodiments, wherein the command may be a RESTful method.

An apparatus as in at least one of the preceding embodiments, wherein the first M2M entity may include (i) a SC for receiving a first command to manipulate any of the resource and attribute of the subordinate resource structure, and (ii) a SC for communicating, to the second M2M entity, a second command to manipulate any of a copy of the resource and a copy of the attribute of a copy of the subordinate resource structure maintained at the second M2M entity.

An apparatus as in the preceding embodiment, wherein the processor may be adapted to send, to the second M2M entity, the second command to cause manipulation of any of the copy of the resource and the copy of the attribute of the copy of the subordinate resource structure maintained at the second M2M entity responsive to second command.

An apparatus as in at least one of the preceding embodiments, wherein both of the first and second commands may be a RESTful method, or alternatively, wherein the first command may be a RESTful method and the second command may be a non-RESTful method.

An apparatus as in at least one of the preceding embodiments, wherein the first M2M entity may include (i) a SC for communicating, to the second M2M entity, a command to manipulate any of a copy of the resource and a copy of the attribute of a copy of the subordinate resource structure maintained at the second M2M entity.

An apparatus as in the preceding embodiment, wherein the processor may be adapted to send, to the second M2M entity, the command to cause manipulation of any of the copy of the resource and the copy of the attribute of the copy of the subordinate resource structure maintained at the second M2M entity responsive to second command.

An apparatus as in the preceding embodiment, wherein the command may be a non-RESTful method or, alternatively, a RESTful method.

In an embodiment, a system may include a server having a first M2M entity configured with a service capability for REM and with a resource structure having a subordinate resource structure for performing REM of a second M2M entity in accordance with one of a plurality of management layers. The system may also include a processor adapted to perform REM of the second M2M entity by manipulating any of a resource and attribute of the subordinate resource structure. The system may further include a device having a second M2M entity configured with a copy of the subordinate resource structure; and a processor adapted to manipulate the copy of the subordinate resource structure to replicate the subordinate resource structure after manipulation by the server.

In an embodiment, a tangible computer readable storage medium may have stored thereon executable instructions for (i) configuring a first M2M entity with a SC for REM and with a resource structure having a subordinate resource structure for performing REM of a second M2M entity in accordance with one of a plurality of management layers; and (ii) performing REM of the second M2M entity by manipulating any of a resource and attribute of the subordinate resource structure. The executable instructions may be loadable into a memory of and executable by a computing device.

In an embodiment, a tangible computer readable storage medium may have stored thereon executable instructions for (i) configuring a first M2M entity with a SC for REM and with a resource structure having a subordinate resource structure for performing REM of a second M2M entity in accordance with one of a plurality of management layers; (ii) performing REM of the second M2M entity by manipulating any of a resource and attribute of the subordinate resource structure; and (iii) manipulating a copy of a subordinate resource structure maintained by the second M2M entity so as to replicate the subordinate resource structure after manipulation of any of the resource and the attribute of the subordinate resource structure.

In an embodiment, a method may include implementing a client/server-based remote entity management (xREM) model for performing management functions in an M2M environment. The method may also include applying the model to M2M devices in the M2M environment.

In an embodiment, a method may include using a tunnel-based technique to implement xREM in a M2M environment using multiple management protocols; and applying the model to M2M devices in the M2M environment.

In an embodiment, a method may include providing a resource command comprising an attribute component, and communicating the resource command to a M2M end device.

A method as in the preceding embodiment, wherein the resource command may be a non-RESTful command.

In an embodiment, a method may include providing a resource commands structure having an attribute component and possibly some sub-parameters. The method may also include communicating the resource commands to an M2M end device. Traditional non-RESTful management commands may be easily operated onto M2M end devices using RESTful methods.

In an embodiment, a method may include storing at a M2M device or an M2M gateway, an accessHistories resource structure, detecting an operation at the M2M device or the M2M gateway and manipulating the accessHistories resource structure to memorialize at least one detail associated with the operation.

In an embodiment, a method may include receiving a request for delegating authority over a machine-to-machine (M2M) device or gateway, and authorizing the authority over the M2M device or gateway.

In an embodiment, a method may be implemented at an M2M end device. The method may include receiving a resource command having one or more attribute components for managing the M2M end device.

A method as in the preceding embodiment may also include applying one or more management functions based on the resource command.

In an embodiment, a method may include providing a resource command including one or more attribute components, and communicating the resource command to an M2M end device.

In an embodiment, a method for performing xREM in a first system may include, for example, first, second and third devices adapted for communicating in accordance with a protocol for M2M communications ("M2M-communications protocol"), such as Draft ETSI TS 102 690. The M2M-communications protocol may define a stack or collection of logical layers for managing entities residing at each of the logical layers ("management layers"). These management layers may include, for example, an M2M application management layer, an M2M service capabilities layer, an M2M Network Management layer and a M2M device management layer. The first device may define an entity residing at a first logical layer of the management layers ("first management layer"). The entity may be, for example, an M2M application, an M2M service capability, an M2M are network, an M2M gateway or a M2M device. The first device may include a first data structure that defines a resource for managing the entity in accordance with the first management layer ("first-management-layer resource"). The second device may include a second data structure that defines first-management-layer resource, as well. And the second device may communicatively couple with the first and third devices.

The method may include providing, from the second device to the third device, an identifier identifying the first-management-layer resource. The method may also include receiving, at the second device from the third device, the identifier and information for application to the first-management-layer resource, and applying the information to the first-management-layer resource.

In one or more instances, applying the information to the first-management-layer resource may include manipulating the second data structure. Alternatively, applying the information to the first-management-layer resource may include sending the information to the first device from the second device to cause the first device to manipulate the first data structure.

The identifier may include and/or be, for example, any of a uniform resource identifier, link and address. The first-management-layer resource may include and/or define a management object. Further, each of the first, second and third devices may include a module for communicating in accordance with the M2M-communications protocol. The third device may further include an application, e.g., an M2M application, adapted to provide the information for application to the first-management-layer resource, and wherein execution of the application involves communication of information in accordance with the M2M-communication protocol. The first device may also include an application, and execution of such application involves communication of information in accordance with the M2M-communication protocol.

In one or more embodiments, the first device may be an appliance, the third device may be a wireless transmit/receive unit ("WTRU"), and second device may include a server.

As another example, an apparatus for xREM is disclosed. The apparatus includes a first device adapted for communicating in accordance with the M2M-communications protocol. As above, the M2M-communication protocol defines a stack or collection of the management layers. The first device may include a first data structure. The first data structure defines a first-management-layer resource for managing, in accordance with a first management layer, an entity of a second device that resides at the first management layer. The first device may also communicatively couple with the second device and a third device. The first device nay further include memory adapted to store executable instructions adapted to: provide, to the third device, an identifier identifying the first-management-layer resource; receive, from the third device, the identifier and information for application to first-management-layer resource; and apply the information to the first-management-layer resource. The first device may also include a processor adapted to obtain the executable instructions from the memory and to execute the executable instructions.

The identifier may include and/or be, for example, any of a uniform resource identifier, link and address. The first-management-layer resource may include a management object.

The first device may include a module for communicating in accordance with the M2M-communications protocol. The information for application to first-management-layer resource may be received from an application of the third device. The first device may include a server, the second device may be an appliance, and the third device may be a WTRU.

Another example of a method for performing xREM in second system is disclosed. The second system may include first and second devices adapted for communicating in accordance with the M2M-communications protocol. The M2M-communications protocol defines the management layers. The first device defines an entity residing at a first management layer, and comprises a first data structure defining the first-management-layer resource. The second device includes a second data structure that defines the first-management-layer resource, as well. The first device may communicatively couple with the second device.

The method may include the first device negotiating with the second device to define a type of management protocol for managing the entity in accordance with the first management layer. Negotiating with the second device may include, for example, sending, from the first device to the second device, a first message to request registration of a service capability layer ("SCL") at the second device, wherein the first message includes an attribute defining the type of management protocol and a first value assigned to the attribute. Negotiating with the second device may also include receiving, at the first device from the second device, a second message sent in response to the first message. The second message may include a second value assigned to the attribute defining the type of management protocol.

In one or more embodiments, negotiating with the second device may further include receiving, at the first device from the second device, a third message to request an update to the registration of the SCL, wherein the third message includes the second value assigned to the attribute defining the type of management protocol.

As an alternative, negotiating with the second device may include sending, from the first device to the second device, a first message to request creation of an object in the SCL at the second device. To facilitate this, the first message may include an attribute defining the type of management protocol and a first value assigned to the attribute. Negotiating with the second device may further include receiving, at the first device from the second device, a second message sent in response to the first message. The second message may include a second value assigned to the attribute.

As another alternative, negotiating with the second device may include sending, from the first device to the second device, a first message to request an update to an object in the SCL at the second device. The first message may include an identifier for identifying the attribute defining the type of management protocol and a first value assigned to the attribute. Negotiating with the second device may also include receiving, at the first device from the second device, a second message sent in response to the first message. The second message may include a second value assigned to the attribute.

In yet another alternative, negotiating with the second device may include receiving, at the first device from the second device, a first message to request an update to an object in the SCL at the second device. To facilitate the update, the first message may include an identifier identifying the attribute defining the type of management protocol and a first value assigned to the attribute. Negotiating with the second device may also include sending a second message from the first device to the second device, in response to the first message. The second message may include a second value assigned to the attribute.

In another alternative, negotiating with the second device may include sending, from the first device to a third device, a first message to discover the second device. The first message may include an attribute defining the type of management protocol and a first value assigned to the attribute. Negotiating with the second device may also include receiving, at the first device from the third device, a second message sent in response to the first message. This second message may include a second value assigned to the attribute defining the type of protocol. The second value assigned to the attribute may be obtained from an SCL of the second device. Negotiating with the second device may further include selecting the second device for registration of an SCL of the first device if the first and second values are equal.

The type of management protocol may be any of a Simple Network Management Protocol ("SNMP"), a Broadband Forums ("BBF") TR-069 CPE WAN Management Protocol and an Open Mobile Alliance (OMA) Device Management (DM) protocol.

A further example of a method for performing xREM in the second system is disclosed. The method may include informing the second device of a type of management protocol for managing the entity in accordance with the first logical layer.

Another example of a method for performing xREM disclosed. The method may include a first device receiving, from a second device, a request for delegating authority for xREM of a third device to the first device; and in response the request, the second device may pass authority to the first device. After obtaining authority, the first device may execute authority over the third device.

In one or more embodiments, a method may include receiving, at a first entity from a second entity, a request for performing a RESTful method. The first entity may include a data structure of a resource defining a command ("command resource"). The request may include an identifier for identifying the command resource and information for executing the command. The method may also include executing the command as a function of the identifier and the information for executing the command. The identifier may be any of a uniform resource identifier, link and address.

In one or more embodiments, the first entity may include first and second data structure of first and second command resources, respectively, and the identifier may include and/or be a pointer to the second resource.

In one or more embodiments, a method may include receiving, at a first entity from a second entity, a request for performing a RESTful method. The first entity may include a data structure of a command resource defining a command. The request may include an identifier for identifying the command resource and information for executing the command. The method may also include generating, in response to the request, a first instance of the resource, and updating the identifier to identify the first instance of the resource, and executing the command as a function of the identifier and the information for executing the command.

In one or more embodiments, a method may include receiving, at a first entity from a second entity, a first request for performing a RESTful method. The first entity may include a data structure of a command resource, the first request may include a first identifier for identifying the command resource and first information for executing the command. The method may also include generating, in response to the first request, a first instance of the command resource; updating the first identifier to identify the first instance of the command resource; receiving, at the first entity from the second entity, a second request for performing a RESTful method. The second request may include a second identifier for identifying the command resource and second information for executing the command. The method may further include generating, in response to the second request, a second instance of the command resource; updating the second identifier to identify the second instance of the command resource; executing the command as a function of the first identifier and the first information for executing the command; and executing the command as a function of the second identifier and the second information for executing the command.

In an embodiment a method for performing xREM in accordance with a protocol for machine-to-machine communications is disclosed. The method may include receiving, at a first entity from a second entity, a request for performing a RESTful method ("RESTful-method request"). The first entity may include a data structure modifiable by the RESTful method. This data structure may be, for example, a data structure representative of a service-capability layer ("SCL"), including, for example, any data structures referred to herein as sclbase and the like. The RESTful-method request may identify a resource associated with a command executable by the first entity (hereinafter "resource command"). The method may also include performing the RESTful method to invoke a modification to the data structure in accordance with the resource command.

In one or more embodiments, the RESTful method may be a RESTful method CREATE, a RESTful method RETRIEVE, a RESTful method UPDATE and/or a RESTful method DELETE. In embodiments in which the RESTful method is, for example, a RESTful method CREATE, performing the RESTful method may include instantiating, in the data structure, a subordinate data structure representative of the resource command (hereinafter "command-resource structure").

In embodiments in which the RESTful method is a RESTful method DELETE, performing the RESTful method may include deleting the command-resource structure from the data structure. In embodiments in which the RESTful method is a RESTful method RETRIEVE, performing the RESTful method may include sending, to the second entity, a copy of some or all of command-resource structure and/or a state of command-resource structure ("command-resource state").

In embodiments in which the RESTful method is a RESTful method UPDATE, performing the RESTful method may include modifying the command-resource structure to invoke a change in a state of the command ("command state"). In one or more embodiments, modifying the subordinate data structure may include modifying the command-resource structure to invoke an execution of the command ("command execution"). The command execution may be invoked, for example, by the first entity responsive to detecting such modification to the command-resource structure.

In one or more embodiments, the resource command may define a subordinate resource ("sub-resource") for invoking command execution ("command-execution sub-resource"). This command-execution sub-resource may be, for example, one or more embodiments of a sub-resource referred to herein below as execEnable and the like. One or more element of the command-resource structure ("command-resource-structure elements") may be representative of the command-execution sub-resource.

In one or more embodiments, the RESTful-method request may include information for modifying the command-execution sub-resource to invoke a command execution. In these embodiments, modifying the command-execution sub-resource may include modifying the command-resource-structure elements representative of the command-execution sub-resource with the information so as to invoke a command execution.

The information for modifying the command-execution sub-resource to invoke a command execution may be a number, integer, character, code, etc. that may be assigned and interpreted to invoke a command execution. By way of example, the information for modifying the command-execution sub-resource to invoke the command execution may be a "0", and therefore, modifying the command-resource-structure elements representative of the command-execution sub-resource with a "0" invokes a command execution.

In one or more embodiments, the resource command may define an attribute for invoking a command execution. In these embodiments, the command-resource-structure elements may be representative of the attribute, and such elements may be identifiable by an identifier ("attribute identifier"). This command-execution attribute identifier may be, for example, one or more embodiments of an attribute referred to herein below as execEnable and the like.

The RESTful-method request may include the attribute identifier. Further, selection of the command-resource-structure elements representative of the attribute may invoke a command execution. And modifying the command-resource structure to invoke an execution of the command may include using the attribute identifier to select the command-resource-structure elements representative of the attribute, which in turn, invokes an execution of the command.

In one or more embodiments, modifying the command-resource structure may include modifying the command-resource structure to invoke a pause to a command execution. The pause to the command execution may be invoked, for example, by the first entity responsive to detecting such modification to the command-resource structure.

In one or more embodiments, the resource command may define a sub-resource for invoking the pause to the command execution. This sub-resource may be, for example, one or more embodiments of a sub-resource referred to herein below as execEnable and the like. In one or more embodiments, the RESTful-method request may include information for modifying the command-execution sub-resource to invoke a pause to the command execution. In these embodiments, modifying the command-resource structure to invoke a pause to the command execution may include modifying the command-resource-structure elements representative of the command-execution sub-resource to invoke the pause. The information for modifying the command-execution sub-resource may be a number, integer, character, code, etc. that may be assigned and interpreted to invoke a pause to the command execution. By way of example, the information for modifying the command-execution sub-resource to invoke the pause may be a "1", and therefore, modifying the command-resource-structure elements representative of the command-execution sub-resource with a "1" invokes a pause to a command execution.

In one or more embodiments, the resource command may define an attribute for invoking a pause to a command execution ("pause-execution attribute"). One or more of the command-resource-structure elements may be representative of the pause-execution attribute, and such elements may be identifiable by a corresponding attribute identifier. This pause-execution attribute may be, for example, one or more embodiments of an attribute referred to herein below as execPause and the like. The RESTful-method request may include the pause-execution-attribute identifier. Further, selection of the command-resource-structure elements representative of the pause-execution attribute may invoke a pause to a command execution. And modifying the command-resource structure to invoke a pause to a command execution may include using the pause-execution-attribute identifier to select the command-resource-structure elements representative of the pause-execution attribute, which in turn, invokes a pause to a command execution.

In one or more embodiments, modifying the command-resource structure may include modifying the command-resource structure to cause a paused execution of the command to resume execution ("resume-command execution"). The resume-command execution may be invoked, for example, by the first entity responsive to detecting the modification to the command-resource structure to cause a resume-command execution.

In one or more embodiments, the resource command may define a sub-resource for invoking a resume-command execution. This sub-resource may be, for example, one or more embodiments of a sub-resource referred to herein below as execEnable and the like. In one or more embodiments, the RESTful-method request may include information for modifying the command-execution sub-resource to invoke a resume-command execution. In these embodiments, modifying the command-resource structure to invoke a resume-command execution may include modifying the command-resource-structure elements representative of the command-execution sub-resource to invoke the resume-command execution. This information may be a number, integer, character, code, etc. that may be assigned and interpreted to invoke a resume-command execution. By way of example, the information for modifying the command-execution sub-resource to invoke the resume-command execution may be a "2", and therefore, modifying the command-resource-structure elements representative of the resume-command-execution sub-resource with a "2" invokes a resume-command execution.

In one or more embodiments, the resource command may define an attribute for invoking a resume-command execution ("resume-execution attribute"). One or more of the command-resource-structure elements may be representative of the resume-execution attribute, and such elements may be identifiable by a corresponding attribute identifier. This resume-execution attribute may be, for example, one or more embodiments of an attribute referred to herein below as execResume and the like. The RESTful-method request may include the resume-execution-attribute identifier. Further, selection of the command-resource-structure elements representative of the resume-execution attribute may invoke a resume-command execution. Modifying the command-resource structure to invoke a resume-command execution may include using the resume-execution-attribute identifier to select the command-resource-structure elements representative of the resume-execution attribute, which in turn, invokes a resume-command execution.

In one or more embodiments, modifying the command-resource structure may include modifying the command-resource structure to invoke a cancellation of a command execution ("cancel-command execution"). The cancel-command execution may be invoked, for example, by the first entity responsive to detecting the modification to the command-resource structure to invoke a cancel-command execution.

In one or more embodiments, the resource command may define a sub-resource for invoking a cancel-command execution. This sub-resource may be, for example, one or more embodiments of a sub-resource referred to herein below as execEnable and the like. In one or more embodiments, the RESTful-method request may include information for modifying the command-execution sub-resource to invoke a cancel-command execution. In these embodiments, modifying the command-resource structure to invoke a cancel-command execution may include modifying the command-resource-structure elements representative of the command-execution sub-resource to invoke the cancel-command execution. This information may be a number, integer, character, code, etc. that may be assigned and interpreted to invoke a cancel-command execution. By way of example, the information for modifying the command-execution sub-resource to invoke the cancel-command execution may be a "3", and therefore, modifying the command-resource-structure elements representative of the cancel-command-execution sub-resource with a "3" invokes a cancel-command execution.

In one or more embodiments, the resource command may define an attribute for invoking a cancel-command execution ("cancel-execution attribute"). One or more of the command-resource-structure elements may be representative of the cancel-execution attribute, and such elements may be identifiable by a corresponding attribute identifier. This cancel-execution attribute may be, for example, one or more embodiments of an attribute referred to herein below as execDisable and the like. The RESTful-method request may include the cancel-execution-attribute identifier. Further, selection of the command-resource-structure elements representative of the cancel-execution attribute may invoke a cancel-command execution. Modifying the command-resource structure to invoke a cancel-command execution may include using the cancel-execution-attribute identifier to select the command-resource-structure elements representative of the cancel-execution attribute, which in turn, invokes a cancel-command execution.

In one or more embodiments in which the RESTful method is a RESTful method DELETE, performing the RESTful method may include modifying the command-resource structure to invoke a change in a state of a command execution, and deleting the command-resource structure from the data structure.

In one or more embodiments, modifying the command-resource structure may include modifying the command-resource structure to invoke a cancel-command execution. The cancel-command execution may also be invoked by the first entity responsive to detecting the modification to the command-resource structure to invoke a cancel-command execution. Alternatively, the cancel-command execution may be invoked, for example, by the first entity responsive to the RESTful method DELETE.

In one or more embodiments, modifying the command-resource structure to invoke a cancel-command execution may include modifying the command-resource-structure elements representative of the command-execution sub-resource to invoke the cancel-command execution, as above. In one or more embodiments, modifying the command-resource structure to invoke a cancel-command execution may include using the cancel-execution-attribute identifier to select the command-resource-structure elements representative of the cancel-execution attribute, which in turn, invokes a cancel-command execution.

An alternative method for performing remote entity management in accordance with a protocol for machine-to-machine communications is disclosed. This method may include receiving, at the first entity from the second entity, a RESTful-method request. The first entity may include a data structure modifiable by the RESTful method. The data structure may include a subordinate data structure representative of a first resource, where the first resource defines an operation for invoking a command-resource state. The subordinate data structure may be identifiable by an identifier, and wherein the RESTful-method request may include the identifier and may identify the resource command. The method may also include performing the RESTful method to invoke a modification to the data structure in accordance with the identifier and the resource command.

In one or more embodiments, the operation for invoking a change in a command-resource state may include an operation to invoke a command execution, to invoke a pause to command execution, to invoke a resume-command execution or to invoke a cancel-command execution.

In an embodiment, a method for performing xREM in accordance with a protocol for machine-to-machine communications may include receiving, at a first entity from a second entity, a request for performing a RESTful method ("RESTful-method request"). The first entity may include a data structure modifiable by the RESTful method. This data structure may be, for example, a data structure representative of a service-capability layer ("SCL"), including, for example, any data structures referred to herein as sclbase and the like. The RESTful-method request may identify a resource associated with a command executable by a third entity (hereinafter "resource command"). The method may also include performing the RESTful method to invoke a modification to the data structure in accordance with the resource command.

In one or more embodiments, the RESTful method may be a RESTful method CREATE, a RESTful method RETRIEVE, a RESTful method UPDATE and/or a RESTful method DELETE. In embodiments in which the RESTful method is, for example, a RESTful method CREATE, performing the RESTful method may include instantiating, in the data structure, a subordinate data structure representative of the resource command (hereinafter "command-resource structure").

In embodiments in which the RESTful method is a RESTful method DELETE, performing the RESTful method may include deleting the command-resource structure from the data structure. In embodiments in which the RESTful method is a RESTful method RETRIEVE, performing the RESTful method may include sending, to the second entity, a copy of some or all of command-resource structure and/or a state of command-resource structure ("command-resource state").

In embodiments in which the RESTful method is a RESTful method UPDATE, performing the RESTful method may include modifying the command-resource structure to invoke a change in a state of the command ("command state"). In one or more embodiments, modifying the subordinate data structure may include modifying the command-resource structure to invoke an execution of the command ("command execution"). The command execution may be invoked, for example, by the first entity responsive to detecting such modification to the command-resource structure.

In one or more embodiments, the resource command may define a subordinate resource ("sub-resource") for invoking command execution ("command-execution sub-resource"). This command-execution sub-resource may be, for example, one or more embodiments of a sub-resource referred to herein below as execEnable and the like. One or more element of the command-resource structure ("command-resource-structure elements") may be representative of the command-execution sub-resource.

In one or more embodiments, the RESTful-method request may include information for modifying the command-execution sub-resource to invoke a command execution. In these embodiments, modifying the command-execution sub-resource may include modifying the command-resource-structure elements representative of the command-execution sub-resource with the information so as to invoke a command execution.

The information for modifying the command-execution sub-resource to invoke a command execution may be a number, integer, character, code, etc. that may be assigned and interpreted to invoke a command execution. By way of example, the information for modifying the command-execution sub-resource to invoke the command execution may be a "0", and therefore, modifying the command-resource-structure elements representative of the command-execution sub-resource with a "0" invokes a command execution.

In one or more embodiments, the resource command may define an attribute for invoking a command execution. In these embodiments, the command-resource-structure elements may be representative of the attribute, and such elements may be identifiable by an identifier ("attribute identifier"). This command-execution attribute identifier may be, for example, one or more embodiments of an attribute referred to herein below as execEnable and the like.

The RESTful-method request may include the attribute identifier. Further, selection of the command-resource-structure elements representative of the attribute may invoke a command execution. And modifying the command-resource structure to invoke an execution of the command may include using the attribute identifier to select the command-resource-structure elements representative of the attribute, which in turn, invokes an execution of the command.

In one or more embodiments, modifying the command-resource structure may include modifying the command-resource structure to invoke a pause to a command execution. The pause to the command execution may be invoked, for example, by the first entity responsive to detecting such modification to the command-resource structure.

In one or more embodiments, the resource command may define a sub-resource for invoking the pause to the command execution. This sub-resource may be, for example, one or more embodiments of a sub-resource referred to herein below as execEnable and the like. In one or more embodiments, the RESTful-method request may include information for modifying the command-execution sub-resource to invoke a pause to the command execution. In these embodiments, modifying the command-resource structure to invoke a pause to the command execution may include modifying the command-resource-structure elements representative of the command-execution sub-resource to invoke the pause. The information for modifying the command-execution sub-resource may be a number, integer, character, code, etc. that may be assigned and interpreted to invoke a pause to the command execution. By way of example, the information for modifying the command-execution sub-resource to invoke the pause may be a "1", and therefore, modifying the command-resource-structure elements representative of the command-execution sub-resource with a "1" invokes a pause to a command execution.

In one or more embodiments, the resource command may define an attribute for invoking a pause to a command execution ("pause-execution attribute"). One or more of the command-resource-structure elements may be representative of the pause-execution attribute, and such elements may be identifiable by a corresponding attribute identifier. This pause-execution attribute may be, for example, one or more embodiments of an attribute referred to herein below as execPause and the like. The RESTful-method request may include the pause-execution-attribute identifier. Further, selection of the command-resource-structure elements representative of the pause-execution attribute may invoke a pause to a command execution. And modifying the command-resource structure to invoke a pause to a command execution may include using the pause-execution-attribute identifier to select the command-resource-structure elements representative of the pause-execution attribute, which in turn, invokes a pause to a command execution.

In one or more embodiments, modifying the command-resource structure may include modifying the command-resource structure to cause a paused execution of the command to resume execution ("resume-command execution"). The resume-command execution may be invoked, for example, by the first entity responsive to detecting the modification to the command-resource structure to cause a resume-command execution.

In one or more embodiments, the resource command may define a sub-resource for invoking a resume-command execution. This sub-resource may be, for example, one or more embodiments of a sub-resource referred to herein below as execEnable and the like. In one or more embodiments, the RESTful-method request may include information for modifying the command-execution sub-resource to invoke a resume-command execution. In these embodiments, modifying the command-resource structure to invoke a resume-command execution may include modifying the command-resource-structure elements representative of the command-execution sub-resource to invoke the resume-command execution. This information may be a number, integer, character, code, etc. that may be assigned and interpreted to invoke a resume-command execution. By way of example, the information for modifying the command-execution sub-resource to invoke the resume-command execution may be a "2", and therefore, modifying the command-resource-structure elements representative of the resume-command-execution sub-resource with a "2" invokes a resume-command execution.

In one or more embodiments, the resource command may define an attribute for invoking a resume-command execution ("resume-execution attribute"). One or more of the command-resource-structure elements may be representative of the resume-execution attribute, and such elements may be identifiable by a corresponding attribute identifier. This resume-execution attribute may be, for example, one or more embodiments of an attribute referred to herein below as execResume and the like. The RESTful-method request may include the resume-execution-attribute identifier. Further, selection of the command-resource-structure elements representative of the resume-execution attribute may invoke a resume-command execution. Modifying the command-resource structure to invoke a resume-command execution may include using the resume-execution-attribute identifier to select the command-resource-structure elements representative of the resume-execution attribute, which in turn, invokes a resume-command execution.

In one or more embodiments, modifying the command-resource structure may include modifying the command-resource structure to invoke a cancellation of a command execution ("cancel-command execution"). The cancel-command execution may be invoked, for example, by the first entity responsive to detecting the modification to the command-resource structure to invoke a cancel-command execution.

In one or more embodiments, the resource command may define a sub-resource for invoking a cancel-command execution. This sub-resource may be, for example, one or more embodiments of a sub-resource referred to herein below as execEnable and the like. In one or more embodiments, the RESTful-method request may include information for modifying the command-execution sub-resource to invoke a cancel-command execution. In these embodiments, modifying the command-resource structure to invoke a cancel-command execution may include modifying the command-resource-structure elements representative of the command-execution sub-resource to invoke the cancel-command execution. This information may be a number, integer, character, code, etc. that may be assigned and interpreted to invoke a cancel-command execution. By way of example, the information for modifying the command-execution sub-resource to invoke the cancel-command execution may be a "3", and therefore, modifying the command-resource-structure elements representative of the cancel-command-execution sub-resource with a "3" invokes a cancel-command execution.

In one or more embodiments, the resource command may define an attribute for invoking a cancel-command execution ("cancel-execution attribute"). One or more of the command-resource-structure elements may be representative of the cancel-execution attribute, and such elements may be identifiable by a corresponding attribute identifier. This cancel-execution attribute may be, for example, one or more embodiments of an attribute referred to herein below as execDisable and the like. The RESTful-method request may include the cancel-execution-attribute identifier. Further, selection of the command-resource-structure elements representative of the cancel-execution attribute may invoke a cancel-command execution. Modifying the command-resource structure to invoke a cancel-command execution may include using the cancel-execution-attribute identifier to select the command-resource-structure elements representative of the cancel-execution attribute, which in turn, invokes a cancel-command execution.

In one or more embodiments in which the RESTful method is a RESTful method DELETE, performing the RESTful method may include modifying the command-resource structure to invoke a change in a state of a command execution, and deleting the command-resource structure from the data structure.

In one or more embodiments, modifying the command-resource structure may include modifying the command-resource structure to invoke a cancel-command execution. The cancel-command execution may also be invoked by the first entity responsive to detecting the modification to the command-resource structure to invoke a cancel-command execution. Alternatively, the cancel-command execution may be invoked, for example, by the first entity responsive to the RESTful method DELETE.

In one or more embodiments, modifying the command-resource structure to invoke a cancel-command execution may include modifying the command-resource-structure elements representative of the command-execution sub-resource to invoke the cancel-command execution, as above. In one or more embodiments, modifying the command-resource structure to invoke a cancel-command execution may include using the cancel-execution-attribute identifier to select the command-resource-structure elements representative of the cancel-execution attribute, which in turn, invokes a cancel-command execution.

An alternative method for performing remote entity management in accordance with a protocol for machine-to-machine communications is disclosed. This method may include receiving, at the first entity from the second entity, a RESTful-method request. The first entity may include a data structure modifiable by the RESTful method. The data structure may include a subordinate data structure representative of a first resource, where the first resource defines an operation for invoking a command-resource state. The subordinate data structure may be identifiable by an identifier, and wherein the RESTful-method request may include the identifier and may identify the resource command. The method may also include performing the RESTful method to invoke a modification to the data structure in accordance with the identifier and the resource command.

In one or more embodiments, the operation for invoking a change in a command-resource state may include an operation to invoke a command execution, to invoke a pause to command execution, to invoke a resume-command execution or to invoke a cancel-command execution.

In one or more embodiments, any of the subordinate data structures for invoking a change in a state of the command (e.g., a <command>, <commandInstance> or <requestInstance>, as described below) may include any of an attribute, sub-resource, parameter and argument imported from the data structure to which such subordinate data structure is subordinated.

In an embodiment, a method may include maintaining an address mapping of devices, and using the address mapping to send notifications to the devices. The devices may be device management devices.

In an embodiment, a method may include managing, at a device management gateway, M2M devices with service capability (D), using one or a transparent mode and proxy mode for managing the M2M devices.

In an embodiment, a method may include managing, at a device management gateway, M2M devices, and using an adaptation mode for managing the M2M devices.

In an embodiment, a method may include managing, at a device management gateway, non-ETSI M2M devices, and using an adaptation mode for managing the non-ETSI M2M devices.

In an embodiment, a method may include, at a gateway, maintaining an address mapping of devices; and using the address mapping to send notifications to the devices.

A method as in the preceding embodiment, wherein the devices are device management devices.

A method as in at least one of the preceding embodiments, wherein the devices may be configured with service capability (D).

In an embodiment, a method may include, at a device management gateway, managing M2M devices with service capability (D); and using one or a transparent mode and proxy mode for managing the M2M devices.

In an embodiment, a method may include, at a device management gateway, managing M2M devices; and using an adaptation mode for managing the M2M devices.

In an embodiment, a method may include, at a device management gateway, managing non-ETSI M2M devices; and using an adaptation mode for managing the non-ETSI M2M devices.

In an embodiment, a data structure for data modeling M2M area networks and M2M devices including at least one management object including etsiAreaNwkInfo, at least one management object may include etsiAreaNwkDeviceInventory, at least one management object includes etsiAreaNwkDeviceGroups, at least one management object includes etsiAreaNwkGroupOperations, and at least one management object includes etsiSensors. The data structure may provide at least one of device inventory and configuration management, area network configuration management, area network performance management, or group management of devices.

In an embodiment, a method of data modeling for machine-to-machine (M2M) area network and M2M devices may include managing a data model for M2M including at least one management object for an M2M network and at least one device.

A method as in the preceding embodiments, wherein the managing may provide device inventory and configuration management.

A method as in at least one of the preceding embodiments, wherein the managing may provide area network configuration management.

A method as in at least one of the preceding embodiments, wherein the managing may provide area network performance management.

A method as in at least one of the preceding embodiments, wherein the managing may provide group management of devices.

A method as in at least one of the preceding embodiments, wherein the at least one management object may include etsiAreaNwkInfo.

A method as in at least one of the preceding embodiments, wherein the at least one management object may include etsiAreaNwkDeviceInventory.

A method as in at least one of the preceding embodiment, wherein the at least one management object may include etsiAreaNwkDeviceGroups.

A method as in at least one of the preceding embodiment, wherein the at least one management object may include etsiAreaNwkGroupOperations.

A method as in at least one of the preceding embodiment, wherein the at least one management object may include etsiSensors.

A method as in at least one of the preceding embodiment, wherein the at least one management object may include a sub-resource.

A method as in at least one of the preceding embodiments, wherein the at least one management object may include a sub-resource of another management object.

A method as in the preceding embodiments, wherein etsiAreaNwkInfo may include areaNwkInstance as a sub-resource.

A method as in at least one of the preceding embodiments, wherein areaNwkInstance may include any of areaNwkID, areaNwkType, workingChannelFrequency, and addressMode as sub-resources.

A method as in at least one of the preceding embodiments, wherein etsiAreaNwkDeviceInventory may include any of deviceInstance and deviceApplicationList as groups.

A method as in at least one of the preceding embodiments, wherein deviceInstance may include at least one of deviceGroupList, etsiBattery, etsiMemory, and etsiSensor as sub-resources.

A method as in at least one of the preceding embodiments, wherein deviceInstance may include at least one of deviceType, deviceID, addressType, areaNwkID, internal address, external address, sleepinterval, sleepDuration, status, maxRtrAdvertisements, minDelayBetweenRas, maxRaDelayTime, tenativeNceLifetime, hopLimit, rtrSolicitationInvterval, maxRtrSolicitatios, or maxRtrSolicitationInterval as sub-resources.

A method as in at least one of the preceding embodiments, wherein etsiAreaNwkDeviceGroups may include deviceGroupinstance as a sub-resource.

A method as in at least one of the preceding embodiments, wherein deviceGroupinstance may include at least one of groupID, groupType, groupSize, members, or condition as sub-resources.

A method as in at least one of the preceding embodiments, wherein etsiAreaNwkGroupOperations includes operationInstance as a sub-resource.

A method as in at least one of the preceding embodiments, wherein operationInstance may include at least one of groupID, enable, disable, results or description as sub-resources.

A method as in at least one of the preceding embodiments, wherein etsiSensors may include sensorInstance as a sub-resource.

A method as in at least one of the preceding embodiments, wherein sensorInstance may include at least one of sensorID, sensorType, manufacturer, or operations as sub-resources.

A method as in at least one of the preceding embodiments, wherein operations may include at least one of enable, disable or result as sub-resources.

In an embodiment, a resource structure for data modeling machine-to-machine (M2M) area networks and M2M devices may include at least one management object includes etsiAreaNwkInfo; at least one management object includes etsiAreaNwkDeviceInventory; at least one management object includes etsiAreaNwkDeviceGroups; at least one management object includes etsiAreaNwkGroupOperations; and at least one management object includes etsiSensors, the resource structure providing at least one of device inventory and configuration management, area network configuration management, area network performance management, or group management of devices.

In an embodiment, a data structure for data modeling M2M area networks and M2M devices includes at least one management object including etsiAreaNwkInfo, at least one management object including etsiAreaNwkDeviceInventory, at least one management object including etsiAreaNwkDeviceGroups, at least one management object including etsiGroupMgmtOperations, and at least one management object including etsiSensors. The data structure provides at least one of device inventory and configuration management, area network configuration management, area network performance management, or group management of devices.

In an embodiment, a method of data modeling for machine-to-machine (M2M) area network and M2M devices may include managing a data model for M2M including at least one management object for an M2M network and at least one device.

A method as in the preceding embodiment, wherein the managing provides device inventory and configuration management.

A method as in at least one of the preceding embodiments, wherein the managing provides area network configuration management.

A method as in at least one of the preceding embodiments, wherein the managing provides area network performance management.

A method as in at least one of the preceding embodiments, wherein the managing provides group management of devices.

A method as in at least one of the preceding embodiments, wherein the at least one management object includes etsiAreaNwkInfo.

A method as in at least one of the preceding embodiments, wherein the at least one management object includes etsiAreaNwkDeviceInventory.

A method as in at least one of the preceding embodiments, wherein the at least one management object includes etsiAreaNwkDeviceGroups.

A method as in at least one of the preceding embodiments, wherein the at least one management object includes etsiGroupMgmtOperations.

A method as in at least one of the preceding embodiments, wherein the at least one management object includes etsiSensors.

A method as in at least one of the preceding embodiments, wherein the at least one management object comprises a sub-resource.

A method as in at least one of the preceding embodiments, wherein the at least one management object comprises a sub-resource of another management object.

A method as in at least one of the preceding embodiments, wherein etsiAreaNwkInfo includes areaNwkInstance as a sub-resource.

A method as in at least one of the preceding embodiments, wherein areaNwkInstance includes at least one of areaNwkID, areaNwkType, workingChannelFrequency, addressMode, sleepinterval, sleepDuration, numOfDevices, and attachedDevices as sub-resources.

A method as in at least one of the preceding embodiments, wherein etsiAreaNwkDeviceInventory includes at least one of deviceInstance and areaNwkInstance as groups.

A method as in at least one of the preceding embodiments, wherein deviceInstance includes at least one of groups, deviceType, deviceID, addressType, areaNwkID, internalAddress, externalAddress, sleepinterval, sleepDuration, status, etsiBattery, etsiMemory, etsiSensor, blockSize, and MTU as sub-resources.

A method as in at least one of the preceding embodiments, wherein deviceInstance includes at least one of 6LoWPAN, Wi-Fi, RFID, and ZigBee as sub-resources.

A method as in at least one of the preceding embodiments, wherein etsiAreaNwkDeviceGroup includes deviceGroupinstance as a sub-resource.

A method as in at least one of the preceding embodiments, wherein deviceGroupinstance includes at least one of groupID, groupType, groupSize, members, or condition as sub-resources.

A method as in at least one of the preceding embodiments, wherein etsiGroupMgmtOperations includes at least one of groups, subscriptions, and operationInstance as sub-resources.

A method as in at least one of the preceding embodiments, wherein operationInstance includes at least one of groupID, execEnable, execDisable, execPause, execResume, execStatus, OperationID, execResults, and execParameters as sub-resources.

A method as in at least one of the preceding embodiments, wherein etsiSensors includes sensorInstance as a sub-resource.

A method as in at least one of the preceding embodiments, wherein sensorInstance includes at least one of sensorID, sensorType, manufacturer, or operations as sub-resources.

A method as in at least one of the preceding embodiments, wherein operations includes at least one of enable, disable or result as sub-resources.

In an embodiment, a wireless transmit/receive unit may be configured to implement a method as in any one of the preceding embodiments.

In an embodiment, a base station may be configured to implement a method as in any one of the preceding embodiments.

In an embodiment, a tangible computer readable storage medium may have stored thereon executable instructions, loadable into a memory of and executable by a computing device, for performing a method as in any one of the preceding embodiments.

In an embodiment, a resource structure for data modeling machine-to-machine (M2M) area networks and M2M devices may include at least one management object including etsiAreaNwkInfo; at least one management object including etsiAreaNwkDeviceInventory; at least one management object including etsiAreaNwkDeviceGroups; at least one management object including etsiGroupMgmtOperations; and at least one management object including etsiSensors, the resource structure providing at least one of device inventory and configuration management, area network configuration management, area network performance management, or group management of devices.

Variations of the method, apparatus and system described above are possible without departing from the scope of the invention. In view of the wide variety of embodiments that can be applied, it should be understood that the illustrated embodiments are exemplary only, and should not be taken as limiting the scope of the following claims. For instance, in the exemplary embodiments described herein include hand-held devices, which may include or be utilized with any appropriate voltage source, such as a battery and the like, providing any appropriate voltage.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the exemplary embodiments are not limited to the above-mentioned memories and that other platforms and memories may support the described methods.

No element, act, or instruction used in the description of the present application should be construed as critical or essential to the invention unless explicitly described as such.

Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Further, as used herein, the terms "set" and/or collection are intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. § 112, ¶6, and any claim without the word "means" is not so intended.

What is claimed is:

1. A method implemented in a machine-to-machine ("M2M") server, the method comprising:
    receiving, from a M2M application, a first request targeting a first resource of a first resource type, wherein the first resource type is configured for facilitating execution of a function in connection with a client M2M device, and wherein the first request comprises information for instantiating a sub-resource of the first resource;
    sending to the M2M application a first response to the first request, wherein the first response comprises an acknowledgment and a reference to use for retrieval of any of a status and a result of an execution of the function;
    autonomously creating a second resource of a second resource type, wherein the second resource type is configured for storing any of the status and the result separate from the first resource, wherein the second resource comprises a plurality of resource elements, including one or more resource elements for storing any of the status and the result, and wherein the reference corresponds to one or more of the plurality of resource elements;
    accessing any of the first resource and the sub-resource of the first resource to obtain any of the status and the result;
    storing any of the obtained status and the obtained result in the one or more resource elements of the second resource;
    receiving, from the M2M application, a second request including the reference; and
    sending a second response to the M2M application, wherein the second response includes any of the obtained status and the obtained result extracted from the one or more resource elements.

2. The method of claim 1, wherein the first request comprises a first RESTful method, wherein the second request comprises a RETRIEVE RESTful method.

3. The method of claim 2, wherein the first RESTful method is an UPDATE RESTful method or a RETRIEVE RESTful method.

4. The method of claim 1, further comprising: instantiating the sub-resource of the first resource.

5. The method of claim 1, wherein the first request comprises information to use for instantiating one or more of the second plurality of resource elements.

6. The method of claim 5, wherein autonomously creating a second resource comprises instantiating the second resource using the information.

7. The method of claim 5, wherein the information comprises any of a reference to the targeted first resource and an identity of an entity making the first request.

8. The method of claim 7, wherein autonomously creating a second resource comprises instantiating the second resource with any of the reference to the targeted first resource and the identity of the entity making the first request.

9. The method of claim 1, further comprising:
receiving a CREATE RESTful method including information for creating a resource of the first resource type; and
creating the first resource responsive to the CREATE RESTful method.

10. A machine-to-machine ("M2M") server comprising circuitry, including a receiver, transmitter, a processor and memory, configured to:
receive, from a M2M application, a first request targeting a first resource of a first resource type, wherein the first resource type is configured for facilitating execution of a function in connection with a client M2M device, and wherein the first request comprises information for instantiating a sub-resource of the first resource;
send to the M2M application a first response to the first request, wherein the first response comprises an acknowledgment and a reference to use for retrieval of any of a status and a result of an execution of the function;
autonomously create a second resource of a second resource type, wherein the second resource type is configured for storing any of the status and the result separate from the first resource, wherein the second resource comprises a plurality of resource elements, including one or more resource elements for storing any of the status and the result, and wherein the reference corresponds to one or more of the plurality of resource elements;
access any of the first resource and sub-resource of the first resource to obtain any of the status and the result;
store any of the obtained status and the obtained result in the one or more resource elements of the second resource;
receive, from the M2M application, a second request including the reference; and
send a second response to the M2M application, wherein the second response includes any of the obtained status and the obtained result extracted from the one or more resource elements.

11. The M2M server of claim 10, wherein the first request comprises a first RESTful method, wherein the second request comprises a RETRIEVE RESTful method.

12. The M2M server of claim 11, wherein the first RESTful method is an UPDATE RESTful method or a RETRIEVE RESTful method.

13. The M2M server of claim 10, wherein the circuitry is configured to instantiate sub-resource of the first resource.

14. The M2M server of claim 10, wherein the first request comprises information to use for instantiating one or more of the second plurality of resource elements.

15. The M2M server of claim 14, wherein the circuitry is configured to autonomously create the second resource at least in part by instantiating the second resource with the information.

16. The M2M server of claim 14, wherein the information comprises any of a reference to the targeted first resource and an identity of an entity making the first request.

17. The M2M server of claim 16, wherein the circuitry is configured to autonomously create the second resource at least in part by instantiating the second resource with any of the reference to the targeted first resource and the identity of the entity making the first request.

18. The M2M server of claim 10, wherein the circuitry is configured to:
receive a CREATE RESTful method including information for creating a resource of the first resource type; and
create the first resource responsive to the CREATE RESTful method.

* * * * *

UNITED STATES PATENT AND TRADEMARK OFFICE
CERTIFICATE OF CORRECTION

PATENT NO. : 10,455,024 B2
APPLICATION NO. : 15/965134
DATED : October 22, 2019
INVENTOR(S) : Chonggang Wang et al.

It is certified that error appears in the above-identified patent and that said Letters Patent is hereby corrected as shown below:

In the Specification

At Column 1, Line 10, delete "continuaton" and insert --continuation--

Signed and Sealed this
Thirteenth Day of June, 2023

Katherine Kelly Vidal
*Director of the United States Patent and Trademark Office*